US012472301B2

(12) United States Patent
Erbey, II et al.

(10) Patent No.: US 12,472,301 B2
(45) Date of Patent: Nov. 18, 2025

(54) NEGATIVE PRESSURE THERAPY SYSTEM AND METHODS

(71) Applicant: 3IVE Labs, LLC, Roswell, GA (US)

(72) Inventors: John R. Erbey, II, Milton, GA (US);
Jacob L. Upperco, Atlanta, GA (US);
Bryan J. Tucker, Chapel Hill, NC (US); Lance Michael Black, Pearland, TX (US)

(73) Assignee: 3IVE Labs, LLC, Roswell, GA (US)

( * ) Notice: Subject to any disclaimer, the term of this patent is extended or adjusted under 35 U.S.C. 154(b) by 745 days.

(21) Appl. No.: 17/885,667

(22) Filed: Aug. 11, 2022

(65) Prior Publication Data
US 2023/0060814 A1 Mar. 2, 2023

Related U.S. Application Data

(60) Provisional application No. 63/232,684, filed on Aug. 13, 2021.

(51) Int. Cl.
*A61M 1/00* (2006.01)
*A61B 5/0215* (2006.01)
(Continued)

(52) U.S. Cl.
CPC .............. *A61M 1/74* (2021.05); *A61B 5/0215* (2013.01); *A61M 25/0017* (2013.01);
(Continued)

(58) Field of Classification Search
CPC .. A61M 1/74; A61M 25/0017; A61M 25/007; A61M 25/04; A61M 60/178;
(Continued)

(56) References Cited

U.S. PATENT DOCUMENTS 1,870,942 A 8/1932 Beatty
2,285,980 A 6/1942 Jeckel
(Continued)

FOREIGN PATENT DOCUMENTS

AU 2013332448 A1 4/2015
CA 1243581 A 10/1988
(Continued)

OTHER PUBLICATIONS

Mordi et al., "Renal and Cardiovascular Effects of sodium-glucose cotransporter 2 (SGLT2) inhibition with loop Diuretics in diabetic patents with Chronic Heart Failure (REEDE-CHF): protocol for a randomised controlled double-blind cross-over trail". BJM open, 2017, vol. 7, pp. 1-9.
(Continued)

*Primary Examiner* — Nicholas J. Weiss
*Assistant Examiner* — Brandon W. Levy
(74) *Attorney, Agent, or Firm* — The Webb Law Firm

(57) ABSTRACT

A system for removing fluid from a urinary tract includes at least one sensor configured to detect signal(s) representative of pulmonary artery pressure and communicate signal(s) representative of the pulmonary artery pressure and a controller. The controller is configured to: receive and process the signal(s) from the at least one sensor to determine if the pulmonary artery pressure is above, below, or at a predetermined value; and provide a control signal, determined at least in part from the pulmonary artery pressure signal(s) received from the at least one sensor, to a negative pressure source to apply negative pressure to a urinary catheter to remove fluid from a urinary tract when the pulmonary artery pressure is above the predetermined value and to cease applying negative pressure when the pulmonary artery pressure is at or below the predetermined value.

55 Claims, 86 Drawing Sheets

(51) Int. Cl.
  *A61M 25/00*    (2006.01)
  *A61M 25/04*    (2006.01)
  *A61M 60/178*   (2021.01)
  *A61M 60/508*   (2021.01)

(52) U.S. Cl.
  CPC .......... *A61M 25/007* (2013.01); *A61M 25/04* (2013.01); *A61M 60/178* (2021.01); *A61M 60/508* (2021.01); *A61M 2202/0496* (2013.01); *A61M 2205/04* (2013.01); *A61M 2205/3523* (2013.01); *A61M 2205/3553* (2013.01); *A61M 2205/50* (2013.01); *A61M 2230/30* (2013.01)

(58) Field of Classification Search
  CPC ........ A61M 60/508; A61M 2202/0496; A61M 2205/04; A61M 2205/3523; A61M 2205/3553; A61M 2205/50; A61M 2230/30; A61M 60/216; A61M 60/531; A61M 60/884; A61M 2205/3344; A61M 2205/3507; A61M 2210/1082; A61M 1/87; A61M 1/73; A61M 27/008; A61M 27/002; A61M 2205/05; A61M 2210/1085; A61M 2210/1089; A61M 25/10; A61M 5/1723; A61M 1/84; A61M 25/0074; A61M 2205/18; A61M 27/00; A61M 1/28; A61M 1/80; A61M 2205/3303; A61M 2205/3355; A61M 2210/1078; A61B 5/0215; A61B 5/4836; A61B 5/208; A61B 5/6852; A61F 2002/048; A61F 2/04; A61F 2/042
  See application file for complete search history.

(56) References Cited

U.S. PATENT DOCUMENTS

| | | |
|---|---|---|
| 2,649,092 A | 8/1953 | Wallace |
| 3,108,595 A | 10/1963 | Overment |
| 3,397,699 A | 8/1968 | Kohl |
| 3,561,431 A | 2/1971 | Pannier, Jr. |
| 3,707,967 A | 1/1973 | Kitrilakis |
| 3,875,941 A | 4/1975 | Adair |
| 3,938,529 A | 2/1976 | Gibbons |
| 3,938,530 A | 2/1976 | Santomieri |
| 3,943,929 A | 3/1976 | Patel |
| 4,265,243 A | 5/1981 | Taylor |
| 4,306,557 A | 12/1981 | North |
| 4,324,663 A | 4/1982 | Hirel et al. |
| 4,349,029 A | 9/1982 | Mott |
| 4,425,124 A | 1/1984 | Womack |
| 4,437,856 A | 3/1984 | Valli |
| 4,531,933 A | 7/1985 | Norton et al. |
| 4,568,338 A | 2/1986 | Todd |
| 4,571,241 A | 2/1986 | Christopher |
| 4,575,371 A | 3/1986 | Nordqvist et al. |
| 4,629,015 A | 12/1986 | Fried et al. |
| 4,681,564 A | 7/1987 | Landreneau |
| 4,710,169 A | 12/1987 | Christopher |
| 4,738,667 A | 4/1988 | Galloway |
| 4,813,935 A | 3/1989 | Haber et al. |
| 4,834,724 A | 5/1989 | Geiss et al. |
| 4,932,938 A | 6/1990 | Goldberg et al. |
| 4,935,004 A | 6/1990 | Cruz |
| 4,945,895 A | 8/1990 | Takai et al. |
| 4,950,228 A | 8/1990 | Knapp, Jr. et al. |
| 4,957,479 A | 9/1990 | Roemer |
| 5,009,639 A | 4/1991 | Keymling |
| 5,011,488 A | 4/1991 | Ginsburg |
| 5,041,093 A | 8/1991 | Chu |
| 5,044,902 A | 9/1991 | Malbec |
| 5,059,169 A | 10/1991 | Zilber |
| 5,078,684 A | 1/1992 | Yasuda |
| 5,098,440 A | 3/1992 | Hillstead |
| 5,116,309 A | 5/1992 | Coll |
| 5,141,502 A | 8/1992 | Macaluso, Jr. |
| 5,193,533 A | 3/1993 | Body et al. |
| 5,256,146 A | 10/1993 | Ensminger et al. |
| 5,370,690 A | 12/1994 | Barrett |
| 5,401,257 A | 3/1995 | Chevalier, Jr. et al. |
| 5,451,215 A | 9/1995 | Wolter |
| 5,451,218 A | 9/1995 | Moore |
| 5,505,717 A | 4/1996 | Moore |
| 5,514,112 A | 5/1996 | Chu et al. |
| 5,523,092 A | 6/1996 | Hanson et al. |
| 5,536,274 A | 7/1996 | Neuss |
| 5,540,701 A | 7/1996 | Sharkey et al. |
| 5,554,144 A | 9/1996 | Wallace et al. |
| 5,562,622 A | 10/1996 | Tihon |
| 5,599,291 A | 2/1997 | Balbierz et al. |
| 5,647,843 A | 7/1997 | Mesrobian et al. |
| 5,662,713 A | 9/1997 | Andersen et al. |
| 5,709,874 A | 1/1998 | Hanson et al. |
| 5,727,555 A | 3/1998 | Chait |
| 5,769,821 A | 6/1998 | Abrahamson et al. |
| 5,785,641 A | 7/1998 | Davis |
| 5,795,319 A | 8/1998 | Ali |
| 5,865,764 A | 2/1999 | Moorhead |
| 5,873,865 A | 2/1999 | Horzewski et al. |
| 5,895,398 A | 4/1999 | Wensel et al. |
| 5,902,336 A | 5/1999 | Mishkin |
| 5,915,386 A | 6/1999 | Lloyd et al. |
| 5,957,867 A | 9/1999 | Lloyd et al. |
| 5,972,019 A | 10/1999 | Engelson et al. |
| 5,989,207 A | 11/1999 | Hughes |
| 6,066,113 A | 5/2000 | Overtoom |
| 6,090,069 A | 7/2000 | Walker |
| 6,111,520 A | 8/2000 | Allen et al. |
| 6,200,485 B1 | 3/2001 | Kitaevich et al. |
| 6,214,037 B1 | 4/2001 | Mitchell et al. |
| 6,283,940 B1 | 9/2001 | Mulholland |
| 6,332,892 B1 | 12/2001 | Desmond, III et al. |
| 6,364,868 B1 | 4/2002 | Ikeguchi |
| 6,402,736 B1 | 6/2002 | Brown et al. |
| 6,442,415 B1 | 8/2002 | Bis et al. |
| 6,461,346 B1 | 10/2002 | Buelna |
| 6,463,326 B1 | 10/2002 | Hartley et al. |
| 6,478,778 B1 | 11/2002 | Jacobsen et al. |
| 6,482,222 B1 | 11/2002 | Bruckheimer et al. |
| 6,500,158 B1 | 12/2002 | Ikeguchi |
| 6,558,350 B1 | 5/2003 | Hart et al. |
| 6,569,150 B2 | 5/2003 | Teague et al. |
| 6,620,202 B2 | 9/2003 | Bottcher et al. |
| 6,648,863 B2 | 11/2003 | Reever |
| 6,676,623 B2 | 1/2004 | Whitmore, III |
| 6,685,744 B2 | 2/2004 | Gellman et al. |
| 6,699,216 B2 | 3/2004 | Ikeguchi |
| 6,702,834 B1 | 3/2004 | Boylan et al. |
| 6,764,519 B2 | 7/2004 | Whitmore, III |
| 6,780,322 B1 | 8/2004 | Bissler et al. |
| 6,837,868 B1 | 1/2005 | Fajnsztajn |
| 7,025,753 B2 | 4/2006 | Reever |
| 7,037,345 B2 | 5/2006 | Bottcher et al. |
| 7,044,981 B2 | 5/2006 | Liu et al. |
| 7,316,663 B2 | 1/2008 | Whitmore, III |
| 7,329,226 B1 | 2/2008 | Ni et al. |
| 7,396,366 B2 | 7/2008 | Ward |
| 7,507,218 B2 | 3/2009 | Aliski et al. |
| 7,550,978 B2 | 6/2009 | Joy et al. |
| 7,603,170 B2 | 10/2009 | Hatlestad et al. |
| 7,682,401 B2 | 3/2010 | Deal |
| 7,722,677 B2 | 5/2010 | Ward |
| 7,727,222 B2 | 6/2010 | Da Silva et al. |
| 7,736,354 B2 | 6/2010 | Gelfand et al. |
| 7,758,562 B2 | 7/2010 | Gelfand et al. |
| 7,758,563 B2 | 7/2010 | Gelfand et al. |
| 7,766,961 B2 | 8/2010 | Patel et al. |
| 7,837,667 B2 | 11/2010 | Gelfand et al. |
| 7,850,704 B2 | 12/2010 | Burnett et al. |
| 7,857,803 B1 | 12/2010 | Salinas et al. |
| 7,879,020 B1 | 2/2011 | Salinas et al. |
| 7,938,817 B2 | 5/2011 | Gelfand et al. |
| 7,972,292 B2 | 7/2011 | Behl et al. |

(56) References Cited

U.S. PATENT DOCUMENTS

| | | |
|---|---|---|
| 8,007,460 B2 | 8/2011 | Gelfand et al. |
| 8,021,307 B2 | 9/2011 | White et al. |
| 8,075,513 B2 | 12/2011 | Rudko et al. |
| 8,088,170 B2 | 1/2012 | Whitmore, III |
| 8,105,317 B2 | 1/2012 | Reever et al. |
| 8,152,786 B2 | 4/2012 | Shapland et al. |
| 8,157,785 B2 | 4/2012 | Salinas et al. |
| 8,177,741 B2 | 5/2012 | Hammack et al. |
| 8,252,065 B2 | 8/2012 | Ward |
| 8,328,877 B2 | 12/2012 | Gellman |
| 8,444,623 B2 | 5/2013 | Gelfand et al. |
| 8,486,010 B2 | 7/2013 | Nomura |
| 8,512,795 B2 | 8/2013 | Dias et al. |
| 8,568,387 B2 | 10/2013 | Paz |
| 8,585,675 B2 | 11/2013 | Salinas et al. |
| 8,597,260 B2 | 12/2013 | Tucker |
| 8,597,273 B2 | 12/2013 | Salinas et al. |
| 8,747,388 B2 | 6/2014 | Pandey et al. |
| 8,795,305 B2 | 8/2014 | Martin et al. |
| 8,827,924 B2 | 9/2014 | Paz et al. |
| 8,852,289 B2 | 10/2014 | Whitmore, III |
| 8,865,063 B2 | 10/2014 | Burnett |
| 8,932,320 B1 | 1/2015 | Janardhan et al. |
| 9,014,815 B2 | 4/2015 | Yang et al. |
| 9,060,888 B2 | 6/2015 | Gellman |
| 9,308,348 B2 | 4/2016 | Mulvihill et al. |
| 9,339,636 B1 | 5/2016 | Khan et al. |
| 9,682,220 B2 | 6/2017 | Schertiger et al. |
| 9,744,331 B2 | 8/2017 | Erbey, II et al. |
| 9,750,634 B2 | 9/2017 | Bar-Am |
| 9,788,928 B2 | 10/2017 | Forsell |
| 9,849,224 B2 | 12/2017 | Angwin et al. |
| 9,980,663 B2 | 5/2018 | Wabel et al. |
| 10,182,747 B2 | 1/2019 | Charlez et al. |
| 10,226,606 B2 | 3/2019 | Nan et al. |
| 10,307,564 B2 | 6/2019 | Erbey, II et al. |
| 10,307,566 B2 | 6/2019 | Bishawi |
| 10,449,329 B2 | 10/2019 | Foley et al. |
| 11,040,180 B2 | 6/2021 | Erbey, II et al. |
| 2001/0053936 A1 | 12/2001 | Whitmore, III |
| 2001/0056273 A1 | 12/2001 | Ewers |
| 2002/0052576 A1 | 5/2002 | Massengale |
| 2002/0062148 A1 | 5/2002 | Hart |
| 2002/0068093 A1 | 6/2002 | Trogolo et al. |
| 2002/0082547 A1 | 6/2002 | Deniega et al. |
| 2002/0085951 A1 | 7/2002 | Gelfand et al. |
| 2002/0143292 A1 | 10/2002 | Flinchbaugh |
| 2002/0143389 A1 | 10/2002 | St. Pierre |
| 2002/0177902 A1 | 11/2002 | Rioux et al. |
| 2002/0183852 A1 | 12/2002 | McWeeney |
| 2002/0183853 A1 | 12/2002 | Mitchell et al. |
| 2002/0188246 A1 | 12/2002 | Hayner et al. |
| 2002/0193667 A1 | 12/2002 | McNair |
| 2003/0009132 A1 | 1/2003 | Schwartz et al. |
| 2003/0018291 A1 | 1/2003 | Hill et al. |
| 2003/0060806 A1 | 3/2003 | Ikeguchi |
| 2003/0069534 A1 | 4/2003 | Work et al. |
| 2003/0074082 A1 | 4/2003 | Bottcher et al. |
| 2003/0109930 A1 | 6/2003 | Bluni et al. |
| 2003/0120261 A1 | 6/2003 | Gellman |
| 2003/0135147 A1 | 7/2003 | Rosenberg et al. |
| 2003/0135195 A1 | 7/2003 | Jimenez et al. |
| 2003/0144623 A1 | 7/2003 | Heath et al. |
| 2003/0153970 A1 | 8/2003 | Rao et al. |
| 2003/0171708 A1 | 9/2003 | Segura et al. |
| 2003/0176831 A1 | 9/2003 | Gellman et al. |
| 2003/0181842 A1 | 9/2003 | Gellman |
| 2003/0181887 A1 | 9/2003 | Castillo Deniega et al. |
| 2003/0191452 A1 | 10/2003 | Meglin et al. |
| 2003/0195456 A1 | 10/2003 | Robertson |
| 2003/0195537 A1 | 10/2003 | Dubrul et al. |
| 2003/0199805 A1 | 10/2003 | McWeeney |
| 2003/0216710 A1 | 11/2003 | Hurt |
| 2003/0224033 A1 | 12/2003 | Li et al. |
| 2004/0019358 A1 | 1/2004 | Kear |
| 2004/0054315 A1 | 3/2004 | Levin et al. |
| 2004/0054351 A1 | 3/2004 | Deniega et al. |
| 2004/0057037 A1 | 3/2004 | Ohishi et al. |
| 2004/0073194 A1 | 4/2004 | Olsen et al. |
| 2004/0097891 A1 | 5/2004 | Bolmsjo |
| 2004/0129616 A1 | 7/2004 | Mori et al. |
| 2004/0143209 A1 | 7/2004 | Liu et al. |
| 2004/0147871 A1 | 7/2004 | Burnett |
| 2004/0167415 A1 | 8/2004 | Gelfand et al. |
| 2004/0167634 A1 | 8/2004 | Atala et al. |
| 2004/0193098 A1 | 9/2004 | Wentling et al. |
| 2005/0042240 A1 | 2/2005 | Utterberg et al. |
| 2005/0049575 A1 | 3/2005 | Snell et al. |
| 2005/0049577 A1 | 3/2005 | Snell et al. |
| 2005/0101941 A1 | 5/2005 | Hakky et al. |
| 2005/0107736 A1 | 5/2005 | Andman et al. |
| 2005/0124969 A1 | 6/2005 | Fitzgerald et al. |
| 2005/0124978 A1 | 6/2005 | Kim |
| 2005/0177102 A1 | 8/2005 | Hart et al. |
| 2005/0187564 A1 | 8/2005 | Jayaraman |
| 2005/0240141 A1 | 10/2005 | Aliski et al. |
| 2005/0240280 A1 | 10/2005 | Aliski et al. |
| 2005/0256441 A1 | 11/2005 | Lotan et al. |
| 2005/0256447 A1 | 11/2005 | Richardson et al. |
| 2005/0288722 A1 | 12/2005 | Eigler et al. |
| 2006/0015015 A1 | 1/2006 | Kawamoto et al. |
| 2006/0015089 A1 | 1/2006 | Meglin et al. |
| 2006/0052879 A1 | 3/2006 | Kolb |
| 2006/0074388 A1 | 4/2006 | Dextradeur et al. |
| 2006/0074409 A1 | 4/2006 | Schuermann |
| 2006/0229553 A1 | 10/2006 | Hammack et al. |
| 2006/0229573 A1 | 10/2006 | Lamborne |
| 2006/0259151 A1 | 11/2006 | Ward |
| 2006/0271019 A1 | 11/2006 | Stoller et al. |
| 2007/0010797 A1 | 1/2007 | Nishtala et al. |
| 2007/0010798 A1 | 1/2007 | Stoller et al. |
| 2007/0055198 A1 | 3/2007 | OMahony et al. |
| 2007/0073271 A1 | 3/2007 | Brucker et al. |
| 2007/0088333 A1 | 4/2007 | Levin et al. |
| 2007/0112302 A1 | 5/2007 | Yu |
| 2007/0197957 A1 | 8/2007 | Hunter et al. |
| 2007/0208291 A1 | 9/2007 | Patel |
| 2007/0213665 A1 | 9/2007 | Curtin et al. |
| 2007/0219488 A1 | 9/2007 | Francescatti |
| 2007/0255230 A1 | 11/2007 | Gross et al. |
| 2008/0051678 A1 | 2/2008 | Lindahl |
| 2008/0051691 A1 | 2/2008 | Dragoon et al. |
| 2008/0058650 A1 | 3/2008 | Saadat et al. |
| 2008/0097463 A1 | 4/2008 | House |
| 2008/0119907 A1 | 5/2008 | Stahmann |
| 2008/0142023 A1 | 6/2008 | Schmid et al. |
| 2008/0183299 A1 | 7/2008 | Monga et al. |
| 2008/0215247 A1 | 9/2008 | Tonelli et al. |
| 2008/0243091 A1 | 10/2008 | Humphreys et al. |
| 2008/0255550 A1 | 10/2008 | Bell |
| 2008/0281291 A1 | 11/2008 | Tihon et al. |
| 2008/0288082 A1 | 11/2008 | Deal |
| 2008/0312550 A1 | 12/2008 | Nishtala et al. |
| 2009/0024091 A1 | 1/2009 | Li et al. |
| 2009/0030370 A1 | 1/2009 | Nishtala et al. |
| 2009/0030435 A1 | 1/2009 | Burnett et al. |
| 2009/0043229 A1 | 2/2009 | Dunn et al. |
| 2009/0088677 A1 | 4/2009 | Cohen |
| 2009/0093748 A1 | 4/2009 | Patterson et al. |
| 2009/0105719 A1 | 4/2009 | Honey et al. |
| 2009/0143713 A1 | 6/2009 | Van Dam et al. |
| 2009/0162530 A1 | 6/2009 | Nesbitt |
| 2009/0171137 A1 | 7/2009 | Farnan et al. |
| 2009/0171241 A1 | 7/2009 | Garcia et al. |
| 2009/0281507 A1 | 11/2009 | Humphreys |
| 2009/0318844 A1 | 12/2009 | Burnett |
| 2010/0057000 A1 | 3/2010 | Melsheimer et al. |
| 2010/0081148 A1 | 4/2010 | Singbartl et al. |
| 2010/0086580 A1 | 4/2010 | Nyman et al. |
| 2010/0121159 A1 | 5/2010 | Burnett et al. |
| 2010/0191183 A1 | 7/2010 | Tanghoej et al. |
| 2010/0204682 A1 | 8/2010 | Tanghoj et al. |
| 2010/0228224 A1 | 9/2010 | Pyles et al. |
| 2010/0241240 A1 | 9/2010 | Willard et al. |

(56) References Cited

U.S. PATENT DOCUMENTS

| | | |
|---|---|---|
| 2010/0244780 A1 | 9/2010 | Turner et al. |
| 2010/0261985 A1 | 10/2010 | Cohen-Solal et al. |
| 2010/0298857 A1 | 11/2010 | Zook et al. |
| 2010/0312163 A1 | 12/2010 | Forsell |
| 2011/0009799 A1 | 1/2011 | Mullick et al. |
| 2011/0009831 A1 | 1/2011 | Burkholz et al. |
| 2011/0015558 A1 | 1/2011 | Kaye et al. |
| 2011/0077605 A1 | 3/2011 | Karpowicz et al. |
| 2011/0089111 A1 | 4/2011 | Mori et al. |
| 2011/0092958 A1 | 4/2011 | Jacobs |
| 2011/0098683 A1 | 4/2011 | Wiita et al. |
| 2011/0118537 A1 | 5/2011 | Wampler |
| 2011/0132838 A1 | 6/2011 | Curtis et al. |
| 2011/0208319 A1 | 8/2011 | Laster |
| 2011/0230950 A1 | 9/2011 | Knapp |
| 2011/0238163 A1 | 9/2011 | Andrews et al. |
| 2011/0269167 A1 | 11/2011 | Bene |
| 2011/0276024 A1 | 11/2011 | Randolph et al. |
| 2011/0282264 A1 | 11/2011 | Hurt |
| 2011/0301553 A1 | 12/2011 | Goral et al. |
| 2011/0301662 A1 | 12/2011 | Bar-Yoseph et al. |
| 2011/0320008 A1 | 12/2011 | Teague et al. |
| 2012/0029937 A1 | 2/2012 | Neftel et al. |
| 2012/0042427 A1 | 2/2012 | Messier |
| 2012/0053700 A1 | 3/2012 | Rickner |
| 2012/0070323 A1 | 3/2012 | Felber et al. |
| 2012/0078226 A1 | 3/2012 | Latere Dwanisa et al. |
| 2012/0083899 A1 | 4/2012 | Whitmore, III |
| 2012/0107420 A1 | 5/2012 | Breit et al. |
| 2012/0136343 A1 | 5/2012 | Burnett |
| 2012/0154264 A1 | 6/2012 | Wang et al. |
| 2012/0165641 A1 | 6/2012 | Burnett et al. |
| 2012/0179144 A1 | 7/2012 | Carleo |
| 2012/0179145 A1 | 7/2012 | Nishtala et al. |
| 2012/0220926 A1 | 8/2012 | Soykan et al. |
| 2012/0238802 A1 | 9/2012 | Knight et al. |
| 2012/0265020 A1 | 10/2012 | Pandey et al. |
| 2012/0277155 A1 | 11/2012 | VanAntwerp et al. |
| 2012/0302977 A1 | 11/2012 | Buan et al. |
| 2012/0316656 A1 | 12/2012 | Deal et al. |
| 2013/0030262 A1 | 1/2013 | Burnett et al. |
| 2013/0066166 A1 | 3/2013 | Burnett et al. |
| 2013/0085468 A1 | 4/2013 | Buydenok |
| 2013/0090648 A1 | 4/2013 | Nagale et al. |
| 2013/0131621 A1 | 5/2013 | Van Holten et al. |
| 2013/0138077 A1 | 5/2013 | ODay |
| 2013/0150828 A1 | 6/2013 | Conway |
| 2013/0172807 A1 | 7/2013 | Cruz |
| 2013/0172881 A1 | 7/2013 | Hill et al. |
| 2013/0184545 A1 | 7/2013 | Blomqvist et al. |
| 2013/0187563 A1 | 7/2013 | Sasai et al. |
| 2013/0197471 A1 | 8/2013 | Williams et al. |
| 2013/0199998 A1 | 8/2013 | Kelly et al. |
| 2013/0218135 A1 | 8/2013 | Dein |
| 2013/0231640 A1 | 9/2013 | Terry et al. |
| 2013/0231752 A1 | 9/2013 | Rosenbaum et al. |
| 2013/0253409 A1 | 9/2013 | Burnett |
| 2013/0267845 A1 | 10/2013 | Howle et al. |
| 2013/0274644 A1 | 10/2013 | Hertz |
| 2013/0274783 A1 | 10/2013 | Wynberg |
| 2013/0303865 A1 | 11/2013 | Rebec et al. |
| 2013/0303961 A1 | 11/2013 | Wolff et al. |
| 2013/0304082 A1 | 11/2013 | Aklog et al. |
| 2013/0317322 A1 | 11/2013 | Andrijauskas |
| 2013/0331824 A1 | 12/2013 | Kim |
| 2013/0338580 A1 | 12/2013 | Yamatani et al. |
| 2013/0345670 A1 | 12/2013 | Rajagopalan et al. |
| 2014/0031773 A1 | 1/2014 | Mikkaichi |
| 2014/0031787 A1 | 1/2014 | Burnes et al. |
| 2014/0039375 A1 | 2/2014 | Jimenez et al. |
| 2014/0058316 A1 | 2/2014 | Gupta et al. |
| 2014/0073926 A1 | 3/2014 | Rajendran et al. |
| 2014/0074144 A1 | 3/2014 | Shrivastava et al. |
| 2014/0135941 A1 | 5/2014 | Smouse et al. |
| 2014/0142539 A1 | 5/2014 | Salinas et al. |
| 2014/0148648 A1 | 5/2014 | Tycast et al. |
| 2014/0148754 A1 | 5/2014 | Soykan et al. |
| 2014/0155818 A1 | 6/2014 | Salinas et al. |
| 2014/0188248 A1 | 7/2014 | Gandhi |
| 2014/0188249 A1 | 7/2014 | Pendleton et al. |
| 2014/0214009 A1 | 7/2014 | Reyes |
| 2014/0228801 A1 | 8/2014 | Keeling |
| 2014/0275984 A1 | 9/2014 | Hermann et al. |
| 2014/0276341 A1 | 9/2014 | Ludin et al. |
| 2014/0276628 A1 | 9/2014 | Gandras et al. |
| 2014/0343515 A1 | 11/2014 | Sylvester et al. |
| 2014/0364820 A1 | 12/2014 | Solazzo et al. |
| 2015/0011855 A1 | 1/2015 | Burnett et al. |
| 2015/0011928 A1 | 1/2015 | Burnett |
| 2015/0017682 A1 | 1/2015 | Adam |
| 2015/0065783 A1 | 3/2015 | Buelna |
| 2015/0080844 A1 | 3/2015 | Donovan et al. |
| 2015/0094548 A1 | 4/2015 | Sabatini et al. |
| 2015/0094644 A1 | 4/2015 | Lenihan et al. |
| 2015/0094696 A1 | 4/2015 | Adams, Jr. et al. |
| 2015/0100009 A1 | 4/2015 | Bearss |
| 2015/0134073 A1 | 5/2015 | Tang et al. |
| 2015/0164370 A1 | 6/2015 | Wabel et al. |
| 2015/0194052 A1 | 7/2015 | Sagan et al. |
| 2015/0223953 A1 | 8/2015 | Pendleton et al. |
| 2015/0224241 A1 | 8/2015 | Fontanazzi et al. |
| 2015/0273120 A1 | 10/2015 | Zamarripa et al. |
| 2015/0283362 A1 | 10/2015 | Shelton et al. |
| 2015/0290411 A1 | 10/2015 | Warrington et al. |
| 2015/0306364 A1 | 10/2015 | Shevgoor |
| 2015/0328027 A1 | 11/2015 | Nishio et al. |
| 2015/0352339 A1 | 12/2015 | Wang |
| 2016/0051176 A1 | 2/2016 | Ramos et al. |
| 2016/0058489 A1 | 3/2016 | Fischell et al. |
| 2016/0183819 A1 | 6/2016 | Burnett et al. |
| 2016/0213881 A9 | 7/2016 | Adams, Jr. et al. |
| 2016/0303303 A1 | 10/2016 | Rovatti et al. |
| 2016/0310711 A1 | 10/2016 | Luxon et al. |
| 2016/0331294 A1 | 11/2016 | Imran et al. |
| 2016/0367747 A1 | 12/2016 | Loske |
| 2017/0020724 A1 | 1/2017 | Burnett et al. |
| 2017/0021128 A1 | 1/2017 | Erbey, II et al. |
| 2017/0095323 A1 | 4/2017 | Garcia |
| 2017/0095641 A1 | 4/2017 | Scarpine et al. |
| 2017/0113000 A1 | 4/2017 | Tobescu et al. |
| 2017/0119519 A1 | 5/2017 | Sambusseti et al. |
| 2017/0128639 A1 | 5/2017 | Erbey, II et al. |
| 2017/0128654 A1 | 5/2017 | Feld |
| 2017/0136209 A1* | 5/2017 | Burnett .......... A61M 1/60 |
| 2017/0136222 A1 | 5/2017 | Hakim et al. |
| 2017/0196576 A1 | 7/2017 | Long et al. |
| 2017/0197028 A1 | 7/2017 | Goldsmith |
| 2017/0232153 A1 | 8/2017 | Babu et al. |
| 2017/0266414 A1 | 9/2017 | Rocha-Singh et al. |
| 2017/0325927 A1 | 11/2017 | Gobel |
| 2017/0348507 A1 | 12/2017 | Erbey, II et al. |
| 2017/0348512 A1 | 12/2017 | Orr et al. |
| 2017/0367636 A1 | 12/2017 | Mantinband et al. |
| 2018/0001055 A1 | 1/2018 | Utas et al. |
| 2018/0116751 A1 | 5/2018 | Schwartz et al. |
| 2018/0117288 A1 | 5/2018 | Lindsay et al. |
| 2018/0147330 A1 | 5/2018 | Pend et al. |
| 2018/0147388 A1* | 5/2018 | Erbey, II .......... A61M 25/0017 |
| 2018/0169313 A1 | 6/2018 | Schwammenthal et al. |
| 2018/0177458 A1 | 6/2018 | Burnett et al. |
| 2018/0193618 A1 | 7/2018 | Erbey, II et al. |
| 2018/0207412 A1 | 7/2018 | Malek et al. |
| 2018/0280601 A1* | 10/2018 | Harjes .......... A61M 60/546 |
| 2018/0344250 A1 | 12/2018 | McKinney et al. |
| 2019/0030303 A1 | 1/2019 | Holman et al. |
| 2019/0091442 A1 | 3/2019 | Erbey, II et al. |
| 2019/0105465 A1 | 4/2019 | Erbey, II et al. |
| 2019/0201662 A1 | 7/2019 | Lad et al. |
| 2019/0240448 A1 | 8/2019 | Murdock |
| 2019/0247615 A1 | 8/2019 | Bishawi |
| 2020/0001045 A1 | 1/2020 | McIntyre |

(56) References Cited

U.S. PATENT DOCUMENTS

| | | |
|---|---|---|
| 2020/0094017 A1 | 3/2020 | Erbey, II et al. |
| 2021/0178133 A1 | 6/2021 | Walish et al. |

FOREIGN PATENT DOCUMENTS

| | | |
|---|---|---|
| CA | 2363001 C | 9/2000 |
| CA | 2205473 C | 6/2006 |
| CA | 2992546 A1 | 1/2017 |
| CA | 2992322 C | 8/2019 |
| CN | 2175619 Y | 8/1994 |
| CN | 2562776 Y | 7/2003 |
| CN | 2588940 Y | 12/2003 |
| CN | 1479596 A | 3/2004 |
| CN | 2753382 Y | 1/2006 |
| CN | 2928043 Y | 8/2007 |
| CN | 101224148 A | 7/2008 |
| CN | 101426540 A | 5/2009 |
| CN | 201814968 U | 5/2011 |
| CN | 102176928 A | 9/2011 |
| CN | 202459720 U | 10/2012 |
| CN | 202526754 U | 11/2012 |
| CN | 202802478 U | 3/2013 |
| CN | 103096964 A | 5/2013 |
| CN | 103203062 A | 7/2013 |
| CN | 103841905 A | 6/2014 |
| CN | 203777060 U | 8/2014 |
| CN | 203842151 U | 9/2014 |
| CN | 204158867 U | 2/2015 |
| CN | 204246651 U | 4/2015 |
| CN | 204446944 U | 7/2015 |
| CN | 205126495 U | 4/2016 |
| CN | 106237417 A | 12/2016 |
| CN | 106456841 A | 2/2017 |
| CN | 106473847 A | 3/2017 |
| CN | 106693092 A | 5/2017 |
| CN | 107261294 A | 10/2017 |
| CN | 108136163 A | 6/2018 |
| EP | 873760 A1 | 10/1998 |
| EP | 1011803 B1 | 9/2004 |
| EP | 1980292 A2 | 10/2008 |
| EP | 3325076 A2 | 5/2018 |
| EP | 3470107 A1 | 4/2019 |
| EP | 3488897 A1 | 5/2019 |
| EP | 3970775 A1 | 3/2022 |
| FR | 3052671 A1 | 12/2017 |
| JP | 59111748 A | 6/1984 |
| JP | H42361 A | 1/1992 |
| JP | H10504469 | 5/1998 |
| JP | 2002510536 A | 4/2002 |
| JP | 2002291879 A | 10/2002 |
| JP | 200253888 | 11/2002 |
| JP | 2002537893 A | 11/2002 |
| JP | 2003530165 A | 10/2003 |
| JP | 2004215787 A | 8/2004 |
| JP | 2006516214 A | 6/2006 |
| JP | 2006526464 A | 11/2006 |
| JP | 2009505802 A | 2/2009 |
| JP | 2009238520 A | 10/2009 |
| JP | 2009537256 A | 10/2009 |
| JP | 201005282 A | 1/2010 |
| JP | 2010508984 A | 3/2010 |
| JP | 2010119737 A | 6/2010 |
| JP | 2010230618 A | 10/2010 |
| JP | 2013149498 A | 1/2012 |
| JP | 2012505022 A | 3/2012 |
| JP | 2014136116 A | 7/2014 |
| JP | 2014176689 A | 9/2014 |
| JP | 2018527061 A | 9/2018 |
| JP | 2018527974 A | 9/2018 |
| JP | 2018196754 A | 12/2018 |
| RU | 2113245 C1 | 6/1998 |
| RU | 2300399 C1 | 6/2007 |
| RU | 149161 U1 | 12/2014 |
| TW | M540625 U | 5/2017 |
| WO | 9529716 A1 | 11/1995 |
| WO | 9716218 A1 | 5/1997 |
| WO | 9816171 A1 | 4/1998 |
| WO | 9850088 A1 | 11/1998 |
| WO | 0054701 A1 | 9/2000 |
| WO | 0160260 A1 | 8/2001 |
| WO | 6558350 A1 | 12/2001 |
| WO | 03017870 A1 | 3/2003 |
| WO | 2004064681 A1 | 8/2004 |
| WO | 2006017439 A2 | 2/2006 |
| WO | 2006023589 A2 | 3/2006 |
| WO | 2006044621 A2 | 4/2006 |
| WO | 2007001978 A2 | 1/2007 |
| WO | 2007027830 A1 | 3/2007 |
| WO | 2008066625 A1 | 6/2008 |
| WO | 2010082197 A2 | 7/2010 |
| WO | 2011109570 A2 | 9/2011 |
| WO | 2011139498 A1 | 11/2011 |
| WO | 197896 A1 | 12/2011 |
| WO | 2013022005 A1 | 2/2013 |
| WO | 2013029622 A1 | 3/2013 |
| WO | 2014025367 A1 | 2/2014 |
| WO | 2014043650 A2 | 3/2014 |
| WO | 2014062225 A1 | 4/2014 |
| WO | 2015105916 A1 | 7/2015 |
| WO | 2015157467 A1 | 10/2015 |
| WO | 2015198333 A1 | 12/2015 |
| WO | 2016049654 A1 | 3/2016 |
| WO | 2016103256 A1 | 6/2016 |
| WO | 2017015345 A2 | 1/2017 |
| WO | 2017015351 A2 | 1/2017 |
| WO | 2017019974 A1 | 2/2017 |
| WO | 2017087182 A1 | 5/2017 |
| WO | 2018136603 A1 | 7/2018 |
| WO | 2018186781 A1 | 10/2018 |
| WO | 2018200050 A1 | 11/2018 |
| WO | 2019038730 A1 | 2/2019 |
| WO | 2020236748 A1 | 11/2020 |

OTHER PUBLICATIONS

Damman et al., "Increased Central Venous Pressure Is Associated With Impaired Renal Function and Mortality in a Broad Spectrum of XPatients With Cardiovascular Disease", 2009, Journal of the American College of Cardiology, vol. 53:7, pp. 582-588.
Dixon et al., "The musculature of the human renal calices, pelvis and upper ureter", J, Anat., 1982, vol. 135, pp. 129-137.
Gregersen et al., "Regional Differences Exist in Elastic Wall Properties in the Ureter", SJUN, 1996, vol. 30, pp. 343-348.
Kiil, "Urinary Flow and Ureteral Peristalsis" in: Lutzeyer W., Melchior H. (Eds.) Urodynamics, 1973 Springer, Berlin, Heidelberg (pp. 57-70).
Lala et al., "Relief and Recurrence of Congestion During and After Hospitalization for Acute Heart Failure: Insights from DOSE-AHF and CARRESS-HF", Circ Heart Fail, 2015, vol. 8:4, pp. 741-748.
Legrand et al. "Association between systemic hemodynamics and septic acute kidney injury in critically ill patients: a retrospective observational study", Critical Care, 2013, vol. 17:R278, pp. 1-8.
Nohria et al., "Cardiorenal Interactions Insights from the ESCAPE Trial", Heart Failure, 2008, vol. 51:13, pp. 1268-1274.
Uthoff et al., "Central venous pressure and impaired renal function in patients with acute heart failure", European Journal of Heart Failure, 2011. vol. 13, pp. 432-439.
Walker, "Annals of Surgery" 1913, Lippincott Williams & Wilkins, p. 58, Figures 3 and 9.
Webb, "Percutaneous Renal Surgery: A Practical Clinical Handbook", 2016, Springer International Publishing, Switzerland, p. 92.
Woodburne et al., "The Uretal Lumen during Peristalsis", Am. J. Anat., 1972. vol. 133, pp. 255-258.
U.S. Pat. No. 10,307,564 / U.S. Appl. No. 15/214,955, "Ureteral and Bladder Catheters and Methods of Inducing Negative Pressure to Increase Renal Perfusion", Jun. 4, 2019 / filed Jul. 20, 2016.
U.S. Pat. No. 9,744,331, / U.S. Appl. No. 15/215,081, "Ureteral and Bladder Catheters and Methods of Inducing Negative Pressure to Increase Renal Perfusion", Aug. 29, 2017 / filed Jul. 20, 2016.

(56) References Cited

OTHER PUBLICATIONS

U.S. Pat. No. 10,512,713 / U.S. Appl. No. 15/411,884, "Method of Removing Excess Fluid from a Patient with Hemodilution", Jan. 20, 2017/ filed Dec. 24, 2019.
U.S. Appl. No. 10/601,664 / U.S. Appl. No. 15/673,706, "Ureteral and Bladder Catheters and Methods of Inducing Negative Pressure to Increase Renal Perfusion", filed Apr. 7, 2020 / filed Aug. 10, 2017.
U.S. Pat. No. 10,765,834 / U.S. Appl. No. 15/687,064, "Ureteral and Bladder Catheters and Methods of Inducing Negative Pressure to Increase Renal Perfusion", Sep. 8, 2020 / filed Aug. 25, 2017.
U.S. Pat. No. 10,926,062 / U.S. Appl. No. 15/687,083, "Ureteral and Bladder Catheters and Methods of Inducing Negative Pressure to Increase Renal Perfusion", Feb. 23, 2021 / filed Aug. 25, 2017.
U.S. Pat. No. 11,040,172 / U.S. Appl. No. 15/879,976, "Ureteral and Bladder Catheters and Methods of Inducing Negative Pressure to Increase Renal Perfusion", Jun. 22, 2021 / filed Jan. 25, 2018.
U.S. Pat. No. 10,918,827 / U.S. Appl. No. 15/879,869, "Catheter Device and Method for Inducing Negative Pressure in a Patient's Bladder", Feb. 16, 2021 / filed Jan. 25, 2018.
U.S. Appl. No. 15/745,823, "Catheter Device and Method for Inducing Negative Pressure in a Patient's Bladder", filed Jul. 20, 2016.
U.S. Pat. No. 11,040,180 / U.S. Appl. No. 15/879,770, "Sistems, Kits and Methods for Inducing Negative Pressure to Increase Renal Function", Jun. 22, 2021 / filed Jan. 25, 2018.
U.S. Pat. No. 10,918,825 / U.S. Appl. No. 16/012,233, "Ureteral and Bladder Catheters and Methods of Inducing Negative Pressure to Increase Renal Perfusion", Feb. 16, 2021 / filed Jun. 19, 2018.
U.S. Pat. No. 11,077,284 / U.S. Appl. No. 16/036,971, "Ureteral and Bladder Catheters and Methods of Inducing Negative Pressure to Increase Renal Perfusion", Aug. 3, 2021/ filed Jul. 17, 2018.
U.S. Pat. No. 11,229,771 / U.S. Appl. No. 16/206,207, "Percutaneous Ureteral Catheter", Nov. 30, 2018 / filed Jan. 25, 2022.
U.S. Appl. No. 16/206,389, "Coated Ureteral Catheter or Ureteral Stent and Method", filed Nov. 30, 2018.
U.S. Pat. No. 10,493,232 / U.S. Appl. No. 16/205,987, "Ureteral Catheters, Bladder Catheters, Systems, Kits and Methods for Inducing Negative Pressure to Increase Renal Function", Dec. 3, 2019 / filed Nov. 30, 2018.
U.S. Pat. No. 10,426,919 / U.S. Appl. No. 16/257,791, "Systems and Methods for Inducing Negative Pressure in a Portion of a Urinary Tract of a Patient", Jan. 25, 2019 / filed Oct. 1, 2019.
U.S. Pat. No. 11,420,014 / U.S. Appl. No. 16/390,154, "Ureteral and Bladder Catheters and Methods of Inducing Negative Pressure to Increase Renal Perfusion", Aug. 23, 2022 / filed Apr. 22, 2019.
U.S. Appl. No. 16/542,680, "Systems and Methods for Inducing Negative Pressure in a Portion of a Urinary Tract of a Patient", filed Aug. 16, 2019.
U.S. Pat. No. 11,471,583 / U.S. Appl. No. 16/670,249, "Method of Removing Excess Fluids from a Patient with Hemodilution", Oct. 18, 2022 / filed Oct. 31, 2019.
U.S. Pat. No. 10,799,668 / U.S. Appl. No. 16/662,536, "Ureteral Catheters, Bladder Catheters, Systems, Kits and Methods for Inducing Negative Pressure to Increase Renal Function", Oct. 24, 2019 / filed Oct. 13, 2020.
U.S. Appl. No. 16/662,212, "Catheter and Method for Inducing Negative Pressure in a Patient's Bladder", filed Oct. 24, 2019.
U.S. Appl. No. 16/696,026, "Coated and/or Impregnated Ureteral Catheter or Stent and Method", filed Nov. 26, 2019.
U.S. Appl. No. 16/850,052, "Method of Removing Excess Fluid from a Patient with Venous Congestion", filed Apr. 16, 2020.
U.S. Appl. No. 16/820,781, "Ureteral and Bladder Catheters and Methods of Inducing Negative Pressure to Increase Renal Perfusion", filed Mar. 17, 2020.
U.S. Appl. No. 16/640,210, "Indwelling Pump for Facilitating Removal of Urine from the Urinary Tract", filed Aug. 24, 2018.
U.S. Appl. No. 16/817,773, "Ureteral and Bladder Catheters and Methods of Inducing Negative Pressure to Increase Renal Perfusion", filed Mar. 13, 2020.
U.S. Appl. No. 16/826,347, "Ureteral Catheters, Bladder Catheters, Systems, Kits and Methods for Inducing Negative Pressure to Increase Renal Function", filed Mar. 23, 2020.
U.S. Appl. No. 16/835,973, "Catheter Device and Method for Inducing Negative Pressure in a Patient's Bladder", filed Mar. 31, 2020.
U.S. Appl. No. 16/856,339, "Pump Assembly and System for Inducing Negative Pressure in a Portion of a Urinary Tract of a Patient", filed Apr. 23, 2020.
U.S. Appl. No. 16/872,965, "Ureteral and Bladder Catheters and Methods of Inducing Negative Pressure to Increase Renal Perfusion", filed May 12, 2020.
U.S. Appl. No. 17/077,793, "Ureteral and Bladder Catheters and Methods of Inducing Negative Pressure to Increase Renal Perfusion", filed Oct. 22, 2020.
U.S. Appl. No. 17/089,757, "Catheter Device and Method for Inducing Negative Pressure in a Patient's Bladder", filed Nov. 5, 2020.
U.S. Appl. No. 17/154,004, "Negative Pressure Therapy System", filed Jan. 20, 2021.
U.S. Appl. No. 17/152,636, "Systems, Kits and Methods for Inducing Negative Pressure to Increase Renal Function", filed Jan. 19, 2021.
U.S. Appl. No. 17/173,262, "Ureteral and Bladder Catheters and Methods of Inducing Negative Pressure to Increase Renal Perfusion", filed Feb. 11, 2021.
U.S. Appl. No. 17/238,454, "Method of Treatment Using Negative Pressure Renal Therapy and Medicament(s)", filed Apr. 23, 2021.
U.S. Appl. No. 17/340,858, "Ureteral anti Bladder Catheters and Methods of Inducing Negative Pressure to Increase Renal Perfusion", filed Jun. 7, 2021.
U.S. Appl. No. 17/392,165, "Negative Pressure Therapy System", filed Aug. 2, 2021.
U.S. Appl. No. 17/520,850, "Percutaneous Urinary Catheter", filed Nov. 8, 2021.
U.S. Appl. No. 17/738,089, "Negative Pressure Therapy System", filed May 6, 2022.
U.S. Appl. No. 17/687,742, "Coated Urinary Catheter or Ureteral Stent and Method", filed Mar. 7, 2022.
U.S. Appl. No. 17/722,919, "Percutaneous Urinary Catheter", filed Apr. 18, 2022.
U.S. Appl. No. 17/748,105, "Pump, System and Methods of Inducing Negative Pressure to Increase Renal Perfusion", filed May 19, 2022.
U.S. Appl. No. 17/870,655, "Percutaneous Urinary Catheter", filed Jul. 21, 2022.
U.S. Appl. No. 17/885,680, "Negative Pressure Therapy System and Methods", filed Aug. 11, 2022.
Bart et al.; "Ultrafiltration in Decompensated Heart Failure with Cardiorenal Syndrome"; N Engl J Med; 2012; p. 2296-2304; vol. 367.
Burr et al.; "Urinary catheter blockage depends on urine pH, calcium and rate of flow"; Spinal Cord; 1997; p. 521-525; vol. 35.
Clinical Practice Guidelines for Chronic Kidney Disease: Evaluation, Classification and Stratification; National Kidney Foundation; Am. J. Kidney Dis.; 2002; p. S1-S266; Suppl. 1.
"The Criteria Committee of the New York Heart Association", (1994), Nomenclature and Criteria for Diagnosis of Diseases of the Heart and Great Vessels, (9th ed.), Boston: Little, Brown Co. p. 253-256 (Abstract).
Harris et al., "Relationship between patients" outcomes and the changes in serum creatinine and urine output and RIFLE classification in a large critical care cohort database, Kidney International, 2015, p. 369-377, vol. 88.
Jessup et al.; "The Cardiorenal Syndrome—Do We Need a Change of Strategy or a Change of Tactics"; Journal of the American College of Cardiology; 2009; p. 597-599; vol. 53:7.
Johnson et al., "Clinical Practice Guidelines for Chronic Kidney Disease in Adults: Part I. Definition, Disease Stages, Evaluation, Treatment, and Risk Factors", American Family Physician, Sep. 1, 2004, p. 869-876, vol. 70 Issue 5.

(56) References Cited

OTHER PUBLICATIONS

Mardis et al., "Comparative Evaluation of Materials Used for Internal Ureteral Stents", Journal of Endourology, 1993, pp. 105-115, vol. 7:2.
Mullens et al.; "Importance of Venous Congestion for Worsening of Renal Function in Advanced Decompensated Heart Failure"; Journal of the American College of Cardiology; 2009; p. 589-596; vol. 53:7.
Peters et al.; "Short and Long-Term Effects of the Angiotensin II Receptor Blocker Irbesartan on Intradialytic Central Hemodynamics: A Randomized Double-Blind Placebo-Controlled One-Year Intervention Trial (the SAFIR Study)"; PLoS One; Jun. 1, 2015; p. 1-22.
"Standard Specification for Ureteral Stents", ASTM International, 2014, Designation F1828-97, p. 1-6.
Verbrugge et al.; "The kidney in congestive heart failure: are natriuresis, sodium, and diuretics really the good, the bad and the ugly"; European Journal of Heart Failure; 2014; p. 133-142; vol. 16.
Wolf, Jr. et al.; "Comparative Ureteral Microanatomy"; Journal of Endourology; 1996; p. 527-531; vol. 10:6.
Wolf, Jr. et al.; "Comparative Ureteral Microanatomy"; Journal of Endourology; 1996; p. 527-531; vol. 10:6.
Zelenko et al.; "Normal Ureter Size on Unenhanced Helical CT"; American Journal of Roentgenology; 2004; p. 1039-1041; vol. 182.
Quadra-Coil | Olympus America | Medical, Ureteral Stents, https://www.medical.olympusamerica.com/products/quadra-coil (downloaded from the Internet Aug. 31, 2022) 2 pages.
Stents—Urology | Olympus America | Medical. Ureteral Stents, https://www.medical.olympusamerica.com/products/stents-Urology (downloaded from the Internet Aug. 31, 2022) 2 pages.
Ureteral stent—Quadra-Coil—Olympus Medical Europa, https://www.medicalexpo.com/prod/olympus-medical-europa/product-69587-661607.html (downloaded from the Internet Aug. 31, 2022) 5 pages.

* cited by examiner

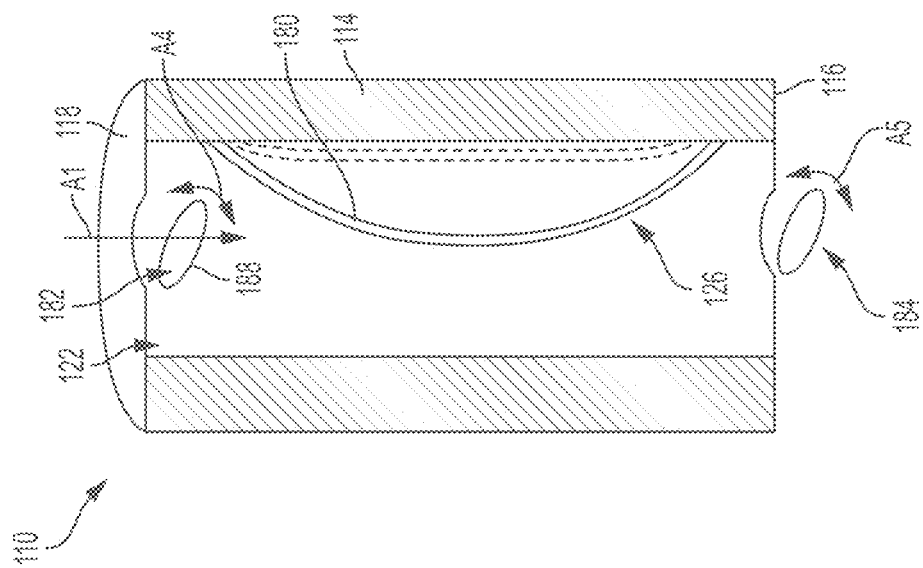
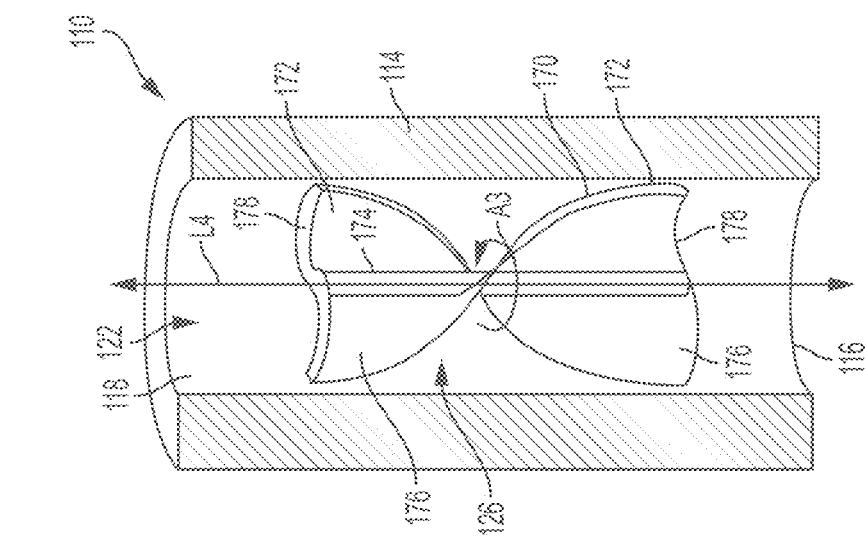

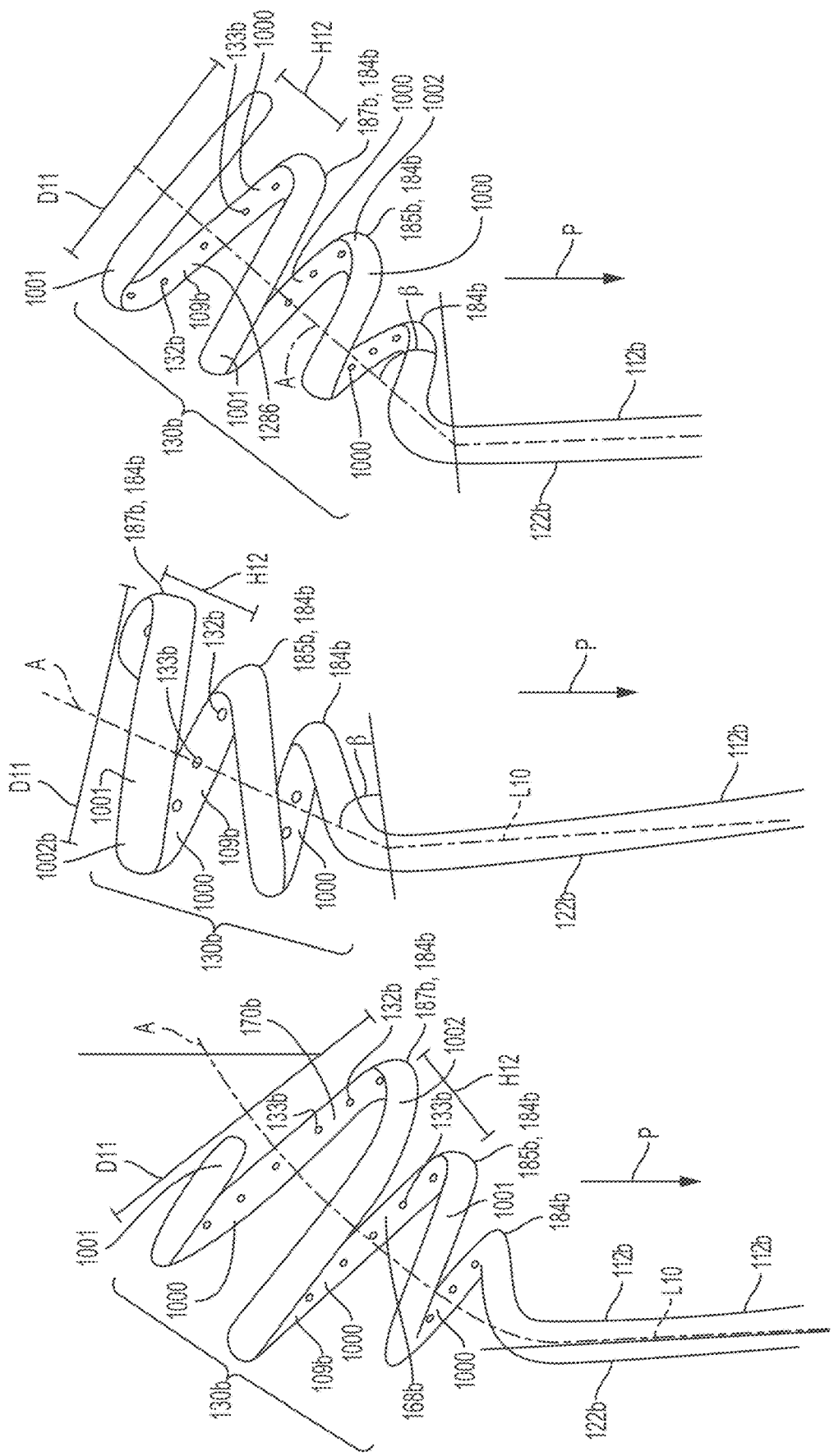

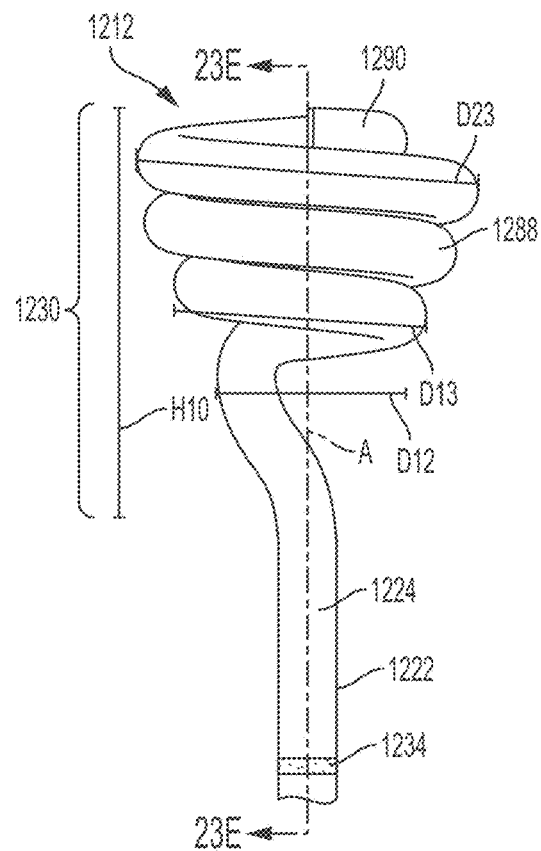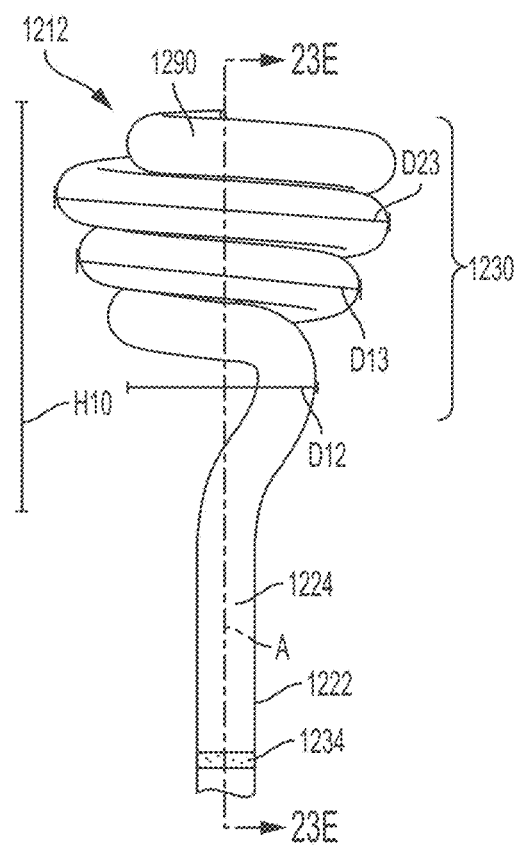
FIG. 23B     FIG. 23C
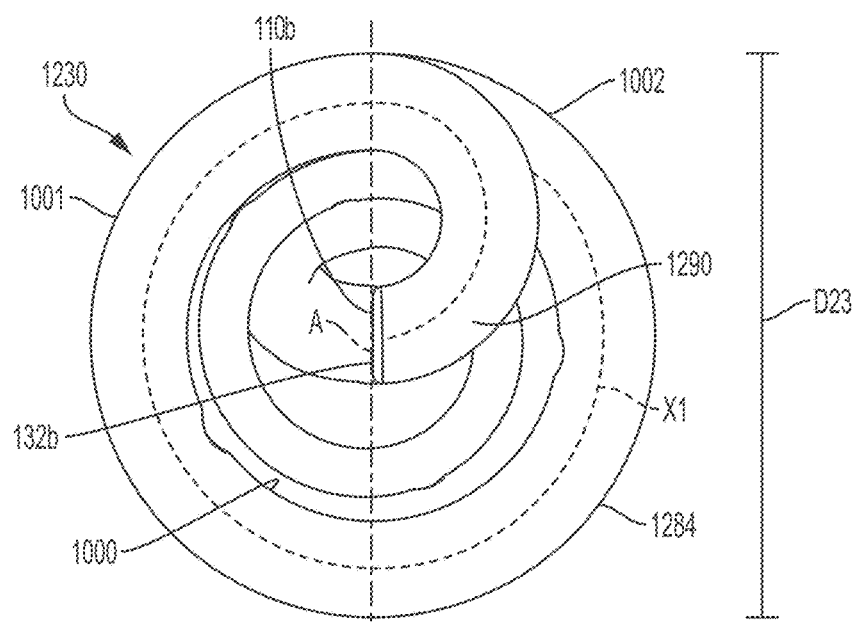
FIG. 23D

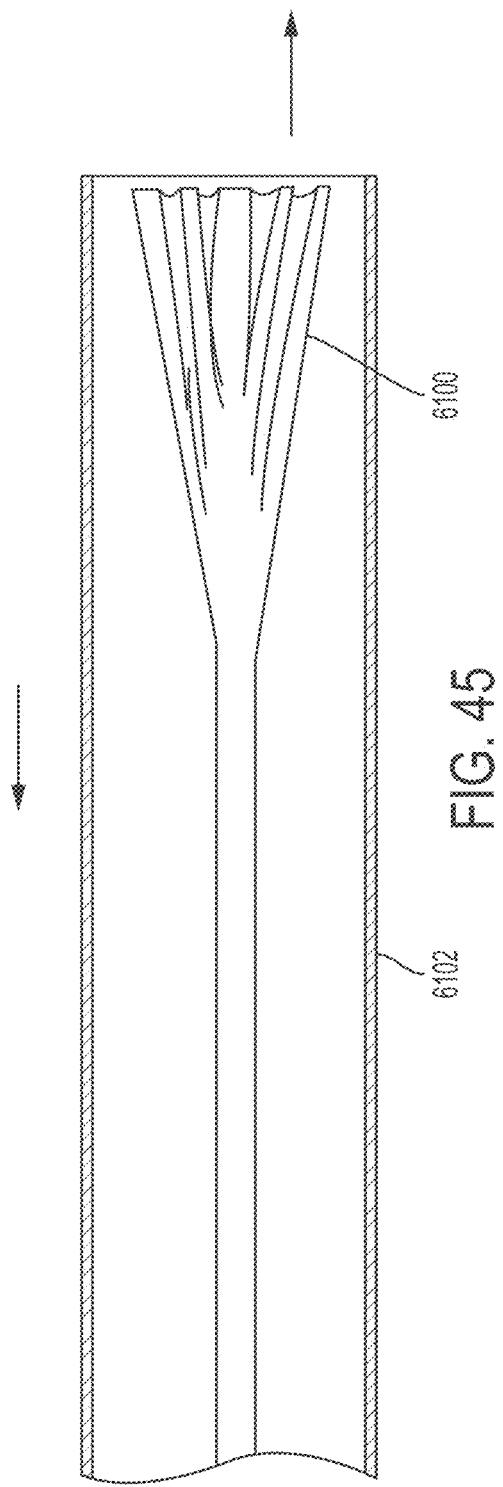

NEGATIVE PRESSURE THERAPY SYSTEM AND METHODS

CROSS REFERENCE TO RELATED APPLICATION

This application claims the benefit of U.S. Provisional Patent Application No. 63/232,684, filed Aug. 13, 2021, entitled "Negative Pressure Therapy System and Methods", which is incorporated by reference herein in its entirety.

BACKGROUND

Technical Field

The present disclosure relates to systems for providing negative pressure to the urinary tract of a patient and associated treatment methods and, more particularly, to systems for providing negative pressure to the urinary tract of the patient controlled based on a measured pulmonary artery pressure of the patient and treatment methods for patients that comprise providing negative pressure at times, for predetermined durations, and/or at magnitudes of negative pressure determined based on measured pulmonary artery pressure for the patient.

Background

The renal or urinary system includes a pair of kidneys, each kidney being connected by a ureter to the bladder, and a urethra for draining fluid or urine produced by the kidneys from the bladder. The kidneys perform several vital functions for the human body including, for example, filtering the blood to eliminate waste in the form of urine. The kidneys also regulate electrolytes (e.g., sodium, potassium and calcium) and metabolites, blood volume, blood pressure, blood pH, fluid volume, production of red blood cells, and bone metabolism. Adequate understanding of the anatomy and physiology of the kidneys is useful for understanding the impact that altered hemodynamics other fluid overload conditions have on their function.

In normal anatomy, the two kidneys are located retroperitoneally in the abdominal cavity. The kidneys are bean-shaped encapsulated organs. Urine is formed by nephrons, the functional unit of the kidney, and then flows through a system of converging tubules called collecting ducts. The collecting ducts join together to form minor calyces, then major calyces, which ultimately join near the concave portion of the kidney (renal pelvis). A major function of the renal pelvis is to direct urine flow to the ureter. Urine flows from the renal pelvis into the ureter, a tube-like structure that carries the urine from the kidneys into the bladder. The outer layer of the kidney is called the cortex, and is a rigid fibrous encapsulation. The interior of the kidney is called the medulla. The medulla structures are arranged in pyramids.

Each kidney is made up of approximately one million nephrons. Each nephron includes the glomerulus, Bowman's capsule, and tubules. The tubules include the proximal convoluted tubule, the loop of Henle, the distal convoluted tubule, and the collecting duct. The nephrons contained in the cortex layer of the kidney are distinct from the anatomy of those contained in the medulla. The principal difference is the length of the loop of Henle. Medullary nephrons contain a longer loop of Henle, which, under normal circumstances, allows greater regulation of water and sodium reabsorption than in the cortex nephrons.

The glomerulus is the beginning of the nephron, and is responsible for the initial filtration of blood. Afferent arterioles pass blood into the glomerular capillaries, where hydrostatic pressure pushes water and solutes into Bowman's capsule. Net filtration pressure is expressed as the hydrostatic pressure in the afferent arteriole minus the hydrostatic pressure in Bowman's space minus the osmotic pressure in the efferent arteriole.

Net Filtration Pressure=Hydrostatic Pressure (Afferent Arteriole)−Hydrostatic Pressure (Bowman's Space)−Osmotic Pressure (Efferent Arteriole)  (Equation 1)

The magnitude of this net filtration pressure defined by Equation 1 determines how much ultra-filtrate is formed in Bowman's space and delivered to the tubules. The remaining blood exits the glomerulus via the efferent arteriole. Normal glomerular filtration, or delivery of ultra-filtrate into the tubules, is about 90 ml/min/1.73 m$^2$.

The glomerulus has a three-layer filtration structure, which includes the vascular endothelium, a glomerular basement membrane, and podocytes. Normally, large proteins such as albumin and red blood cells, are not filtered into Bowman's space. However, elevated glomerular pressures and mesangial expansion create surface area changes on the basement membrane and larger fenestrations between the podocytes allowing larger proteins to pass into Bowman's space.

Ultra-filtrate collected in Bowman's space is delivered first to the proximal convoluted tubule. Re-absorption and secretion of water and solutes in the tubules is performed by a mix of active transport channels and passive pressure gradients. The proximal convoluted tubules normally reabsorb a majority of the sodium chloride and water, and nearly all glucose and amino acids that were filtered by the glomerulus. The loop of Henle has two components that are designed to concentrate wastes in the urine. The descending limb is highly water permeable and reabsorbs most of the remaining water. The ascending limb reabsorbs 25% of the remaining sodium chloride, creating a concentrated urine, for example, in terms of urea and creatinine. The distal convoluted tubule normally reabsorbs a small proportion of sodium chloride, and the osmotic gradient creates conditions for the water to follow.

Under normal conditions, there is a net filtration of approximately 14 mm Hg. The impact of venous congestion can be a significant decrease in net filtration, down to approximately 4 mm Hg. See Jessup M., *The cardiorenal syndrome: Do we need a change of strategy or a change of tactics?*, JACC 53(7):597-600, 2009 (hereinafter "Jessup"). Venous congestion is a common complication of renal insufficiency, heart failure, traumatic injuries and surgery. Prolonged elevated venous pressure can result in distention, edema, stasis, ischemia and: or cellular death. Venous congestion can be determined by observation of symptoms, such as edema, or direct or indirect measurement, as is well known to those skilled in the art. For example, the central venous pressure, which is a measure of pressure in the vena cava, can be measured using a central venous catheter advanced via the internal jugular vein and placed in the superior vena cava near the right atrium. A normal central venous pressure reading is between 0 to 6 mmHg. This value is altered by volume status and/or venous compliance. Alternatively, venous congestion can be measured by jugular venous distension (JVD). While the patient is lying down on an exam table, with the head of the table at a 45-degree angle and head turned to the side, the doctor measures the highest point at which pulsations can be detected in the internal jugular vein. Alternatively, the Venus Excess Ultrasound (VExUS) score (0-3) can be determined using ultrasound, or the distensibility of the inferior vena cava can be measured via ultrasound. A NT-proB-type Natriuretic Peptide (BNP) blood test can provide an assessment of congestion caused by elevated venous pressures.

The second filtration stage occurs at the proximal tubules. Most of the secretion and absorption from urine occurs in tubules in the medullary nephrons. Active transport of sodium from the tubule into the interstitial space initiates this process. However, the hydrostatic forces dominate the net exchange of solutes and water. Under normal circumstances, it is believed that 75% of the sodium is reabsorbed back into lymphatic or venous circulation. However, because the kidney is encapsulated, it is sensitive to changes in hydrostatic pressures from both venous and lymphatic congestion. During venous congestion the retention of sodium and water can exceed 85%, further perpetuating the renal congestion. See Verbrugge, et al., *The kidney in congestive heart failure: Are natriuresis, sodium, and diuretics really the good, the bad and the ugly? European Journal of Heart Failure* 2014:16, 133-42 (hereinafter "Verbrugge").

Venous congestion can lead to a prerenal form of acute kidney injury (AKI). Prerenal AKI is due to a loss of perfusion (or loss of blood flow) through the kidney. Many clinicians focus on the lack of flow into the kidney due to shock. However, there is also evidence that a lack of blood flow out of the organ due to venous congestion can be a clinically important sustaining injury. See Damman K, *Importance of venous congestion for worsening renal function in advanced decompensated heart failure, JACC* 17:589-96, 2009 (hereinafter "Damman").

Prerenal AKI occurs across a wide variety of diagnoses requiring critical care admissions. The most prominent admissions are for sepsis and Acute Decompensated Heart Failure (ADHF). Additional admissions include cardiovascular surgery, general surgery, cirrhosis, trauma, burns, and pancreatitis. While there is wide clinical variability in the presentation of these disease states, a common denominator is an elevated central venous pressure. In the case of ADHF, the elevated central venous pressure caused by heart failure leads to pulmonary edema, and, subsequently, dyspnea in turn precipitating the admission. In the case of sepsis, the elevated central venous pressure is largely a result of aggressive fluid resuscitation. Whether the primary insult was low perfusion due to hypovolemia or sodium and fluid retention, the sustaining injury is the venous congestion resulting in inadequate perfusion.

Hypertension is another widely recognized state that creates perturbations within the active and passive transport systems of the kidney(s). Hypertension directly impacts afferent arteriole pressure and results in a proportional increase in net filtration pressure within the glomerulus. The increased filtration fraction also elevates the peritubular capillary pressure, which stimulates sodium and water re-absorption. See Verbrugge.

Because the kidney is an encapsulated organ, it is sensitive to pressure changes in the medullary pyramids. The elevated renal venous pressure creates congestion that leads to a rise in the interstitial pressures. The elevated interstitial pressures exert forces upon both the glomerulus and tubules. See Verbrugge. In the glomerulus, the elevated interstitial pressures directly oppose filtration. The increased pressures increase the interstitial fluid, thereby increasing the hydrostatic pressures in the interstitial fluid and peritubular capillaries in the medulla of the kidney. In both instances, hypoxia can ensue leading to cellular injury and further loss of perfusion. The net result is a further exacerbation of the sodium and water re-absorption creating a negative feedback. See Verbrugge, 133-42. Fluid overload, particularly in the abdominal cavity is associated with many diseases and conditions, including elevated intra-abdominal pressure, abdominal compartment syndrome, and acute renal failure. Fluid overload can be addressed through renal replacement therapy. See Peters, C. D., *Short and Long-Term Effects of the Angiotensin II Receptor Blocker Irbesartanon Intradialytic Central Hemodynamics: A Randomized Double-Blind Placebo-Controlled One-Year Intervention Trial (the SAFIR Study), PLoS ONE* (2015) 10(6): e0126882. doi:10.1371/journal.pone.0126882 (hereinafter "Peters"). However, such a clinical strategy provides no improvement in renal function for patients with the cardiorenal syndrome. See Bart B, *Ultrafiltration in decompensated heart failure with cardiorenal syndrome, NEJM* 2012; 367:2296-2304 (hereinafter "Bart").

Even among the best medical centers, nearly half of all patients admitted for congestion due to ADHF are discharged without achieving clinical decongestion, even with administration of high dose intravenous diuretics. *Circ Heart Fail.*, 8(4), 741-748 (2015). The success in achieving decongestion or avoiding major clinical events for patients with any form of diuretic resistance are significantly worse.

Impaired renal sodium excretion secondary to neurohumoral upregulation is the primary abnormality. The body is composed of semipermeable membranes that allow water, but not ions, to move freely. Sodium accumulation, therefore, is required to precipitate volume overload. Presentation with clinical congestion, therefore, underscores the inability of the kidneys to appropriately regulate sodium and water in the body.

Heart failure is a medical condition where the heart is unable to maintain a sufficient blood flow to support the body. The signs and symptoms of heart failure include, but are not limited to, shortness of breath, fatigue, weakness, swelling in the legs, ankles and feet, rapid and/or irregular heartbeat, persistent cough or wheezing, blood tinged phlegm, increased urine output (especially at night), abdominal swelling, fluid retention, loss of appetite and nausea, loss of concentration and alertness, sudden and/or severe shortness of breath and/or chest pain.

One common symptom in heart failure is edema (i.e., fluid buildup in the patient). This occurs when excess fluid is trapped in the tissues of the body. When blood is not pumped properly during heart failure, blood and fluid can back up in the legs, ankles and feet of a patient. It can also result in swelling in the abdomen along with sudden weight gain due to fluid buildup. Pulmonary edema occurs when fluid builds up in the lungs of a patient which contributes to shortness of breath and respiratory symptoms.

SUMMARY

According to an example of the disclosure, a system for removing fluid from a urinary tract includes at least one sensor configured to detect signal(s) representative of pulmonary artery pressure and communicate signal(s) representative of the pulmonary artery pressure and a controller. The controller is configured to: receive and process the signal(s) from the at least one sensor to determine if the pulmonary artery pressure is above, below, or at a predetermined value; and provide a control signal, determined at least in part from the pulmonary artery pressure signal(s) received from the at least one sensor, to a negative pressure source to apply negative pressure to a urinary catheter to remove fluid from a urinary tract when the pulmonary artery pressure is above the predetermined value and to cease applying negative pressure when the pulmonary artery pressure is at or below the predetermined value.

According to another example, a system for providing mechanical assistance for blood circulation and for removing fluid from a urinary tract includes at least one sensor configured to detect signal(s) representative of pulmonary artery pressure and communicate the signal(s) representative of the pulmonary artery pressure and a controller in communication with the at least one sensor. The controller is configured to: receive and process the signal(s) from the at least one sensor to determine the pulmonary artery pressure; provide a first control signal determined at least in part based on the determined pulmonary artery pressure to a negative pressure source to control applying negative pressure to a urinary catheter to remove fluid from a urinary tract; and provide a second control signal determined at least in part based on the determined pulmonary artery pressure to a blood pump to control output of the blood pump.

According to another example of the disclosure, a method for removing fluid from a urinary tract includes: monitoring a pulmonary artery pressure; determining if the pulmonary artery pressure is above, below, or at a predetermined value; and applying negative pressure to a urinary catheter to remove fluid from the urinary tract when the pulmonary artery pressure is above the predetermined value or ceasing application of the negative pressure when the pulmonary artery pressure is at or below the predetermined value.

Non-limiting examples of the present invention will now be described in the following numbered clauses:

Clause 1: A system for removing fluid from a urinary tract, comprising: at least one sensor configured to detect signal(s) representative of pulmonary artery pressure and communicate signal(s) representative of the pulmonary artery pressure; and a controller configured to: receive and process the signal(s) from the at least one sensor to determine if the pulmonary artery pressure is above, below, or at a predetermined value; and provide a control signal, determined at least in part from the pulmonary artery pressure signal(s) received from the at least one sensor, to a negative pressure source to apply negative pressure to a urinary catheter to remove fluid from a urinary tract when the pulmonary artery pressure is above the predetermined value and to cease applying negative pressure when the pulmonary artery pressure is at or below the predetermined value.

Clause 2: The system of clause 1, wherein the at least one sensor comprises an implantable pressure transducer.

Clause 3: The system of clause 2, wherein the implantable pressure transducer is configured to be deployed in a right pulmonary artery.

Clause 4: The system of clause 1, wherein the at least one sensor comprises a passive sensor comprising an inductor-capacitor circuit configured to be generate an electromagnetic field in response to an external radio frequency signal.

Clause 5: The system of clause 1 or clause 4, wherein the controller comprises a radio frequency antenna configured to cause the inductor-capacitor circuit of the at least one sensor to generate the electromagnetic field, and wherein the signal(s) received by the controller from the at least one sensor are representative of the generated electromagnetic field.

Clause 6: The system of any of clauses 1-5, wherein the at least one sensor comprises at least one anchor comprising elongated tines formed from a flexible biocompatible material for securing the at least one sensor at an implant location.

Clause 7: The system of any of clauses 1-6, wherein the negative pressure source comprises a pump configured to apply the negative pressure to the urinary catheter, the pump comprising at least one fluid port in fluid communication with a drainage lumen of the urinary catheter for receiving fluid from a kidney.

Clause 8: The system of clause 7, wherein at least a portion of the pump is configured to be positioned external to the urinary tract.

Clause 9: The system of clause 7, wherein at least a portion of the pump is configured to be implanted in the urinary tract.

Clause 10: The system of any of clauses 7-9, wherein the pump comprises at least one of a rotary pump, a rotodynamic pump, or a positive displacement pump.

Clause 11: The system of any of clauses 7-10, wherein the pump is configured to provide negative pressure ranging from 0 mmHg to about 150 mmHg to the drainage lumen of the urinary catheter, as measured at the at least one fluid port of the pump.

Clause 12: The system of any of clauses 7-11, wherein the pump is configured to produce a negative pressure sufficient for establishing a pressure gradient across a glomerulus of a kidney to facilitate urine flow towards the drainage lumen of the urinary catheter.

Clause 13: The system of any of clauses 7-13, wherein the controller is an external controller electrically coupled to the pump to provide the control signal and, optionally, power to the pump.

Clause 14: The system of any of clauses 7-13, wherein the controller is a pump controller disposed on a printed circuit board within a housing of the pump.

Clause 15: The system of any of clauses 1-14, further comprising a remote computer device in wired or wireless communication with the controller, the remote computer device being configured to provide instructions to the controller for operating the negative pressure source and to receive information from the controller about at least one of the negative pressure source and/or about the pulmonary artery pressure.

Clause 16: The system of any of clauses 1-15, further comprising the urinary catheter.

Clause 17: The system of clause 16, wherein the urinary catheter comprises a ureteral catheter comprising a distal portion comprising a retention portion and a proximal portion comprising a drainage lumen.

Clause 18: The system of clause 17, wherein the retention portion of the ureteral catheter comprises an outer periphery or protective surface area which prevents mucosal tissue from a kidney, renal pelvis and/or uretero-renal pelvis junction from occluding one or more protected drainage holes, ports, or perforations of the catheter upon application of negative pressure through the catheter.

Clause 19: The system of clause 18, wherein the retention portion comprises a coil, and wherein the one or more protected drainage holes, ports, or perforations extend through a radially inwardly facing portion of a sidewall of the coil.

Clause 20: The system of any of clauses 16-19, wherein the urinary catheter comprises a percutaneous kidney catheter.

Clause 21: The system of clause 20, wherein the percutaneous kidney catheter comprises: a proximal portion configured to pass through a percutaneous opening; and a distal portion comprising a retention portion, wherein the retention portion comprises an outer periphery or protective surface area that inhibits mucosal tissue from a kidney, renal pelvis and/or uretero-renal pelvis junction from occluding one or more protected drainage holes, ports, or perforations of the catheter upon application of negative pressure through the catheter.

Clause 22: The system of clause 21, wherein the retention portion comprises a proximal end sized to be positioned in the kidney and a distal end sized to be positioned in the uretero-renal pelvis junction.

Clause 23: The system of clause 21 or clause 22, wherein the retention portion comprises a coiled retention portion comprising at least a first coil having a first diameter and at least a second coil having a second diameter, the first diameter being greater than the second diameter.

Clause 24: The system of any of claims 1-23, wherein the controller is further configured to: as the negative pressure source is applying negative pressure to a urinary catheter, periodically compare the pulmonary artery pressure to the predetermined value for pulmonary artery pressure; and provide additional control signals to the negative pressure source to increase a magnitude of the negative pressure applied by the negative pressure source to the urinary catheter when the pulmonary artery pressure is greater than the predetermined value.

Clause 25: The system of clause 24, wherein the controller is configured to provide additional control signals to the negative pressure source to cause the negative pressure source to continue providing the increased magnitude of negative pressure to the urinary catheter until the pulmonary artery pressure decreases below the predetermined.

Clause 26: The system of clause 24 or clause 25, wherein the periodic comparison between the pulmonary artery pressure and the predetermined value occurs at least one of every hour, every four hours, every eight hours, or every twenty four hours.

Clause 27: A system for providing mechanical assistance for blood circulation and for removing fluid from a urinary tract, the system comprising: at least one sensor configured to detect signal(s) representative of pulmonary artery pressure and communicate the signal(s) representative of the pulmonary artery pressure; and a controller in communication with the at least one sensor configured to: receive and process the signal(s) from the at least one sensor to determine the pulmonary artery pressure; provide a first control signal determined at least in part based on the determined pulmonary artery pressure to a negative pressure source to control applying negative pressure to a urinary catheter to remove fluid from a urinary tract; and provide a second control signal determined at least in part based on the determined pulmonary artery pressure to a blood pump to control output of the blood pump.

Clause 28: The system of clause 27, wherein the blood pump comprises a left ventricular assist device.

Clause 29: The system of clause 27 or clause 28, wherein the controller is configured to determine if the pulmonary artery pressure is within or outside of a target range for pulmonary artery pressure.

Clause 30: The system of clause 29, wherein the second control signal adjusts the output of the blood pump when the pulmonary artery pressure is outside of the target range.

Clause 31: The system of clause 29 or clause 30, wherein the first control signal causes the negative pressure source to apply the negative pressure to the urinary catheter to remove fluid from the urinary tract when the pulmonary artery pressure is outside of the target range, and the first control signal causes the negative pressure source to cease applying the negative pressure to the urinary catheter when the pulmonary artery pressure is within the target range.

Clause 32: The system of clause 31, wherein the controller is further configured to: as the negative pressure source is applying negative pressure to a urinary catheter, periodically compare the pulmonary artery pressure to the target range for pulmonary artery pressure; and provide a signal to the negative pressure source to increase a magnitude of the negative pressure applied by the negative pressure source to the urinary catheter when the pulmonary artery pressure is greater than the predetermined value.

Clause 33: The system of clause 32, wherein the controller is configured to cause the negative pressure source to continue providing the increased magnitude of negative pressure to the urinary catheter until the pulmonary artery pressure determined by the at least one sensor decreases below the predetermined.

34: The system of any of clauses 27-33, wherein the at least one sensor comprises an implantable pressure transducer.

Clause 35: The system of clause 34, wherein the implantable pressure transducer is configured to be deployed in a right pulmonary artery.

Clause 36: The system of any of clauses 27-33, wherein the at least one sensor comprises a passive sensor comprising an inductor-capacitor circuit configured to be generate an electromagnetic field in response to an external radio frequency signal.

Clause 37: The system of any of clauses 27-33, wherein the controller comprises a radio frequency antenna configured to cause the inductor-capacitor circuit of the at least one sensor to generate the electromagnetic field, and wherein the signal(s) received by the controller from the at least one sensor are representative of the generated electromagnetic field.

Clause 38: The system of any of clauses 27-37, wherein the at least one sensor comprises at least one anchor comprising elongated tines formed from a flexible biocompatible material for securing the at least one sensor at an implant location.

Clause 39: The system of any of clauses 27-38, wherein the negative pressure source comprises a pump configured to apply the negative pressure to the urinary tract, the pump comprising at least one fluid port in fluid communication with a drainage lumen of the urinary catheter for receiving fluid from the kidney.

Clause 40: The system of any of clauses 27-39, wherein the controller is a pump controller disposed on a printed circuit board contained within a housing of the pump.

Clause 41: The system of clause 40, wherein the controller wirelessly transmits the second control signal to the blood pump.

Clause 42: The system of any of clauses 27-41, wherein the controller is configured to receive negative pressure feedback regarding at least one of a flow rate of fluid passing through the urinary catheter, a total fluid volume of fluid passing through the urinary catheter, and/or an analyte concentration of fluid passing through the urinary catheter, and wherein the second control signal is determined based, at least in part, of the received negative pressure feedback.

Clause 43: The system of clause 42, wherein the second control signal comprises an instruction to increase an output of the blood pump when the negative pressure feedback indicates fluid overload and/or pulmonary edema, and an instruction to decrease or maintain an output of the blood pump when the negative pressure feedback indicates no fluid overload and/or pulmonary edema.

Clause 44: A method for removing fluid from a urinary tract, the method comprising: monitoring a pulmonary artery pressure; determining if the pulmonary artery pressure is above, below, or at a predetermined value; and applying negative pressure to a urinary catheter to remove fluid from the urinary tract when the pulmonary artery pressure is above the predetermined value or ceasing application of the negative pressure when the pulmonary artery pressure is at or below the predetermined value.

Clause 45: The method of clause 44, wherein monitoring the pulmonary artery pressure comprises applying a radio frequency signal to a passive sensor comprising an inductor-capacitor circuit configured to be generate an electromagnetic field in response to the radio frequency signal, and detecting changes in the generated electromagnetic field to determine the pulmonary artery pressure.

Clause 46: The method of clause 45, wherein the radio frequency signal is applied to the passive sensor by an external control device comprising a radio frequency antenna that generates the radio frequency signal and detects a signal response from the inductor-capacitor circuit of the sensor.

Clause 47: The method of clause 45 or clause 46, wherein the passive sensor is implanted in a right pulmonary artery.

Clause 48: The method of any of clauses 45-47, wherein the radio frequency signal is periodically applied to the passive sensor at least one of once every hour, once every two hours, once every four hours, or once every twenty-four hours.

Clause 49: The method of any of clauses 44-48, wherein applying negative pressure to a urinary catheter when the pulmonary artery pressure is above the predetermined value comprises applying the negative pressure for a predetermined duration.

Clause 50: The method of clause 49, wherein, following the predetermined duration, the method further comprises determining the pulmonary artery pressure and applying the negative pressure for another instance of the predetermined duration when the pulmonary artery pressure is above the predetermined value or ceasing to apply the negative pressure when the pulmonary artery pressure is at or below the predetermined value.

Clause 51: The method of clause 49 or clause 50, wherein the predetermined duration comprises at least twelve hours.

Clause 52: The method of any of clauses 44-51, further comprising, as the negative pressure is being applied to the urinary catheter, continuing to monitor the pulmonary artery pressure, and increasing a magnitude of the negative pressure applied by the negative pressure source when the pulmonary artery pressure is above the predetermined value.

Clause 53: The method of any of clauses 44-52, wherein the negative pressure source comprises a pump configured to apply the negative pressure to the urinary tract, the pump comprising at least one fluid port in fluid communication with a drainage lumen of the urinary catheter.

Clause 54: The method of any of clauses 44-53, further comprising causing an implanted blood pump to provide blood flow at an output determined based, at least in part, on the pulmonary artery pressure.

Clause 55: The method of any of clauses 44-54, wherein the blood pump comprises a left ventricular assist device.

BRIEF DESCRIPTION OF THE DRAWINGS

These and other features and characteristics of the present disclosure, as well as the methods of operation, use, and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

Further features and other examples and advantages will become apparent from the following detailed description made with reference to the drawings in which:

FIG. 7 is a cross-sectional view of a portion of the pump assembly of FIGS. 2A and 2B taken along line 7-7;

FIG. 8 is a cross-sectional view of a portion of a pump assembly according to an example of the present disclosure;

FIG. 22C is a schematic drawing of another example of a retention portion for a catheter according to an example of the present invention;

FIG. 22D is a schematic drawing of another example of a retention portion for a catheter according to an example of the present invention;

FIG. 22E is a schematic drawing of another example of a retention portion for a catheter according to an example of the present invention;

FIG. 23B is a front view of the retention portion of FIG. 23A according to an example of the present invention;

FIG. 23C is a rear view of the retention portion of FIG. 23A according to an example of the present invention;

FIG. 23D is a top view of the retention portion of FIG. 23A according to an example of the present invention;

FIG. 45 is a side elevational view showing a cut away cross-sectional view of the sheath surrounding a catheter according to an example of the present invention in a contracted configuration for insertion into a patient's ureter;

DETAILED DESCRIPTION

Figure 1A:
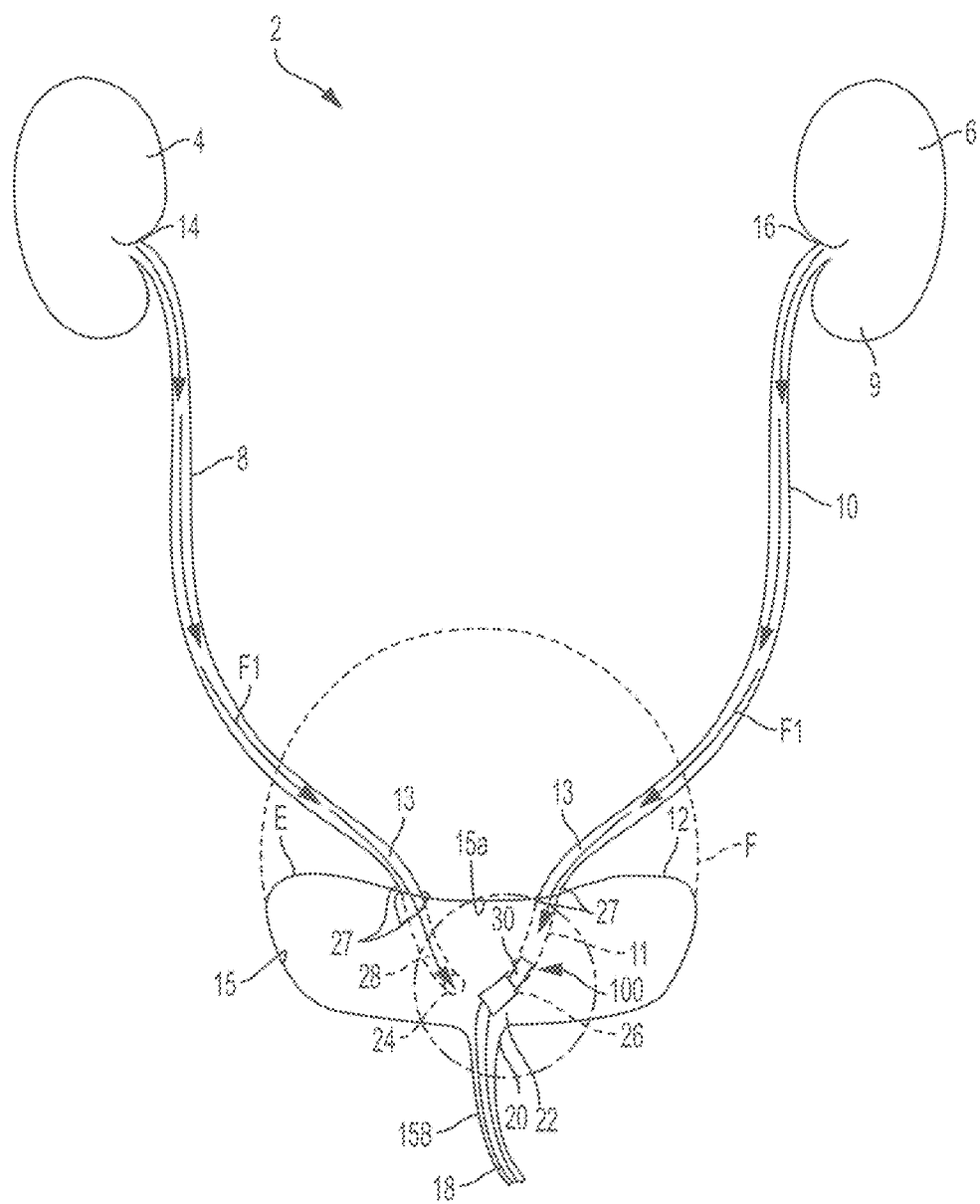
FIG. 1A is a schematic drawing of a urinary tract of a patient showing a pump assembly positioned in the ureter and bladder of the patient according to an example of the present disclosure.
Figure 1B:
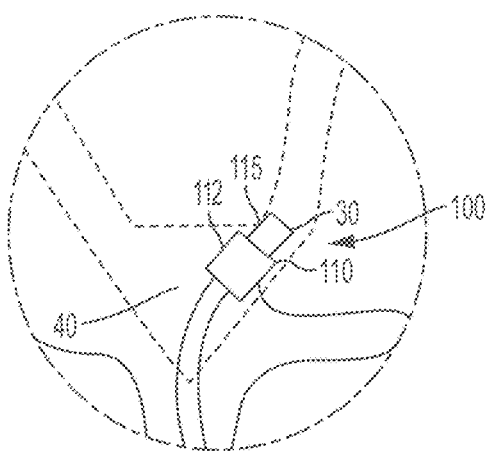
FIG. 1B is an enlargement of a portion of FIG. 1A.
Figure 1C:
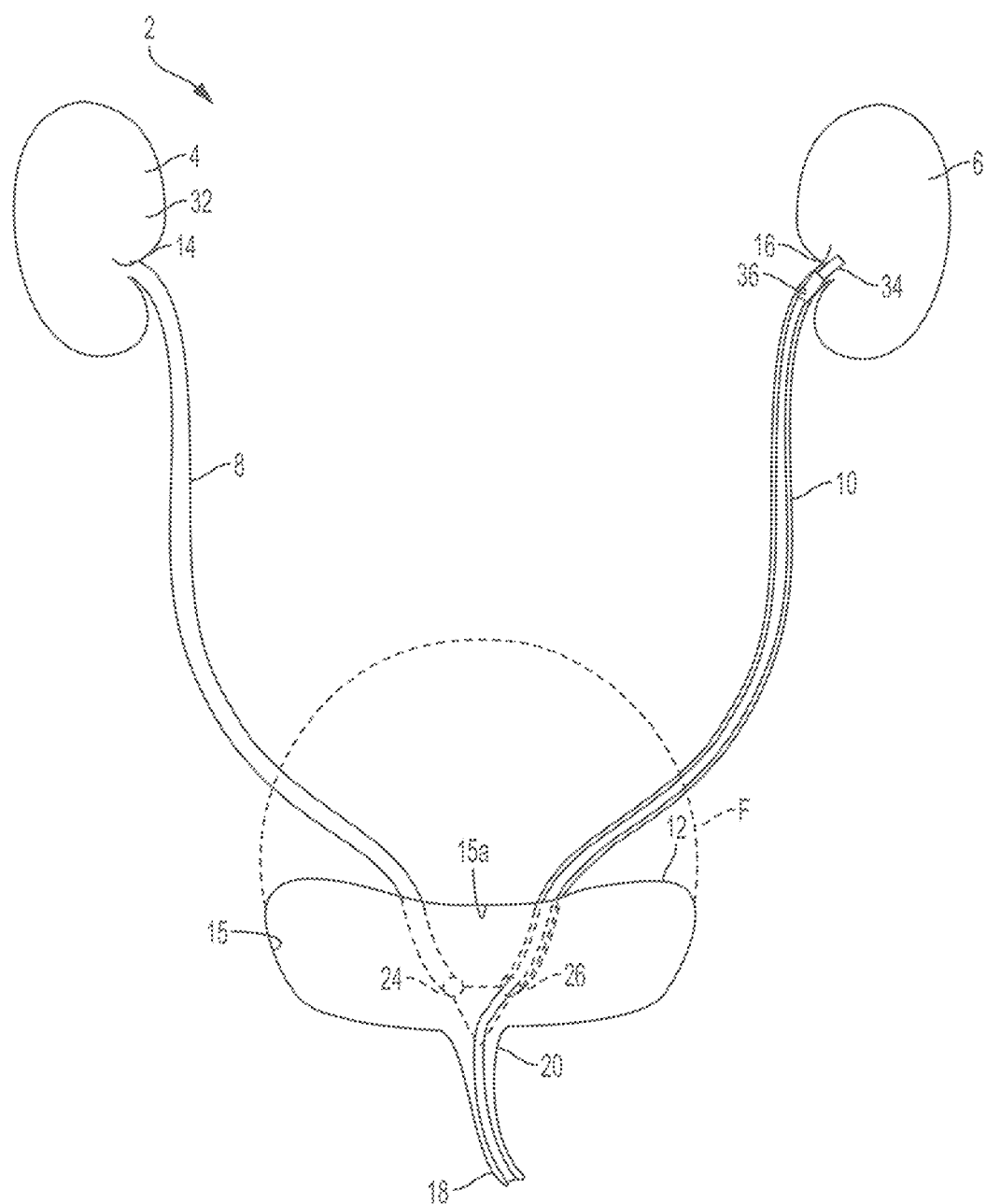
FIG. 1C is a schematic drawing of a urinary tract of a patient showing a pump assembly positioned in the renal pelvis and ureter of the patient according to another example of the present disclosure.
Figure 1D:
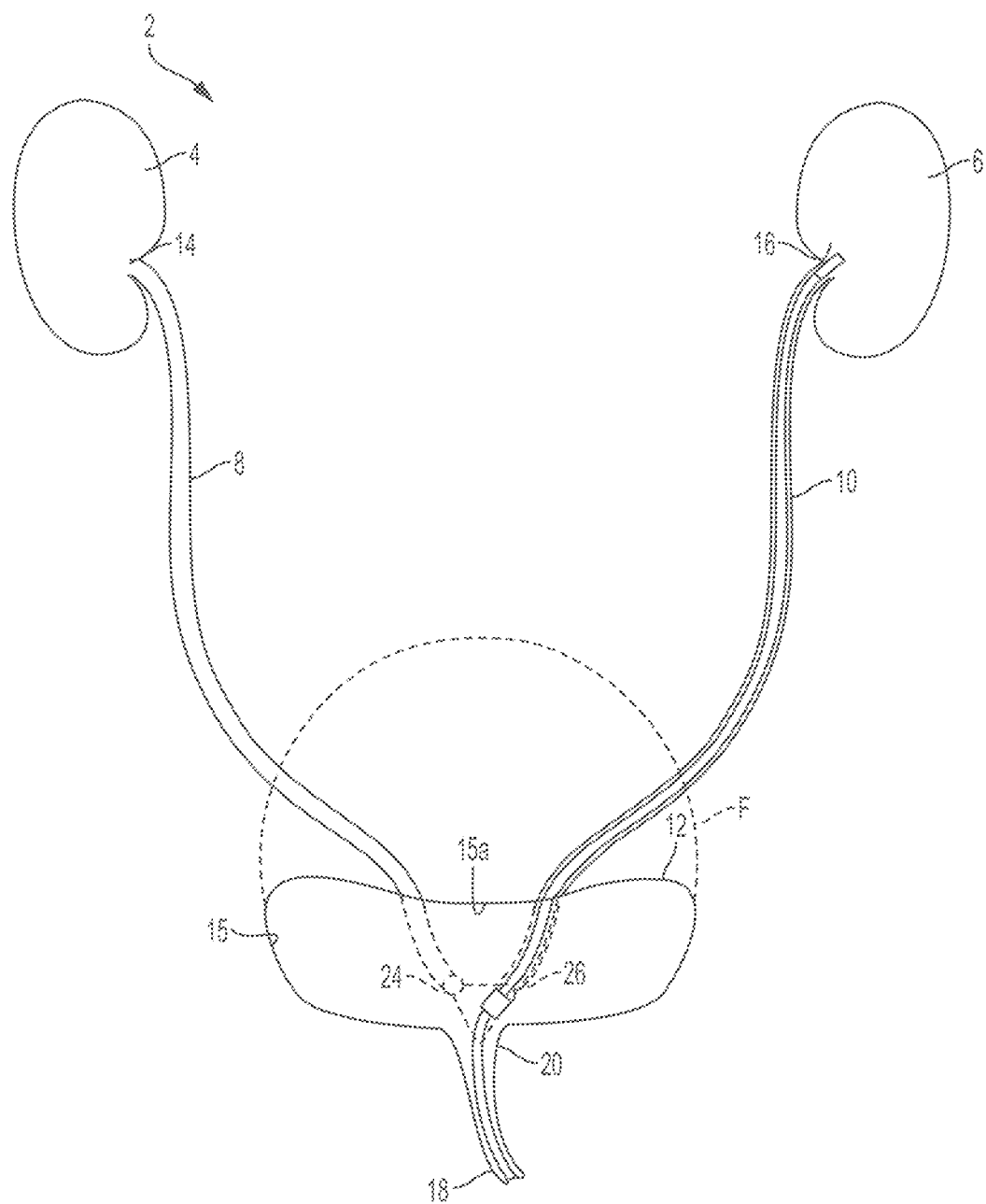
FIG. 1D is a schematic drawing of a urinary tract of a patient showing a pump assembly positioned in the bladder of the patient according to another example of the present disclosure.

As used herein, the singular form of "a", "an", and "the" include plural referents unless the context clearly states otherwise.

As used herein, the terms "right", "left", "top", and derivatives thereof shall relate to the invention as it is oriented in the drawing figures. The term "proximal" refers to the portion of the catheter device that is manipulated or contacted by a user and/or to a portion of an indwelling catheter nearest to the urinary tract access site, for example the urethra or a percutaneous access opening in the patient's body. The term "distal" refers to the opposite end of the catheter device that is configured to be inserted into a patient and/or to the portion of the device that is inserted farthest into the patient's urinary tract. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

The systems and treatment methods of the present disclosure are configured to provide negative pressure to the urinary tract of a patient for removal of fluid from the urinary tract. As used herein, the "patient" can be any species of the human or animal kingdom having kidney(s), a renal system and/or a urinary system. Non-limiting examples of patients include mammal(s), such as human(s) and/or non-mammalian animal(s). Non-limiting examples of mammal(s) include primate(s) and/or non-primate(s). Primate(s) include human(s) and non-human primate(s), including but not limited to male(s), female(s), adult(s) and children. Non-limiting examples of non-human primate(s) include monkey(s) and/or ape(s), for example chimpanzee(s). Non-limiting examples of non-primate(s) include cattle (such as cow(s), bull(s) and/or calves), pig(s), camel(s), llama(s), alpaca(s), horse(s), donkey(s), goat(s), rabbit(s), sheep, hamster(s), guinea pig(s), cat(s), dog(s), rat(s), mice, lion(s), whale(s), and/or dolphin(s). Non-limiting examples of non-mammalian animal(s) include bird(s) (e.g., duck(s) or geese), reptile(s) (e.g., lizard(s), snake(s), or alligator(s)), amphibian(s) (e.g., frog(s)), and/or fish. In some examples, the animals can be zoological animals, human pets and/or wild animals.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any measured numerical value, however, may inherently contain certain errors resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are possible.

As used herein, "maintain patency of fluid flow between a kidney and a bladder of the patient" means establishing, increasing or maintaining flow of fluid, such as urine, from the kidneys through the ureter(s), ureteral stent(s) and/or ureteral catheter(s) to the bladder and outside of the body. In some examples, the fluid flow is facilitated or maintained by providing a protective surface area 1001 in the upper urinary tract and/or bladder to prevent the uroendothelium from contracting or collapsing into the fluid column or stream. As used herein, "fluid" means urine and any other fluid from the urinary tract.

As used herein, "negative pressure" means that the pressure applied to the proximal end of the bladder catheter or the proximal end of the ureteral catheter, respectively, is below the existing pressure at the proximal end of the bladder catheter or the proximal end of the ureteral catheter, respectively, prior to application of the negative pressure, e.g., there is a pressure differential between the proximal end of the bladder catheter or the proximal end of the ureteral catheter, respectively, and the existing pressure at the proximal end of the bladder catheter or the proximal end of the ureteral catheter, respectively, prior to application of the negative pressure. This pressure differential causes fluid from the kidney to be drawn into the ureteral catheter or bladder catheter, respectively, or through both the ureteral catheter and the bladder catheter, and then outside of the patient's body. For example, negative pressure applied to the proximal end of the bladder catheter or the proximal end of the ureteral catheter can be less than atmospheric pressure (less than about 760 mm Hg or about 1 atm), or less than the pressure measured at the proximal end of the bladder catheter or the proximal end of the ureteral catheter prior to the application of negative pressure, such that fluid is drawn from the kidney and/or bladder. In some examples, the negative pressure applied to the proximal end of the bladder catheter or the proximal end of the ureteral catheter can range from about 0.1 mmHg to about 150 mm Hg, or about 0.1 mm Hg to about 50 mm Hg, or about 0.1 mm Hg to about 10 mm Hg, or about 5 mm Hg to about 20 mm Hg, or about 45 mm Hg (gauge pressure at the pump 710 or at a gauge at the negative pressure source). In some examples, the negative pressure source comprises a pump external to the patient's body for application of negative pressure through both the bladder catheter and the ureteral catheter, which in turn causes fluid from the kidney to be drawn into the ureteral catheter, through both the ureteral catheter and the bladder catheter, and then outside of the patient's body. In some examples, the negative pressure source comprises a vacuum source external to the patient's body for application and regulation of negative pressure through both the bladder catheter and the ureteral catheter, which in turn causes fluid from the kidney to be drawn into the ureteral catheter, through both the ureteral catheter and the bladder catheter, and then outside of the patient's body. In some examples, the vacuum source is selected from the group consisting of a wall suction source, vacuum bottle, and manual vacuum source, or the vacuum source is provided by a pressure differential. In some examples, the negative pressure received from the negative pressure source can be controlled manually, automatically, or combinations thereof. In some examples, a controller is used to regulate negative pressure from the negative pressure source. Non-limiting examples of negative and positive pressure sources are discussed in detail below. Also, systems for providing negative pressure therapy are also disclosed in International Publication No. WO 2017/015351 entitled "Ureteral and Bladder Catheters and Methods for Inducing Negative Pressure to Increase Renal Perfusion" and International Publication No. WO 2017/015345 entitled "Catheter Device and Method for Inducing Negative Pressure in a Patient's Bladder", each of which is incorporated by reference herein its entirety.

Fluid retention and venous congestion are central problems in the progression to advanced renal disease. Excess sodium ingestion coupled with relative decreases in excretion leads to isotonic volume expansion and secondary compartment involvement. In some examples, the present invention is generally directed to devices and methods for facilitating drainage of urine or waste from the bladder, ureter, and/or kidney(s) of a patient. In some examples, the present invention is generally directed to systems and methods for inducing a negative pressure in at least a portion of the bladder, ureter, and/or kidney(s), e.g., urinary system, of a patient. While not intending to be bound by any theory, it is believed that applying a negative pressure to at least a portion of the bladder, ureter, and/or kidney(s), e.g., urinary system, can offset the medullary nephron tubule re-absorption of sodium and water in some situations. Offsetting re-absorption of sodium and water can increase urine production, decrease total body sodium, and improve erythrocyte production. Since the intra-medullary pressures are driven by sodium and, therefore, volume overload, the targeted removal of excess sodium enables maintenance of volume loss. Removal of volume restores medullary hemostasis. Normal urine production is 1.48-1.96 L/day (or 1-1.4 ml/min).

Fluid retention and venous congestion are also central problems in the progression of prerenal Acute Kidney Injury ("AKI"). Specifically, AKI can be related to loss of perfusion or blood flow through the kidney(s). Accordingly, in some examples, the present invention facilitates improved renal hemodynamics and increases urine output for the purpose of relieving or reducing venous congestion. Further, it is anticipated that treatment and/or inhibition of AKI positively impacts and/or reduces the occurrence of other conditions, for example, reduction or inhibition of worsening renal function in patients with NYHA Class III and/or Class IV heart failure. Classification of different levels of heart failure are described in *The Criteria Committee of the New York Heart Association*, (1994), *Nomenclature and Criteria for Diagnosis of Diseases of the Heart and Great Vessels*, (9th ed.), Boston: Little, Brown & Co. pp. 253-256, the disclosure of which is incorporated by reference herein in its entirety. Reduction or inhibition of episodes of AKI and/or chronically decreased perfusion may also be a treatment for Stage 4 and/or Stage 5 chronic kidney disease. Chronic kidney disease progression is described in National Kidney Foundation, K/DOQI Clinical Practice Guidelines for Chronic Kidney Disease: Evaluation, Classification and Stratification. Am. J. Kidney Dis. 39:S1-S266, 2002 (Suppl. 1), the disclosure of which is incorporated by reference herein in its entirety.

Also, the ureteral catheters, ureteral stents and/or bladder catheters disclosed herein can be useful for preventing, delaying the onset of, and/or treating end-stage renal disease ("ESRD"). The average dialysis patient consumes about $90,000 per year in healthcare utilization for a total cost to the US government of $33.9 Billion. Today, ESRD patients comprise only 2.9% of Medicare's total beneficiaries, yet they account over 13% of total spending. While the incidence and costs per patient have stabilized in recent years, the volume of active patients continues to rise.

The five stages of advanced chronic kidney disease ("CKD") are based upon glomerular filtration rate (GFR). Stage 1 (GFR>90) patients have normal filtration, while stage 5 (GFR<15) have kidney failure. Like many chronic diseases, the diagnosis capture improves with increasing symptom and disease severity.

The CKD 3b/4 subgroup is a smaller subgroup that reflects important changes in disease progression, healthcare system engagement and transition to ESRD. Presentation to the emergency department rises with severity of CKD. Among the US Veteran's Administration population, nearly 86% of the incident dialysis patients had a hospital admission within the five years preceding the admission. Of those, 63% were hospitalized at initiation of dialysis. This suggests a tremendous opportunity to intervene prior to dialysis.

Despite being further down the arterial tree than other organs, the kidneys receive a disproportionate amount of cardiac output at rest. The glomerular membrane represents a path of least resistance of filtrate into the tubules. In healthy states, the nephron has multiple, intricate, redundant means of auto-regulating within normal ranges of arterial pressure.

Venous congestion has been implicated in reduced renal function and is associated with the systemic hypervolemia found in later stages of CKD. Since the kidney is covered with a semi-rigid capsule, small changes in venous pressure translate into direct changes in the intratubule pressures. This shift in intratubule pressure has been shown to upregulate reabsorption of sodium and water, perpetuating the vicious cycle.

Regardless of the initial insult and early progression, more advanced CKD is associated with decreased filtration (by definition) and greater azotemia. Regardless of whether the remaining nephrons are hyperabsorbing water or they are just unable to filtrate sufficiently, this nephron loss is associated with fluid retention and a progressive decline in renal function.

The kidney is sensitive to subtle shifts in volume. As pressure in either the tubule or capillary bed rises, the pressure in the other follows. As the capillary bed pressure rises, the production of filtrate and elimination of urine can decline dramatically. While not intending to be bound by any theory, it is believe that mild and regulated negative pressure delivered to the renal pelvis decreases the pressure among each of the functioning nephrons. In healthy anatomy, the renal pelvis is connected via a network of calyces and collecting ducts to approximately one million individual nephrons. Each of these nephrons are essentially fluid columns connecting Bowman's space to the renal pelvis. Pressure transmitted to the renal pelvis translates throughout. It is believed that, as negative pressure is applied to the renal pelvis, the glomerular capillary pressure forces more filtrate across the glomerular membrane, leading to increased urine output.

It is important to note that the tissues of the urinary tract are lined with urothelium, a type of transitional epithelium. The tissues lining the inside of the urinary tract are also referred to as uroendothelial or urothelial tissues, such as mucosal tissue 1003 of the ureter and/or kidney and bladder tissue 1004. Urothelium has a very high elasticity, enabling a remarkable range of collapsibility and distensibility. The urothelium lining the ureter lumen is surrounded first by the lamina propria, a thin layer of loose connective tissue, which together comprise the urothelial mucosa. This mucosa is then surrounded by a layer of longitudinal muscle fibers. These longitudinal muscle fibers surrounding the urothelial mucosa and the elasticity of the urothelial mucosa itself allow the ureter to relax into a collapsed stellate cross-section and then expand to full distention during diuresis. Histology of any normal ureteral cross-section reveals this star-shaped lumen in humans and other mammals generally used in translational medical research. Wolf et al., "Comparative Ureteral Microanatomy", JEU 10: 527-31 (1996).

The process of transporting urine from the kidney to the bladder is driven by contractions through the renal pelvis and peristalsis distally through the rest of the ureter. The renal pelvis is the widening of the proximal ureter into a funnel-shape where the ureter enters the kidney. The renal pelvis has actually been shown to be a continuation of the ureter, comprised of the same tissue but with one additional muscle layer that allows it to contract. Dixon and Gosling, "The Musculature of the Human Renal Calyces, Pelvis and Upper Ureter", J. Anat. 135: 129-37 (1982). These contractions push urine through the renal pelvis funnel to allow peristaltic waves to propagate the fluid through the ureter to the bladder.

Imaging studies have shown that the ureter of the dog can readily increase to up to 17× its resting cross-sectional area to accommodate large volumes of urine during diuresis. Woodburne and Lapides, "The Ureteral Lumen During Peristalsis", AJA 133: 255-8 (1972). Among swine, considered to be the closest animal model for the human upper urinary tract, the renal pelvis and most proximal ureter are actually shown to be the most compliant of all ureteral sections. Gregersen, et al., "Regional Differences Exist in Elastic Wall Properties in the Ureter", SJUN 30: 343-8 (1996). Wolf's comparative analysis of various research animals' ureteral microanatomy to that of humans revealed comparable thickness of lamina propria layer relative to whole ureter diameter in dogs (29.5% in humans and 34% in dogs) and comparable percentage of smooth muscle relative to total muscular cross sectional area in pigs (54% in humans and 45% in pigs). While there are certainly limitations to the comparisons between species, dogs and pigs have historically been strong foci in studying and understanding human ureter anatomy and physiology, and these reference values support this high level of translatability.

There is much more data available on structure and mechanics of pig and dog ureters and renal pelves than on human ureters. This is due partly to the invasiveness required for such detailed analyses as well as the inherent limitations of various imaging modalities (MRI, CT, ultrasound, etc.) to attempt to accurately identify size and composition of such small, flexible, and dynamic structures clinically. Nevertheless, this ability for the renal pelvis to distend or completely collapse in humans is a hurdle for nephrologists and urologists seeking to improve urine flow.

While not intending to be bound by any theory, the present inventors theorized that the application of negative pressure might help to facilitate fluid flow from the kidney, and that a very particular tool, designed to deploy a protective surface area in order to open or maintain the opening of the interior of the renal pelvis while inhibiting the surrounding tissues from contracting or collapsing into the fluid column under negative pressure, is needed to facilitate the application of negative pressure within the renal pelvis. The catheter designs of the present invention disclosed herein provide a protective surface area to inhibit surrounding urothelial tissues from contracting or collapsing into the fluid column under negative pressure. It is believed that the catheter designs of the present invention disclosed herein can successfully maintain the stellate longitudinal folding of the ureteral wall away from the central axis and protected holes of the catheter drainage lumen, and can inhibit natural sliding of the catheter down the stellate cross-sectional area of the ureteral lumen and/or downward migration by peristaltic waves.

Also, catheter designs of the present invention disclosed herein can avoid an unprotected open hole at the distal end of the drainage lumen which fails to protect surrounding tissues during suction. While it is convenient to think of the ureter as a straight tube, the true ureter and renal pelvis can enter the kidney at a variety of angles. Lippincott Williams & Wilkins, Annals of Surgery, 58, FIGS. 3 & 9 (1913). Therefore, it would be difficult to control the orientation of an unprotected open hole at the distal end of the drainage lumen when deploying such a catheter in the renal pelvis. This single hole may present a localized suction point that has no means of either reliable or consistent distancing from tissue walls, thereby permitting tissue to occlude the unprotected open hole and risking damage to the tissue. Also, catheter designs of the present invention disclosed herein can avoid placement of a balloon having an unprotected open hole at the distal end of the drainage lumen close to the kidney which may result in suction against and/or occlusion of the calyces. Placement of a balloon having an unprotected open hole at the distal end of the drainage lumen at the very base of the uretero—renal pelvis junction may result in suction against and occlusion by renal pelvis tissue. Also, a rounded balloon may present a risk of ureteral avulsion or other damage from incidental pulling forces on the balloon.

Delivering negative pressure into the kidney area of a patient has a number of anatomical challenges for at least three reasons. First, the urinary system is composed of highly pliable tissues that are easily deformed. Medical textbooks often depict the bladder as a thick muscular structure that can remain in a fixed shape regardless of the volume of urine contained within the bladder. However, in reality, the bladder is a soft deformable structure. The bladder shrinks to conform to the volume of urine contained in the bladder. An empty bladder more closely resembles a deflated latex balloon than a ball. In addition, the mucosal lining on the interior of the bladder is soft and susceptible to irritation and damage. It is desirable to avoid drawing the urinary system tissue into the orifices of the catheter to maintain adequate fluid flow therethrough and avoid injury to the surrounding tissue.

Second, the ureters are small tube-like structures that can expand and contract to transport urine from the renal pelvis to the bladder. This transport occurs in two ways: peristaltic activity and by a pressure gradient in an open system. In the peristaltic activity, a urine portion is pushed ahead of a contractile wave, which almost completely obliterates the lumen. The wave pattern initiates in the renal pelvis area, propagates along the ureter, and terminates in the bladder. Such a complete occlusion interrupts the fluid flow and can prevent negative pressure delivered in the bladder from reaching the renal pelvis without assistance. The second type of transport, by pressure gradient through a wide-open ureter, may be present during large urine flow. During such periods of high urine production, the pressure head in the renal pelvis would not need to be caused by contraction of the smooth muscles of the upper urinary tract, but rather is generated by the forward flow of urine, and therefore reflects arterial blood pressure. Kiil F., "Urinary Flow and Ureteral Peristalsis" in: Lutzeyer W., Melchior H. (Eds.) Urodynamics. Springer, Berlin, Heidelberg (pp. 57-70) (1973).

Third, the renal pelvis is at least as pliable as the bladder. The thin wall of the renal pelvis can expand to accommodate multiple times the normal volume, for example as occurs in patients having hydronephrosis.

More recently, the use of negative pressure in the renal pelvis to remove blood clots from the renal pelvis by the use of suction has been cautioned against because of the inevitable collapse of the renal pelvis, and as such discourages the use of negative pressure in the renal pelvis region. Webb, *Percutaneous Renal Surgery: A Practical Clinical Handbook*. p 92. Springer (2016).

While not intending to be bound by any theory, the tissues of the renal pelvis and bladder are flexible enough to be drawn inwardly during delivery of negative pressure to conform to the shape and volume of the tool being used to deliver negative pressure. Analogous to the vacuum sealing of a husked ear of corn, the urothelial tissue will collapse around and conform to the source of negative pressure. To prevent the tissue from occluding the lumen and impeding the flow of urine, the present inventors theorized that a protective surface area sufficient to maintain the fluid column when mild negative pressure is applied would prevent or inhibit occlusion.

The present inventors determined that there are specific features that enable a catheter tool to be deployed successfully in and deliver negative pressure through the urological region that have not been previously described. These require a deep understanding of the anatomy and physiology of the treatment zone and adjacent tissues. The catheter must comprise a protective surface area within the renal pelvis by supporting the urothelium and inhibiting the urothelial tissue from occluding openings in the catheter during application of negative pressure through the catheter lumen. For example, establishing a three dimensional shape or void volume, that is free or essentially free from urothelial tissue, ensures the patency of the fluid column or flow from each of the million nephrons into the drainage lumen of the catheter.

Since the renal pelvis is comprised of longitudinally oriented smooth muscle cells, the protective surface area would ideally incorporate a multi-planar approach to establishing the protected surface area. Anatomy is often described in three planes, sagittal (vertical front to back that divides the body into right and left parts), coronal (vertical side to side dividing the body into dorsal and ventral parts) and transverse (horizontal or axial that divides the body into superior and inferior parts, and is perpendicular to the sagittal and coronal planes). The smooth muscle cells in the renal pelvis are oriented vertically. It is desirable for the catheter to also maintain a radial surface area across the many transverse planes between the kidney and the ureter. This enables a catheter to account for both longitudinal and horizontal portions of the renal pelvis in the establishment of a protective surface area 1001 (shown in FIGS. 22A-22E). In addition, given the flexibility of the tissues, the protection of these tissues from the openings or orifices that lead to the lumen of the catheter tool is desirable. The catheters discussed herein can be useful for delivering negative pressure, positive pressure, or can be used at ambient pressure, or any combination thereof.

In some examples, a deployable/retractable expansion mechanism is utilized that, when deployed, creates and/or maintains a patent fluid column or flow between the kidney and the catheter drainage lumen. This deployable/retractable mechanism, when deployed, creates the protective surface area 1001 within the renal pelvis by supporting the urothelium and inhibiting the urothelial tissue from occluding openings in the catheter during application of negative pressure through the catheter lumen. In some examples, the retention portion is configured to be extended into a deployed position in which a diameter of the retention portion is greater than a diameter of the drainage lumen portion.

Pump Assemblies for Providing Negative Pressure for Fluid Removal

With reference to the figures, a pump assembly, indicated generally as 100, 500, 9004, or pump system, indicated generally as 600, 800, 9000 comprising a pump 110, 510, 612, 812, for increasing urine output from a patient is disclosed herein. The pump 110, 510, 612, 812 can be at least partially or fully positioned within the patient's body, for example within a body cavity or conduit, such as the urinary tract, or positioned externally of the patient's body. In other examples, the pump 110, 510, 612, 812 may positioned within the patient's body external to the urinary tract, such as in the abdominal cavity, peritoneum, or subcutaneous space of the patient.

In some examples, the pump 110, 510, 612, 812 may be an indwelling pump configured to be positioned in a portion of the patient's body. An "indwelling pump" can be inserted through, for example, a body orifice. For example, as described in further detail herein, one or more pump(s), such as pump 110, 510, may be inserted into the patient's urinary tract through the urethral orifice and deployed in the bladder, ureter(s), renal pelvis and/or kidney.

In some examples, the pump 110, 510, 612, 812 may be an implantable pump. As used herein, a pump is "implantable" or "implanted" by insertion through an incision through the patient's skin. An "implantable pump" may be fixed in position within, for example, a body cavity by sutures. As described in further detail herein, the pump 610 may be implanted in the abdominal cavity, peritoneum, or subcutaneous space of the patient. In some examples, all portions of a pump or pump assembly are configured to be implanted or inserted within a body cavity or body of a patient. In other examples, as described in further detail herein, some portions of the pump, pump assembly and/or pump system, such as fluid contacting portions of the pump, can be implanted, while other portions of the pump (i.e., controller, power supply, output components, visual display) are positioned outside of the patient's body and are in electronic communication with implanted components of the pump or pump assembly by a wired or wireless electronic connection.

In some examples, the pump 110, 510, 612, 812, 9004 may be an external pump positioned outside of the patient's body and fluidly connected to, for example, catheters that are deployed in and extend from a urinary tract of the patient. As used herein, an "external pump" refers to a pump in which all components, such as mechanical components (i.e., housing, impeller, valves, fluid reservoir, etc.) and electrical components (i.e., controller or processor, power supply, output components) of the pump are located outside of the patient's body, such that only catheters (for example, catheters inserted into the urinary tract or portion thereof, or implanted into at least a portion of the urinary tract, such as the kidney region or bladder) extend from the pump into the patient's body. Examples of systems comprising external pumps are shown, for example, in FIGS. 16D, 16E, 21C, 57B, 57D and 58B. External pumps that can be adapted for use with the pump systems of the present disclosure are also described, for example, in U.S. Pat. No. 10,426,919, which is incorporated by reference herein in its entirety.

The indwelling, implanted, and/or external pumps, pump assemblies 100, 500, 9004 and pump systems 600, 800, 9000 disclosed herein can be configured to be used, for example, by ambulatory patients for providing continuous or periodic negative pressure therapy to the renal pelvis and/or kidneys over a prolonged treatment period, such as a treatment period of several days, several weeks, or more. As used herein, an "ambulatory patient" refers to a patient that, while undergoing negative pressure therapy, is capable of standing, moving from a first location to a second location by, for example, walking or being pushed in a wheel chair, and performing normal life activities without being inconvenienced or restricted by components of the pump assembly 100, 500 or system 600, 800. Accordingly, in order to be used for ambulatory patients, the components of the pump assembly 100, 500, 9004 or system 600, 800, 9000, such as components of the pump mechanism, catheters, electronic processing and control circuitry, and power supply, are either implanted or worn by the patient, so that the patient can move and perform normal daily activities without being restricted by the pump assembly or system components. For a wheelchair bound patient, some components of the pump assembly 100, 500 or system 600, 800 may also be attached to the wheelchair, rather than being worn by the patient. Also, any wires or tubing of the pump assembly 100, 500, 9004 or system 600, 800, 9000 external to the patient's body should be short in length to avoid restricting movement of the patient. Further, in some examples, the pump assembly 100, 500, 9004 or system 600, 800, 9000 for the ambulatory patient expels urine to the bladder, rather than to an external urine collection container. In some examples, urine expelled into the bladder is removed from the bladder by a conventional bladder catheter inserted through the urethra, as are known in the art.

In some examples, any of the pumps, pump assemblies or pump systems of the present disclosure (internal or external pumps, pump systems or pump assemblies) can be configured for use in treating non-ambulatory patients, such as a patient spending at least a portion of their time in hospital bed or in a seated position. At least a portion or all of the pump, pump system or pump assembly may be located internally within the patient and/or externally from the patient, as desired. Such assemblies for non-ambulatory patients may also comprise urine collection containers or fluid reservoirs connected to the urinary tract through, for example, a urethral catheter.

The pump assemblies 100, 500 or pump systems 600, 800, shown in FIGS. 2A to 19B and 21A to 21C, comprise at least one ureteral catheter 614, 814, also referred to as an inlet line 146, and the pump 110, 510, 612, 812. At least a portion of the pump assembly 100, 500 or pump device 612, 812 is configured to be positioned within a patient's body. The pump assembly 100, 500 or pump system 600, 800 may further comprise a controller 112, 644, 844 coupled to the pump 110, 510, 612, 812, configured to direct motion of the pump 110, 510, 612, 812. At least one (one or more) of the pump 110, 510, 612, 812, the controller 112, 644, 844, or a power supply may be positioned within the patient's urinary tract, or any body cavity. In other examples, the controller 112, 644, 844 and/or power supply can be positioned outside of the patient's body, if desired. The pump 110, 510, 612, 812 can comprise at least one pump element positioned within the fluid flow channel to draw fluid through the channel. The ureteral catheter comprises a distal portion comprising a retention portion configured to be positioned in a patient's kidney, renal pelvis, and/or ureter; and a proximal portion comprising a drainage lumen. The retention portion may comprise at least one drainage port which permits fluid flow into the drainage lumen. The pump 110, 510, 612, 812 is configured to provide negative pressure to at least one of the renal pelvis or kidney of the patient through the drainage lumen of the at least one ureteral catheter. The pump 110, 510, 612, 812 can comprise at least one fluid port in fluid communication with the drainage lumen of the proximal portion of the ureteral catheter for receiving fluid from the patient's kidney.

For ease of discussion, the pump assembly 100 will now be discussed with reference to use with a urinary tract, however one of ordinary skill in the art would understand that the pump assembly 100 can be used in a similar manner for drainage of fluids from any body cavity or conduit. With specific reference to FIG. 1A, a urinary tract, shown generally as 2, of a patient comprises a patient's right kidney 4 and left kidney 6. The kidneys 4, 6 are responsible for blood filtration and clearance of waste compounds from the body through urine. Urine produced by the right kidney 4 and the left kidney 6 is drained into a patient's bladder 12 through tubules, namely, a right ureter 8 and a left ureter 10. For example, urine may be conducted through the ureters 8, 10 by peristalsis of the ureter walls, as well as by gravity. A distal portion 9 of the ureter 8, 10 and/or kidney 4, 6 known as the renal pelvis 14, 16 is a cornucopia-shaped structure extending between the ureters 8, 10 and kidneys 4, 6. The ureters 8, 10 enter the bladder 12 through a ureter opening or orifice 24, 26. The bladder 12 is a flexible and substantially hollow structure adapted to collect urine until the urine is excreted from the body. The bladder 12 is transitionable from an empty position (signified by reference line E) to a full position (signified by reference line F). Normally, when the bladder 12 reaches a substantially full state, urine is permitted to drain from the bladder 12 to a urethra 18 through a urethral opening or sphincter 20 located at a lower portion of the bladder 12. Contraction of the bladder 12 can be responsive to stresses and pressure exerted on a trigone region 22 of the bladder 12, which is the triangular region extending between ureteral orifices 24, 26 and the urethral opening or sphincter 20. The trigone region 22 is sensitive to stress and pressure, such that as the bladder 12 begins to fill, pressure on the trigone region 22 increases. When a threshold pressure on the trigone region 22 is exceeded, the bladder 12 begins to contract to expel collected urine through the urethra 18.

Referring now to FIGS. 1A-1D, 2A, and 2B, which show the urinary tract 2, in some examples, the pump assembly 100 comprises the pump 110. As described in further detail herein, in some examples, the pump 110 comprises an inlet for receiving fluid from the patient's ureter or from a proximal portion of a ureteral catheter and an outlet configured for expelling fluid into the patient's bladder or into, for example, an outlet catheter for directing the fluid from the pump 110 to the patient's bladder or through the urinary tract 2 to a container external to the patient. At least a portion of the pump 110 is configured to be positioned within at least one of an interior portion 28, 30 of a ureter 8, 10, an interior portion 32, 34 of a renal pelvis 14, 16, an interior portion 40 of a bladder 12, or an interior portion of a urethra 18 of a patient. For example, the pump 110 can be configured to be positioned in a proximal portion 11 or a distal portion 9 of a patient's ureter 8, 10 and/or renal pelvis 14, 16. The pump 110 can be used to provide negative or positive pressure, as desired, to an interior of at least one of the patient's ureter 8, 10 or kidney 4, 6.

Figure 2A:
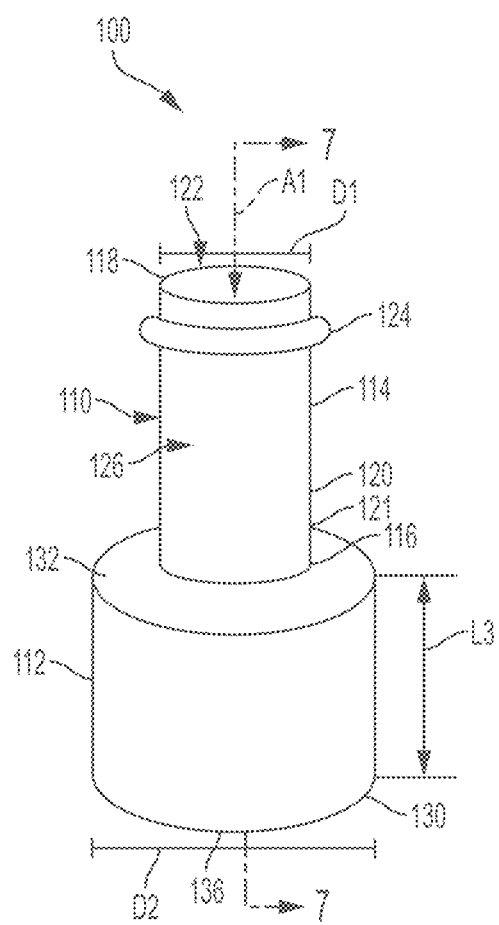
FIGS. 2A and 2B are schematic drawings of a pump assembly according to an example of the present disclosure.
Figure 2B:
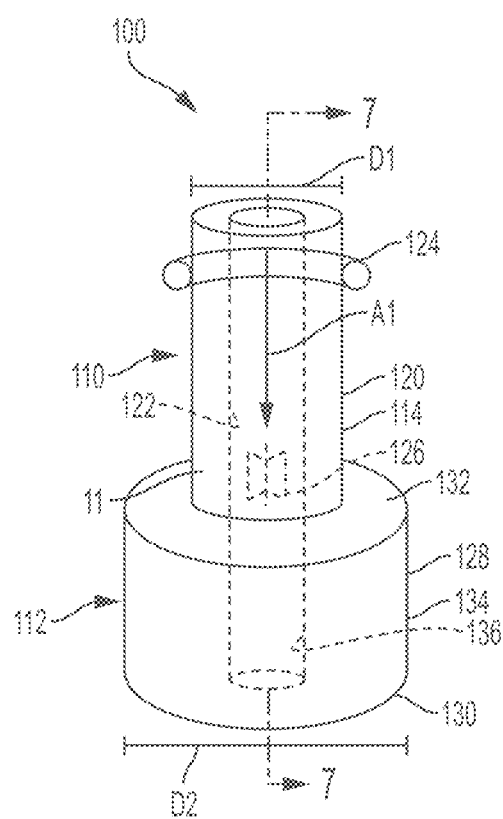

An exemplary pump assembly 100 is shown in FIGS. 2A and 2B. The pump assembly 100 comprises a pump 110 configured to be positioned within an interior portion 28, 30 (e.g., a proximal portion 11 or distal portion 9) of a ureter 8, 10 and/or an interior portion 32, 34 of a renal pelvis 14, 16 or kidney of a patient for providing negative or positive pressure to the patient's ureter 8, 10 and/or kidney 4, 6, and a controller 112 configured to be implanted and/or deployed in a portion of the ureter 8, 10 and/or renal pelvis 14, 16 or, for example, elsewhere in a patient's urinary tract 2, for example, in the bladder 12 or the urethra 18.

Indwelling Pump Assemblies

In some examples, the present disclosure is directed to a variety of indwelling or implantable pumps. As shown in FIGS. 1A-1D, 2A, and 2B, the pump 110 can be positioned in a portion of the urinary tract 2. In other examples, one or more pumps can be implanted at any convenient location in the patient's body. Pumps are generally configured to draw urine from the renal pelvis and/or kidneys. In some examples, pumps conduct fluid from the body through one or more drainage catheters. In other examples, pumps cause fluid to drain into the bladder, where it can be expelled from the body through the urethra.

As discussed in further detail as follows, to induce negative or positive pressure, the pump 110 comprises a pump mechanism or element 126 (shown in FIG. 2B) which, while positioned within an interior portion 28, 30 of the ureter 8, 10, an interior portion 32, 34 of the renal pelvis 14, 16, an interior portion 40 of the bladder 12, or an interior portion of the urethra 18, is continuously or periodically activated to draw fluid into a flow channel 122 of the pump 110, thereby inducing negative or positive pressure in the ureters 8, 10 and/or kidneys 4, 6. The pump element 126 can be at least partially positioned within the channel 122 such that, when activated, draws fluid through the channel 122 between the open distal end 118 and the open proximal end 116 of the housing 114 in the direction of arrow A1. The pump element 126 can operate for a predetermined period of time, for example, for a certain period each day, or it can operate continuously. The period of time of pump operation can vary, as desired. The pump element 126 can comprise different types of molded or machined parts, as are known in the art, comprising impellers, screw threads, pistons, one-way valves, check valves, and similar structures for drawing fluid through the pump, as will be described herein. In some examples, the pump element 126 comprises a piezoelectric film or surface configured to transition from an extended configuration to a retracted configuration to draw fluid through the pump, such as is described as follows.

When actuated, the pump 110 draws fluid F1 (e.g., urine) from the kidney(s) 4, 6 and ureter(s) 8, 10 and moves the fluid F1 to the bladder 12 or through the bladder 12 to outside of the patient's body, thereby inducing a negative pressure in the urinary tract. The rotation or actuation of the pump element 126 can be reversed to provide positive pressure, as needed.

In some examples, fluid F1 is expelled by the pump 110 into the bladder 12. In other examples, fluid F1 can be conducted through an outlet line 158, such as a tube or conduit, through the inside of the urethra 18, and outside the body. The fluid F1 can be collected in a fluid collection container (not shown) located outside of the patient's body. The pump 110 may be configured to deliver negative pressure in a range of 0 to about 150 mmHg, or about 5 mmHg to about 100 mmHg, or about 10 mmHg to about 50 mmHg, as measured at an inflow port of the pump 110. The pump 110 may be configured to intermittently deliver positive pressure in a range of about 0 to about 150 mmHg, or about 1 mmHg to about 100 mmHg, or about 1 mmHg to about 50 mmHg, as measured at the inflow port of the pump 110. The pump 110 can be configured to provide a volumetric fluid flow rate between 0 and about 3.5 mL/min, between about 0.2 mL/min and about 2.5 mL/min, or between about 0.4 mL/min and about 1.25 mL/min Generally, the amount of negative or positive pressure delivered by the pump and/or volumetric flow rate is determined from pump operating parameters (e.g., the pump is set to deliver a predetermined negative pressure or to extract fluid at a predetermined flow rate). However, in some examples, the pump 110 can comprise pressure sensors for directly or indirectly measuring negative and/or positive pressure exerted on the ureter and/or kidneys by the pump 110 and/or flow rate sensors for measuring fluid volume drawn through the pump 110. As described herein, negative or positive pressure may be applied continuously or intermittently pulsed to drive continuous or pulsatile flow.

As described herein, the pump element 126 can be, for example, a micro-electrical mechanical component as is known in the art, for example, an Abiomed® Impella® pump, or a piezoelectric pump, such as those manufactured by Dolomite. Other fabrication techniques for producing components of a pump 110 configured for insertion in the ureter 8, 10, the renal pelvis 14, 16, or the urethra 18 can comprise, for example, injection molding, three-dimensional printing, metal stamping, and similar fabrication techniques, as are known in the art. For example, as shown in FIGS. 7 and 8, the pump element 126 may comprise an impeller 1 and/or a deformable, moveable, and/or expandable piezoelectric element 180. As described in greater detail below with respect to FIG. 11, in some examples, the pump element 126 can be operatively connected to electrical components comprising a motor (e.g., drive mechanism 228), a power source (e.g., battery 226 and/or induction coil 210), and an on/off switch or controller 218, as well as to different types of optional sensors for measuring pump operating parameters and/or physiological information for the patient, as discussed herein.

With continued reference to FIGS. 2A and 2B, in some examples, the pump 110 comprises a housing 114, which can at least partially enclose the pump element 126 and/or can partially define the flow channel 122. At least a portion of the housing 114 can be configured to be positioned within an interior portion 28, 30 of the ureter 8, 10, an interior portion 32, 34 of the renal pelvis 14, 16, an interior portion 40 of the bladder 12, or an interior portion of the urethra 18. The housing 114 comprises an open proximal end 116, an open distal end 118, and a sidewall 120 extending therebetween, which define the flow channel 122 for conducting the fluid F1 through the interior portion 28, 30 of the patient's ureter 8, 10, the interior portion 32, 34 of the patient's renal pelvis 14, 16, the interior portion 40 of patient's bladder 12, or the interior portion of the patient's urethra 18 (depending upon where the pump 110 is positioned) and to move the fluid into or through the patient's bladder 12 or urethra 18 to the exterior of the patient.

As described in further detail herein, the open proximal end 116 and the open distal end 118 of the housing 114 are sized to fit within particular portions of the patient's urinary tract 2, such as the ureters. The housing 114 may have a diameter ranging from about 3 mm to about 8 mm or from about 4 mm to about 7 mm, and a length ranging from about 5 mm to about 30 mm, from about 10 mm to about 25 mm, or from about 15 mm to about 20 mm. The pump flow channel 122 may have a diameter ranging from about 1 mm to about 6 mm or about 2 mm to about 5 mm. In other examples, the housing 114 can be tapered to facilitate positioning of distal portions of the housing 114 within the ureters 8, 10, the renal pelvis 14, 16, or the urethra 18. For example, a taper of about 0 to about 6 degrees may be used. In other examples, the housing 114 can have a non-circular cross section. For example, the cross section of the housing 114 can be a square, rectangle, another polygonal shape, or combinations thereof. For a housing 114 having a square or rectangular shaped cross-section, each side of the cross-section can have a width of about 3 mm to about 8 mm or about 4 mm to about 7 mm. In some examples, the housing 114 can have a generally smooth outer surface to improve patient comfort.

In some examples, the housing 114 has a maximum external or outer diameter D1 of about 0.5 mm to about 3.0 mm, or about 2.0 mm to about 2.5 mm. The outer diameter D1 can be selected to correspond to an average ureter interior diameter, such that the pump 110 fits snugly within the ureter.

In some examples, the pump 110 may at least partially seal the ureter to inhibit bypass leakage of urine and/or to maintain negative pressure. In some examples, the outer cross-section of the housing 114 of the pump 110 may be sized to fill the interior cross-section of the ureter. The engagement of the tissue of the ureter with the housing 114 at least partially seals the ureter to inhibit bypass leakage of urine and/or to maintain negative pressure. In one example, the housing 114 may be substantially cylindrical and the outer diameter of the housing 114 may be equal to or larger than the interior diameter of the ureter. In some examples, as shown in FIG. 2B, in order to facilitate formation of a suitable seal, a flexible and/or resilient elastomeric structure can be positioned about a portion of the exterior of the pump 110 to at least partially seal the ureter. For example, an annular seal 124 extending around the outer surface 121 of the sidewall 120 circumference of the pump 110 can be attached to or positioned about a portion of the pump 110 to form a seal 124 between the housing 114 and the adjacent inner wall 13 of the ureter 8, 10. The seal 124 can be formed from one or more elastomeric biocompatible materials, such as silicone, polyurethane, polyolefin, or hydrogel such as alginate.

The housing 114 can be shaped as desired to facilitate positioning within the ureter, renal pelvis, bladder, or urethra, and to accommodate the pump element (discussed below) and flow channel. In some examples, the housing 114 is a substantially cylindrical structure having substantially similar annular cross sections along its entire length.

The housing 114 can be formed from one or more suitable biocompatible materials, such as medical grade plastic (e.g., high-density polyethylene, polycarbonates, and silicone materials) and/or metal (e.g., surgical stainless steel).

Pump Element and Associated Electronic Components

Exemplary pump elements 126 of the pump 110 are shown in FIGS. 7 and 8. As discussed previously, the pump element 126 can be positioned at least partially within the channel 122 defined by the pump housing 114. When activated, the pump element 126 draws fluid, such as urine produced by the kidney, into the channel 122 through the open distal end 118 of the housing 114 and expels the fluid through the open proximal end 116 of the housing 114. In some examples, the pump element 126 may also propel fluid through the channel 122 defined by the controller housing 128 (shown in FIG. 2B) and into the patient's bladder, or through a tube through the bladder and urethra, and external to the patient's body.

As shown in FIG. 7, in some examples, the pump element 126 comprises a rotatable impeller 170 positioned within the channel 122. The impeller 170 can be made from various medical-grade materials, which are sufficiently strong and rigid to rotate for a prolonged duration without deforming or bending. For example, the impeller 170 can be formed from a metal material, such as surgical stainless steel, and/or from a rigid plastic material, such as polycarbonate. For example, the impeller 170 can comprise two or more blades 172 mounted to and positioned to rotate about a central rotor 174 in a direction of arrow A3. The impeller 170 can have 2 to 4 blades, or more. The blades 172 can have a length of about 8 mm to about 14 mm or about 10 mm to about 12 mm and a width of about 2 mm to about 3 mm. The clearance between the blades 172 can be about 0.02 mm to about 1 mm, or about 0.5 mm to about 0.8 mm. As shown in FIG. 7, the rotor 174 may extend longitudinally through the channel 122 along a central longitudinal axis L4 thereof. The blades 172 may comprise a straight or curved surface 176 configured to contact fluid passing through the channel 122. In some examples, the blades 172 may also be able to rotate about the rotor 174 in an opposite direction to apply positive pressure to the ureter and/or kidney if desired. The blades 172 can have any suitable shape, which, when rotated, is capable of drawing fluid through the channel 122. For example, as shown in FIG. 7, edges 178 of the blades 172 may have a straight, curved, or "S"-shaped configuration. As previously discussed, the pump element 126 and impeller 170 can be operatively connected to the drive mechanism or electric motor which, when activated, causes the blades 172 to rotate as described herein.

As shown in FIG. 8, another exemplary pump element 126 comprises a piezoelectric diaphragm 180 configured to transition between a contracted position (shown by dashed lines in FIG. 8) and an expanded position (shown by sold lines in FIG. 8), in which the piezoelectric diaphragm 180 expands into the channel 122 to restrict flow through the channel 122 and reduce a volume and cross-sectional area of the channel 122. The piezoelectric diaphragm 180 can be formed from a thin, flexible, conductive film, such as a polymer and/or elastomeric film, as is known in the art, or from stainless steel. The piezoelectric diaphragm 180 can be electronically coupled to a drive mechanism, such as a signal generator or power source, for activating the piezoelectric diaphragm 180. For example, the diaphragm 180 can be activated by passing an electric signal generated by the signal generator or power source through the conductive film of the diaphragm 180 to cause the diaphragm 180 to transition to the extended position. During use, one side of the piezoelectric diaphragm 180 is exposed to the fluid, and the drive mechanism is located on the unexposed side of the piezoelectric diaphragm 180. The pump element 126 further comprises valves 182, 184, such as one-way valve and/or a check valve, positioned at the open distal end 118 and open proximal end 116 of the channel 122, respectively, as shown in FIG. 8. The one-way and/or check valves 182, 184 can be conventional one-way valves configured to restrict backflow of fluid, as is known in the art. Exemplary one-way and/or check valve mechanisms can comprise, for example, a flexible flap or cover, ball valve, piston valve, or similar mechanism.

In operation, fluid is drawn into channel 122 through a distal valve 182 by deflation of the piezoelectric diaphragm 180, as shown by arrow A1 in FIG. 8. For example, a flap 188 of the distal valve 182 may pivot in a direction of arrow A4 to an open position to permit fluid to pass therethrough. As a result of negative pressure produced by deflation or collapsing of the diaphragm 180, the proximal valve 184 is forced to close, as shown by arrow A5, to prevent backflow of fluid. Once the diaphragm 180 is deflated or collapses by a predetermined amount, motion of the diaphragm 180 is reversed by applying the electric signal to the conductive film. As the diaphragm 180 expands, the distal valve 182 closes to prevent fluid backflow and fluid is expelled from the channel 122 through the open proximal valve 184 through the open proximal end 116 of the housing 114, into the lower ureter portion 11 and through the urethra 18.

Pump Assembly Controller or Control Device

The pump assembly 100 further comprises a controller 112 configured to be positioned within at least one of a second interior portion of the patient's ureter 8, 10, a second interior portion of the patient's renal pelvis 14, 16, a second interior portion of the patient's bladder 12, or a second interior portion of a patient's urethra 18. The controller 112 may comprise a module or device in wired or wireless communication with one or more other modules or devices, thereby forming a patient treatment system. The controller 112 may comprise portions of a single device or assembly, or multiple devices or assemblies and, for example, can be enclosed in a single device housing or multiple housings. In some examples, the controller 112 comprises processing circuitry configured to execute instructions and perform functions based on the executed instructions. In that case, the same processing components may perform functions of for different components of the pump assembly 100. For example, a single processor or microprocessor may be configured to perform both functions of the pump 110, comprising actuating and ceasing operation of a pump mechanism or pump element 126, and of the controller 112, such as receiving and processing data transmitted from remote devices.

In some examples, the controller 112 comprises electronic circuitry, such as a controller or microprocessor comprising computer readable memory comprising instructions, that when executed, control pump operating parameters (e.g., flow rate, operating speed, operating duration, etc.). For example, the controller or processor can be configured to output instructions to the pump 110 to cause the pump 110 to turn on, turn off, or adjust operating speed. The controller 112 can further comprise one or more communication interfaces for communicating instructions to the pump 110 and for communicating information about treatment provided to the patient and measured patient parameters to a remote device or data collection facility. For example, the communication interface may be configured to wirelessly transmit data about a patient or treatment provided to a patient to a patient care facility for inclusion in a patient health record.

Figure 3:
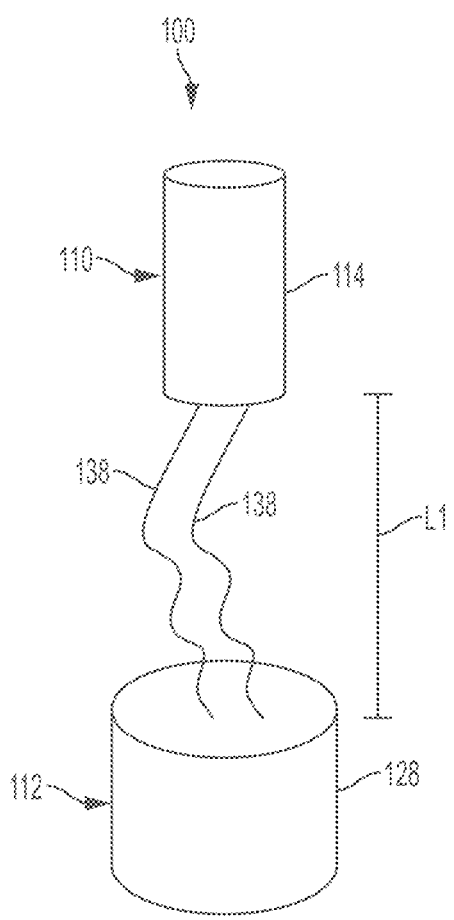
FIG. 3 is a schematic drawing of a pump assembly comprising a wire linkage between a pump and a controller thereof, according to an example of the present disclosure.

The pump 110 and controller 112 may be integrally formed or directly connected as shown, for example, in FIGS. 2A and 2B. In other examples, separate pump and controllers can be connected by a wireless or wired connection, as shown in FIG. 3. In some examples, the wires extending between the pump 110 and the controller 112 may extend a substantial portion of the length of the ureter, so that the pump 110 can be positioned within the renal pelvis region, and the controller 112 can be positioned in the patient's bladder 12. In other examples, the pump 110 may be in wireless communication with the controller 112, which can be spaced apart from the pump 110. For example, a remote control device 310 (shown in FIG. 12), such as a device positioned outside of the patient's body, can be used to control the pump 110.

The controller 112 is operatively connected to and/or in communication with components of the pump 110 comprising the pump element 126 to direct motion of the pump element 126 to control the flow rate of fluid F1 passing through the interior portion of the patient's ureter 8, 10, the patient's renal pelvis 14, 16, the patient's bladder 12, or the patient's urethra 18.

In some examples, the controller 112 comprises a housing 128. At least a portion of the housing 128 is configured to be positioned within the interior portion 28, 30 of the ureter 8, 10, the interior portion 32, 34 of the renal pelvis 14, 16, the interior portion 40 of the bladder 12, the interior portion of the urethra 18, and/or elsewhere in the urinary tract 2. The housing 128 comprises a distal end 132, a proximal end 130, and a sidewall 134 extending therebetween. A length L3 of the controller 112 can be based on its intended location in the urinary tract. For example, the controller 112 can have a length L3 of between about 1 cm to about 5 cm, or about 2 cm to about 4 cm. The controller 112 can have a maximum outer diameter D2 which, in some examples, is greater than the maximum outer diameter D1 of the pump housing 114. The diameter D2 of the controller 112 is also variable based on the intended deployment location. For example, the controller 112 can have a diameter D2 of between about 5 mm to about 20 mm or about 10 mm to about 15 mm.

The controller housing 128 can be shaped as desired to facilitate positioning within the ureter 8, 10, the renal pelvis 14, 16, the bladder 12, or the urethra 18, and to accommodate the controller 110 and the flow channel (if present). In some examples, the controller housing 128 is a substantially cylindrical structure having substantially similar annular cross sections along its entire length. In other examples, the controller housing 114 can be tapered to facilitate positioning of distal portions of the controller housing 128 within the ureters 8, 10, the bladder 12, or the urethra 18. For example, a taper of about 0 to about 6 degrees may be used. In other examples, the controller housing 128 can have a non-circular cross section. For example, the cross section of the controller housing 128 can be a square, rectangle, or another polygonal shape.

In some examples, the controller housing 128 is a generally cylindrical structure. The controller housing 128 can optionally comprise a flow channel 136 therethrough. The flow channel 136 can have an inner diameter ranging from about 1 mm to about 6 mm or about 2 mm to about 5 mm. The shape of the interior of the flow channel 136 can have any shape as desired, and in some examples can be generally cylindrical to facilitate flow therethrough. The controller housing 128 can be formed from a similar biocompatible metal or plastic material as the pump housing 114 described above. In general, the maximum outer diameter D2 can be sufficient to position the controller 112 within the bladder 12 of a patient and, as such, can be wider than the diameter of the ureteral orifice 24, 26 (shown in FIG. 1A) and the interior diameter of the ureter 8, 10 so that the controller 112 remains in the bladder and is not drawn into the ureter along with the pump 110.

Figure 11:
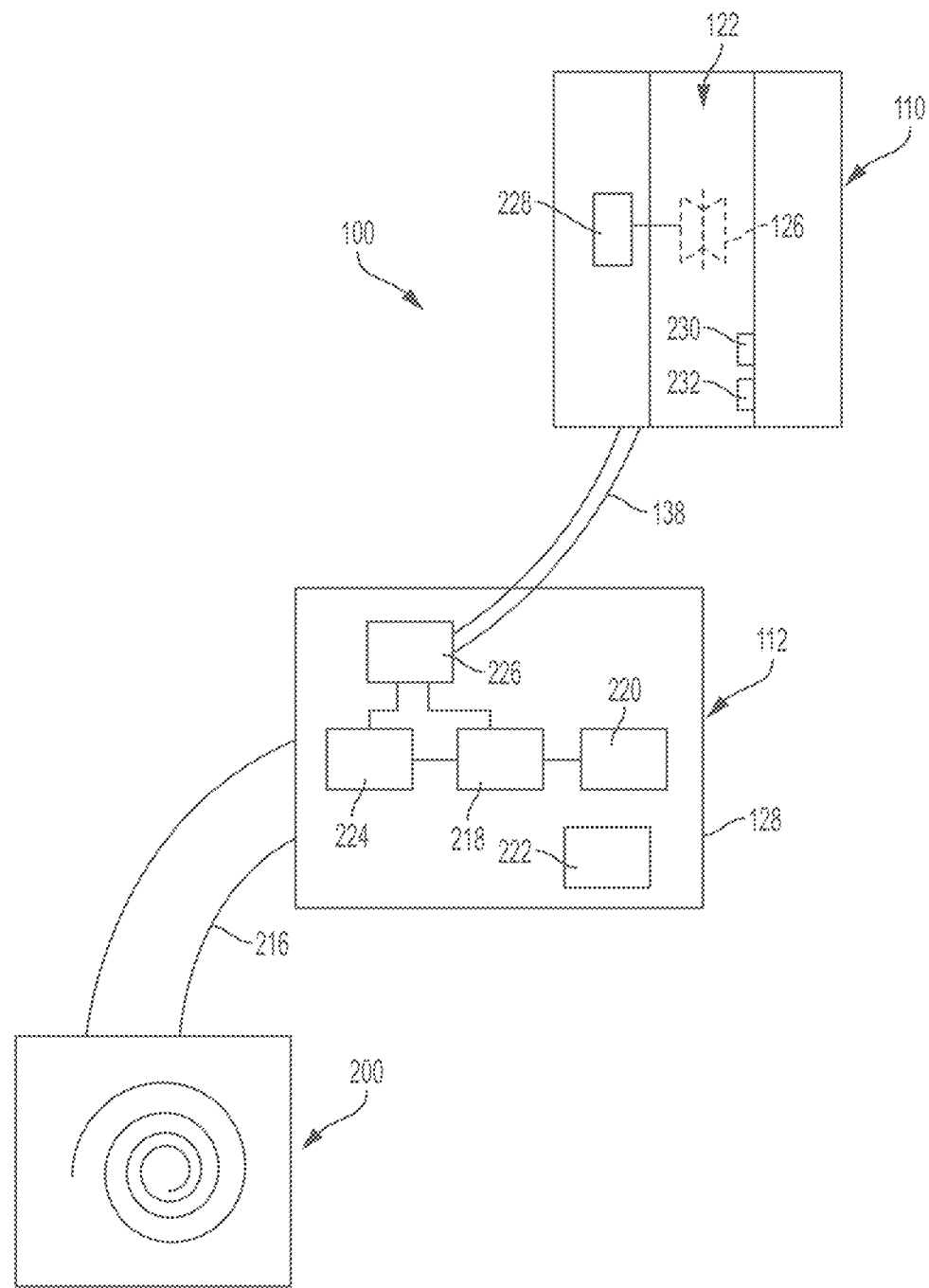
FIG. 11 is a schematic diagram of electronic components of the pump assembly of FIGS. 2A and 2B.

The controller 112 further comprises electronic circuitry for operating the pump element 126, comprising components for controlling and adjusting pump flow rate, negative and/or positive pressure generated, power usage, and other operating parameters. Exemplary electronic components of the pump assembly 100, particularly the controller 112, are shown in FIG. 11 and are described below in detail.

With reference again to FIGS. 2A and 2B, in some examples, the pump 110 and the controller 112 can be integrally formed, such that the respective housings 114, 128 are directly connected to one another. For example, as shown in FIGS. 2A and 2B, the proximal end 116 of the pump 110 is connected to and/or integrally formed with the distal end 132 of the controller 112. In that case, the channel 122 of the pump 110 is directly connected to and in fluid communication with the channel 136 of the controller 112, such that fluid F1 is drawn from the ureter 8, 10, the renal pelvis 14, 16, the bladder 12, or the urethra 18 through the flow channel 122 of the pump 110 and the flow channel 136 of the controller 112, and expelled from the open proximal end 130 of the controller 112 into the patient's bladder 12 or through tubing to conduct the fluid through the bladder 12 and urethra 18 to outside of the patient's body.

As shown in FIG. 3, in another example of a pump assembly 100, the controller housing 128 is separate from the pump housing 114. In that case, as shown in FIG. 3, the pump 110 and controller 112 are connected via a wireless or wired connection formed by one or more wires 138 extending between the pump 110 and controller 112. In some examples, the wires 138 are coated with a suitable biocompatible sheath or coating to provide suitable insulation and to facilitate insertion and/or removal of the wires 138 from the urinary tract. For example, polymer coatings, such as polyvinyl chloride, polytetrafluoroethylene (PTFE,), latex, or silicone may be used. In this example, the controller housing 128 can optionally comprise the flow channel 136.

The wires 138 can be configured to conduct electronic signals between the pump 110 and controller 112 comprising, for example, operating instructions from the controller 112 to the pump element 126 of the pump 110 to control or adjust operating speed and/or to actuate or cease operation of the pump element 126. Operating parameters and/or information sensed by electronic components of the pump 110 may be transmitted to the controller 112 via the wired connection for processing, analysis, and/or to be transmitted from the controller 112 to a remote source. In some examples, the wires 138 between the pump 110 and controller 112 are rather short in length, meaning that the pump 110 is configured to be positioned in a proximal portion 11 of the ureter 8, 10, near the ureteral orifice 24, 26 into the bladder 12. In other configurations, the wires 138 are about the length of the ureter 8, 10, meaning that the pump 110 can be positioned in the renal pelvis 14, 16 and/or kidney 4, 6, while the controller 112 can be positioned in the ureter 8, 10 and/or the bladder 12. For example, the wires 138 may have a length L1 of about 1 cm to about 35 cm, or about 15 cm to about 25 cm, since the average ureter length of an adult is about 25 cm to about 30 cm.

Pump Assembly Power Source

In some examples, the controller 112 further comprises an internal power source or external power source 200 for providing power for the electronic circuitry of the controller 112 and pump element 126 or mechanism of the pump 110. The power source 200 can be a disposable or rechargeable battery, which, in some examples, may be recharged via, for example, inductive power transfer through a small induction coil deployed in the bladder, or elsewhere in or outside the body. The induction coil may be configured to generate power when exposed to an electromagnetic field generated by a remote device outside of the patient's body. For example, the remote device can be a computerized device, such as a smart phone or computer tablet. In other examples, the remote device can be a non-computerized device comprising circuitry for generating the electromagnetic field. In one example, a blanket comprising field generating electromagnetic circuitry can be wrapped around the patient while he/she sleeps. The field generating circuitry can induce the induction coil to generate power for the entire night or at least until the rechargeable battery is fully charged. Since the patient is less likely to move while sleeping than when awake, it is likely that the portion of the blanket which produces the electromagnetic field remains in close proximity to the pump assembly 100 and induction coil for a substantial period of time.

Figure 9:
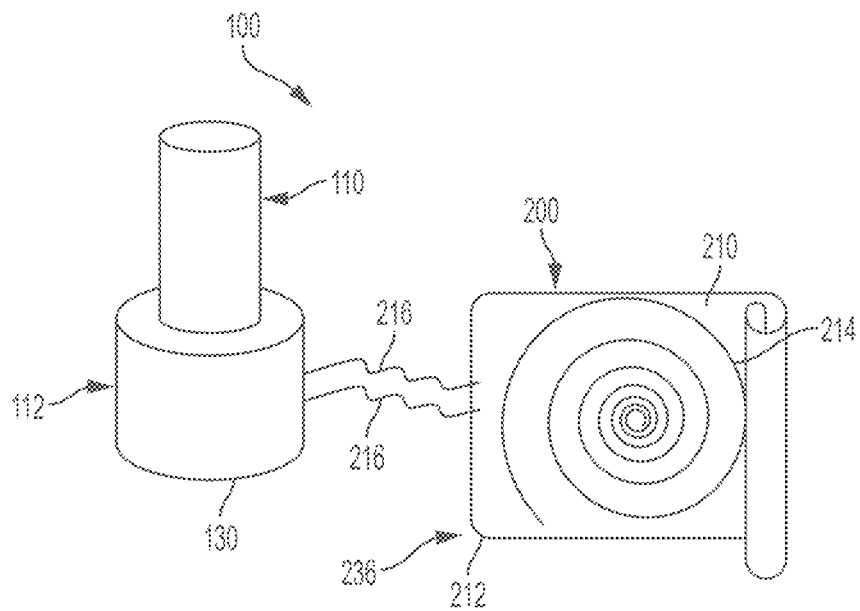
FIG. 9 is a schematic drawing of a pump assembly comprising a deployable induction coil according to an example of the present disclosure.
Figure 10:
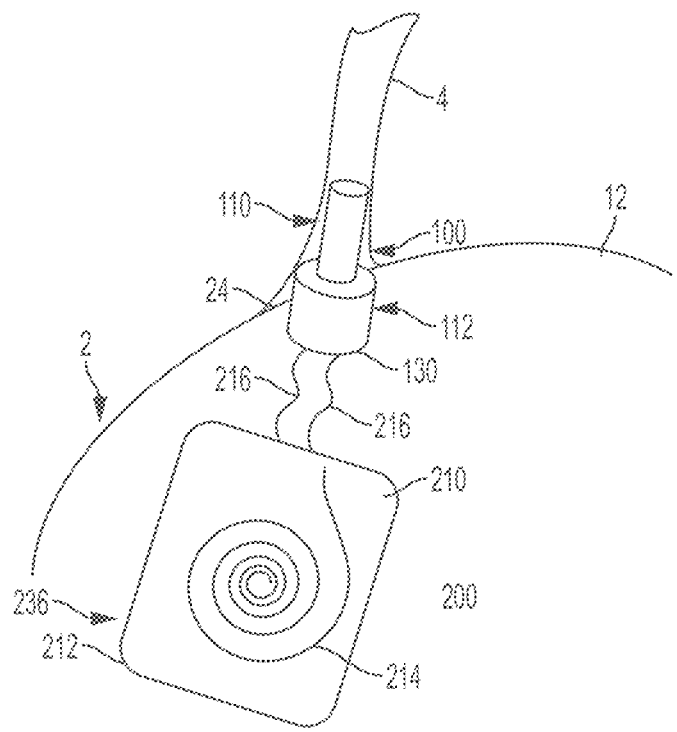
FIG. 10 is a schematic drawing of the pump assembly of FIG. 9 deployed in a patient's urinary tract, according to an example of the present disclosure.

In some examples, the pump assembly 100 further comprises the power source 200 shown in FIGS. 9 and 10. The power source 200 comprises an induction coil 210 electronically coupled to the pump 110 and/or to the controller 112. Induction coils for near field wireless energy transfer are known and are used, for example, to charge portable low-power electronic devices, such as cell phones, laptop computers, small electrical appliances, and power tools. An exemplary induction coil is the eCoupled system developed by Fulton Innovation, which is described, for example, in U.S. Pat. No. 6,975,198 entitled "Inductive Coil Assembly". Other known or later developed induction systems, which can be positioned in a patient's body and used to generate sufficient power to operate a microelectromechanical device or system, may also be used within the scope of the present disclosure.

As described herein, the induction coil 210 generates and provides power to the pump assembly 100 to operate the pump 110 and controller 112. For example, power produced by the induction coil 210 can be used to recharge a rechargeable battery to provide power for sensors disposed in the pump 110 and/or for wireless data transmission between the pump assembly 100 and external devices. In some examples, as discussed herein, the induction coil 210 generates power when exposed to an electromagnetic field produced by another device. For example, the electromagnetic field can be generated by a remote control device 310 (shown in FIG. 12) positioned outside the patient's body. The remote control device 310 can be worn in a holster, carrying case, fanny pack, or pocket, for example, and positioned such that the remote device 310 is held flat against the patient's body and as close as possible to the induction coil 210.

In examples shown in FIGS. 9 and 10, the induction coil 210 comprises a flexible sheet 212, such as a polymer sheet, and a conductive wire 214 embedded or attached to the flexible sheet 212. For example, the wire 214 can be attached to the flexible sheet 212 in a spiral pattern, a zig-zag pattern, or any other suitable pattern. The induction coil 210 can be connected to the pump assembly 110 by one or more wires or cables 216. For example, the coil 210 can be connected to the controller 112 through cables 216 extending from the proximal end 130 of the controller 112.

Figure 13A:
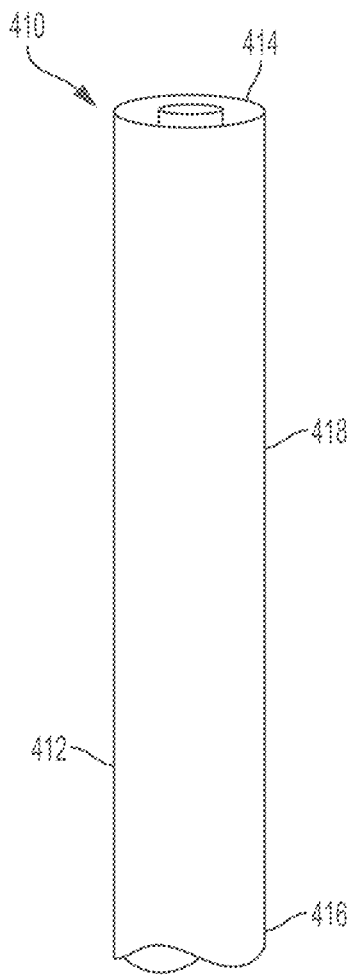
FIG. 13A is a schematic drawing of a delivery catheter for delivery of a pump assembly into a portion of a urinary tract of a patient, according to an example of the present disclosure.
Figure 13B:
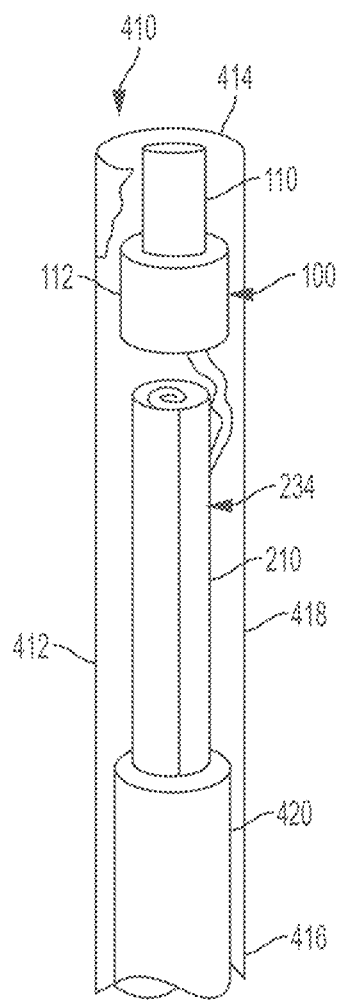
FIG. 13B is a schematic drawing of the delivery catheter of FIG. 13A with portions of an elongated tube cut-away to show the pump assembly contained therein.

In some examples, the flexible sheet 212 is transitionable between a rolled configuration 234 (as shown in FIG. 13B) and an un-rolled or deployed configuration 236 (shown in FIGS. 9 and 10). In some instances, the flexible sheet 212 may be configured to deploy automatically. For example, the sheet 212 may be biased to naturally unroll when it is released from a deployment catheter 410 (shown in FIGS. 13A and 13B). In other examples, the coil 210 may comprise a manual release mechanism, such as a release button or trigger wire. When a user presses the release button or pulls the trigger wire, a latching mechanism for maintaining the coil 210 in the rolled configuration 234 releases allowing the flexible sheet 212 to unroll, thereby transitioning the sheet 212 to the deployed configuration 236.

The induction coil 210 can be positioned at any convenient position within the patient's urinary tract 2. For example, as shown in FIG. 10, the induction coil 210 can be operatively connected to the controller 112 and positioned in the patient's bladder 12 at a position proximal to the controller 112. Alternatively, the induction coil 210 may be positioned in the abdominal cavity, outside of the bladder, in the peritoneal cavity, in any other convenient location in vivo, or external to the patient.

Pump Assembly Electrical Components

Exemplary electronic components of the pump assembly 100 are shown in the schematic diagram of FIG. 11. As previously described, the pump assembly 100 comprises the pump 110, controller 112, and power source 200, such as induction coil 210 or battery 226 (shown in FIG. 11). The induction coil 210 can be operatively coupled to the controller 112 by cables 216 for proving power to the controller 112.

The controller 112 comprises a controller 218 and associated transitory or non-transitory computer readable memory 220. The controller 218 can comprise, for example, one or more general-purpose microprocessors configured to receive and implement instructions for operating the pump by, for example, communicating with the pump 110 to actuate or cease operation of the pump element 126 and/or to adjust an operating speed to control negative and/or positive pressure delivered to the patient.

In some examples, the controller 218 can be configured to control communication between the pump assembly 100 and one or more remote control devices 310 (shown in FIG. 12) located external to the patient. In that case, the controller 112 may further comprise a communications interface 222 comprising, for example, a wireless transmitter or antenna. The communications interface 222 can be configured to receive instructions from a remote source (e.g., the remote control device 310, shown in FIG. 12) and to emit signals controlling operation of the pump element based on the received instructions.

The controller 112 further comprises power distribution and management circuitry 224. As shown in FIG. 11, the power management circuitry is electrically coupled to the induction coil 210. The power distribution circuitry 224 can be configured to receive power generated by the induction coil 210 and to control distribution of the generated power to other system components.

In some examples, the controller 112 may further comprise a battery 226, such as a rechargeable battery, operatively connected to the controller 218 and power distribution circuitry 224. The battery 226 can be recharged from power generated by the induction coil 210. At times when power is not being generated by the induction coil 210, system components can continue to operate with power provided by the battery 226. The battery 226 can be any battery which is small enough to fit within the controller housing 128 and which has been approved for use in vivo. For example, batteries used in pacemakers and similar implanted devices may be appropriate for use with the pump assembly 100 described herein.

As previously described, electronic components of the controller 112 comprising the controller 218 are in electronic communication with electrical components of the pump 110 through, for example, connecting wires 138 (shown in FIGS. 3, 9, and 11) or by another suitable electronic connection. Power generated by the induction coil 210 can be provided to electronic components of the pump 110 through the wires 138. Additionally, operating instructions generated by the controller 218 can be provided to components of the pump 110 to control pump operating parameters. In a similar manner, information collected or generated by components of the pump 110 can be communicated to the controller 218 for further processing and/or to be transmitted wirelessly to a remote device.

As shown in FIG. 11, the pump 110 comprises the pump element 126 and associated electronic components. For example, the pump 110 can comprise a drive mechanism 228, such as an electric motor or signal generator, operatively connected to the pump element 126. A variety of different drive mechanisms 228 can be used in connection with the pump 110 depending on the type of pump element 126 being used. For example, for an impeller-type pump arrangement (as shown in FIG. 7), the drive mechanism 228 may comprise an electric motor which causes the impeller to rotate. In other examples, the drive mechanism 228 can comprise electromagnetic elements disposed around the impeller 170, which turn on and off in a predetermined pattern to cause the impeller 170 to rotate at a desired speed. If the pump element 126 is a piezoelectric element 180, then the drive mechanism 228 can comprise a signal generator for generating electric current to transition the piezoelectric element 180 between the contracted and expanded states.

In some examples, the pump 110 can further comprise one or more sensors (e.g., pump sensors 230 and physiological sensors 232) positioned within the flow channel 122 of the pump 110 for measuring information about pump operating conditions and/or about fluid passing through the channel 122. For example, pump sensors 230 can comprise flow sensors for confirming that fluid is passing through the channel 122 and/or for measuring flow rate. Pump sensors 230 can also comprise sensors for measuring an amount of negative and/or positive pressure generated or a pump impeller rotation speed. Physiological sensors 232 can comprise one or more sensors for measuring information about fluid passing through the channel 122 to determine information about the physiological condition of the patient. Exemplary physiological sensors 232 can comprise, for example, capacitance and/or analyte sensors for measuring information representative of the chemical composition of generated urine, pH sensors for measuring acidity of urine, or temperature sensors for measuring urine temperature.

Pump Assembly Retention Members

Figure 4:
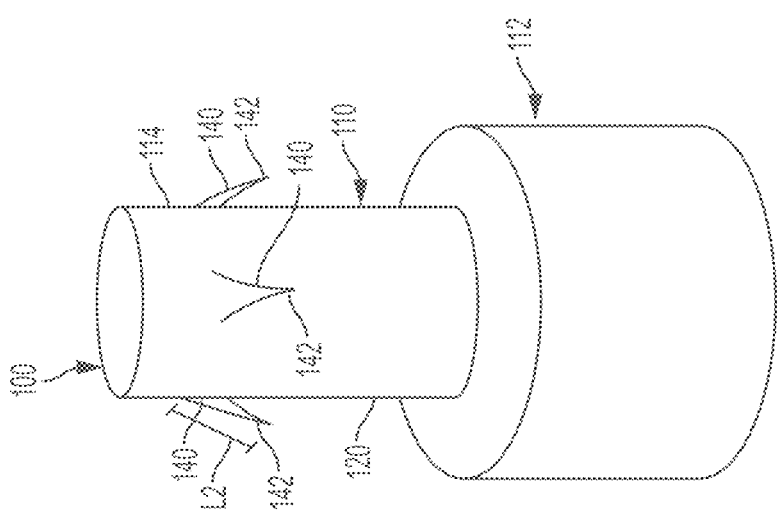
FIG. 4 is a schematic drawing of a pump assembly comprising anchor barbs extending radially outward from a sidewall thereof, according to an example of the present disclosure.

In some examples, and as shown in FIG. 4, the pump assembly 100 can further comprise one or more retention members, such as retention barbs 140, and/or spiral barbs 144, for maintaining position of the pump 110 and/or controller 112 within the patient's urinary tract 2. In some examples, the pump housing 114 and/or controller housing 128 comprises one or more retention members extending from the sidewall for releasably attaching a portion of the pump housing 114 to at least one of the interior portion 28, 30 of the ureter 8, 10, the interior portion 32, 34 of the renal pelvis 14, 16, the interior portion 40 of the bladder 12, or the interior portion of the urethra 18 of a patient. The retention members are retractable to permit removal of the pump 110 from the ureter 8, 10, renal pelvis 14, 16, the bladder 12, or the urethra 18.

Retention members or retention barbs 140, 144 can be formed in any suitable pattern or arrangement, such as straight ridges, curved ridges, sharpened protrusions, fish hooks, and/or combinations thereof. For example, the retention barbs 140 can be deployable and retractable. In that case, the barbs 140 may be in a retracted position as the pump assembly 100 is being advanced through the urinary tract. Once the pump assembly 100 is advanced to a desired position, the barbs 140 are deployed to engage portions of the ureter, renal pelvis, bladder, or urethra wall to hold the pump assembly 100 in a desired position. For example, as shown in FIG. 4, an exemplary pump assembly 100 comprises one or more barbs 140 extending radially outward from the sidewall 120 of the pump 110. The barbs 140 may be flat so that the barbs 140 can be compressed against the sidewall 120 of the housing 114 of the pump 110 to disengage the tissue of the ureter, renal pelvis, bladder, or urethra during removal of the pump assembly 100. Alternatively, the barbs 140 can have any suitable configuration or cross sectional shape, such as a triangle, circle, semi-circle, rectangle, trapezoid, or polygon. The barbs 140 may have a longitudinal length L2 that may be at least about 0.25 mm or at least about 0.45 mm and may be up to about 3.0 mm, up to about 2.5 mm, or up to about 1.5 mm. The barbs 140 may have a width or diameter of about 1.0 mm or less, about 0.8 mm or less, or about 0.5 mm or less. Prior to insertion, the barbs 140 may extend a maximum distance from the sidewall 120 of the pump 110, a distance of about 1.0 mm or less, about 0.8 mm or less, or about 0.5 mm or less. The barbs 140 can be formed from a semi-rigid or rigid material suitable for maintaining positioning of the pump 110 in the urinary tract. For example, the barbs 140 can be formed from metal (e.g., surgical stainless steel) or plastic. The barbs 140 may comprise a sharpened tip 142 for pressing against and slightly encroaching into the ureter, renal pelvis, bladder, or urethra wall to maintain positioning of the pump 110, without perforating the ureteral wall. Ureteral wall thickness is about 0.05 mm to 0.1 mm, so the tips 142 of the barbs 140 should encroach into the ureter, renal pelvis, bladder, or urethra wall by less than that amount.

In some examples, the barbs 140 are retractable. For example, barbs 140 can be biased in a radially outward direction toward the ureter, renal pelvis, bladder, or urethra wall, but configured to retract against the sidewall 120 of the pump housing 114 when the pump assembly 100 is being advanced through a deployment catheter and into the patient's ureter, renal pelvis, bladder, or urethra. Once in a deployed position, the barbs 140 may be configured to extend radially outward to a deployed configuration, as shown in FIG. 4. In other examples, the barbs 140 can be extended or retracted by a manually activated triggering mechanism. For example, a user may press a retraction button or pull on a triggering wire to remove a radial biasing force from the barbs 140 to cause the barbs 140 to retract. After the barbs 140 retract, the pump assembly 100 can be safely and easily removed from the urinary tract. For example, the pump 110 and controller 112 can be removed through the bladder and the urethral sphincter and then from the body through the urethra.

Figure 5:
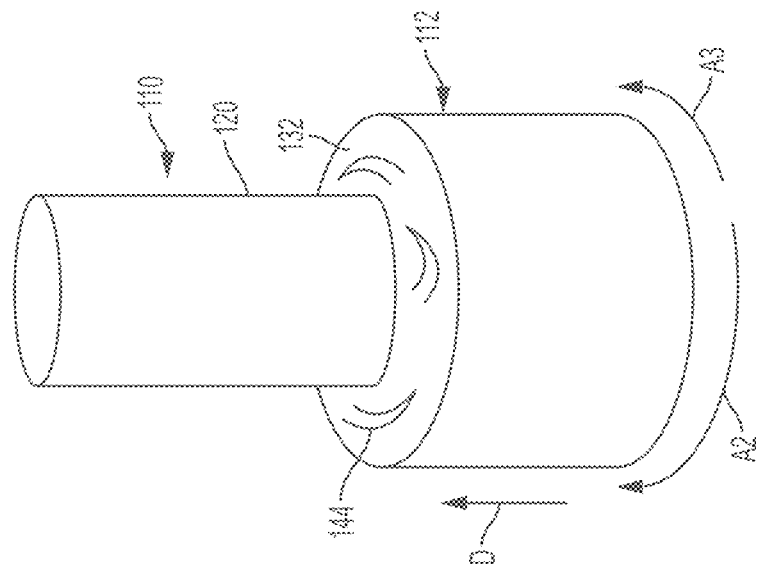
FIG. 5 is a schematic drawing a pump assembly comprising spiral retention barbs, according to an example of the present disclosure.

In some examples, the controller 112 also comprises one or more retention members or barbs 144 for anchoring or retaining the controller 112 to an interior surface of the bladder wall, in addition to or in lieu of the retention members on the pump 110. The barbs 144 can be similar to those discussed above for barbs 140. For example, as shown in FIG. 5, retention barbs 144, such as spiral retention barbs, extend in a distal direction D from the distal end 132 of the controller 112. When positioned in the bladder 12, the barbs 144 are configured to contact portions 27 of the bladder wall 15 around the ureter orifice 24, 26 to secure the controller 112 to the bladder wall 15. For example, barbs 144, such as spiral retention barbs, may engage with the bladder wall with a twisting maneuver in a direction shown by arrow A2 (shown in FIG. 5). The spiral barbs 144 may be removed from the bladder wall 15 by twisting the controller 112 in an opposite direction, as shown by arrow A3. In some examples, the spiral barbs 144 can be retractable. In that case, a user may advance the pump assembly 100 into the urinary tract with the proximal end of the controller 112 in contact with the bladder wall 15. Once the controller 112 is in place, the user deploys the barbs 144, such that the barbs 144 embed into the bladder wall 15 to maintain positioning of the controller 112 and/or pump 110 within the urinary tract.

Indwelling Pump with Inlet Line

Figure 6:
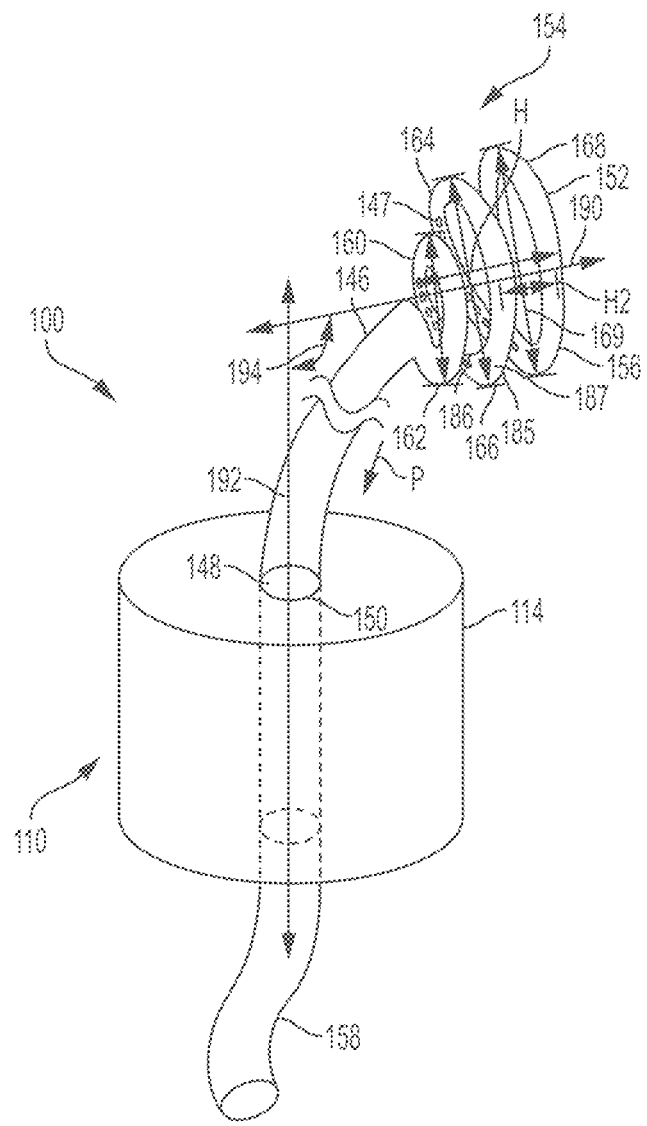
FIG. 6 is a schematic drawing of a pump assembly comprising an inlet conduit configured to be inserted into a patient's ureter, according to an example of the present disclosure.

In other examples, as shown in FIG. 6, the pump 110 can be configured to be positioned in the patient's bladder 12 rather than in the ureter 8, 10. In that case, the housing 114 may be large enough to also enclose electronic components of the controller 112, such as a computer processor and battery. In such a configuration, the pump assembly 100 can further comprise an inlet line 146 or drainage lumen or channel extending from the pump 110 into the patient's ureter 8, 10 and/or renal pelvis 14, 16. For example, the inlet line 146 can be a substantially tubular conduit comprising a proximal end 148 mounted to a fluid inflow port 150 of the pump 110 and a distal end 152 for placement in the ureter 8, 10 and/or renal pelvis 14, 16. In some examples, the inlet line 146 can have an external diameter ranging from about 0.33 mm to about 3.0 mm, or about 1.0 mm to 2.0 mm. In some examples, the internal diameter of the inlet line 146 can range from about 0.165 mm to about 2.39 mm, or from about 1.0 mm to 2 mm, or about 1.25 mm to about 1.75 mm.

In one example, the inlet line 146 is 6 Fr and has an outer diameter of 2.0±0.1 mm. The inlet line 146 can be formed from one or more suitable biocompatible materials, such as materials used for conventional urinary tract catheters. Suitable biocompatible materials may comprise one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). Portions of the inlet line 146 can also comprise and/or be impregnated with metal materials, such as copper, silver, gold, nickel-titanium alloy, stainless steel, and/or titanium.

In some examples, the inlet line 146 comprises a plurality of openings 147 or drainage holes extending through a sidewall thereof for drawing fluid from the ureter and/or kidney into an interior lumen or flow channel of the line 146. In other examples, portions of the inlet line 146 can be formed from a porous and/or water absorbent material, such as a sponge, mesh, woven fiber, or similar material. In that case, fluid can be drawn into the interior of the lumen or flow channel through the porous material.

In some examples, the distal end 152 of the inlet line 146 comprises a retention portion, indicated generally at 154, for maintaining the position of the inlet line 146 at a desired fluid collection position proximate to or within the ureter 8, 10 and/or renal pelvis 14, 16. Non-limiting examples of suitable retention portions are disclosed in U.S. Pat. Nos. 10,307,564 and 9,744,331, and PCT International Publication No. WO 2017/015345, each of which is incorporated by reference herein in its entirety.

In some examples, the retention portion 154 is configured to be flexible and bendable to permit positioning of the retention portion 154 in the ureter and/or renal pelvis. The retention portion 154 is desirably sufficiently bendable to absorb forces exerted on the inlet line 146 and to prevent such forces from being translated to the ureters. For example, if the retention portion 154 is pulled in the proximal direction P (shown in FIG. 6) toward the patient's bladder, the retention portion 154 can be sufficiently flexible to begin to unwind or straighten so that it can be drawn through the ureter. Similarly, the retention portion 154 can be biased to return to its deployed configuration when reinserted into the renal pelvis or other suitable wider region within the ureter.

In some examples, the retention portion 154 is integral with the inlet line 146. In that case, the retention portion 154 can be formed by imparting a bend or curl to the inlet line 146 that is sized and shaped to retain the retention portion 154 at a desired fluid collection location. Suitable bends or coils can comprise a pigtail coil, corkscrew coil, and/or helical coil. For example, the retention portion 154 can comprise one or more radially and longitudinally extending helical coils configured to contact and passively retain the inlet line 146 within the ureter 8, 10 proximate to or within the renal pelvis 14, 16. In other examples, the retention portion 154 is formed from a radially flared or tapered portion of the inlet line 146. For example, the retention portion 154 can further comprise a fluid collecting portion, such as a tapered or funnel-shaped inner surface. In other examples, the retention portion 154 can comprise a separate element connected to and extending from the inlet line 146.

Referring now to FIG. 6, exemplary retention portions 154 comprise a plurality of helical coils, such as one or more full coils and one or more half or partial coils, which are capable of moving between contracted and deployed configurations. For example, a substantially straight guidewire can be inserted through the retention portion 154 to maintain the retention portion 154 in a substantially straight contracted configuration. When the guidewire is removed, the retention portion 154 can transition to its coiled configuration. In some examples, the coils 156 extend radially and longitudinally at the distal portion 152 of the inlet line 146. In some examples, the retention portion 154 can comprise one or more coils 156, each coil having an outer coil diameter sufficient to contact at least a portion of the interior wall of the ureter and/or renal pelvis to maintain the inlet line 146 at a desired position in the patient's ureter and/or renal pelvis.

In some examples, the coiled retention portion comprises at least a first coil 160 having a first outer diameter 162 and at least a second coil 164 having a second outer diameter 166 smaller than the first outer diameter 162. As shown in FIG. 6, the second coil 164 is nearer to the base of the retention portion 154 (i.e., closer to an end of the distal portion of the drainage channel) than the first coil 160. The first outer diameter 162 can range from about 12 mm to about 16 mm, or about 13 mm to about 15 mm. The second outer diameter 166 can range from about 16 mm to about 20 mm, or about 17 mm to about 19 mm. The retention portion 154 can further comprise a third coil 168 extending about the axis of the retention portion 154. The third coil 168 may have a third outer diameter 169 greater than or equal to either the first coil outer diameter 162 or the second coil outer diameter 166. As shown in FIG. 6, the third coil 168 is positioned at the base of the retention portion 154 (i.e., adjacent to an end of the distal portion of the drainage channel). The third outer diameter 169 can range from about 12 mm to about 20 mm. The coiled retention portion 154 can have a height H ranging from about 14 mm to about 18 mm.

In some examples, prior to insertion or after insertion into the patient's body, the central axis 190 of the retention portion 154 can be coextensive with, generally parallel to, and/or curved or angled relative to the central axis 192 of the flow channel of the drainage lumen (inlet line 146). In some examples, at least a portion of the axis 190 of the retention portion 154 extends at an angle 194 from the central axis 192 from 0 to about 90 degrees, or about 15 degrees to about 75 degrees, or about 45 degrees.

In some examples, prior to insertion into a patient's urinary tract, a portion of the drainage channel that is proximal to the retention portion defines a straight or curvilinear central axis, and wherein, when deployed, the coil(s) of the retention portion extend about the central axis 190 of the retention portion 154 that is at least partially coextensive or coextensive with the straight or curvilinear central axis 192 of the portion of the flow channel 122.

In some examples, multiple coils 156 can have the same inner and/or outer diameter D and height H. In that case, the outer diameter 162, 166, 169 of the coils 156 can range from about 10 mm to about 30 mm. The height H2 between the centerline of each coil 156 can range from about 3 mm to about 10 mm.

In some examples, the retention portion 154 is configured to be inserted in the tapered portion of the renal pelvis. For example, the outer diameter D of the coils 156 can increase toward the distal end 152 of the inlet line 146, resulting in a helical structure having a tapered or partially tapered configuration. For example, the distal or maximum outer diameter 169 of the tapered helical portion ranges from about 10 mm to about 30 mm, which corresponds to the dimensions of the renal pelvis.

In some examples, the outer diameter 162, 166, 169 and/or height H2 of the coils 156 can vary in a regular or irregular fashion. For example, the outer diameter 162, 166, 169 of coils or height H2 between coils can increase or decrease by a regular amount (e.g., about 10% to about 25%) between adjacent coils 156. For example, for a retention portion 154 having three coils (as shown, for example, in FIG. 6), an outer diameter 162 of a proximal-most coil or first coil 160 can range from about 6 mm to about 18 mm, an outer diameter 166 of a middle coil or second coil 164 can range from about 8 mm to about 24 mm, and an outer diameter 169 of a distal-most or third coil 168 can range from about 10 mm to about 30 mm.

Other non-limiting examples of suitable retention portions, such as funnel-shaped structures, inflatable or balloon structures, porous and/or sponge-like structures, and expandable cage structures are disclosed in U.S. Pat. Nos. 10,307,564 and 9,744,331, and PCT Publication No. WO 2017/015345, which are incorporated by reference herein. Some examples of suitable catheters, systems and methods of use are also disclosed in U.S. Patent Appl. Pub. No. 2017/0348507, which is incorporated by reference herein in its entirety.

Optionally, the retention portion 154 can further comprise one or more perforations or drainage holes 147. The perforations or drainage holes 147 can be configured to draw fluid into an interior of the inlet line 146, for example, disposed on or through the sidewall of the inlet line 146 on or adjacent to the retention portion 154 to permit urine waste to flow from the outside of the inlet line 146 to the inside of the flow channel 122. Drainage holes 147 can be positioned in a spaced apart arrangement along a sidewall of the inlet line 146. In some examples, the retention portion 154 can further comprise an additional hole at a distal end 152 of the retention portion 154.

The drainage holes 147 can be located, for example, proximate the open distal end 152 of the inlet line 146. In other examples, perforated sections and/or drainage holes 147 are disposed along the sidewall 185 of the distal portion of the inlet line 146. The drainage holes 147 can be used for assisting in fluid collection. In other examples, the retention portion 154 is solely a retention structure and fluid collection and/or imparting negative pressure is provided by structures at other locations on the inlet line 146.

In some examples, the retention portion 154 of the inlet line 146 comprises a sidewall 185 comprising a radially inwardly facing side 186 and a radially outwardly facing side 187. In such instances, a total surface area of perforations or holes 147 on the radially inwardly facing side 186 can be greater than a total surface area of perforations or holes 147 on the radially outwardly facing side 187. The radially outwardly facing side 187 can be essentially free or free of perforations.

The drainage holes 147 can be any shape and arranged in any configuration suitable for permitting fluid F1 to pass through the drainage holes 147 and into the lumen of the inlet line 146. For example, the drainage holes 147 can be circular or non-circular (e.g., elliptical, square, rectangular, polygonal, irregular shaped) or any combination thereof. The position and size of the drainage holes 147 can vary depending upon the desired flow rate and configuration of the retention portion 154. For circular drainage holes 147, a diameter of each of the drainage holes 147 can range from about 0.05 mm to 1.1 mm, about 0.7 mm to about 0.9 mm A cross-sectional area of each drainage hole 147 may range from about 0.002 $mm^2$ to about 1.0 $mm^2$, or about 0.35 $mm^2$ to about 0.65 $mm^2$. A distance between adjacent drainage holes 147, for example, a linear distance between a center-point of adjacent drainage holes 147 when the coils are straightened, can range from about 20 mm to about 25 mm, or about 21 mm to about 23 mm. The drainage holes 147 can be spaced in any arrangement, for example, linear or offset. A total cross-sectional area of all of the drainage holes 147 on the retention portion 154 can range from about 0.002 $mm^2$ to about 10 $cm^2$, about 0.02 $mm^2$ to about 8 $cm^2$, or about 0.2 $mm^2$ to about 5 $cm^2$. In some examples, non-circular drainage holes 147 have a cross-section area of about 0.00002 $mm^2$ to about 1.0 $mm^2$ or about 0.02 $mm^2$ to about 0.8 $mm^2$.

In some examples, the drainage holes 147 are located around an entire periphery of the sidewall 185 of the inlet line 146 to increase an amount of fluid that can be drawn into the flow channel 122. In other examples, the drainage holes 147 can be disposed essentially only on the radially inwardly facing side 186 of the coils 156 to prevent occlusion or blockage of the drainage holes 147, and the outwardly facing side 187 of the coils may be essentially free of drainage holes 147. For example, when negative pressure is induced in the ureter and/or renal pelvis, mucosal tissue of the ureter and/or kidney may be drawn against the retention portion 154 and may occlude some drainage holes 147 on the outer periphery of the retention portion 154. Drainage holes 147 located on the radially inward side of the retention structure would not be appreciably occluded when such tissues contact the outer periphery of the retention portion 154. Further, risk of injury to the tissues from pinching or contact with the drainage holes 147 can be reduced or ameliorated.

In some examples, the retention portion 154 can comprise one or more mechanical stimulation devices for providing stimulation to nerves and muscle fibers in adjacent tissues of the ureter(s) and renal pelvis. For example, the mechanical stimulation devices can comprise linear or annular actuators embedded in or mounted adjacent to portions of the sidewall 185 of the inlet line 146 and configured to emit low levels of vibration. In some examples, mechanical stimulation can be provided to portions of the ureters and/or renal pelvis to supplement or modify therapeutic effects obtained by application of negative pressure. While not intending to be bound by theory, it is believed that such stimulation affects adjacent tissues by, for example, stimulating nerves and/or actuating peristaltic muscles associated with the ureter(s) and/or renal pelvis. Stimulation of nerves and activation of muscles may produce changes in pressure gradients or pressure levels in surrounding tissues and organs that may contribute to or, in some cases, enhance therapeutic benefits of negative pressure therapy.

In some examples, the pump 110 further comprises an outlet line 158 extending from the pump 110 to a portion of the patient's urinary tract 2. The outlet line 158 can be formed from a similar material and have similar dimensions to the inlet line 146. The outlet line 158 may extend from the bladder, through the urethral sphincter and the urethra, and to a collection container external to the body. In some examples, a length of the outlet line 158 may range from about 30 cm to about 120 cm depending on the gender and age of the patient.

Negative Pressure Therapy System

Figure 12:
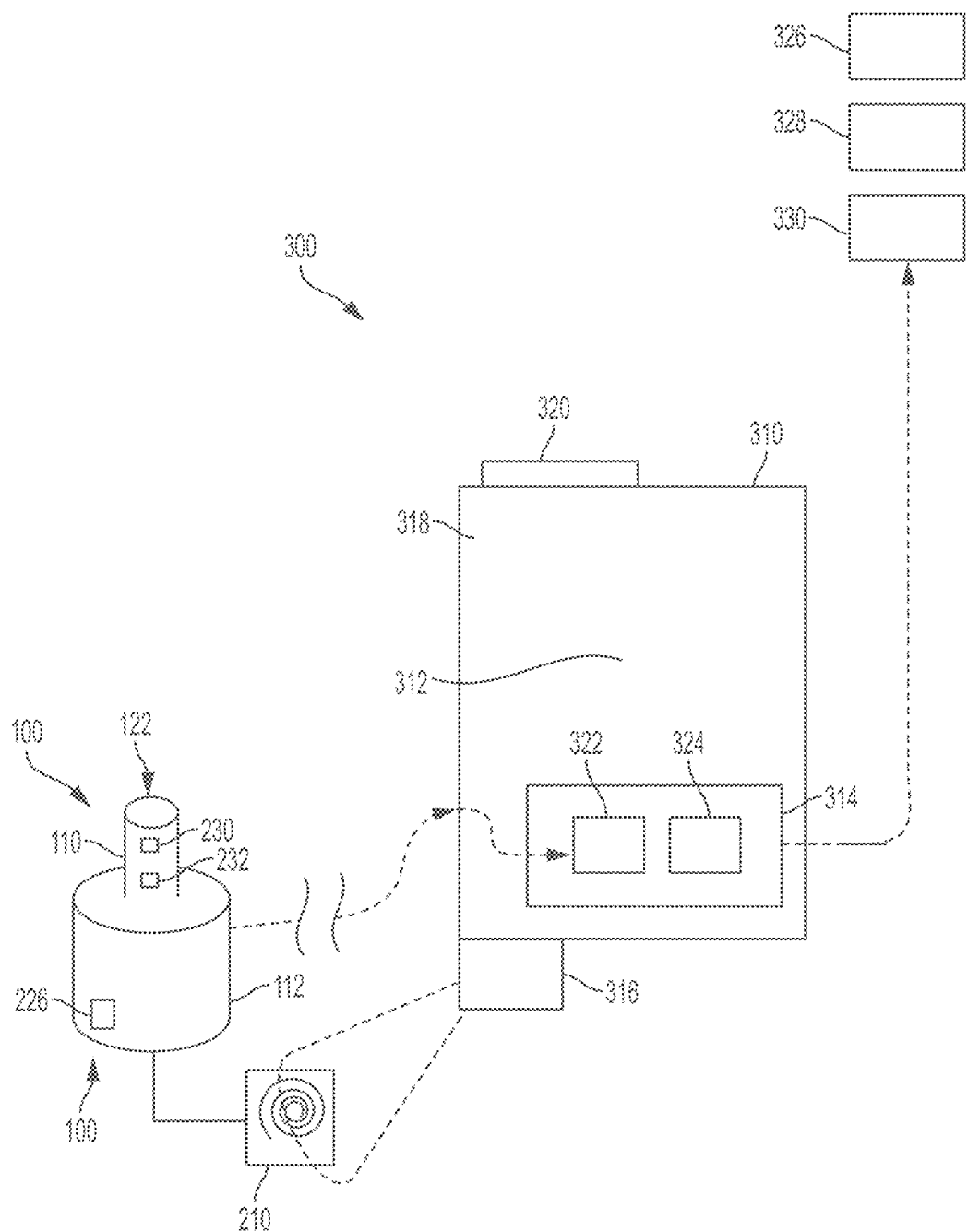
FIG. 12 is a schematic drawing of a system for inducing negative pressure in a patient's urinary tract comprising a pump assembly according to an example of the disclosure.

With reference to FIG. 12, an exemplary pump assembly 100 is shown that is a component of a negative pressure therapy or treatment system 300 for providing negative pressure therapy to a patient. While the system 300 is described as including the pump assembly 100, it is understood that the system 300 can be modified to include and/or be used in conjunction with any of the pumps and/or pump assemblies described herein. Also, any of the pump assemblies and pump systems can use any of the catheters described herein, for example ureteral catheters, bladder catheters, indwelling catheters or implanted catheters.

As shown in FIG. 12, the system 300 comprises the pump assembly 100 in communication with one or more computer devices positioned outside of the patient's body for controlling operation of the pump assembly 100 and for receiving, processing, and analyzing data generated by implanted and indwelling components of the pump assembly 100. The computer devices can also be in electronic communication with external components of the assembly 100 or system, including sensors, electronic devices, patient monitoring devices, and similar components located outside of the body.

In some examples, as shown in FIG. 12, the system 300 comprises a remote control device 310 in wired or wireless communication with the controller 112 of the pump assembly 100. The remote control device 310 can be a dedicated electronic device configured to communicate with the pump assembly 100. In other examples, the remote control device 310 comprises a general purpose computer device configured to execute software for communicating with and/or controlling operation of the pump assembly 100. For example, the remote control device 310 can be a handheld web-enabled computer device, such as a smart phone, computer tablet, or personal digital assistant. In other examples, the remote control device 310 can comprise a laptop computer, desktop computer, or computer server, as are known in the art. The remote control device 310 can be located in close proximity to the patient. For example, as previously described, the remote control device 310 can be a portable device, which is easily stored in a pocket, fanny pack, holster, or harness worn by the patient, and configured to position the remote control device 310 as close to the pump assembly 100 as possible. In other examples, the remote control device 310 may comprise a stationary electronic device placed, for example, in a patient's house or hospital room, configured to communicate with the pump assembly 100 by a short range data communications protocol, such as BLUETOOTH®, or a long-range data communications protocol, such as WiFi.

In some examples, the remote control device 310 comprises a controller 312, a communications interface 314 configured to communicate with the pump assembly 100 and with other remote computer devices or networks, and, optionally, an electromagnetic field generator 316 configured to generate an electromagnetic field to cause the induction coil 210 to generate power.

In some examples, the remote control device 310 further comprises a feedback and/or user interface module 318 operatively connected to a feedback device, such as a visual display 320. The feedback and/or user interface module 318 can be configured to receive information generated by the one or more sensors 230, 232 associated with the pump 110 and to provide feedback to the user about operating conditions of the pump assembly 100 and/or about a physiological condition of the patient. For example, the feedback and/or user interface module 318 may be configured to cause the visual display 320 to display information about a volume and/or flow rate of urine which passes through the flow channel 122 or about an amount of negative pressure being generated by the pump 110. In other examples, the displayed information can also comprise information about the pump assembly 100, such as a charge remaining of the battery 226 or estimated time until the battery 226 will need to be recharged. In some examples, information about a treatment protocol for a patient can also be displayed. For example, information about how long negative pressure will continue to be delivered to the patient or showing a pattern of positive and negative pressures to be delivered to the patient may be displayed.

In some examples, the communications interface 314 comprises a short-range data transceiver 322 configured to communicate with the communications interface 314 of the controller 112. For example, the short-range data transceiver 322 can comprise a BLUETOOTH® transceiver, near-field communications (e.g., RFID) transceiver, or similar data transmission device. Since the remote control device 310 is configured to be positioned as close to the pump assembly 100 as possible, the transmission range of the short-range data transceiver 322 need only be a few feet or less. In some examples, the communications interface 314 further comprises a long-range data transceiver 324 for transmitting information collected by the pump assembly 100 and remote control device 310 to a remote source, such as a computer network 326, a database 328, or a web-based portal or website 330. For example, information about the patient and/or about treatment provided by the pump assembly 100 can be transmitted from the remote control device 310 to the remote database 328 for inclusion in the patient's electronic health record. A confirmation that treatment has been provided can also be transmitted to medical professionals, such as to a responsible physician. The physician may be able to review the confirmation, along with physiological information about the patient using, for example, the web-based portal 330.

Deployment of Negative Pressure Therapy System

The pump assembly 100, battery 226, and/or induction coil 210 are configured to be inserted into the bladder, ureter, and/or renal pelvis through the patient's urethra. In order to facilitate placement and deployment in this manner, the pump assembly 100 described herein is configured to fit within a deployment device, such as a catheter tube and, once advanced from the tube, is configured to automatically transition to deployed positions. In some configurations, the entire assembly 100, particularly the pump 110, controller 112, and induction coil 210, can be delivered into the ureter and bladder via the urethra using, for example, a 12-16 Fr catheter (4.0-5.3 mm in outer diameter). In other examples, portions of the pump assembly 100 can be delivered through an abdominal incision or a nephrostomy or urostomy transdermal procedure.

As shown in FIGS. 13A and 13B, an exemplary deployment catheter 410 for use with the pump assembly 100 comprises a flexible elongated tube 412 comprising an open distal end 414 configured to be inserted into the urinary tract through the urethra, a proximal end 416, which can be configured to remain outside the patient's body, and a sidewall 418, such as a substantially continuous sidewall formed from a flexible medical grade plastic material, extending therebetween. For example, the elongated tube 412 can be formed from one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). Portions of the elongated tube 412 can also comprise and/or be impregnated with metal materials, such as copper, silver, gold, nickel-titanium alloy, stainless steel, and/or titanium. At least a portion or all of the catheter 410, such as the tube 412, can be coated with a hydrophilic coating to facilitate insertion and/or removal, and/or to enhance comfort. In some examples, the coating comprises a hydrophobic and/or lubricious coating. For example, suitable coatings can comprise ComfortCoat® hydrophilic coating produced by Koninklijke DSM N.V. or hydrophilic coatings comprising polyelectrolyte(s) as are disclosed, for example, in U.S. Pat. No. 8,512,795, which is incorporated herein by reference.

In some examples, the proximal end 416 of the tube 412 can comprise a hub (not shown) comprising a guidewire lumen port for assisting a user in positioning the catheter 410 through the urethra and into the bladder and/or ureter. The catheter 410 can be a standard deployment catheter formed from one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). As in previous examples, portions of the catheter 410 can also comprise and/or be impregnated with metal materials, such as copper, silver, gold, nickel-titanium alloy, stainless steel, and/or titanium. The elongated tube 412 can be any standard size for insertion in the urinary tract, such as a 12 Fr tube to a 16 Fr tube. A length of the elongated tube 412 may range from about 30 cm to about 120 cm, depending on the gender and age of the patient.

As shown in FIGS. 13A and 13B, the pump assembly 100, which comprises the pump 110, controller 112, and induction coil 210, is configured to be positioned within the tube 412 in a contracted configuration and position. The pump assembly 100 is advanced through the tube 412 by a pusher rod 420, as shown in FIG. 13B. Once the open distal end 414 of the catheter 410 is advanced through the urinary tract to a desired position within the bladder, ureter, or kidney, a user may advance the pusher rod 420 through the elongated tube 412 to cause the components of the pump assembly 100 to exit the tube 412 through the open distal end 414 thereof. Once clear of the tube 412, structures of the pump 110 and controller 112 may deploy from a contracted configuration or position to a deployed configuration or position. For example, radially extending barbs 140 (shown in FIG. 4) may extend radially outward from the sidewall 120 of the pump 110 and come into contact with the interior ureter wall to maintain positioning of the pump 110 within the ureter. In a similar manner, once the induction coil 210 extends past the open distal end 414 of the elongated tube 412, it may uncurl in the manner previously described. In some examples, the induction coil 210 may be biased to its uncurled state. In that case, the induction coil 210 may automatically uncurl as soon as it is removed from the elongated tube 412. In other examples, a user may manually cause the induction coil 210 to uncurl by actuating a release button or triggering wire.

In order to deploy the pump assembly 100 in a patient's urinary tract, a medical professional may first advance a guidewire to a desired position in the bladder and/or ureter. In some instances, visualization devices, such as a cystoscope, may be used to obtain visualization of the bladder and ureter openings to assist in positioning of the distal end of the guidewire. The delivery catheter 410 can be delivered over the guidewire. For example, a medical professional may insert the delivery catheter 410 over the guidewire and advance the distal end 414 of the catheter 410 over the guidewire toward the ureteral orifice 24, 26. Once the distal end 414 of the catheter 410 is in place, the medical professional can begin to push the pump assembly 100 from the elongated tube 412 by advancing the pusher rod 420 through the deployment elongated tube 412. As it is expelled from the elongated tube 412, the open distal end 118 of the pump 110 is advanced through the ureteral orifice 24, 26 and into a distal end 9 of the patient's ureter 8, 10. The controller 112 and induction coil 210 can remain in the bladder.

In some examples, as previously discussed, housings 114, 128 of the pump 110 and/or controller 112 can comprise retractable or permanently extending barbs 140, 144 for mounting the pump 110 and/or controller 112 to a surface of the ureter, renal pelvis, bladder, or urethra. In some examples, once the pump assembly 100 comprising the pump 110 and controller 112 is in position in the patient's urinary tract, the user may actuate a release mechanism to cause the barbs 140, 144 to extend toward the interior wall of the ureter, renal pelvis, bladder, or urethra. In other examples, the barbs 140, 144 may extend automatically as the elongated tube is being retracted. Retraction of the elongated tube 412 also causes the deployable induction coil 210 to uncurl from a rolled configuration to a substantially flat configuration.

Bladder Pump Assembly

Figure 14:
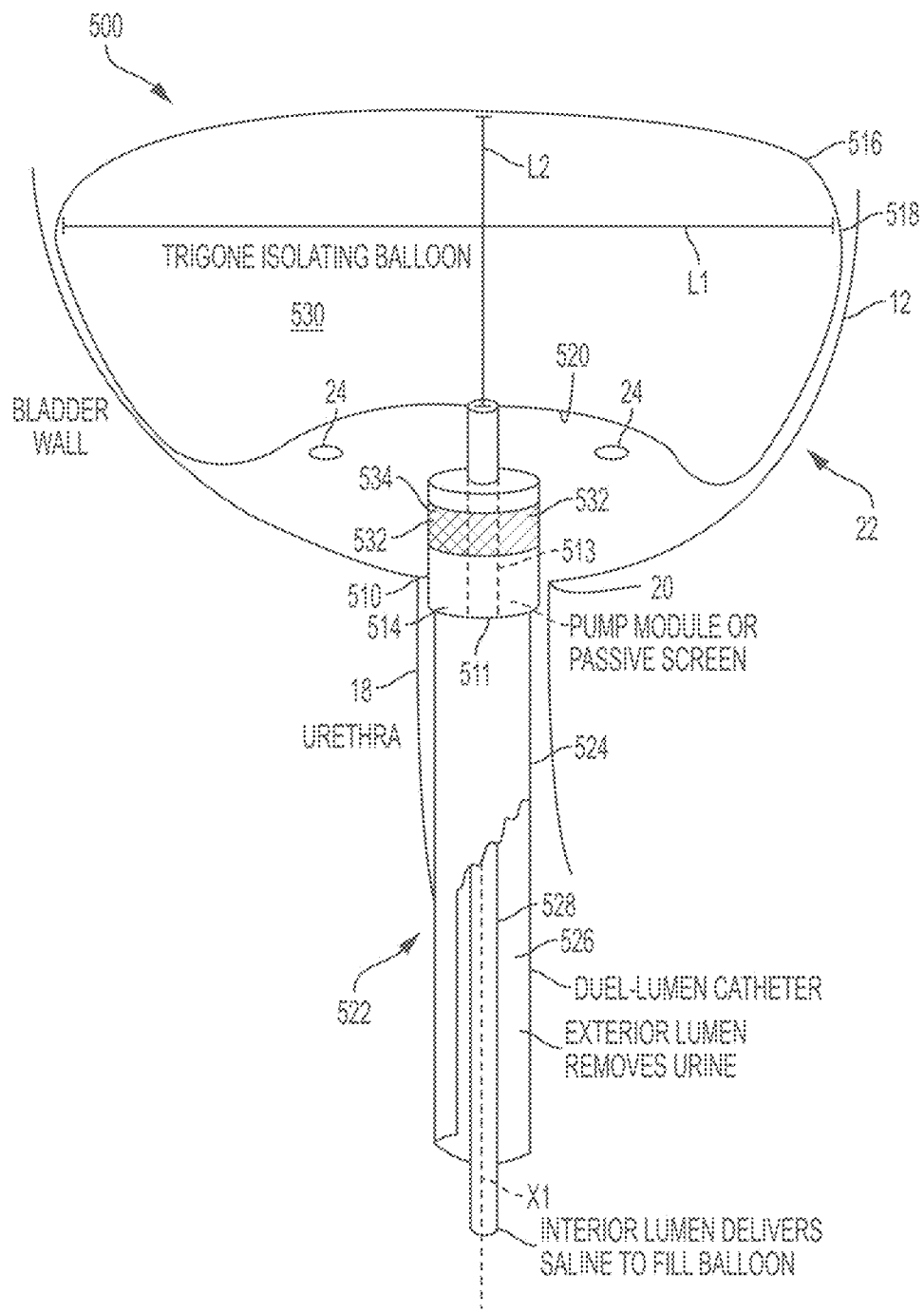
FIG. 14 is a schematic drawing of a pump assembly comprising a pump positioned in a patient's bladder according to an example of the present disclosure.

According to another aspect of the disclosure, systems and devices can be configured for inducing negative pressure in the bladder. An example of a bladder pump assembly, identified generally as assembly 500, comprising a bladder pump 510 for inducing negative pressure in the bladder is illustrated in FIG. 14. While not intending to be bound by theory, it is believed that negative pressure induced in the bladder transmits through the bladder and ureteral orifices, such that the induced negative pressure also acts on the ureter and kidneys, thereby drawing urine from the kidneys to achieve therapeutic results similar to previously described example assemblies. As discussed previously, negative pressure applied to the kidneys is believed to enhance urine production resulting in physiological benefits, such as reduced venous congestion and reduced risk of acute kidney injury.

With reference to FIG. 14, the bladder pump 510 can be substantially similar to previously described pumps and can comprise, for example, impeller or piezoelectric configurations as shown in FIGS. 7 and 8. In some examples, the bladder pump 510 comprises an annular housing 512 sized for placement in the patient's bladder. For example, the bladder pump 510 can be placed adjacent to the urethral opening or sphincter 20, such that the sphincter 20 seals about an outer circumference 514 of the housing 512 to prevent fluid from leaking from the bladder 12.

In some examples, the bladder pump 510 comprises fluid entry holes or ports 532 extending through a sidewall 534 of the pump 510 for drawing fluid into a central channel 513 of the pump 510. In some examples, a diameter of each of the drainage holes or ports 532 is about 0.5 mm to 2.0 mm or about 0.75 mm to 1.0 mm A distance between adjacent drainage holes or ports 532 about the circumference of the sidewall 534 can be about 5 mm to about 30 mm or about 10 mm to 20 mm. The holes or ports 532 can be a size and shape suitable for drawing fluid from the bladder 12 into the bladder pump 510. For examples, holes or ports 532 can be circular, non-circular (e.g., elliptical, square, rectangular, polygonal, and/or irregular shapes), or combinations thereof. In some examples, the holes or ports 532 can be covered by a screen or filter for preventing solid materials from being draw into the bladder pump 510.

The assembly 500 further comprises a bladder wall support 516 extending from the bladder pump 510. The bladder wall support 516 is configured to prevent a superior portion 15a (not shown in FIG. 14) of the bladder wall 15 from collapsing when negative pressure is applied to the bladder 12, ureter 8, 10, and kidneys 4, 6 by the bladder pump 510. In particular, the bladder wall support 516 maintains at least the superior portion 15a of the bladder 12 in an un-collapsed state in which the ureteral orifices 24, 26 are not occluded by the collapsed bladder wall 15. Exemplary bladder wall supports, which can be used in a negative pressure therapy system for providing negative pressure to portions of the urinary tract, such as the bladder, ureters, and kidneys, are described in PCT Publication No. WO 2017/015345 entitled "Catheter Device and Method for Inducing Negative Pressure in a Patient's Bladder", the contents of which is incorporated by reference herein in its entirety.

In some examples, the bladder wall support 516 comprises an inflatable balloon 518 configured to expand from a collapsed state to an inflated state. The balloon 518 is configured to isolate the trigone region 22 of the bladder 12 from the superior bladder wall 15a, thereby preventing the superior bladder wall 15a from collapsing into the trigone region 22 when negative pressure is applied thereto. In some examples, the balloon 518 can be about 1.0 cm to 2.3 cm in diameter, and preferably about 1.9 cm (0.75 in) in diameter. The balloon 518 is preferably formed from a flexible material comprising, for example, biocompatible polymers, polyvinyl chloride, polytetrafluoroethylene (PTFE) (e.g., Teflon®), silicone coated latex, or silicone.

As shown in FIG. 14, in some examples, the balloon 518 has a substantially flattened or elongated cross section having a maximum inflated width L1. The inflated width L1 can be, for example, about 15 cm or less or about 10 cm or less. The inflated width L1 is generally greater than a maximum inflated height L2 of the balloon 518. The maximum inflated height L2 can be about 5 cm or less or can be about 2.5 cm or less. The width L1 generally corresponds to the width of a patient's bladder. In some examples, a bottom or proximal surface 520 of the balloon 518 is a concave surface offset from the proximal surface of the bladder by about 1 cm to about 3 cm to permit free flow of urine from the ureter orifice 24.

The pump assembly 500 further comprises a drainage catheter 522 comprising an elongated tubular member 524. As with other catheters and tubular members described herein configured for insertion in the urinary system, the tubular member 524 of the drainage catheter 522 can be formed from any suitable flexible material, such one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). As in previous examples, portions of the tubular member 524 can also comprise and/or be impregnated with metal materials, such as copper, silver, gold, nickel-titanium alloy, stainless steel, and/or titanium. In some examples, at least a portion or all of the tubular member 524 can be coated with a hydrophilic coating to facilitate insertion and/or removal and/or to enhance comfort. In some examples, the coating is a hydrophobic and/or lubricious coating. For example, a suitable coating can comprise ComfortCoat® hydrophilic coating.

In some examples, the elongated tubular member 524 extends from a proximal end 511 of the bladder pump 510, through the urethra 18, and to the outside of the patient's body. The drainage catheter 522 may be connected to a fluid collection container, such as a urine collection bag or pouch (not shown). The drainage catheter 522 can be a single or multi-lumen catheter comprising one or more drainage lumens 526 in fluid communication with the channel 513 of the bladder pump 510. In some examples, the drainage catheter 522 further comprises an inflation lumen 528 in fluid communication with an interior 530 of the inflatable balloon 518. As shown in FIG. 14, in some examples, the inflation lumen 528 extends through the bladder pump 510 and into the interior 530 of the balloon 518. The inflation lumen 528 is used to deliver a filling material, such as saline solution, to inflate the balloon 518. When a user is prepared to remove the pump assembly 500 from the body, the balloon 518 can be deflated by emptying the filling material, such as saline solution, contained in the balloon interior 520, through the inflation lumen 528 and out of the body.

In some examples, the inflation lumen 528 extends through the drainage lumen 526, as shown in FIG. 14. For example, the inflation lumen 528 may extend through the drainage lumen 526 such that a longitudinal central axis X1 of the drainage lumen 526 is substantially co-extensive with a longitudinal central axis of the inflation lumen 528. However, many different arrangements of the drainage lumen 526 and inflation lumen 528 may be used within the scope of the present disclosure. For example, a separate drainage lumen 526 and inflation lumen 528 may extend through the drainage catheter 522 in a side-by-side configuration. Other configurations of the drainage lumen 526 and inflation lumen 528 will also be apparent to those of ordinary skill in the art.

In use, the bladder pump assembly 500 comprising the bladder pump 510, bladder wall support 516, and elongated tubular member 524 is advanced through the urethra 18 into the bladder 12. The balloon 518 of the bladder wall support 516 is then expanded within the bladder 12, as shown in FIG. 14. Once the elongated member 524 and bladder pump 510 are in place, the urethral sphincter 20 can be permitted to seal or partially seal around the outer circumference 514 of the bladder pump 510. Once the balloon 518 and bladder pump 510 are positioned within the bladder 12, a user may actuate a pump element of the bladder pump 510 to draw urine from the bladder 12 into the bladder pump 510 through the fluid entry ports 532. The negative pressure generated by the bladder pump 510 also acts on more distal portions of the urinary tract. For example, the ureter(s) and kidney(s) can be exposed to the negative pressure to increase renal perfusion in the manner described herein. When the bladder pump 510 is actuated, fluid is drawn through the channel 513 of the bladder pump 510 due to motion of the pump element and expelled from the bladder pump 510 to the drainage lumen 526 of the drainage catheter 522. The collected fluid drains from the body through the drainage catheter 522 where it is collected in a fluid collection container, such as a bag or pouch, located outside the patient's body. Collected urine can be analyzed to monitor patient physiological condition and to confirm that the pump assembly 510 is operating and providing negative pressure in an expected manner. The bladder pump 510 can further comprise sensors 230, 232 configured to detect characteristics of urine passing through the bladder pump 510 to monitor pump performance and/or physiological conditions of the patient.

Implantable Pump Systems

With reference to FIGS. 15A-16C, according to another aspect of the disclosure, an implantable pump assembly or pump system 600 comprising a pump 612 configured to be positioned in the patient's body, but outside of the urinary tract, is provided. As in previous examples, the implantable pump system 600 is configured to provide or induce negative pressure in the renal pelvis and/or kidneys of the patient.

Figure 15A:
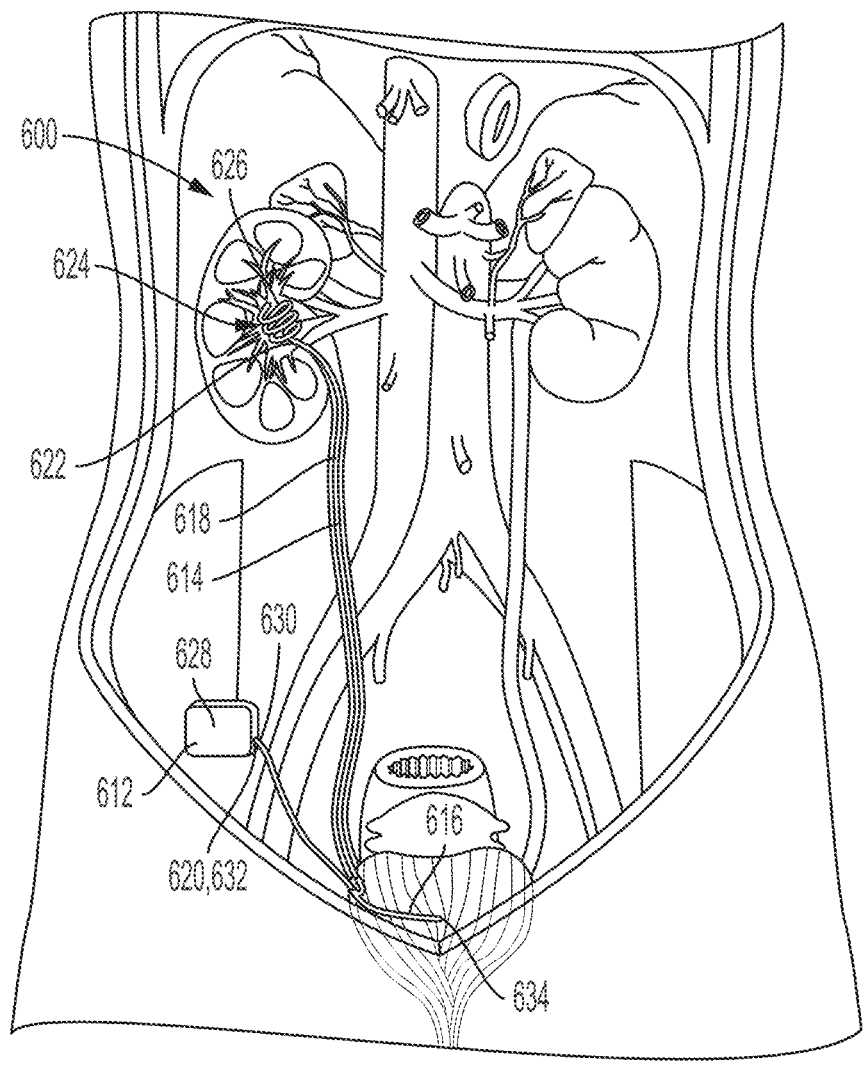
FIG. 15A is a schematic drawings of an example of an implantable pump system implanted in an abdomen and urinary tract of a patient according to an example of the present disclosure.
Figure 15B:
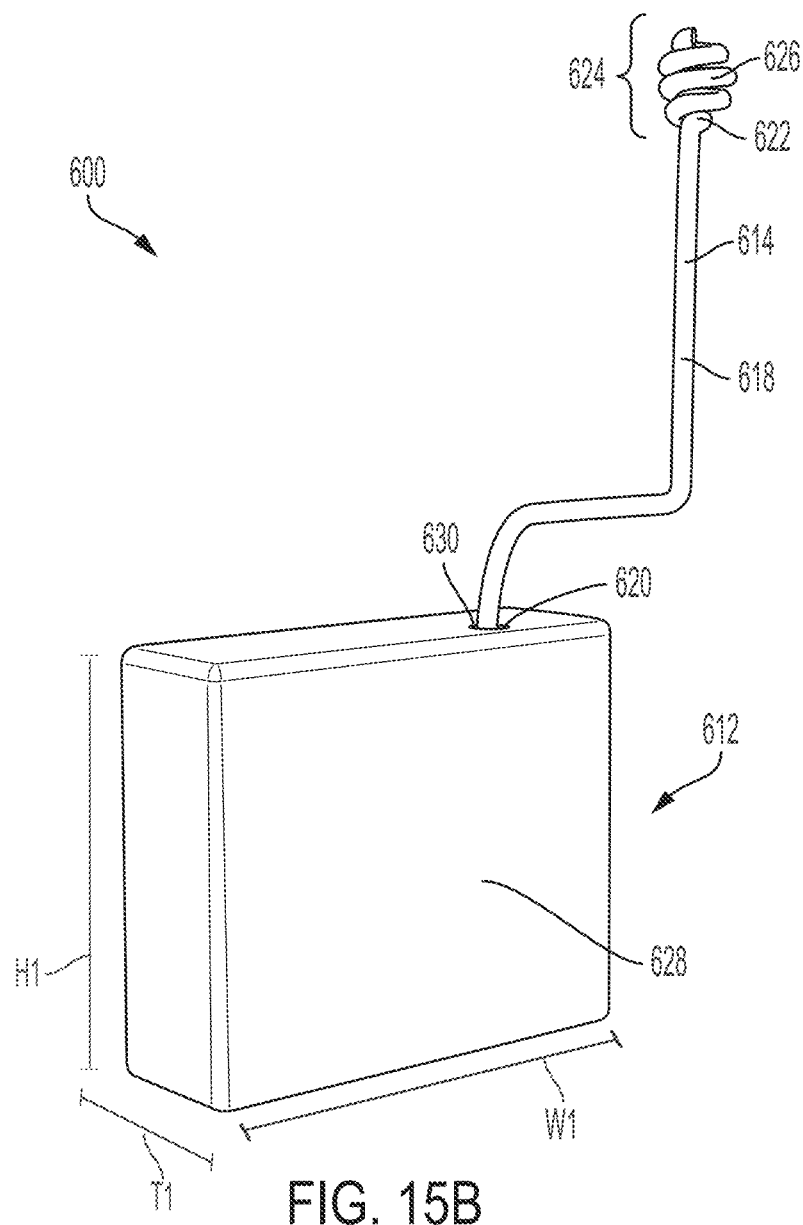
FIG. 15B is a perspective view of components of the pump system of FIG. 15A.
Figure 15C:
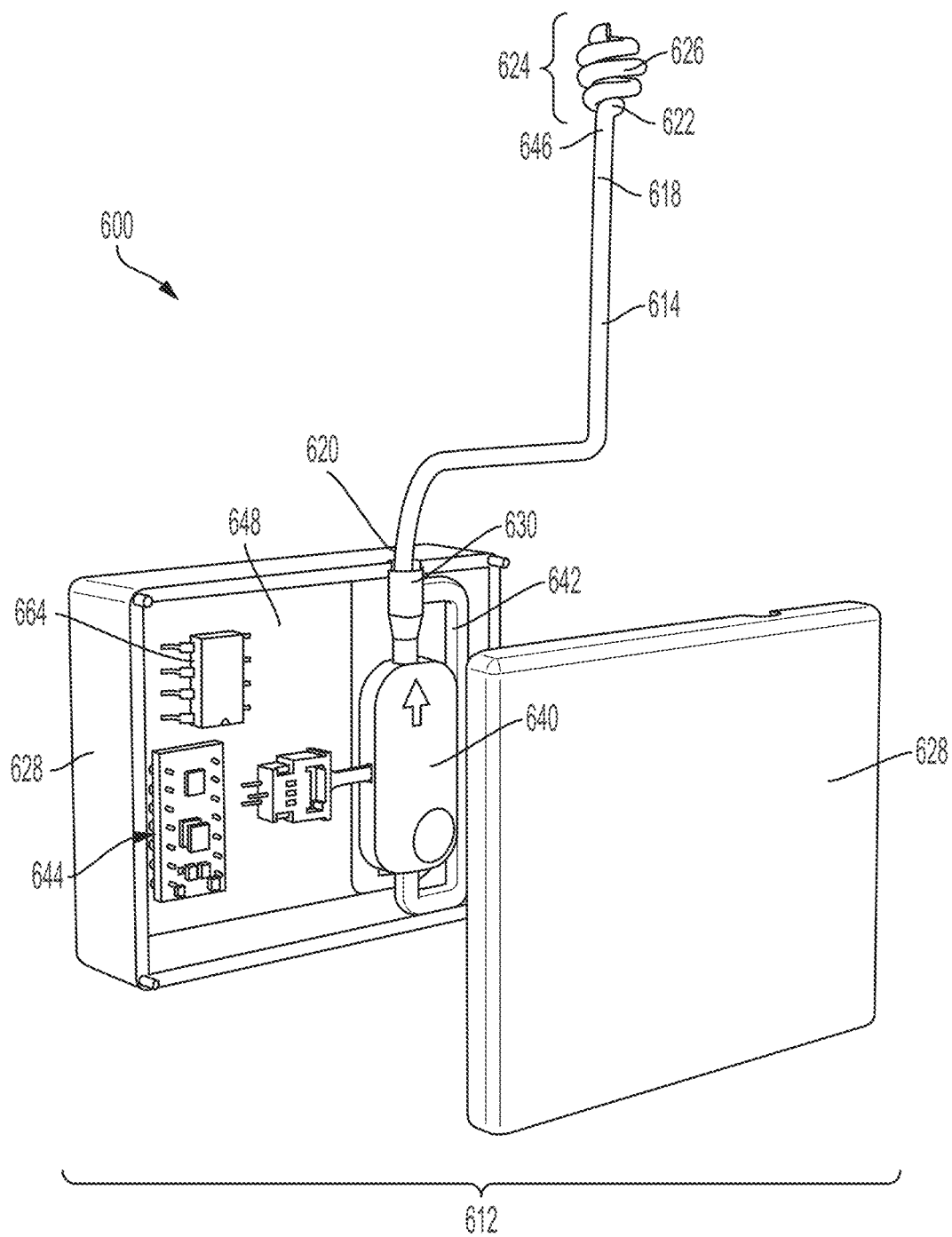
FIG. 15C is another perspective view of the pump system of FIG. 15A showing components inside the pump housing.
Figure 15D:
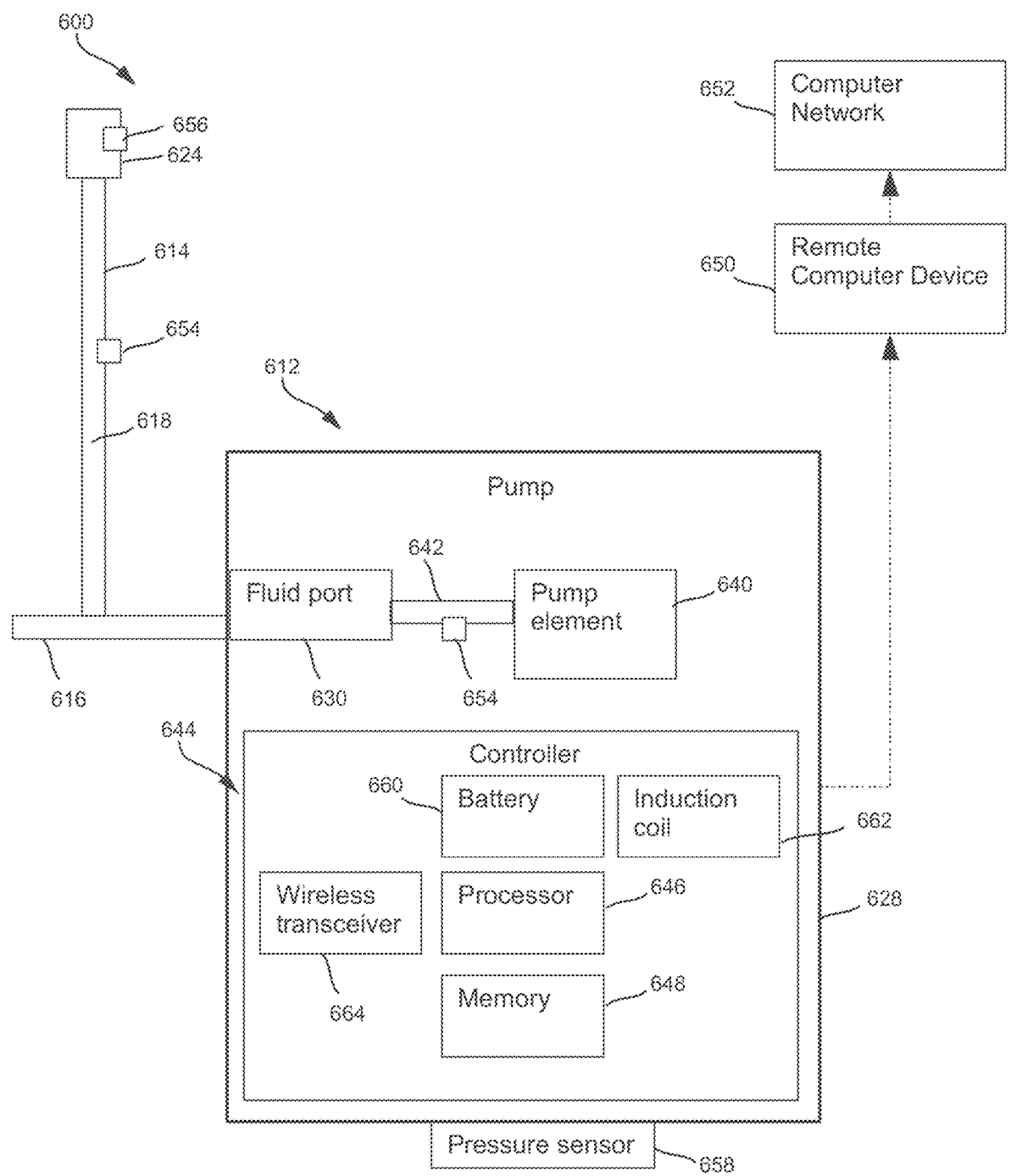
FIG. 15D is a schematic drawing of electrical components of the pump system of FIG. 15A.
Figure 16A:
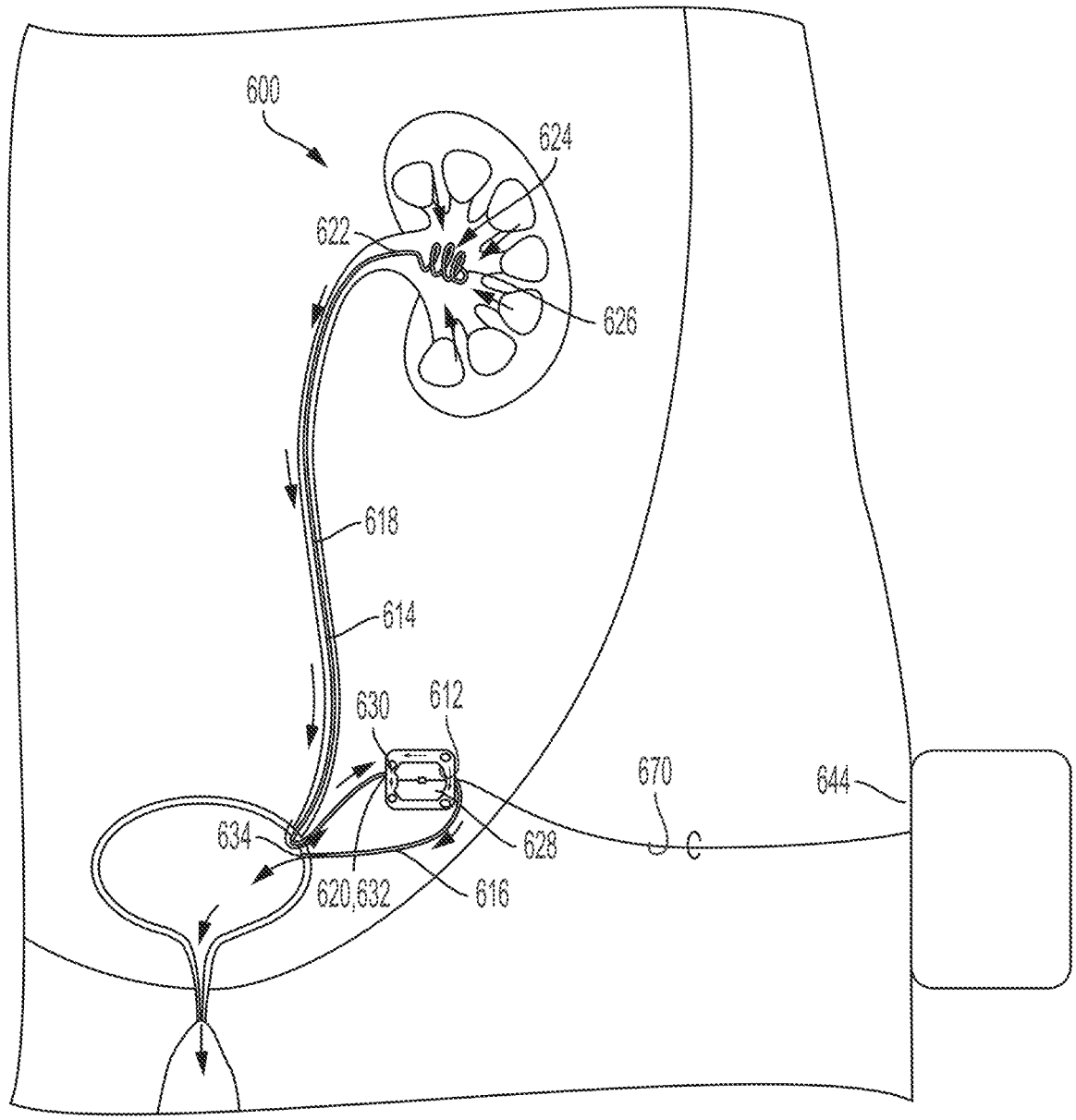
FIG. 16A is a schematic drawings of another example of an implantable pump system implanted in an abdomen and urinary tract of a patient.

Unlike in previous examples, the pump 612 and electrical components of the pump system 600 are not positioned in the urinary tract. Instead, as shown in FIGS. 15A and 16A, the pump 612 of the pump system 600 is positioned in the abdominal cavity or peritoneum of the patient outside of the urinary tract. As used herein, the "abdominal cavity" can refer to the cavity within the abdomen comprising a space between the abdominal wall and the spine. The abdominal cavity contains organs including the lower part of the esophagus, the stomach, small intestine, colon, rectum, liver, gallbladder, pancreas, spleen, kidneys, and bladder. The "peritoneum" refers to the tissue or membrane lining the abdominal cavity and/or covering organs in the abdominal cavity. In other examples, the pump 612 could be positioned in a subcutaneous cavity or other suitable positions adjacent to the pelvis and/or urinary system of a patient. For example, the pump 612 could be implanted in a space between a bottom layer of the skin and the patient's ribs.

Generally, the pump system 600 comprises a ureteral catheter 614, which is similar to previously described ureteral catheters and fluid inlet lines, for collecting fluid (e.g., urine) in the renal pelvis or kidney and for conducting the fluid through the ureter to the pump 612. The pump system 600 can further comprise an outflow conduit or catheter 616 in fluid communication with the pump 612 for conducting collected fluid from the pump 612 into the bladder, where it can be naturally expelled from the body through the urethra. The outlet catheter 616 may also extend, for example, through the patient's bladder and urethra to an external collection container for expelling the fluid from the patient's body. As shown in FIGS. 15A and 16A, unlike in previous examples in which the entire or substantially entire assembly was positioned in the urinary tract 2, the catheters 614, 616 exit the urinary tract by passing through one or more incisions in the bladder wall. As described herein, various arrangements of multi-lumen and/or coaxial catheter portions and/or tubular shunts can be provided to minimize the number of incisions in the bladder wall, which are made while implanting the pump system 600 in the patient's body. For example, the catheters 614, 616 could be separate tubes, which pass through the bladder wall through a single tubular shunt. Alternatively, catheters 614, 616 could be provided in a multi-lumen arrangement, in which a tube of one catheter (e.g., the inflow catheter 614) is fully or partially enclosed in a tube of a second catheter (e.g., the outflow catheter 616) so that only one incision in the bladder wall is needed.

Figure 16B:
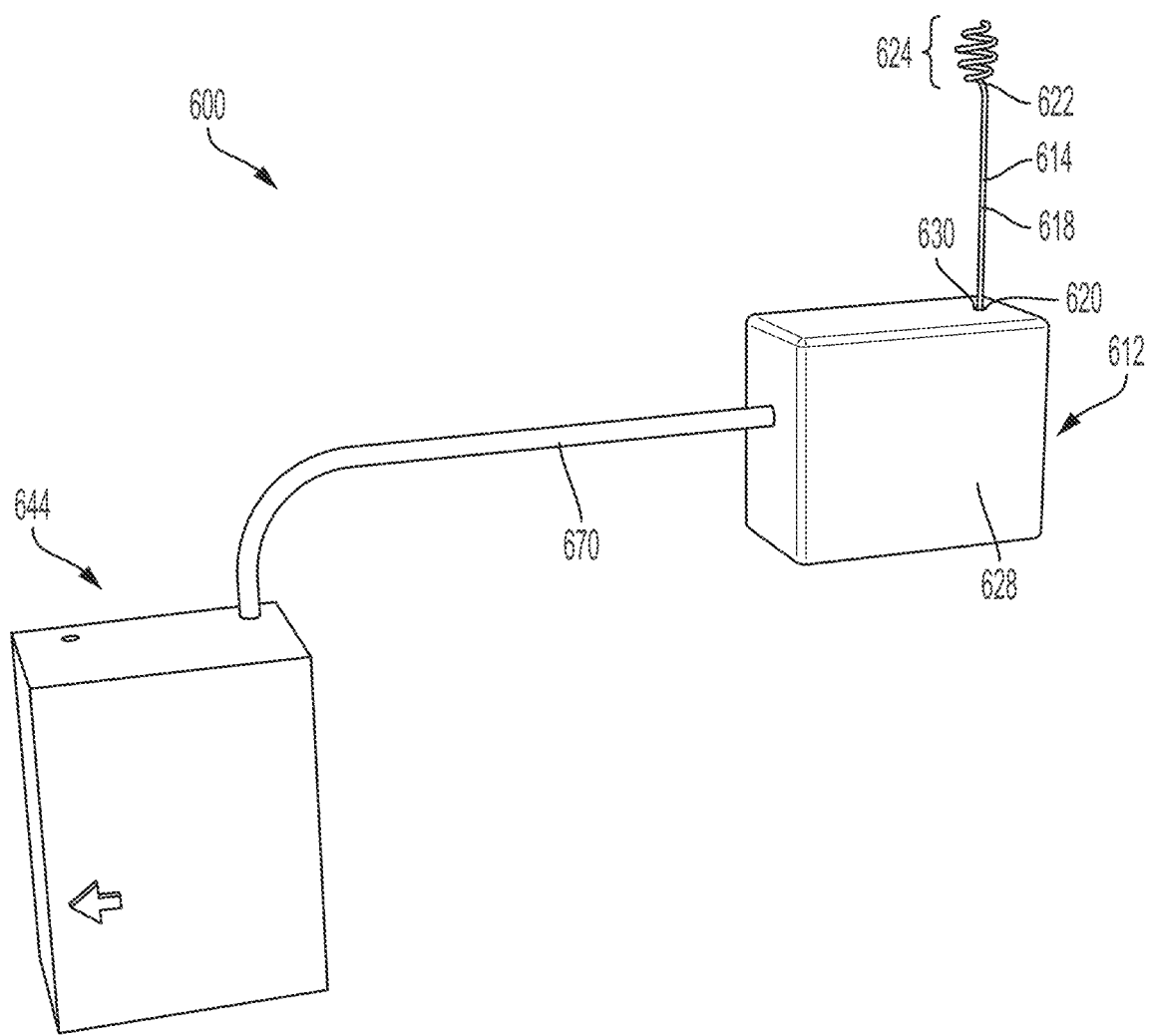
FIG. 16B is a perspective view of components of the implantable pump system of FIG. 16A.
Figure 16C:
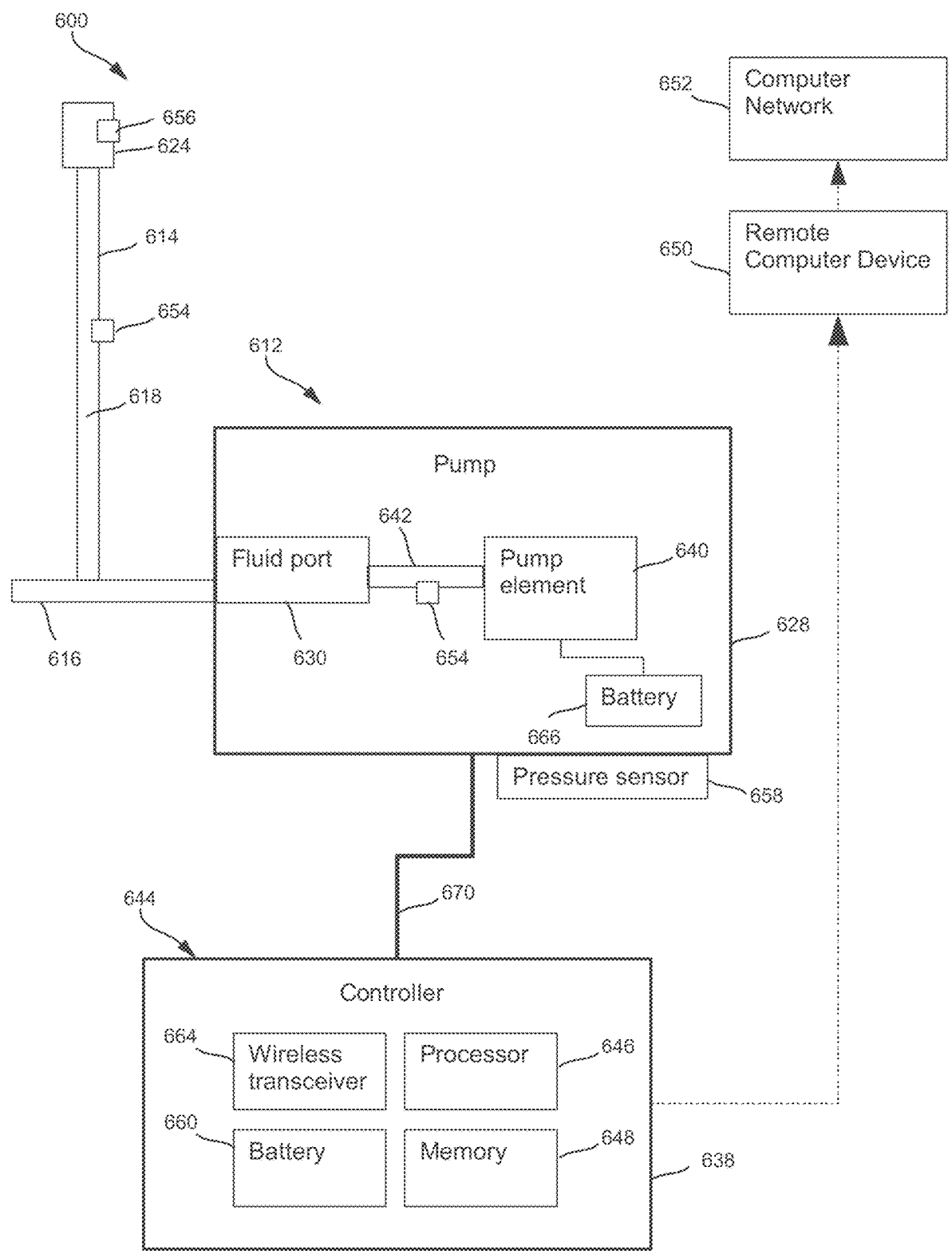
FIG. 16C is a schematic drawing of electrical components of the pump system of FIG. 16A.

As described herein and shown in FIGS. 15A-15D, in some examples, the pump system 600 is configured to be at least partially or entirely implanted within the body and, for example, can be recharged using a wired or wireless charging assembly. As used herein, a pump system is "entirely implanted" when all or substantially all processing and control components of the pump system 600 are provided in the pump 612, which is implanted within the body. In such cases, the pump 612 may periodically receive power (e.g., to recharge a battery) from an external source, but otherwise operates independently. In other examples, as shown in FIGS. 16A-16C, portions of the pump system 600, such as control circuitry and/or a power supply, may be positioned in a separate external or remote device located outside of the body. The external or remote device can be in wired or wireless communication with implanted portions of the pump system 600. For example, the pump 612 could receive power from an external power supply via a shielded percutaneous wire 670 (shown in FIGS. 16A-16D) extending between the pump 612 and remote device. By using a separate power supply, dimensions of the pump 612 may be minimized, since batteries or other power supply circuitry are not included in the pump 612, which is implanted in the body.

The ureteral catheters 614 can be similar in shape and size to any of the previously described exemplary ureteral catheters. As in previous examples, the ureteral catheter 614 comprises a drainage lumen 618 for conducting urine from the kidney and/or renal pelvis to the pump 612. In some examples, the pump system 600 comprises ureteral catheters 614 deployed in both kidneys and/or renal pelvises connected to the same pump 612 to provide simultaneous negative pressure therapy for both kidneys. When both kidneys are treated simultaneously, in some examples, the ureteral catheters 614 deployed in each kidney may join together in the bladder, and a single inflow catheter or tube extends from the bladder to the pump 612 through one incision in the bladder wall. In other examples, the ureteral catheters 614 may remain as separate tubes which, for example, may pass through a tubular shunt in the bladder wall to the pump 612. A wide variety of ureteral catheter designs can be used with the pump system 600 disclosed herein, such as embodiments of ureteral catheters disclosed in U.S. Patent Appl. Pub. No. 2019/0091442 to Erbey et al., entitled "Coated Ureteral Catheter or Ureteral Stent and Method" (hereinafter "the '442 publication") and U.S. Patent Appl. Pub. No. 2020/0094017 to Erbey et al. (hereinafter "the '017 publication"), entitled "Coated Ureteral Catheter or Ureteral Stent and Method", which are incorporated herein by reference in their entirety.

In some examples, the drainage lumen 618 of the ureteral catheter 614 comprises a first end 620 (referred to elsewhere as a proximal end), configured to be connected to the pump 612, and a second end 622 (referred to elsewhere as a distal end). The second end 622 is configured to be positioned in or near the renal pelvis and/or kidney. The catheter 614 further comprises a tubular sidewall extending between the first end 620 and the second end 622, which defines the lumen 618. The catheter 614 can be any size suitable for deployment in the ureters. For example, the catheter 614 can be from about 1 Fr to about 9 Fr (French catheter scale). In some examples, tubular portions of the catheter 614 have an external diameter ranging from about 0.33 to about 3 mm. In one example, the catheter 614 is 6 Fr and has an outer diameter of 2.0±0.1 mm. In some examples, the internal diameter of the ureteral catheter 614 can range from about 0.165 mm to about 2.39 mm, or from about 1.0 mm to 2 mm, or about 1.25 mm to about 1.75 mm. As discussed previously, portions of the ureteral catheter 614 can be formed from one or more suitable biocompatible materials, such as materials used for conventional urinary tract stents and catheters. Exemplary materials can comprise one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). As in previous examples, portions of the catheter 614 can also comprise and/or be impregnated with metal materials, such as copper, silver, gold, nickel-titanium alloy, stainless steel, and/or titanium.

The ureteral catheter 614 can further comprise a retention portion 624, such as any of the previously described retention portions, which extends radially outward from a portion of the second end 622 of the drainage lumen 618. The retention portion 624 can be configured to be extended into a deployed position in which a diameter of the retention portion 624 is greater than a diameter of the drainage lumen 618. In some examples, the retention portion 624 comprises at least one drainage port 626 to permit fluid flow into the drainage lumen 618. In some examples, the at least one drainage port 626 comprises perforations on an inwardly facing side of the retention portion 624, positioned to receive urine produced by the kidneys. The drainage port 626 can be a protected drainage port positioned on a protected surface area of the retention portion 624, meaning that when negative pressure is applied to the kidneys and/or renal pelvis, the protected drainage port(s) 626 are not occluded by mucosal tissues drawn against the retention portion 624 by the negative pressure. As in previous examples, perforations on the retention portion 624 can be about 0.05 mm to about 1.1 mm in diameter, or, preferably, about 0.7 mm to about 0.9 mm in diameter. A cross-sectional area of each perforation may range from about 0.002 mm$^2$ to about 1.0 mm$^2$, or about 0.35 mm$^2$ to about 0.65 mm$^2$.

A wide variety of retention portions 624 can be used for maintaining the second end 622 of the ureteral catheter 614 in the renal pelvis or kidney, as described, for example, in the '442 publication and the '017 publication. In some examples, as shown in FIGS. 15A and 16A, the retention portion 624 comprises a helical coil similar in shape and function to the helical coil shown in FIG. 6. As in previous examples, the helical coil of the retention portion 624 can be formed, for example, by bending or twisting the second end 622 of the catheter 614 in a coiled configuration. The coiled retention portion 624 can be tapered such that coils near the end of the catheter 614 are wider than coils located at the base of the retention portion 624. This tapered configuration can be selected to correspond to a shape of the renal pelvis. The coiled retention portion 624 can define an inwardly facing portion or side and an outwardly facing portion or side of the catheter tube. In some examples, the drainage ports 626 or perforations are positioned on the inwardly facing side of the coil, so as to protect the drainage ports or perforations from being occluded by tissues drawn towards the retention portion as negative pressure is applied through the drainage lumen 618 of the ureteral catheter 614. In that case, outwardly facing portions of the coil can be free from perforations or openings.

The pump system 600 further comprises the outflow catheter 616 extending from the pump 612 to a drainage location for expelling collected fluid (e.g., urine) from the body. For example, the outflow catheter 616 can be an elongated tube or conduit connected at a first end 632, also referred to as a proximal end, to the pump 612. A second end 634, also referred to as a distal end, of the outflow catheter 616 can be positioned in the bladder of the patient. In that case, urine collected by the ureteral catheter 614 can pass through the outflow catheter 616 to the bladder. Urine expelled into the bladder can naturally pass from the body through the urethra.

The outflow catheter 616 may be similar in material composition and dimensions to the ureteral catheter 614. For example, the outflow catheter 616 can be made from similar materials as the ureteral catheter 614, such as one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). A length of the outflow catheter 616 is generally based on the positioning of the pump 612. The outflow catheter 616 is desirably a sufficient length to extend from the patient's bladder, through an incision in the bladder wall, and to the pump 612. If the inflow or ureteral catheter 614 and the outflow catheter 616 remain separate along their entire lengths, then the outflow catheter 616 may be the same width or diameter as the inflow or ureteral catheter 614. For example, the outflow catheter 616 may be about 1 Fr to about 9 Fr (French catheter scale). In some examples, the outflow catheter 616 can have an external diameter ranging from about 0.33 to about 3.0 mm. In one example, the outflow catheter 616 is 6 Fr and has an outer or external diameter of 2.0±0.1 mm. In some examples, the internal diameter of the outflow catheter 616 can range from about 0.165 mm to about 2.39 mm, or from about 1.0 mm to 2 mm, or about 1.25 mm to about 1.75 mm.

As described in further detail herein, in some examples, portions of the inflow or ureteral catheter 614 can be partially or fully enclosed within a lumen of the outflow catheter 616 forming a multi-lumen catheter, along at least a portion of a length of the inflow or ureteral catheter 614. In that case, the outflow catheter 616 is wide enough to enclose the inflow or ureteral catheter 614. For example, the multi-lumen portions of the outflow catheter 616 may have an external diameter of from about 0.5 mm to about 5.0 mm, or about 2.0 mm to 4.0 mm. In some examples, the internal diameter of the outflow catheter 616 can range from about 0.33 mm to about 4.4 mm, or from about 1.5 mm to about 3.5 mm. In some examples, as discussed previously, the pump system 600 comprises two ureteral catheters 614, one deployed in each renal pelvis and/or kidney of the patient. In that case, both ureteral catheters 616 may be enclosed within the outflow catheter 616 to reduce the number of incisions in the bladder wall.

The pump system 600 further comprises the pump 612, which is configured to be implanted in the body. The pump 612 is configured to provide or exert negative pressure to portions of the urinary tract through the drainage lumen 618 of the ureteral catheter 614. For example, when actuated, the pump 612 can exert negative pressure to the renal pelvis(es) and kidney(s) to draw urine produced by the kidney(s) into the drainage lumen 618. In some examples, the pump 612 is configured to provide negative pressure of between about 0 mmHg and about 150 mmHg, as measured at the first end 620 of the drainage lumen 618 of the ureteral catheter 614. Desirably, negative pressure provided by the pump 612 can be sufficient for establishing a pressure gradient across filtration anatomy or glomerulus of a kidney of a patient to facilitate urine flow towards the ureter.

In some examples, the pump 612 comprises a housing 628 and fluid port(s) 630 extending through the housing 628. As in previously discussed examples, the housing 628 can be formed from any suitable biocompatible material, which does not degrade when positioned in the body. Materials used for implantable cardiac devices, such implantable defibrillators and/or pacemakers, can be used for the housing 628. For example, the housing 628 can be formed from stamped metals, such as stainless steel or titanium alloys. Alternatively or in addition, the housing 628 may comprise certain biocompatible rigid plastics, as are known in the art. Unlike in previous examples where the housing was sized for insertion within the urinary tract, the housing 628 is desirably a suitable size and shape to be positioned within a body cavity, such as the abdominal cavity or in a subcutaneous space between the skin and ribs or muscle tissue. The housing 628 can comprise rounded edges and/or curved surfaces, since hard edges and corners could irritate body tissues. In some examples, as shown in FIG. 15A, the housing 628 comprises a narrow box shaped structure having a height H1, width W1, and narrower depth or thickness T1. In some examples, the height H1 and width W1 can each be about 25 mm to about 75 mm. The thickness T1 can be from about 5 mm to about 10 mm. In other examples, the housing 628 may be a substantially disc-shaped structure having opposing flat or substantially flat front and back sides connected by curved or rounded edges. The diameter of the disc-shaped housing may be about 25 mm to about 75 mm, and a thickness of the disc-shaped housing could be about 5 mm to 10 mm.

As described in further detail herein, in some examples, the pump 612, which is implanted in the body, is a suitable size and shape to be inserted into the subcutaneous space or body cavity through an incision. The housing 628 can be sized to be secured within the subcutaneous space or body cavity by suturing portions of the housing 628 to body tissues using conventional suturing techniques, as are known in the art. As will be appreciated by those skilled in the art, conventional techniques for insertion and deployment of electronic implantable devices, such as implantable defibrillators and pacemakers, can be used for implanting the pump 612 within the scope of the present disclosure.

The fluid port(s) 630 of the pump 612 are configured to connect to the ends 620, 632 of the ureteral catheter 614 and outflow catheter 616, thereby establishing fluid communication between the lumens 618 of the ureteral catheter 614 and the outflow catheter 616 and pumping components of the pump 612. The fluid port(s) 630 are sized to engage the ends 620, 632 of the ureteral catheter 614 and the outflow catheter 616 and, accordingly, can have a diameter slightly larger than the external diameter of the ureteral catheter 614 and/or outflow catheter 616. In some examples, the pump 612 comprises both an inflow fluid port for the ureteral catheter 614 and a separate outflow fluid port 630 for the outflow catheter 616. In other examples, as shown in FIGS. 15A-16D, the pump 612 comprises a single fluid port 630 sized to receive the ends 620, 632 of both the ureteral catheter 614 and the outflow catheter 616. For example, in multi-lumen arrangements, the fluid port 630 can be sized to receive the outer outflow catheter 616, meaning that the fluid port 630 has a diameter slightly larger than the external diameter of the outflow catheter 616. In such examples, the fluid port 630 comprises an outer annular portion sized to engage the end 632 of the outflow catheter 616 and an interior portion, such as a nozzle or luer connector, enclosed by the outer portion and configured to engage the end 620 of the ureteral catheter 614. Including only a single fluid port 630 in the pump housing 628 simplifies the housing 628 structure and, in particular, reduces a number of ports that need to be sealed during implantation.

Figure 16D:
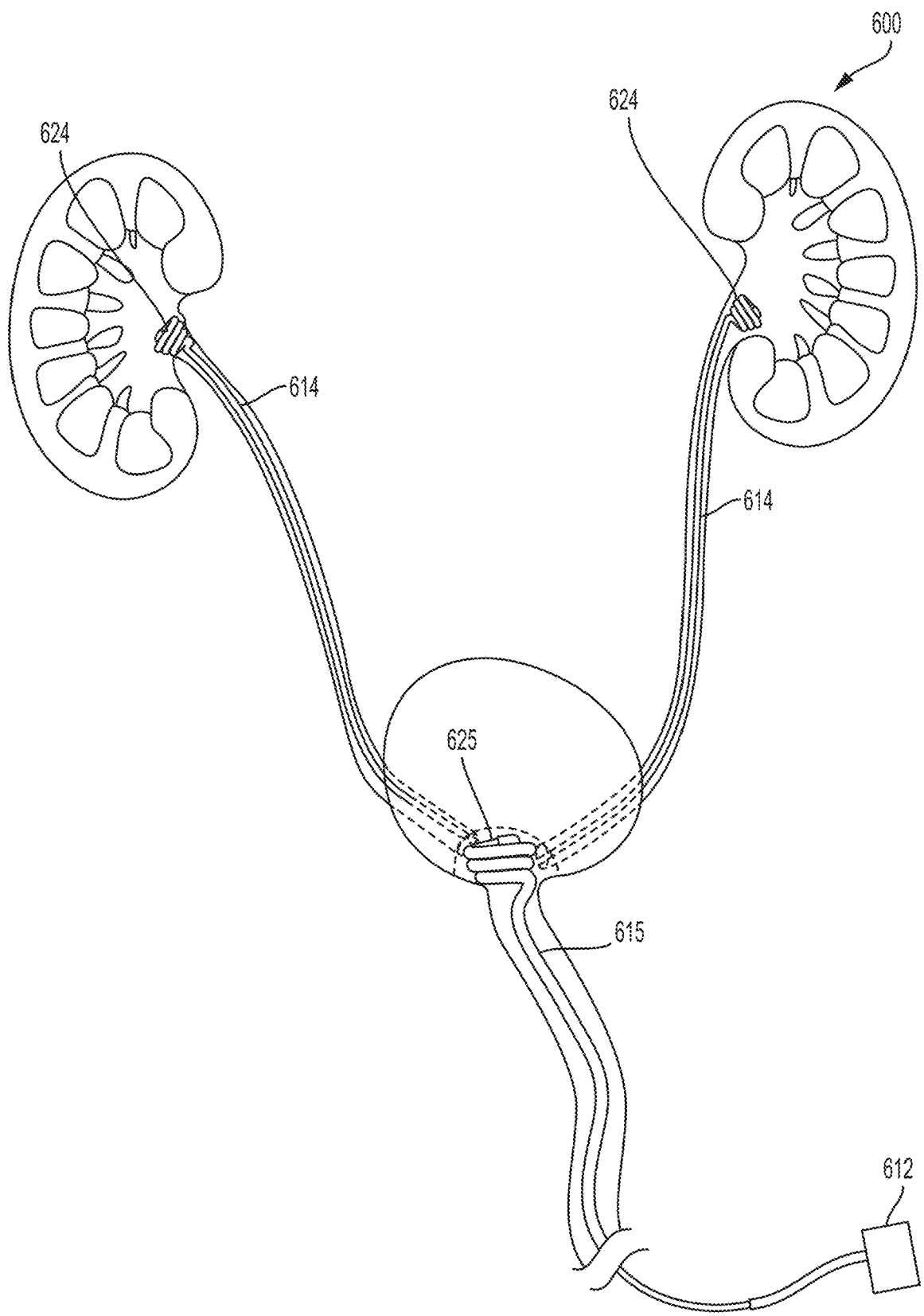
FIG. 16D is a schematic drawing of an external pump system for removing urine from the urinary tract according to another example of the disclosure.
Figure 16E:
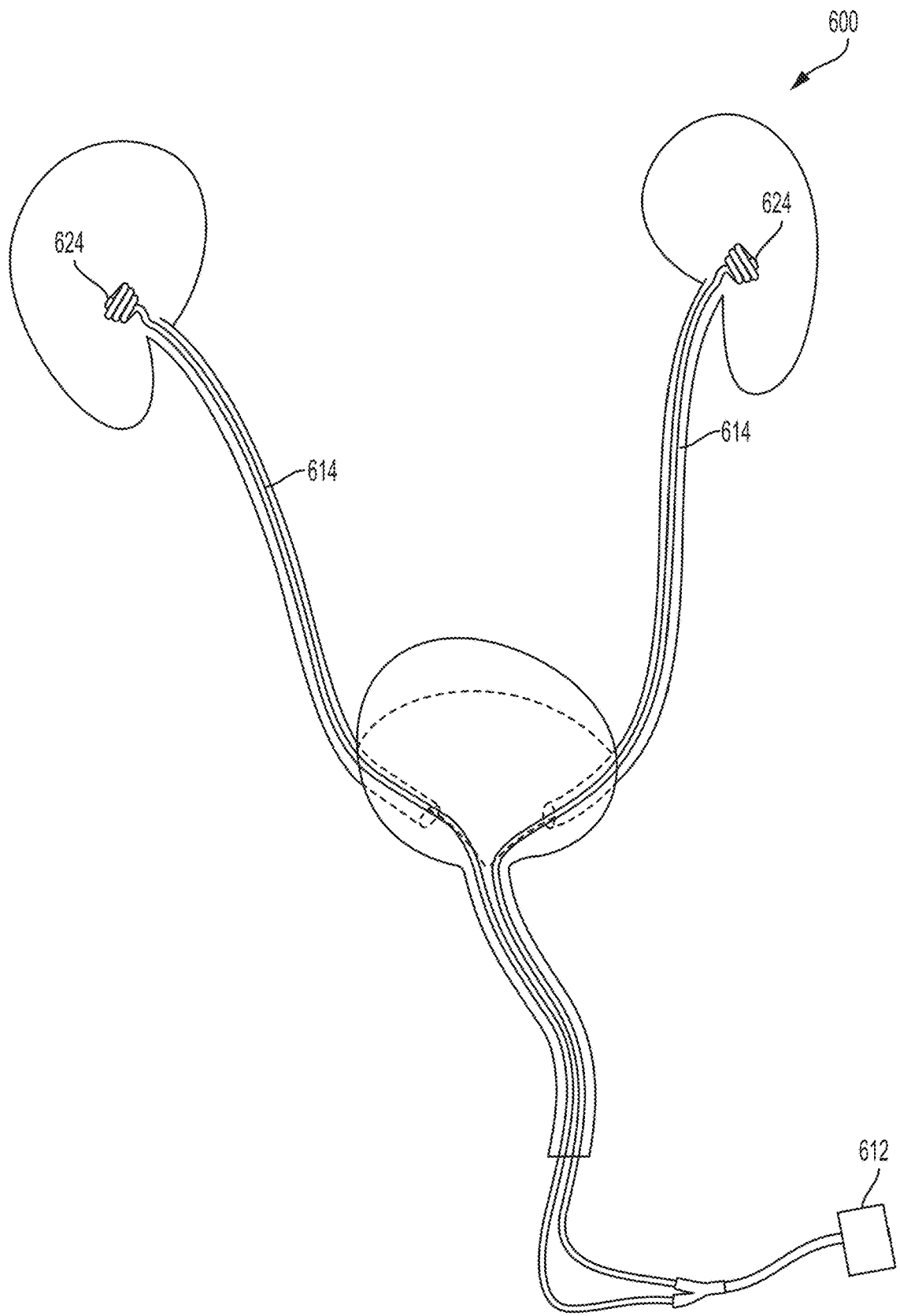
FIG. 16E is a schematic drawing of another external pump system for removing urine from the urinary tract according to another example of the disclosure.

FIGS. 16D and 16E shows pump systems 600 comprising an external pump 612, which can include features of the previously described implanted and indwelling pump systems. As shown in FIG. 16D, the system comprises a bladder catheter 615 having a proximal end connected to the external pump 612 and a distal end positioned in the patient's bladder. The bladder catheter 615 is held in place in the bladder by a retention portion 625, which can comprise a helical coil sized to prevent the distal end of the bladder catheter 615 from being pulled out of the patient's bladder at inappropriate times. The system 600 also comprises ureteral catheters 614 comprising retention portions 624 for retaining the ureteral catheters 614 in the renal pelvis and/or kidney and a drainage tube extending along the ureter into the bladder. In use, fluid (e.g., urine produced by the kidneys) passes into drainage lumens of the ureteral catheters 614 through drainage ports or holes in the retention portion 624 of the ureteral catheters. The fluid passes through the drainage lumen into the bladder. The fluid is then drawn into the bladder catheter 615 by negative pressure provided by the pump 612. The external pump 612 can be configured to operate in response to data received from various sensors associated with the patient and/or positioned in the patient's urinary tract in a similar manner to the previously described indwelling and implanted pumps.

FIG. 16E shows another example of the pump system 600 comprising the external pump 612. As shown in FIG. 16E, the system 600 comprises ureteral catheters 614 having a retention portion 624 for retaining a distal end of the catheters 614 in the renal pelvis and/or kidney of the patient and the external pump 612 positioned outside of the patient's body. The catheters 614 extend from the patient's renal pelvis, through the ureters, bladder, and urethra to the external pump 612. In use, negative pressure applied by the pump 612 draws fluid (i.e., urine) through drainage ports or holes in the retention portions 624 into a drainage lumen of the catheters 614. The fluid passes through drainage lumens of the catheters 614 to an external reservoir or container under negative pressure provided by the pump 612. As with the pump 612 in FIG. 16D, the external pump 612 can be configured to operate in response to data received from various sensors associated with the patient and/or positioned in the patient's urinary tract in a similar manner to the previously described indwelling and implanted pumps.

Mechanical and Electrical Components of Pump

Mechanical and electronic components of the pump 612 and/or pump system 600 will be described in further detail. In some examples, as shown in FIGS. 15A-15D, some or all of the electrical components are positioned within the housing 628 of the pump 612. In other examples, as shown in FIGS. 16A-16C, some electrical components of the pump system 600 can be contained in separate device, which can be implanted or can be external to the body.

In some examples, the pump 612 comprises at least one pump chamber or pump element 640 connected to the fluid port 630 by a suitable conduit 642, such as flexible or rigid tubing, extending through the housing 628 from the fluid port 630 to the pump chamber or element 640. The pump chamber or element 640 can be at least partially positioned within the housing 628 and in fluid communication with the fluid port 630. The pump chamber or element 640 can be configured to draw fluid through the drainage lumen 618 of the ureteral catheter 614 to the pump chamber or element 640. The pump chamber or pump element 640 can comprise a rotodynamic pump and/or a positive displacement pump. As used herein, a "rotodynamic pump" refers to a pump mechanism configured to continuously impart kinetic energy to pumped fluid via a rotating pump element. The rotating pump element can comprise an impeller, turbine, propeller, screw, gear vane, rotor, or combinations thereof. A "positive displacement pump" refers to a pump element that moves fluid by trapping a fixed amount of fluid in a space and then forcing the trapped fluid through a discharge conduit or pipe. The pump chamber or element 640 for a positive displacement pump can comprise, for example, a reciprocating diaphragm. In some examples, the pump element 640 comprises a piezoelectric diaphragm pump. In other examples, the pump element 640 of the positive displacement pump comprises a peristaltic pump element.

With specific reference to FIGS. 15A-15D, in some examples, the pump system 600 further comprises a controller 644 integrated with the pump 612. The controller 644 comprises processing circuitry operably connected to the pump element 640 of the pump 612 for controlling operation of the pump 612. For example, the controller 644 can comprise a computer processor 646 and memory 648 comprising instructions for operating the pump 612 to deliver negative pressure therapy to the patient. In particular, the processor 646 and memory 648 can be configured to actuate the pump 612 by setting and/or adjusting operating parameters of the pump 612 in response to instructions stored on the memory 648 or received from an external source, such as a remote computer device 650 accessible over a computer network 652.

The processor 646 and memory 648 can also be configured to control the pump chamber or element 640 based on feedback received from sensors associated with the pump system 600. The pump system 600 can comprise a variety of different types of sensors positioned at different locations for sensing information about fluid flow through portions of the assembly 600, as well as information about a condition of the patient. The sensors can be electrically connected to the controller 644 for providing information about the pump 612, patient condition, and/or negative pressure therapy treatment to the controller 644. In some examples, the system 600 comprises fluid sensors 654 positioned in the fluid conduit 642 or catheters 614, 616. The fluid sensors 654 can be configured to measure characteristics or parameters of fluid passing through the conduit 642 and/or catheters 614, 616. Examples of fluid characteristics or parameters that can be used for controlling the pump element 640 can comprise fluid pressure or flow volume measured in the conduit 642 or catheters 614, 616.

In some examples, the pump system 600 further comprises a catheter probe or sensor 656 positioned near the retention portion 624 of the ureteral catheter 614 configured to measure fluid pressure in the renal pelvis to determine a magnitude of negative pressure applied to the renal pelvis. The probe or sensor 656 can be electrically connected to the controller 644 and processor 646 by a wired connection extending through the ureteral catheter 614 to the pump 612 and integrated controller 644 to provide feedback about operation of the pump system 600.

In some examples, the pump system 600 further comprises pressure sensors 658 positioned on external surfaces of components of the assembly for measuring pressure at various portions of the patient's body. For example, a pressure sensor 658 may be positioned on an exterior surface of the housing 628 of the pump 612, for a pump positioned in the abdominal cavity or peritoneum tissue. The pressure sensor 658 may be configured to detect intra-abdominal pressure of the patient as negative pressure therapy is provided to the patient.

In some examples, the processor 646 and memory 648 are configured to receive and process information from the sensors 654, 656, 658 to determine parameters related to fluid flow and/or a condition of the patient. For example, information from fluid sensors 654 in the catheters 614, 616 and/or conduit 642 could be processed to determine flow rate of fluid through the ureteral catheter 614 and/or fluid volume for urine drawn into the lumen 618 of the ureteral catheter 614. Information from the retention portion probe 656 located on the retention portion 624 of the ureteral catheter 614 could be used to determine negative pressure provided to the kidney or renal pelvis. Information from the pressure sensor 658 on the housing 628 could be used for determining the intra-abdominal pressure.

In some examples, the processor 646 and memory 648 of the controller 644 can be configured to control operating parameters of the pump 612 based on the determined fluid flow and patient parameters. For example, the processor 646 and memory 648 may be configured to adjust the pump 612 by reducing power supplied to the pump chamber or pump element 640 when a flow rate of fluid through the ureteral catheter 614 or a magnitude of the negative pressure measured by the retention portion probe 656 is higher than an expected or threshold value, which can reduces the flow rate or flow volume for fluid drawn into the drainage lumen 618 of the ureteral catheter 614. Similarly, the processor 646 and memory 648 can be configured to adjust the pump 612 by increasing power for the pump chamber or pump element 640 when fluid flow through the ureteral catheter 614 or magnitude of the negative pressure measured at the renal pelvis by the retention portion probe 656 is lower than expected or lower than a minimum threshold value to increase the flow rate and/or flow volume.

In some examples, operating parameters of the pump 612 can be determined based on measured physiological information about the patient, such as measured intra-abdominal pressure for the patient. It is believed that elevated intra-abdominal pressure can signify reduced renal function. In order to address elevated intra-abdominal pressure, the processor 646 and memory 648 can be configured to adjust the pump 612 by increasing power to the pump chamber or pump element 640 in order to increase a magnitude of negative pressure applied to the renal pelvis and kidneys. As discussed previously, increasing a magnitude of negative pressure applied to the renal pelvis and/or kidneys is expected to increase urine output, which is expected to reduce venous congestion and pressure. The processor 646 and memory 648 can be configured to cause the pump chamber or pump element 640 to continue to operate at an increased power until intra-abdominal pressure decreases below, for example, a target or threshold value.

In some examples, the pump 612 further comprises a power supply, such as a rechargeable battery 660, positioned in the pump housing 628, for providing power to the pump chamber or element 640 and the controller 644. The battery 660 can be similar in size and electrical output to batteries used for implantable medical devices, such as pacemakers and implantable defibrillators. For example, the battery 660 can comprise a lithium-ion battery, as are known in the art. The battery 660 can be rechargeable either wirelessly or via a wired connection to an external power source. In order to wirelessly recharge the battery 660, in some examples, the pump 612 further comprises an induction coil 662 (shown in FIG. 15D) electronically coupled to the pump element 612 for providing power to the pump element 612 and/or to the rechargeable battery 660. The induction coil 662 can be configured to generate power when exposed to an electromagnetic field generated by a remote device 650 positioned outside or within the patient's body. A suitable induction coil 662 for generating sufficient power to operate the pump element 640 and other electronic components of the pump 612 and/or to recharge the battery 660 can comprise, for example, a conductive wire or filament positioned on a substrate, such as a circuit board. As shown schematically in FIG. 15D, the induction coil 662 can be positioned in the housing 628 along with other electronic components of the pump 612.

In some examples, the pump 612 further comprises a wireless transceiver 664 positioned in the housing 628 configured to receive operating instructions for the pump 612 from, for example, the remote computer device 650, such as a smart phone, computer tablet, computer, or computer network 652. As in previous examples, the wireless transceiver 664 can comprise a short-range wireless data transceiver, such as BLUETOOTH®, configured to communicate with remote computer devices 650 positioned near the patient, such as a remote control device located in a holster or carrier worn by the patient. In that case, the remote computer device 650 may act as a relay device configured to transmit or broadcast information received from the controller 644 to other computer devices, the computer network 652, or the Internet. The wireless transceiver 664 may alternatively or additionally comprise a long-range wireless transceiver using, for example, WiFi. The long-range transceiver can be configured to transmit information to a stationary medical or communication device, such as a patient monitor device located, for example, in the patient's residence or to a wireless router configured to communicate information to a computer network 652 and/or the Internet. In some examples, the controller 644 is configured to record information about negative pressure treatment provided to the patient, such as information detected by the sensors 654, 656, 658, along with information about operation of the pump 612. Information about operation of the pump 612 may comprise, for example, an amount of time that the pump 612 was in operation, power usage information for the pump 612, or a charge remaining for the rechargeable battery 660. The processor 646 and memory 648 can be configured to periodically cause the wireless transceiver 664 to transmit this recorded information from the controller 644 to the remote computer device 650 to provide feedback to the patient and/or to caregivers about operational status of the pump 612 and about treatment being provided by the pump 612.

With reference now to FIGS. 16A-16C, in other examples, the pump system 600 comprises a controller 644 positioned outside of the patient's body enclosed within its own separate housing 638. For example, the controller 644 can be a hand-held computer device, such as a dedicated electronic device, smart phone, or computer tablet. In some examples, the controller 644 is worn by the patient in a holster, fanny pack, or pocket, so that it is held in place in close proximity to the pump 612, which is implanted in the body. As in the previous examples, the external controller 644 comprises the processor 646 and memory 648 configured to control operation of the pump 612. The controller 644 can be electrically connected to the pump 612 by the percutaneous shielded wire 670. As shown in FIGS. 16A-16C, the wire 670 extends from the controller 644, through a percutaneous access site, and to the pump 612. Beneficially, since the processing electronics and other components of the controller 644 are positioning in the housing 638 external to the patient, the pump 612 is smaller than in previous examples. Using a smaller pump 612 may make the device easier to implant and remove from the patient.

The processor 646 and memory 648 can transmit operating instructions from the controller 644 to the pump 612 via the wire 670. Also, the processor 646 and memory 648 can receive information about operation of the pump 612 via the wired connection 670. The controller 644 can also be electrically connected to sensors of the system 600, such as the fluid sensors 654 positioned in the ureteral catheter 614 and/or conduit 642, the retention portion probe 656, and the external pressure sensor 658. As in previous examples, the external controller 644 further comprises a power source, such as a battery 660, for providing power to the pump 612. Electrical power can be provided from the battery 660 in the controller 644 to the pump 612 via the wired connection 670. In some examples, the pump 612 may comprises an auxiliary battery 666 configured to store power received via the wire 670 for operating the pump 612.

The controller 644 may further comprise the wireless transceiver 664. As in previous examples, the wireless transceiver 664 can be configured to transmit information about the pump 612, patient, and negative pressure therapy received from the pump 612 and sensors 654, 656, 658 to remote computer devices 650, computer networks 652, or the Internet, as previously described. For example, the wireless transceiver 664 can transmit information from the controller 644 to a laptop computer or computer server, where it can be reviewed by users The wireless transceiver 664 generally comprises a long range wireless transceiver that periodically or continuously transmits information from the controller 644 to the remote computer devices or networks. In some examples, the wireless transceiver 664 is a WiFi transceiver that that transmits data to a computer network through a wireless gateway or router. In other examples, the wireless transceiver can be a cellular transceiver (e.g., a transceiver configured to transmit data via a 3G or 4G mobile network).

Catheter Connector Examples

Having described the pump system 600 and electrical components of the pump 612, aspects of fluidics and fluid flow through the pump 612 will now be described in further detail with reference to FIGS. 17A and 17B. As discussed previously, the pump 612 comprises the fluid port 630 configured to provide a fluid connection between the ureteral catheter 614 and/or outflow catheter 616 and the pump chamber or pump element 640. The fluid port 630 can be configured to connect to a multi-lumen or co-axial catheter or catheter segment, such as a co-axial catheter in which the ureter catheter 614 forms a central lumen and the outflow catheter 616 forms an annular outer lumen surrounding the ureteral catheter 614. In systems comprising two ureteral catheters 614, the fluid port 630 could comprise two inner or central lumens configured to engage ends 620 of the ureteral catheters 614 and an outer lumen configured to engage the end 632 of the outflow catheter 616. As discussed previously, using a coaxial or multi-lumen catheter reduces a number of incisions made through the bladder wall during implantation of the pump system 600.

Figure 17A:
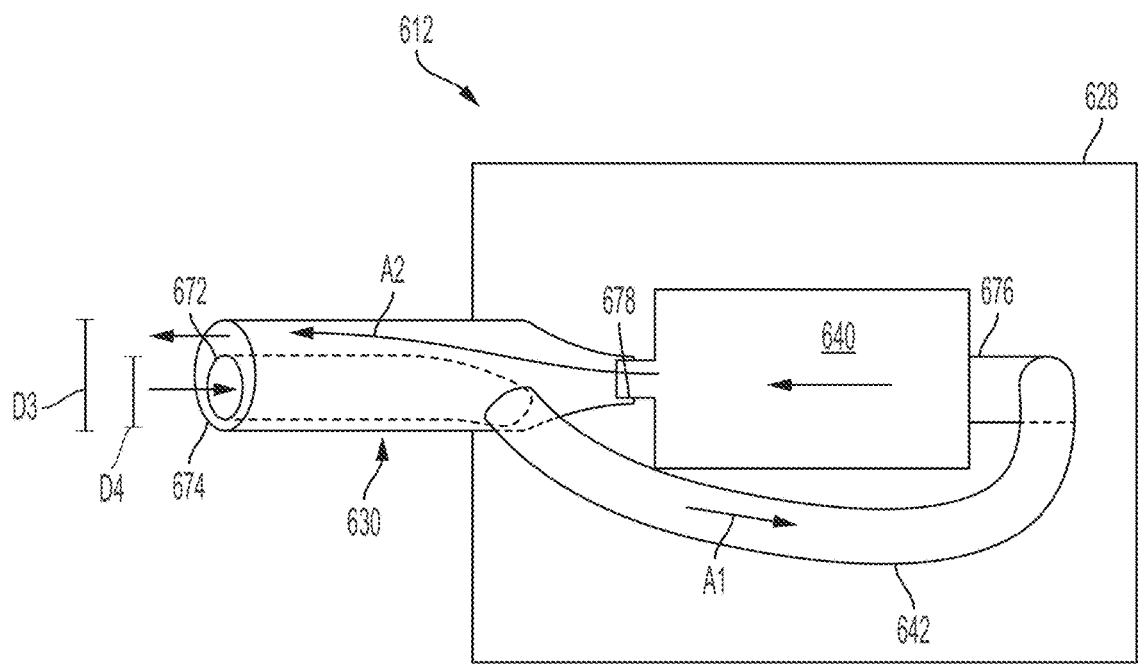
FIGS. 17A and 17B are schematic drawings showing examples of fluid conduits of a pump, which extend between the pump chamber or element and a fluid port of the pump.
Figure 17B:
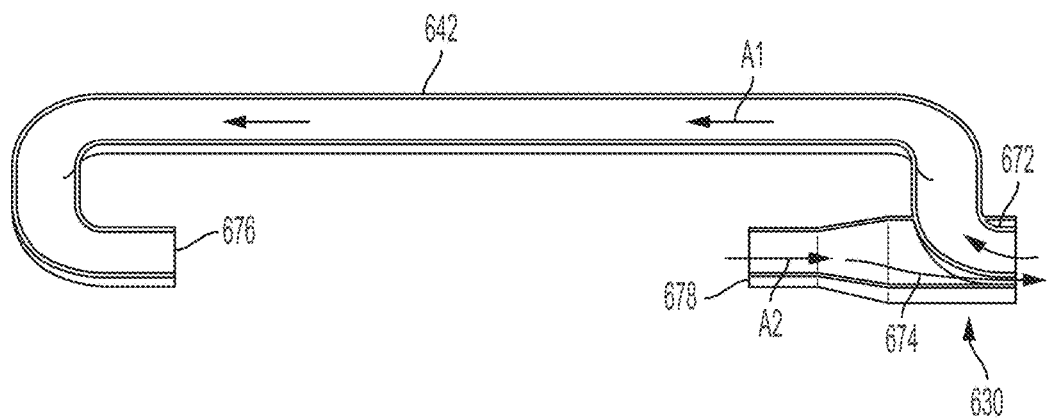

As shown in FIGS. 17A and 17B, the fluid port 630 configured to receive the coaxial or multi-lumen catheter comprises a first tubular segment or portion 672, configured to receive the ureteral catheter 614, and a second tubular segment or portion 674, enclosing the first tubular portion 672, configured to receive the outflow catheter 616. The tubular portions 672, 674 are sized to engage corresponding ends 620, 632 of the ureteral catheter 614 and the outflow catheter 616, respectively. For example, the inner tubular portion 672 can have an inner diameter D3 corresponding to an outer diameter of the ureteral catheter 614. In some examples, the diameter D3 can be about 0.33 mm to about 3.0 mm, or about 1.0 mm to 2.0 mm. The second tubular portion 674 can have an inner diameter D4 corresponding to an outer diameter of the outflow catheter 616. The diameter D4 can be, for example, about 0.5 mm to about 6.0 mm, or about 2.0 mm to 4.0 mm.

Fluid from the ureteral catheter 614 passes through the first tubular portion 672 of the fluid port 630 and fluid conduit 642 to an inflow port 676 of the pump chamber or pump element 640, in a direction of arrow A1. As discussed previously, the pump chamber or element 640 can comprise any of a variety of rotodynamic or positive displacement pump mechanisms that draw fluid (e.g., urine) into the inflow port 676 by producing negative pressure in the lumen 618 of the ureteral catheter 614. For example, the pump mechanism could comprise an impeller, rotor, or piezoelectric diaphragm. An outflow port 678 of the pump chamber or element 640 is located on an opposite side of the pump chamber or element 640 from the inflow port 676. The outflow port 678 is fluidly connected to the second tubular portion 674 of the fluid port 630, so that fluid expelled from the pump chamber or element 640 passes through the second tubular portion 674 and into the outflow catheter 616 in a direction of arrow A2. As discussed previously, the expelled fluid then passes through the outflow catheter 616 into the bladder.

In other examples, as discussed in further detail herein, rather than including coaxial or multi-lumen catheters, a tubular shunt could be positioned in the bladder wall. In such examples, both the ureteral catheter 614 and the outflow catheter 616 may pass through an opening in the bladder wall defined by the tubular shunt. The ureteral catheter 614 and outflow catheter 616 could extend from the tubular shunt to the pump 612. In such cases, the pump 612 may comprise separate fluid ports 630, with one port configured to engage the end 620 of the ureteral catheter 614, and a second port of about the same size configured to engage the end 632 of the outflow catheter 616. Beneficially, using the tubular shunt avoids a need for multiple incisions in the bladder wall, while allowing the ureteral catheter 614 and outflow catheter 616 to remain separate and, in some cases, spaced apart from one another along their entire lengths.

Exemplary Multi-Lumen Catheters and Tubular Shunts

Figure 18A:
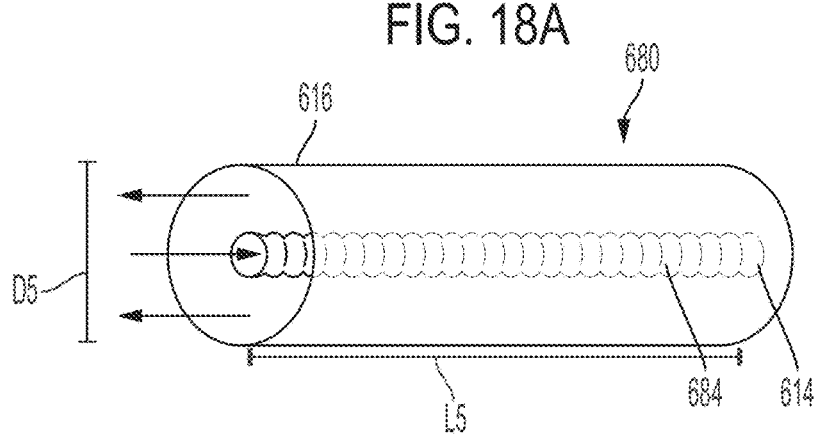
FIGS. 18A-18D are schematic drawings of examples of catheter tubes that can be used with the implantable pump systems disclosed herein.
Figure 18B:
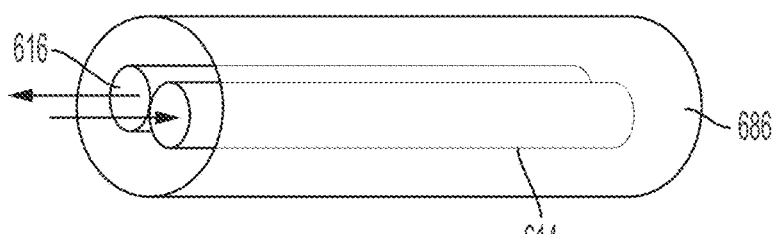
Figure 18C:
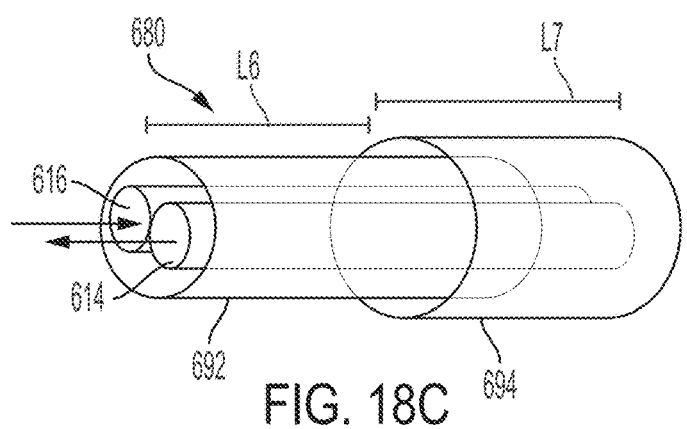
Figure 18D:
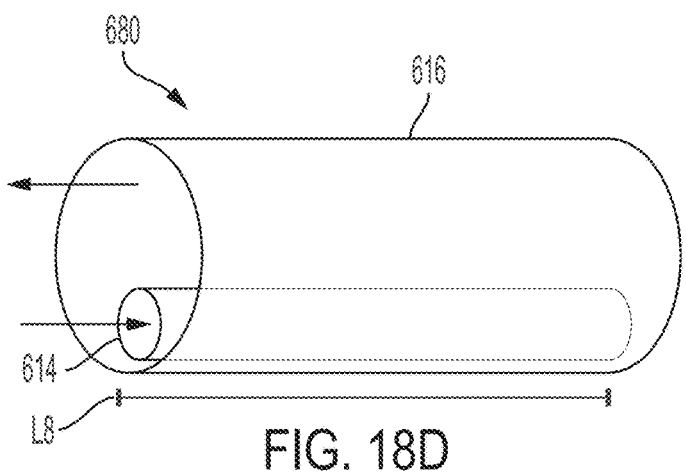
Figure 19A:
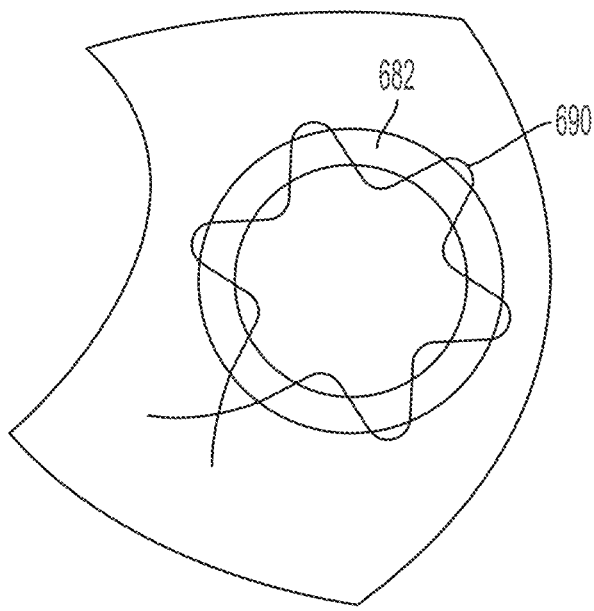
FIGS. 19A and 19B are schematic drawings showing techniques for suturing a catheter to a bladder wall for use with an implantable pump system, according to an example of the present disclosure.
Figure 19B:
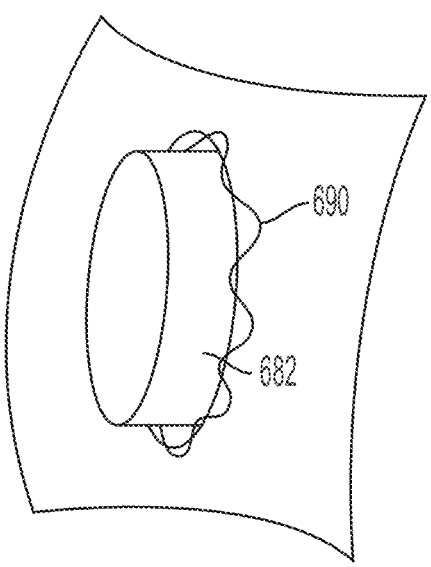

A number of examples of multi-lumen catheter portions 680 and shunts 682 for insertion through the bladder wall, which can be used with the pump system 600 disclosed herein, are shown in FIGS. 18A-18D. FIGS. 19A and 19B are schematic drawings showing how the tubing portions 680 or shunts 682 can be secured through an opening in the bladder wall by, for example, a purse string suture 690. FIGS. 18A and 18D show examples of multi-lumen catheter portions 680, in which a segment of the ureteral catheter 614 is positioned within an annular lumen of the outflow catheter 616. FIGS. 18B and 18C show examples of tubular sheaths or shunts 682 enclosing both the ureteral catheter 614 and outflow catheter 616. The catheter portions 680 and shunts 682 of FIGS. 18A-18D also comprise structures for reducing, absorbing, or counteracting stresses that may be applied to the catheters 614, 616 due to movement of the patient and/or constriction of the bladder during use. In particular, the multi-lumen catheter portions 680 and shunts 682 are configured to be radially and axially flexible and/or stretchable. The multi-lumen catheter portions 680 and shunts 682 may also comprise elastic materials.

As used herein, a radially flexible structure is capable of absorbing a radially inwardly directed force without breaking. While the structure may deform slightly due to the applied force, the structure generally remains capable of performing its intended function both as the radially inwardly directed force is being applied and once the force is removed. An elastic material or structure is capable of absorbing the radially inwardly directed force and resumes its previous shape once the radially inwardly directed force is removed. Similarly, a structure that is axially flexible and/or stretchable is capable of increasing in length when an axial force is applied without breaking. An elastic material or structure returns to its previous axial length once the axial force is removed. Multi-lumen catheter portions 680 and shunts 682 that are radially and axially flexible and/or stretchable allow for patient movement without pulling on body tissues, organs, percutaneous access sites, or other structures within and external to the urinary tract to avoid injuring body tissue, causing pain, and to ensure that the catheters 614, 616 and pump 612, which is implanted in the body, are not pulled out of place as the ambulatory patient changes position or moves while performing normal activities.

The multi-lumen catheter portions 680 and shunts 682 are generally formed from similar materials as other portions of the catheters 614, 616. In some examples, the multi-lumen catheter portions 680 and shunts 682 can be configured to be more flexible, deformable, or elastic than other portions of the catheters 614, 616, since the portions 680 and shunts 682 must absorb constricting forces of the bladder wall. The multi-lumen portions 680 and shunts 682 can be formed from suitable coated or coated biocompatible polymeric materials, such as materials used for conventional urinary tract catheters. Exemplary materials can comprise one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). A total outer diameter D5 of the multi-lumen portion 680 and shunt 682 is desirably as small as possible to minimize the size of the incision in the bladder wall, while permitting sufficient fluid flow through the catheters 614, 616. For example, the external diameter D5 can be from about 0.5 mm to about 6.0 mm or about 2.0 mm to about 4.0 mm.

As shown in FIG. 18A, the multi-lumen catheter portion 680 comprises the ureteral catheter 614 enclosed by the outflow catheter 616. The ureteral catheter 614 comprises an accordion shaped segment 684 configured to increase in length when pulled. In some examples, the outflow catheter 616 can be connected to and configured to exert a biasing force on the ureteral catheter 614. The biasing force can cause the ureteral catheter 614 to return to a normal length when an axial force (e.g., a stretching force) is no longer being applied to the catheters 614, 616. In this way, a length L5 of the catheter 614 can increase from a normal length of, for example, about 1 cm to about 10 cm to an extended length of about 2 cm to about 15 cm, as the patient moves. Once the patient stops moving, the biasing force applied by the outer catheter 616 causes the accordion section 684 of the ureteral catheter 614 to return to its normal length.

In order to deploy the multi-lumen catheter portion 680 of FIG. 18A, the catheter portion 680 can be positioned through an incision in the bladder wall. The catheters 614, 616 can then be expanded using an inflatable element, such as a balloon. It is expected that tautness of the bladder causes the bladder wall to seal around the expanded catheters 614, 616 as the bladder drains, thereby fixing the multi-lumen catheter portions 680 in place in the bladder wall without the need for sutures. However, as shown in FIGS. 19A and 19B, a loose purse string suture 690 could be used to further secure the multi-lumen catheter portion 680 to the bladder wall.

As shown in FIG. 18B, an example of a sheath or shunt 682 configured to be positioned through an incision of the bladder wall is illustrated. Both the outflow catheter 616 and the ureteral catheter 614 extend through a lumen 686 of the sheath or shunt 682. The sheath or shunt 682 of FIG. 18B can be formed from an elastomeric material configured to absorb forces applied to the catheters 614, 616 or sheath or shunt 682. As used herein, an "elastomeric material" refers to a material or structure that absorbs a deforming force and returns to its previous or normal size and shape after the force is removed. In order to avoid leaking and to fully seal the bladder, the sheath or shunt 682 can be tightly fit around the catheters 614, 616 to resist movement of the catheters, which can occur when portions of the catheters 614, 616 are pulled or moved.

In order to deploy the sheath or shunt 682 in the bladder wall, the sheath or shunt 682 can be sutured in place using conventional techniques. For example, as shown in FIGS. 19A and 19B, the sheath or shunt 682 can be secured to the bladder wall using the purse string suture 690. Desirably, the suture 690 is not fully tightened to avoid constricting the bladder wall around the sheath or shunt 682. In some examples, as shown in FIG. 19B, the sheath or shunt 682 can protrude into the bladder by a suitable distance to ensure that it does not fall out of the bladder due to patient movement or constriction of the bladder.

Another example of a sheath or shunt 682 configured to pass through the bladder wall is illustrated in FIG. 18C. As shown in FIG. 18C, the sheath or shunt 682 comprises a telescoping arrangement comprising a first or inner section or segment 692 of a length L6 of, for example, from about 5 mm to 5 cm. The inner section or segment 692 is slideably received within and sealed to a second or outer section or segment 694 of length L7 of, for example, about 5 mm to about 5 cm. The telescoping sheath or shunt 682 is configured to axially extend when the catheters 614, 616 are pulled or moved away from one another. Accordingly, the telescoping arrangement serves to absorb stresses applied to the catheters 614, 616 or sheath 662. In some examples, the inner section or segment 692 and the outer section or segment 694 can be inwardly biased, so that the sheath or shunt 682 returns to a contracted length once a biasing force is removed.

FIG. 18D shows another example of a multi-lumen catheter portion 680. As was the case for the multi-lumen catheter portion 680 in FIG. 18A, the catheters 614, 616 shown in FIG. 18D form a multi-lumen portion 680 in which the ureteral catheter 614 is received with an annular lumen of the outflow catheter 616. The multi-lumen portion 680 of the catheters 614, 616 are formed from an elastomeric material (i.e., a material capable of stretching axially when a force is applied to the material and which returns to its previous state once the force is removed) to absorb any stresses applied to the catheters 614, 616. For example, the catheter portion 680 may be configured to extend from a normal length L8 of from about 1 cm to about 10 cm to an extended length of about 2 cm to about 15 cm. Elastomeric or stretchable portions of the catheters 614, 616 can be formed from biocompatible elastomeric materials, such as synthetic or natural rubbers, silicone, and other elastomeric polymers.

Method of Implanting a Pump Assembly for an Ambulatory Patient

Figure 20:
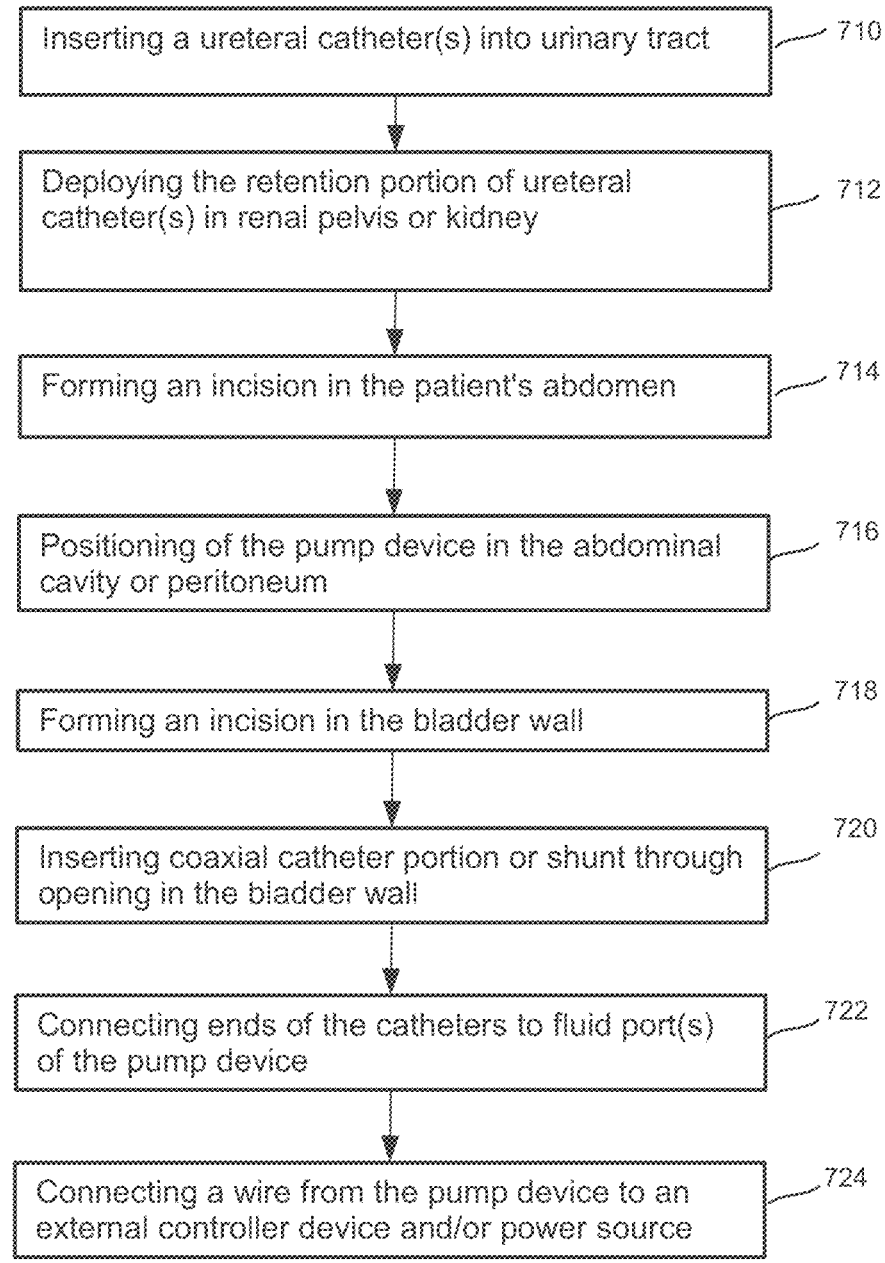
FIG. 20 is a flow diagram showing an exemplary method for implanting components of an implantable pump system.

With reference to FIG. 20, a method for inserting and/or implanting components of the pump system 600 into a patient's body comprises introducing one or two ureteral catheters 614 into the urinary tract of the patient, as shown at step 710. The ureteral catheters 614, 616 can be inserted into the urinary tract through the urethra using conventional techniques for deploying ureteral stents, and as described, for example, in previously referenced U.S. Patent Appl. Pub. No. 2020/0094017, to Erbey et al., entitled "Coated Ureteral Catheter or Ureteral Stent and Method".

In some examples, a cystoscope is used to assist in advancing the catheter through the urethra, bladder, urethral orifice, and into the ureter. For example, to deploy the ureteral catheter 614, a medical professional may insert a cystoscope into the urethra to provide a channel for tools to enter the bladder. The ureteral orifice is then visualized and a guidewire is inserted through the cystoscope and ureter until a tip of the guidewire reaches the renal pelvis. Once the guidewire reaches the renal pelvis, the cystoscope can be removed, and a pusher tube is fed over the guidewire up to the renal pelvis. The guidewire is then removed while the pusher tube stays in place to act as deployment sheath. The ureteral catheter 614 is then inserted through the pusher tube/sheath and advanced towards the renal pelvis.

At step 712, once a catheter tip or end 622 of the ureteral catheter 614 reaches the renal pelvis, the ureteral catheter 614 is deployed in the renal pelvis or kidney by causing the retention portion 624 to expand to its deployed configuration or state. In some examples, the retention portion 624 is naturally biased to its deployed position. In that case, the ureteral catheter 614 may be deployed automatically once it protrudes from the distal end of the pusher tube. In other examples, the retention portion 624 ureteral catheter 614 can be deployed by removing a guidewire from the lumen 618 of the ureteral catheter 614 or by some other triggering mechanism, thereby allowing the catheter 614 to adopt its deployed configuration.

The method for implanting the pump assembly or pump system 600 further comprises steps for implanting the pump 612 into the abdominal cavity, peritoneum, or subcutaneous space. In order to implant the pump 612, at step 714, an incision is made to gain access to the desired implantation site or location. For example, the medical professional may make an incision of about 1 cm to 10 cm or about 5 cm in the patient's abdomen at a position near to the kidneys or renal pelvis. Once the incision is made, at step 716, the pump 612 is inserted through the incision and placed at the desired implantation site or location in the abdominal cavity, peritoneum, or subcutaneous space. For example, the pump 612 can be placed against the peritoneum. The medical professional may use surgical sutures to secure the pump 612 in place against the peritoneum tissue.

At step 718, the method further comprises making one or more incisions in the bladder wall for the ureteral catheter 614 and outflow catheter 616. As discussed previously, the ureteral catheter 614 and outflow catheter 616 can be joined together and pass through the bladder wall through a single incision using the multi-lumen catheter portions 680 and shunts 682 shown in FIGS. 18A-18D. When the catheters 614, 616 are joined together, only a single incision in the bladder wall is needed.

Once the incision in the bladder wall is made, at step 720, the multi-lumen catheter portion 680 or shunt 682 is inserted through the incision and fixed in place. As discussed previously, the tautness of the bladder causes the bladder wall to press against the outer surface of the multi-lumen catheter portion 680 or shunt 682, which may effectively seal the bladder. In order to further secure the catheter portion 680 or shunt 682 in place, the medical professional can make a loose purse string suture 690 around the opening in the bladder wall to hold the bladder wall against the catheter portion 680 or shunt 682, as shown in FIGS. 19A and 19B. As discussed previously, in some examples, the purse string suture 690 is not fully tightened, but may only be tied tight enough to pull the bladder taut to the outer surface of the shunt 682. As shown in FIG. 19B, the shunt 682 may extended into the bladder by at least a short distance to ensure that it does not slip out of the opening in the bladder wall.

Once the catheter portion 680 or shunt 682 is secured to the bladder wall, at step 722, the catheters 614, 616 can be inserted through the opening in the bladder wall and the ends 620, 632 of the catheters 614, 616 can be secured to the pump 612. For example, the end 620 of the ureteral catheter 614 can be secured to a corresponding portion of the fluid port 630 of the pump 612. Similarly, the end 632 of the outflow catheter 616 can be secured to a corresponding portion of the same fluid port 630 or, for pumps 612 comprising two fluid ports, to a different fluid port. The connections between the catheters 614, 616 and fluid port(s) 630 are sealed to prevent leaks.

At step 724, optionally, a wire, such as a shielded percutaneous wire 670, can be extended from the pump 612, through a percutaneous access site, and to an external controller 644 and/or power supply. Once the wire 670 is connected, the pump 612 can be configured to receive power from the external device and begin to operate to provide negative pressure therapy for the patient. Alternatively, for wireless connections, a remote power device can be brought in proximity to the pump 612 to charge the battery 660 in the pump 612 or controller 644. Once the battery 660 is wirelessly charged, the pump 612 can be actuated to provide the negative pressure therapy to the patient.

Pump Assembly Using a Percutaneous Ureteral Catheter

Figure 21A:
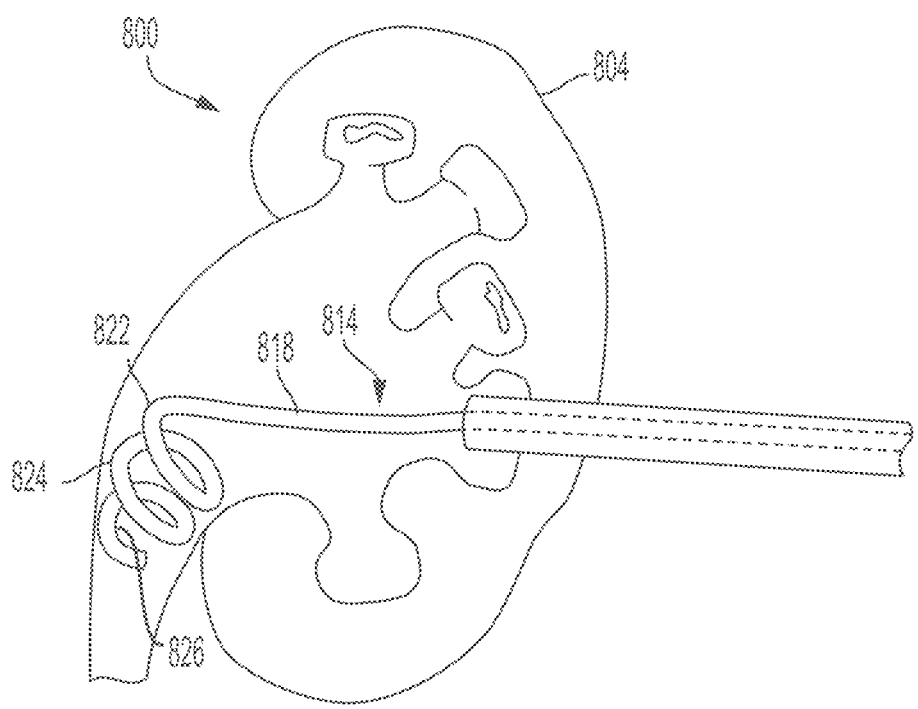
FIG. 21A is a schematic drawing showing a bypass catheter implanted in the renal pelvis and/or kidney of a patient.
Figure 21B:
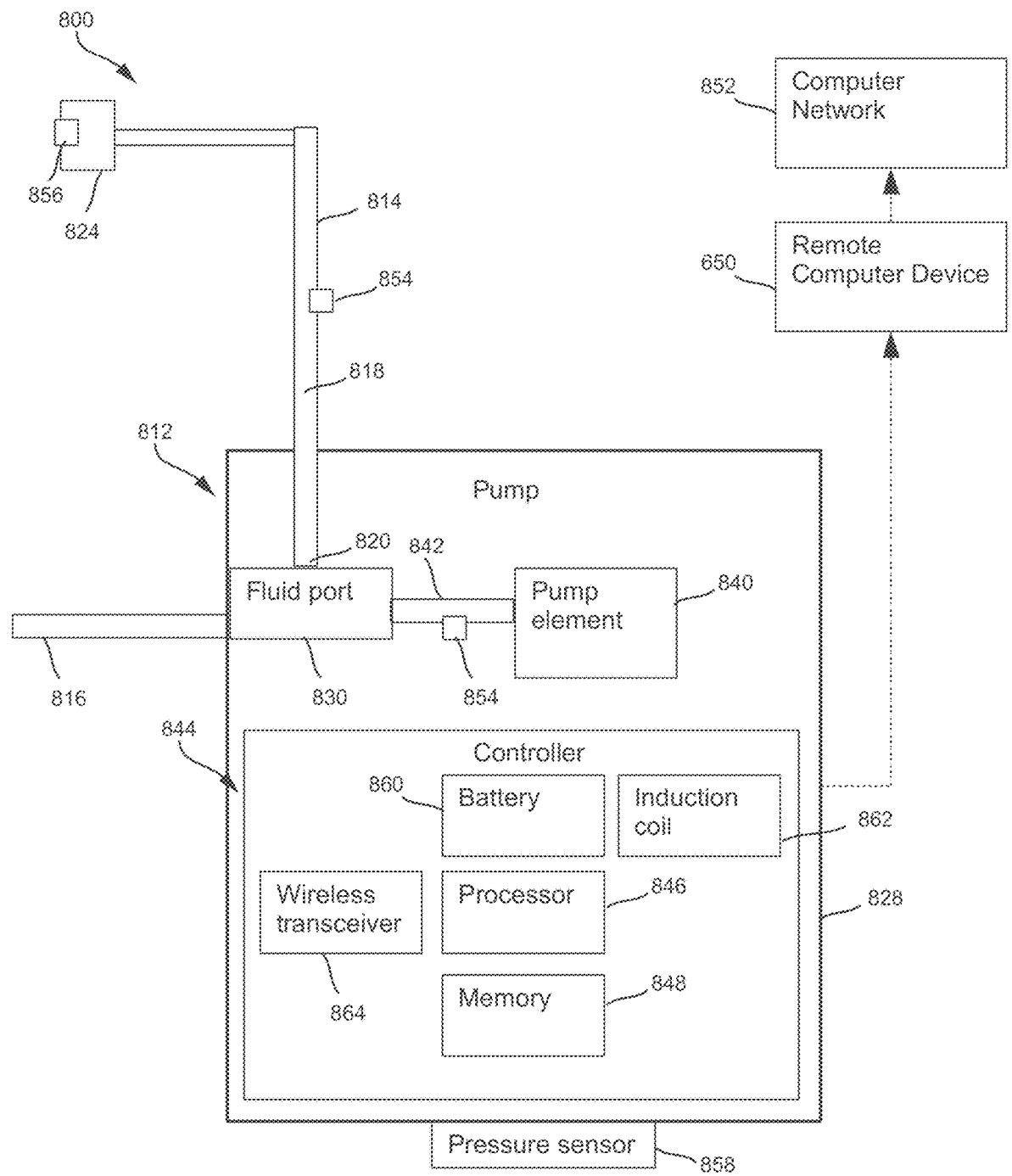
FIG. 21B is a schematic drawing of an implantable pump system including the bypass catheter of FIG. 21A, according to an example of the present disclosure.

With reference to FIGS. 21A and 21B, a pump assembly or system 800 is illustrated including a bypass catheter 814 configured to provide negative pressure therapy to the kidney or renal pelvis of a patient. However, unlike in previous examples, the bypass catheter 814, which may be referred to as percutaneous nephrostomy tube or urinary bypass catheter, is deployed in the kidney or renal pelvis through a percutaneous access site and not through the urinary tract. Exemplary catheters that can be used for accessing the kidney and/or renal pelvis through a percutaneous access site are disclosed in U.S. Patent Appl. Pub. No. 2019/0105465 to Erbey et al., entitled "Percutaneous Ureteral Catheter," the disclosure of which is incorporated by reference in its entirety.

As shown in FIG. 21A, the bypass catheter 814 comprises an elongated tube defining a drainage lumen 818 extending from a proximal end 820 (shown in FIG. 21B) to a distal end 822. The elongated tube comprises a retention portion 824 configured to be deployed in a renal pelvis 802, kidney 804, and/or bladder, of the patient. The catheter 814 may be inserted through a percutaneous access site, which can be formed in a conventional manner, such as by inserting a tip of a needle through the skin into the abdomen.

The elongated tube of the bypass catheter 814 can be formed from and/or comprise one or more biocompatible polymer(s), such as polyurethane, polyvinyl chloride, polytetrafluoroethylene (PTFE), latex, silicone coated latex, silicone, polyglycolide or poly(glycolic acid) (PGA), Polylactide (PLA), Poly(lactide-co-glycolide), Polyhydroxyalkanoates, Polycaprolactone and/or Poly(propylene fumarate). As in previous examples, portions of the catheter 814 can also comprise and/or be impregnated with metal materials, such as copper, silver, gold, nickel-titanium alloy, stainless steel, and/or titanium. The catheter 814 should be of sufficient length to extend from the renal pelvis 802, through the kidney 804 and, as shown in FIG. 21B, to the pump 812, which is implanted in the body. The size of the catheter 814 can range from about 1 Fr to about 9 Fr (French catheter scale), or about 2 Fr to 8 Fr, or can be about 4 Fr. In some examples, the catheter 814 can have an external diameter ranging from about 0.33 mm to about 3.0 mm, or about 0.66 mm to 2.33 mm, or about 1.0 mm to 2.0 mm, and an internal diameter ranging from about 0.165 mm to about 2.40 mm, or about 0.33 mm to 2.0 mm, or about 0.66 mm to about 1.66 mm.

The retention portion 824 of the catheter 814 can be integrally formed with the distal end 822 of the catheter 814 or can be a separate structure mounted to the distal end 822 of the catheter 814 by a conventional fastener or adhesive. Many exemplary retention portions 824 suitable for retaining the distal end 822 of the catheter 814 within the renal pelvis 802 are provided in previous exemplary embodiments of ureteral catheters 614. For example, retention portions 824 comprising one or more of coils, funnels, cages, balloons, and/or sponges can be adapted for use with the bypass catheter 814. In some cases, such retention portions 824 can be adapted for use with urinary bypass catheters 814 by, for example, inverting the retention portion(s) 814 to account for the fact that a urinary bypass catheter 814 enters the renal pelvis 802 through the kidney 804, rather than through the ureters.

Regardless of the embodiment selected, the retention portion 824 creates an outer periphery or protected surface area to prevent urinary tract tissues from constricting or occluding a fluid column extending between nephrons of the kidney 804 and the drainage lumen 818 of the catheter 814. In some examples, such a retention portion 824 could comprise an inwardly facing side or protected side or surface area comprising one or more drainage openings, perforations, and/or ports 826 for receiving fluid, such as urine, produced by the kidneys 804 and an outwardly facing side or protective surface area, which can be free from or substantially free from the drainage ports 826. As in previous examples, desirably, the inwardly facing side or protected surface area and the outwardly facing side or protective surface area are configured such that, when negative pressure is applied through the tube of the catheter 814, the urine is drawn into the lumen 818 of the tube through the one or more drainage ports 826, while mucosal tissues, such as tissue of the ureters and/or renal pelvis 802, are prevented from appreciably occluding the one or more drainage ports 826. As in previously described ureteral catheters, sizes and spacing between the drainage ports 826 may vary to achieve different distributions of negative pressure within the renal pelvis 802 and/or kidney 804, as are disclosed herein. In some examples, each of the one or more drainage ports 826 has a diameter of about 0.0005 mm to about 2.0 mm, or about 0.05 mm to 1.5 mm, or about 0.5 mm to about 1.0 mm. In some examples, the drainage ports 826 can be non-circular, and can have a surface area of about 0.0002 $mm^2$ to about 100 $mm^2$, or about 0.002 $mm^2$ to about 10 $mm^2$, or about 0.2 $mm^2$ to about 1.0 $mm^2$. The drainage ports 826 can be spaced equidistantly along an axial length of the retention portion 824. In other examples, drainage ports 826 nearer to the base or proximal end of the retention portion 824 may be spaced more closely together to increase fluid flow through more distal drainage ports 826, compared to examples where the ports 826 are evenly spaced.

With reference to FIG. 21B, the elongated tube defining the drainage lumen 818 of the bypass catheter 814 extends from a posterior surface of the kidney 804 to the pump 812, which is implanted in the body. As in previous examples, the pump 812, which is implanted in the body, can be positioned in the abdominal cavity, peritoneum, or subcutaneous space. A proximal or second end 820 of the bypass catheter 814 connects to a fluid port 830 of the pump 812, as in previous examples. The system may further comprise an outflow catheter 816 extending from the same fluid port 830 or from a different fluid port of the pump 812. The outflow catheter 816 is configured to provide fluid (e.g., urine) expelled from the pump 812 to the bladder through an opening in the bladder wall. Once delivered to the bladder, the fluid (e.g., urine) can be expelled from the body naturally or through a bladder catheter inserted through the urethra.

The pump 812 is similar or identical to pumps 612 described in previous examples. As in previous examples, the pump 812 comprises the pump chamber or pump element 840 fluidly connected to the fluid port(s) 830 via a conduit 842. The pump 812 further comprises the controller 844. As shown in FIG. 21B, the controller 844 is integral with the pump 812 and enclosed within the housing 828 of the pump 812. In other examples, the controller 844 can be an external controller, as described in connection with FIGS. 16A-16C.

As in the previous examples, the controller 844 comprises the processor 846 and memory 848 configured to control operation of the pump 812. The controller 844 may further comprise a power source, such as a rechargeable battery 860 and/or induction coil 862 for providing power to the pump 812.

The system 800 further comprises sensors 854, 856, 858 electrically connected to the processor 846 and memory 848 of the controller 844. Specifically, as in previous examples, the system 800 can comprise, for example, fluid sensors 854 positioned in the ureteral catheter 814 and/or conduit 842, a retention portion probe 856, and the external pressure sensor 858. As in previous examples, the controller 844 is configured to receive and process information from the sensors 854, 856, 858 for controlling operation of the pump 812 and, in particular, for adjusting power output of the pump to control a magnitude of negative pressure provided to the kidney and/or renal pelvis through the drainage lumen 818 of the ureteral catheter 814.

The controller 844 may further comprise the wireless transceiver 864. The wireless transceiver 864 can be configured to transmit information about the pump 812, patient, and negative pressure therapy received from the pump 812 and sensors 854, 856, 858 to remote computer devices 850, computer networks 852, or the Internet, as previously described. The wireless transceiver 864 can comprise a short-range transceiver, such as BLUETOOTH®, or a long range wireless transceiver. The wireless transceiver 864 can be configured to periodically or continuously transmit information from the controller 844 to the remote computer device 850 and/or computer network 852.

Urinary Catheters with Ureteral Retention Portions

Further examples of retention portions for ureteral catheters, which can be used with any of the retention portions 154, 624 of ureteral catheters described previously and shown, for example, in FIGS. 6, 15A-15D, and 16A-16C, are now provided. These retention portions can also be used with the ureteral catheters of the fluid removal systems 9000 shown in FIG. 57A-57D. Any of these retention portions disclosed herein can be formed from the same material as other portions of the ureteral catheters and can be unitary with or connected to the other portions of the ureteral catheters. In other examples, retention portions can be formed from a different material, such as those that are discussed above for the drainage lumen, and connected to the other portions of the ureteral catheters. For example, the retention portion can be formed from any of the aforementioned materials, for example a polymer such as polyurethane, flexible polyvinyl chloride, polytetrafluoroethylene (PTFE), latex, silicone, silicon, polyglycolide or poly(glycolic acid) (PGA), Polylactide (PLA), Poly(lactide-co-glycolide), Polyhydroxyalkanoates. Polycaprolactone and/or Poly(propylene fumarate).

Referring to FIGS. 22A-22F, a retention portion 130*b* of a ureteral catheter may be configured to be flexible and bendable to permit positioning of the retention portion 130*b* in the ureter and/or renal pelvis of the patient. The retention portion 130*b* is desirably sufficiently bendable to absorb forces exerted on the ureteral catheter 112*b* and to prevent such forces from being translated to the ureters. For example, if the retention portion 130*b* is pulled in the proximal direction P (shown in FIG. 22A) toward the patient's bladder, the retention portion 130*b* can be sufficiently flexible to begin to unwind or be straightened so that it can be drawn through the ureter. Similarly, when reinserted into the renal pelvis or other suitable region within the ureter, the retention portion 130*b* can be biased to return to its deployed configuration.

In some examples, the retention portion 130*b* is integral with a tube 122*b* of a ureteral catheter 112*b*. In that case, the retention portion 130*b* can be formed by imparting a bend or curl to the tube 122*b* that is sized and shaped to retain the catheter at a desired fluid collection location. Suitable bends or coils can comprise a pigtail coil, corkscrew coil, and/or helical coil, such as are shown in FIGS. 22A-23F. For example, the retention portion 130*b* can comprise one or more radially and longitudinally extending helical coils configured to contact and passively retain the catheter 112*b* within the ureter proximate to or within the renal pelvis, as shown for example in FIGS. 22A-23F. In other examples, the retention portion 130*b* is formed from a radially flared or tapered portion of the tube 122*b*. For example, the retention portion 130*b* can further comprise a fluid collecting portion, as shown in FIGS. 28A-50B, such as a tapered or funnel-shaped inner surface 186*b*. In other examples, the retention portion 130*b* can comprise a separate element connected to and extending from the catheter body or tube 122*b*.

In some examples, the retention portion 130*b* can further comprise one or more perforated sections, such as drainage holes, perforations or ports 132*b*, 1232 (shown, for example, in FIGS. 22A-22E, 23A, 23E, 24-27, 34, 41A, 41B, 42, 43, and 48A-50B). A drainage port 132*b* can be located, for example, at the open distal end 120*b*, 121*b* of the tube 122*b*, as shown in FIG. 23D. In other examples, perforated sections and/or drainage ports 132*b*, 1232 are disposed along the sidewall 109*b* of the distal portion 118*b* of the catheter tube 122*b*, as shown in FIGS. 22A-22E, 23A, 23E, 24-27, 34, 41A, 41B, 42, 43, and 48A-50B, or within the material of the retention portion, such as the sponge material of FIGS. 48A, 48B, 49A and 49B. The drainage ports or holes 132*b*, 1232 can be used for assisting in fluid collection by which fluid can flow into the drainage lumen for removal from the patient's body. In other examples, the retention portion 130*b* is solely a retention structure and fluid collection and/or imparting negative pressure is provided by structures at other locations on the catheter tube 122*b*.

In some examples, such as are shown in FIGS. 22B-E, 23D-G, 28B, 28C-28E, 29, 31A-44B, 46B, 47A, 48B, and 49A-50B, at least a portion of, most, or all of the drainage holes, ports or perforations 132*b*, 1232 are positioned in the ureteral catheter 112*b* in protected surface areas or inner surface areas 1000, such that tissue 1003 from the kidney (shown in FIG. 22F) does not directly contact or partially or fully occlude the protected drainage holes, ports or perforations 133*b*. For example, as shown in FIGS. 23F, 28D, 33B, 38C, 48B, 49B, and 50B, when negative pressure is induced in the ureter and/or renal pelvis, a portion of the mucosal tissue 1003 (shown in FIG. 22F) of the ureter and/or kidney may be drawn against the outer periphery 1002 or protective surface areas 1001 or outer regions of the retention portion 130*b* and may partially or fully occlude some drainage holes, ports or perforations 134*b* positioned on the outer periphery 1002 or protective surface areas 1001 of the retention portion 130*b*.

At least a portion of protected drainage ports 133*b* located on the protected surface areas or inner surface areas 1000 of the retention portion 130*b* would not be partially or fully occluded when such tissues 1003 contact the outer periphery 1002 or protective surface areas 1001 or outer regions of the retention portion 130*b*. Further, risk of injury to the tissues 1003, 1004 from pinching or contact with the drainage ports 133*b* can be reduced or ameliorated. The configuration of the outer periphery 1002 or protective surface areas 1001 or outer regions of the retention portion 130*b* depends upon the overall configuration of the retention portion 130*b*. Generally, the outer periphery 1002 or protective surface areas 1001 or outer regions of the retention portion 130*b* contacts and supports the kidney tissue 1003 (shown in FIG. 22F), and thereby inhibits occlusion or blockage of the protected drainage holes, ports or perforations 133*b*.

Figure 23A:
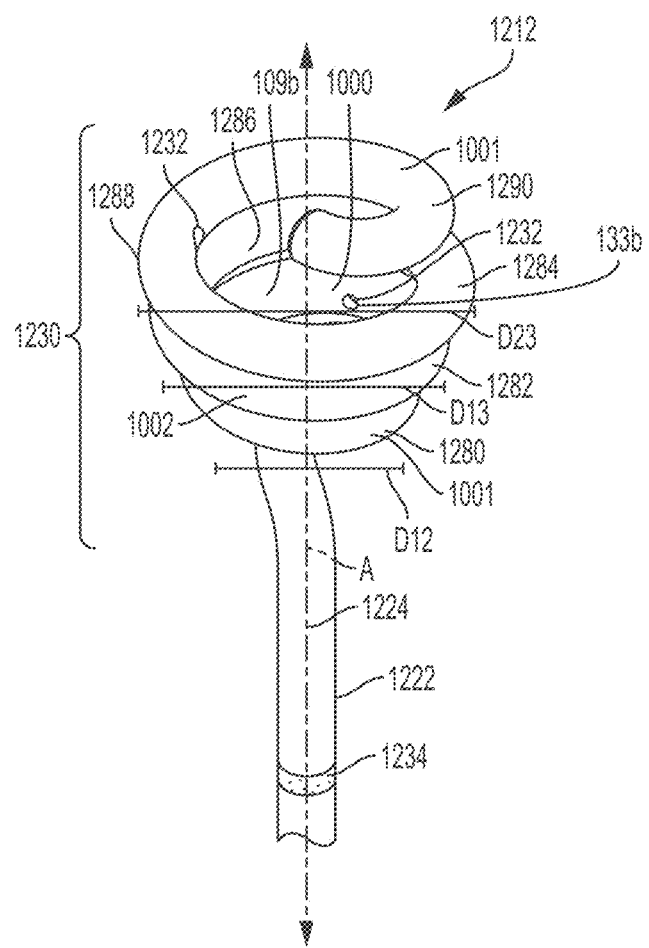
FIG. 23A is a perspective view of the retention portion of a ureteral catheter according to an example of the present invention.
Figure 23E:
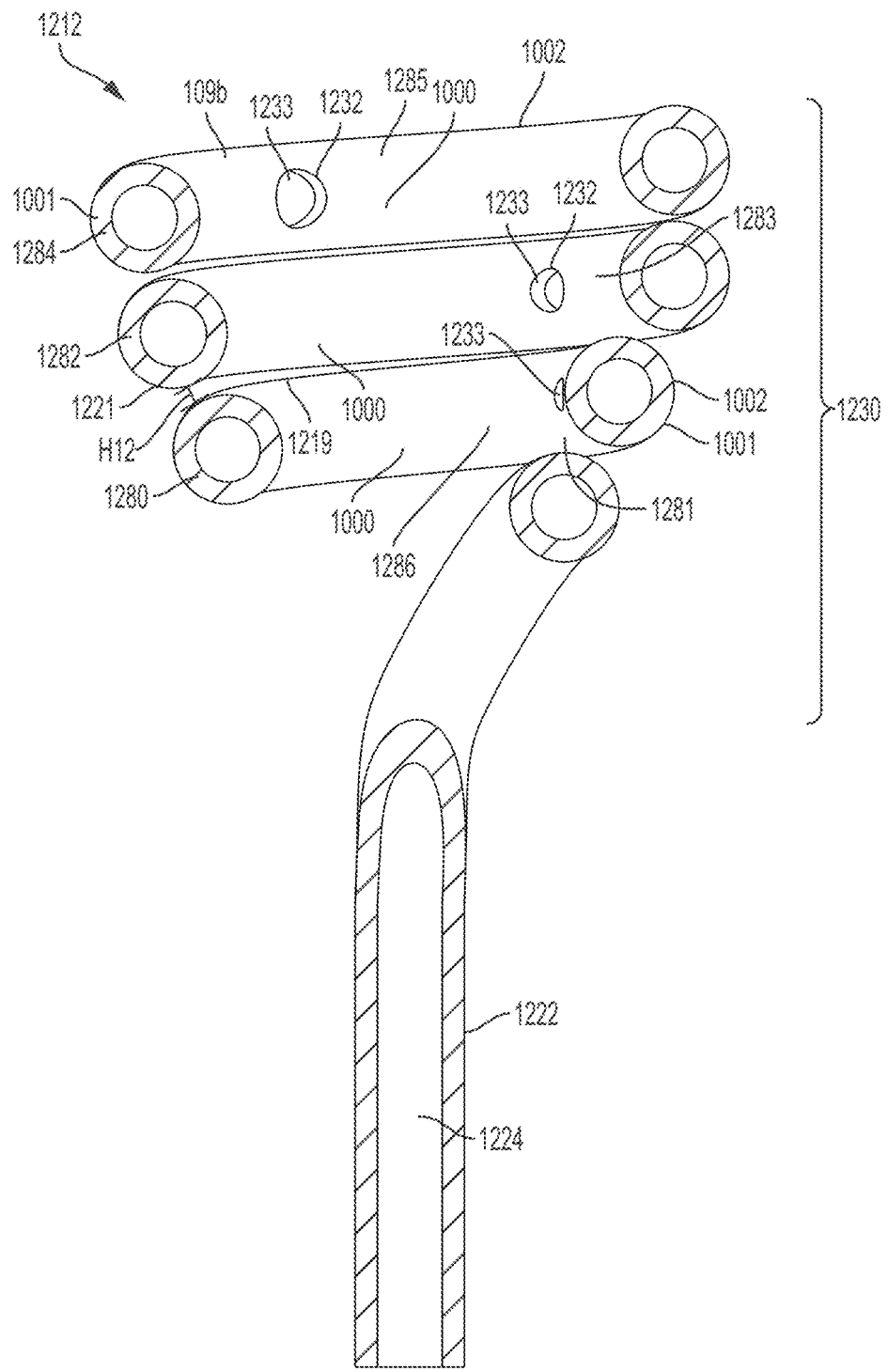
FIG. 23E is a cross sectional view of the retention portion of FIG. 23A taken along line 23E-23E according to an example of the present invention.
Figure 23F:
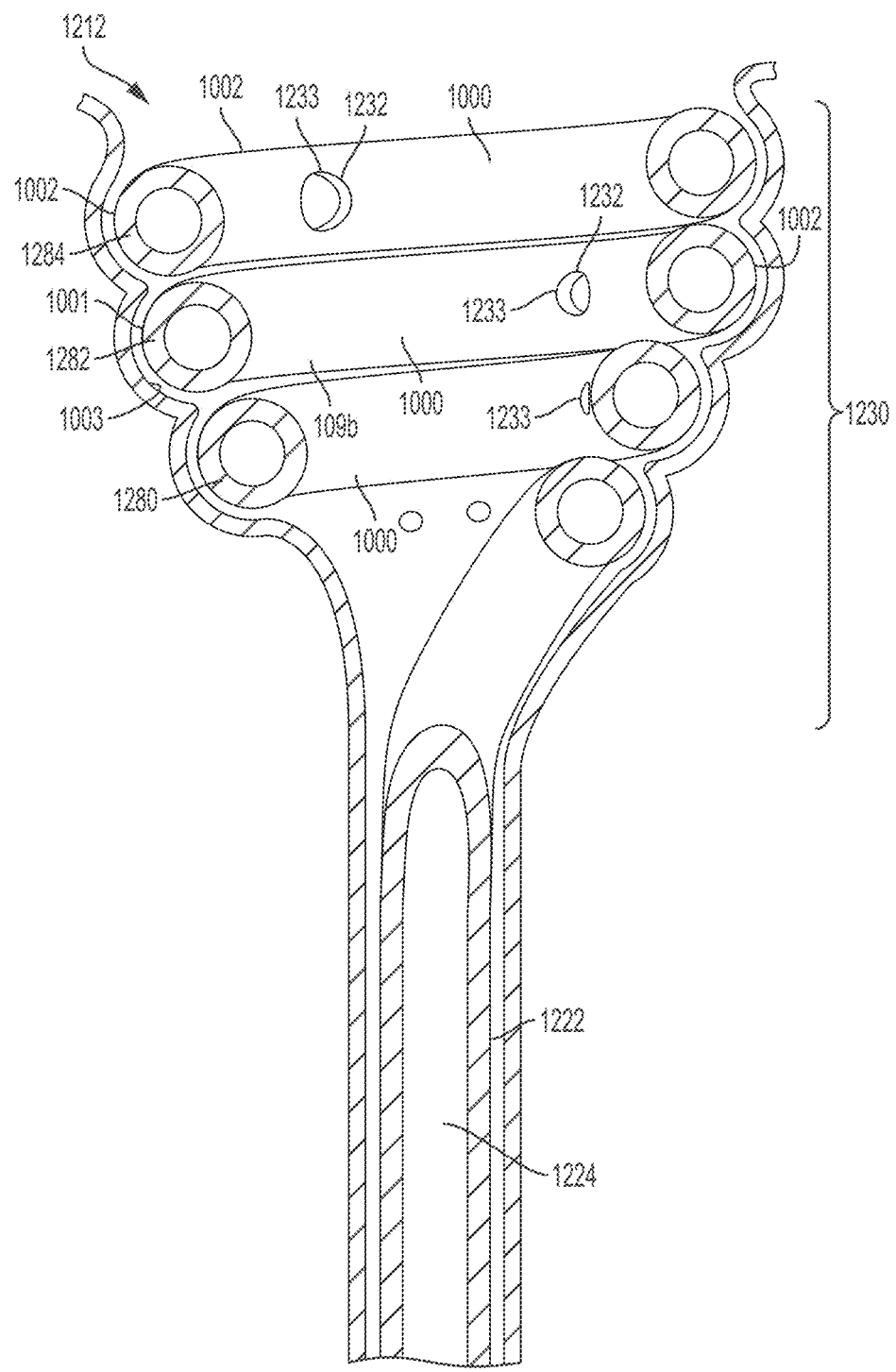
FIG. 23F is s a cross sectional view of the retention portion of FIG. 23A taken along line 23E-23E according to an example of the present invention positioned in the renal pelvis region of the kidney showing in general changes believed to occur in the renal pelvis tissue in response to application of negative pressure through the ureteral catheter.

For example, as shown in FIG. 23E, there is shown an exemplary retention portion 1230 comprising a plurality of helical coils 1280, 1282, 1284. The outer periphery 1002 or protective surface areas 1001 or outer regions of the helical coils 1280, 1282, 1284 contact and support the kidney tissue 1003 to inhibit occlusion or blockage of protected drainage holes, ports or perforations 1233 positioned in protected surface areas or inner surface areas 1000 of the helical coils 1280, 1282, 1284. The outer periphery 1002 or protective surface areas 1001 or outer regions of the helical coils 1280, 1282, 1284 provides protection for the protected drainage holes, ports or perforations 1233. In FIG. 23F, the kidney tissue 1003 is shown surrounding and contacting at least a portion of the outer periphery 1002 or protective surface areas 1001 or outer regions of the helical coils 1280, 1282, 1284, which inhibits contact of the kidney tissue 1003 with the protected surface areas or inner surface areas 1000 of the helical coils 1280, 1282, 1284, and thereby inhibits partial or full blockage of the protected drainage holes, ports or perforations 1233 by the kidney tissue 1003.

Similarly, other examples of configurations of ureteral retention portions shown in FIGS. 28A-50B provide an outer periphery 1002 or protective surface areas 1001 or outer regions which can contact and support the kidney tissue 1003 (shown in FIG. 22F) to inhibit occlusion or blockage of protected drainage holes, ports or perforations 133*b*, 1233 positioned in protected surface areas or inner surface areas 1000 of the retention portions. Each of these examples will be discussed further below.

Referring now to FIGS. 22A-22E, exemplary retention portions 130*b* for ureteral catheters comprising a plurality of helical coils, such as one or more full coils 184*b* and one or more half or partial coils 183*b*, are illustrated. The retention portion 130*b* is capable of moving between a contracted position and the deployed position with the plurality of helical coils. For example, a substantially straight guidewire can be inserted through the retention portion 130*b* to maintain the retention portion 130*b* in a substantially straight contracted position. When the guidewire is removed, the retention portion 130*b* can transition to its coiled configuration. In some examples, the coils 183*b*, 184*b* extend radially and longitudinally from the distal portion 118*b* of the tube 122*b*. In an exemplary embodiment, the retention portion 130*b* comprises two full coils 184*b* and one half coil 183*b*. For example, an outer diameter of the full coils 184*b*, shown by line D11, can be about 18±2 mm, the half coil 183*b* diameter D12 can be about 14 mm±2 mm, and the coiled retention portion 130*b* can have a height H10 of about 16±2 mm.

The retention portion 130*b* can further comprise the one or more drainage holes 132*b*, 1232 (shown in FIGS. 22A-22E, 23A and 23E, for example) configured to draw fluid into an interior of the catheter tube 122*b*. In some examples, the retention portion 130*b* can comprise two, three, four, five, six, seven, eight or more drainage holes 132*b*, 1232, plus an additional hole 110*b* at the distal tip or end 120*b* of the retention portion. In some examples, the diameter of each of the drainage holes 132*b*, 1232 (shown in FIGS. 22A-22E, 23A and 23E, for example) can range from about 0.7 mm to 0.9 mm and, preferably, is about 0.83±0.01 mm. In some examples, the diameter of the additional hole 110*b* at the distal tip or end of the retention portion 130*b* (shown in FIGS. 22A-22E, 23A and 23E, for example) can range from about 0.165 mm to about 2.39 mm, or about 0.7 to about 0.97 mm. The distance between adjacent drainage holes 132*b*, specifically the linear distance between the closest outer edges of adjacent drainage holes 132*b*, 1232 when the coils are straightened, can be about 15 mm±2.5 mm, or about 22.5±2.5 mm or more.

Figure 22A:
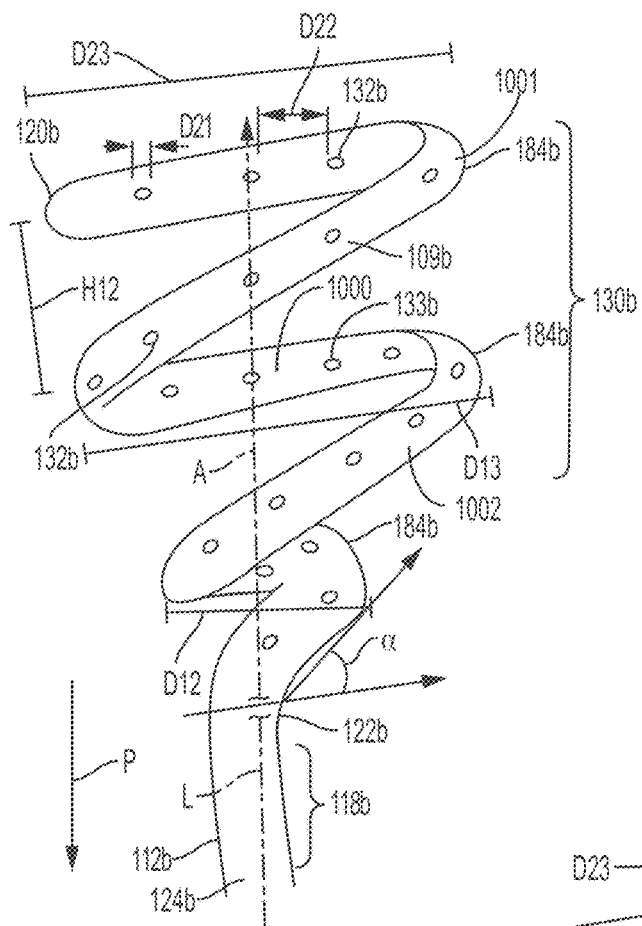
FIG. 22A is a schematic drawing of an example of a retention portion for a catheter according to an example of the present invention.
Figure 22B:
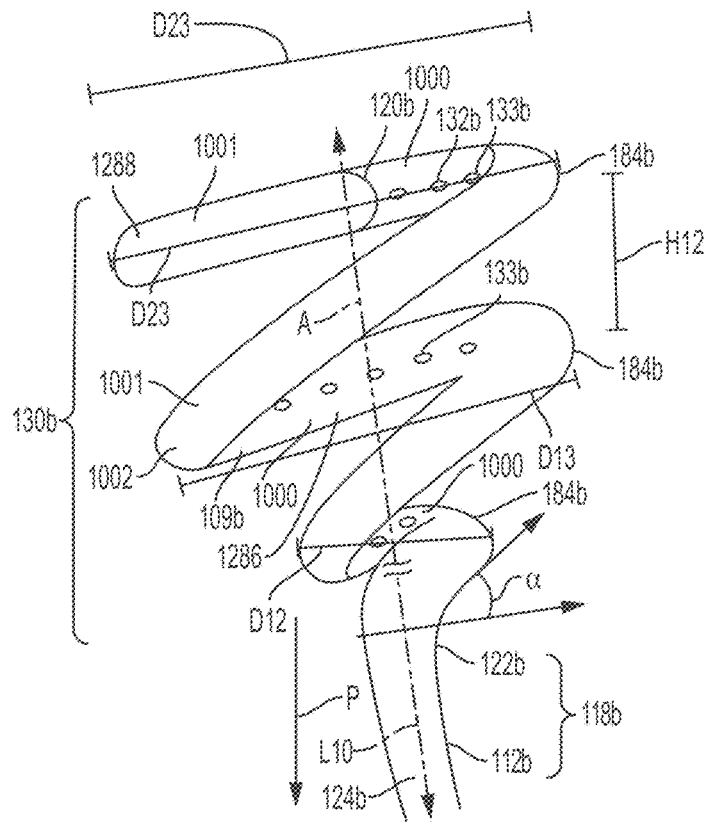
FIG. 22B is a schematic drawing of another example of a retention portion for a catheter according to an example of the present invention.
Figure 22F:
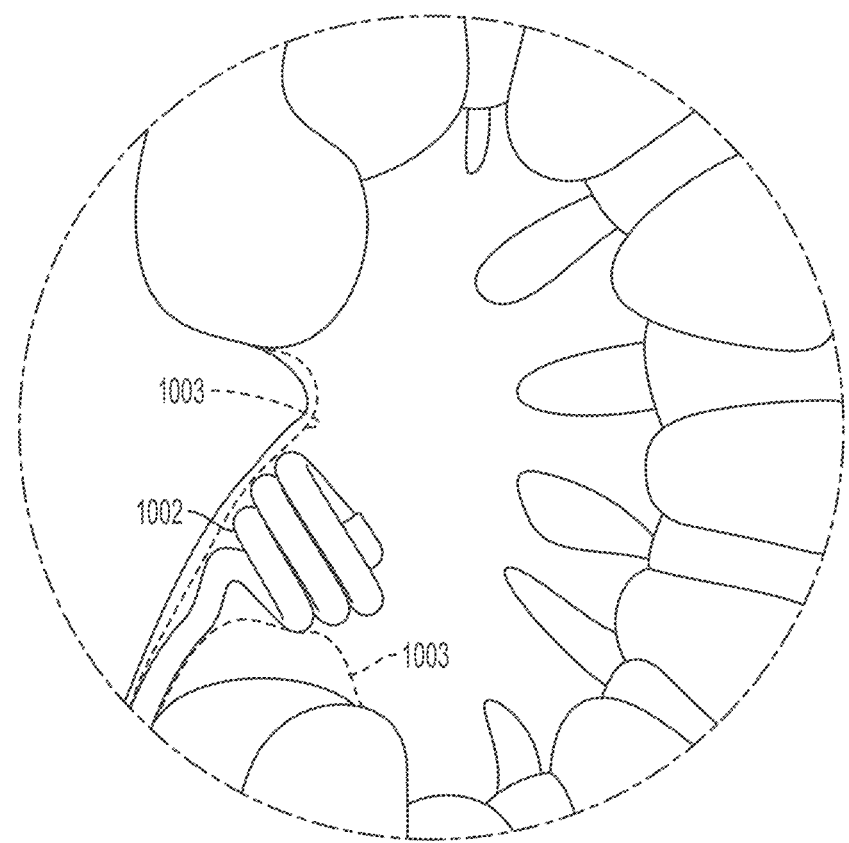
FIG. 22F is a an enlarged schematic drawing of a portion of a ureteral catheter according to the present invention positioned in the renal pelvis region of the kidney showing in phantom general changes believed to occur in the renal pelvis tissue in response to application of negative pressure through the ureteral catheter.

As shown in FIGS. 22A-22E, in another exemplary embodiment, the distal portion 118*b* of a drainage lumen 124*b* proximal to the retention portion 130*b* defines a straight or curvilinear central axis L. In some examples, at least a half or first coil 183*b* and a full or second coil 184*b* of the retention portion 130*b* extend about an axis A of the retention portion 130*b*. The first coil 183*b* initiates or begins at a point where the tube 122*b* is bent at an angle α ranging from about 15 degrees to about 75 degrees from the central axis L, as indicated by angle α, and preferably about 45 degrees. As shown in FIGS. 22A and 22B, prior to insertion in the body, the axis A can be coextensive with the longitudinal central axis L. In other examples, as shown in FIGS. 22C-22E, prior to insertion in the body, the axis A extends from and is curved or angled, for example at angle β, relative to the central longitudinal axis L.

In some examples, multiple coils 184*b* can have the same or different inner and/or outer diameter D10 and height H12 between adjacent coils 184*b*. In that case, the outer diameter D11 of each of the coils 184*b* may range from about 10 mm to about 30 mm. The height H12 between each of the adjacent coils 184*b* may range from about 3 mm to about 10 mm.

In other examples, the retention portion 130*b* is configured to be inserted in the tapered portion of the renal pelvis. For example, the outer diameter D11 of the coils 184*b* can increase toward the distal end 120*b* of the tube 122*b*, resulting in a helical structure having a tapered or partially tapered configuration. For example, the distal or maximum outer diameter D10 of the tapered helical portion ranges from about 10 mm to about 30 mm, which corresponds to the dimensions of the renal pelvis, and the outer diameter D11 of each adjacent coil can decrease closer to the proximal end 128*b* of the retention portion 130*b*. The overall height H10 of the retention portion 130*b* can range from about 10 mm to about 30 mm.

In some examples, the outer diameter D11 of each coil 184*b* and/or height H12 between each of the coils 184*b* can vary in a regular or irregular fashion. For example, the outer diameter D11 of coils or height H12 between adjacent coils can increase or decrease by a regular amount (e.g., about 10% to about 25% between adjacent coils 184*b*). For example, for a retention portion 130*b* having three coils (as shown, for example, in FIGS. 22A and 22B) an outer diameter D12 of a proximal-most coil or first coil 183*b* can be about 6 mm to 18 mm, an outer diameter D23 of a middle coil or second coil 185 can be about 8 mm to about 24 mm, and an outer diameter D23 of a distal-most or third coil 187 can be between about 10 mm and about 30 mm.

The retention portion 130b can further comprise the drainage perforations, holes or ports 132b disposed on or through the sidewall 109b of the catheter tube 122b on, or adjacent to, the retention portion 130b to permit urine waste to flow from the outside of the catheter tube 122b to the inside drainage lumen 124b of the catheter tube 122b. The position and size of the drainage ports 132b can vary depending upon the desired flow rate and configuration of the retention portion 130b. The diameter D21 of each of the drainage ports 132b can range independently from about 0.005 mm to about 1.0 mm. The spacing D22 between the closest edge of each of the drainage ports 132b can range independently from about 1.5 mm to about 5 mm. The drainage ports 132b can be spaced in any arrangement, for example, random, linear or offset. In some examples, the drainage ports 132b can be non-circular, and can have a surface area of about 0.00002 to 0.79 mm².

In some examples, as shown in FIG. 22A, the drainage ports 132b are located around the entire outer periphery 1002 or protective surface area 1001 of the sidewall 109b of the catheter tube 122b to increase an amount of fluid that can be drawn into the drainage lumen 124b (shown in FIGS. 22A and 22B). In other examples, as shown in FIGS. 22B-22E and 23A-23E, the drainage holes, ports or perforations 132b can be disposed essentially only or only on the protected surface areas or inner surface areas 1000 or radially inwardly facing side 1286 of the coils 184b to prevent occlusion or blockage of the drainage ports 132b, 1232 and the outwardly facing side 1288 of the coils may be essentially free of drainage ports 132b, 1232 or free of drainage ports 132b, 1232. The outer periphery 189b, 1002 or protective surface area 1001 or outer regions 192b of the helical coils 183b, 184b, 1280, 1282, 1284 can contact and support the kidney tissue 1003 (shown in FIG. 22F) to inhibit occlusion or blockage of protected drainage holes, ports or perforations 133b, 1233 positioned in protected surface areas or inner surface areas 1000 of the helical coils 183b, 184b, 1280, 1282, 1284. For example, when negative pressure is induced in the ureter and/or renal pelvis, mucosal tissue of the ureter and/or kidney may be drawn against the retention portion 130b and may occlude some drainage ports 134b on the outer periphery 189b, 1002 of the retention portion 130b. Drainage ports 133b, 1233 located on the radially inward side 1286 or protected surface areas or inner surface areas 1000 of the retention structure would not be appreciably occluded when such tissues 1003, 1004 contact the outer periphery 189b, 1002 or protective surface area 1001 or outer regions of the retention portion 130b. Further, risk of injury to the tissues from pinching or contact with the drainage ports 132b, 133b, 1233, or protected drainage holes, ports or perforations 133b, 1233 can be reduced or ameliorated.

With reference to FIGS. 22C and 22D, other examples of ureteral catheters 112b having a retention portion 130b comprising a plurality of coils 184b are illustrated. As shown in FIG. 22C, the retention portion 130b comprises three coils 184b extending about the axis A. The axis A is a curved arc extending from the central longitudinal axis L of the portion of the drainage lumen 181b proximal to the retention portion 130b. The curvature imparted to the retention portion 130b can be selected to correspond to the curvature of the renal pelvis, which comprises a cornucopia-shaped cavity.

As shown in FIG. 22D, in another exemplary embodiment, the retention portion 130b can comprise two coils 184b extending about an angled axis A. The angled axis A extends at an angle from a central longitudinal axis L, and is angled, as shown by angle β, relative to an axis generally perpendicular to the central axis L of the portion of the drainage lumen. The angle β can range from about 15 to about 75 degrees (e.g., about 105 to about 165 degrees relative to the central longitudinal axis L of the drainage lumen portion of the catheter 112b).

FIG. 22E shows another example of a ureteral catheter 112b. The retention portion comprises three helical coils 184b extending about an axis A. The axis A is angled, as shown by angle β, relative to the horizontal. As in the previously-described examples, the angle β can range from about 15 to about 75 degrees (e.g., about 105 to about 165 degrees relative to the central longitudinal axis L of the drainage lumen portion of the catheter 112b).

In some examples shown in FIGS. 23A-23E, the retention portion 1230 is integral with the tube 1222. In other examples, the retention portion 1230 can comprise a separate tubular member connected to and extending from the tube or drainage lumen 1224.

In some examples, the retention portion comprises a plurality of radially extending coils 184b. The coils 184b are configured in the shape of a funnel, and thereby form a funnel support. Some examples of coil funnel supports are shown in FIGS. 22A-23E.

In some examples, the at least one sidewall 119b of the funnel support comprises at least a first coil 183b having a first diameter and a second coil 184b having a second diameter, the first diameter being less than the second diameter. A maximum distance between a portion of a sidewall of the first coil and a portion of an adjacent sidewall of the second coil can range from about 0 mm to about 10 mm. In some examples, the first diameter of the first coil 183b ranges from about 1 mm to about 10 mm and the second diameter of the second coil 184b ranges from about 5 mm to about 25 mm. In some examples, the diameter of the coils increases toward a distal end of the drainage lumen, resulting in a helical structure having a tapered or partially tapered configuration. In some embodiments, the second coil 184b is closer to an end of the distal portion 118b of the drainage lumen 124b than is the first coil 183b. In some examples, the second coil 184b is closer to an end of the proximal portion 128b of the drainage lumen 124b than is the first coil 183b.

In some examples, the at least one sidewall 119b of the funnel support comprises an inwardly facing side 1286 and an outwardly facing side 1288, the inwardly facing side 1286 comprising at least one opening 133b, 1233 for permitting fluid flow into the drainage lumen, the outwardly facing side 1288 being essentially free of or free of openings, as discussed below. In some examples, the at least one opening 133b, 1233 has an area ranging from about 0.002 mm² to about 100 mm².

In some examples, the first coil 1280 comprises a sidewall 119b comprising a radially inwardly facing side 1286 and a radially outwardly facing side 1288, the radially inwardly facing side 1286 of the first coil 1280 comprising at least one opening 1233 for permitting fluid flow into the drainage lumen.

In some examples, the first coil 1280 comprises a sidewall 119b comprising a radially inwardly facing side 1286 and a radially outwardly facing side 1288, the radially inwardly facing side 1286 of the first coil 1280 comprising at least two openings 1233 for permitting fluid flow into the drainage lumen 1224.

In some examples, the first coil 1280 comprises a sidewall 119b comprising a radially inwardly facing side 1286 and a radially outwardly facing side 1288, the radially outwardly facing side 1288 of the first coil 1280 being essentially free of or free of one or more openings 1232.

In some examples, the first coil 1280 comprises a sidewall 119*b* comprising a radially inwardly facing side 1286 and a radially outwardly facing side 1288, the radially inwardly facing side 1286 of the first coil 1280 comprising at least one opening 1233 for permitting fluid flow into the drainage lumen 1224 and the radially outwardly facing side 1288 being essentially free of or free of one or more openings 1232.

Referring now to FIGS. 23A-23E, in some examples, the distal portion 1218 comprises an open distal end 1220 for drawing fluid into the drainage lumen 1224. The distal portion 1218 of the ureteral catheter 1212 further comprises a retention portion 1230 for maintaining the distal portion 1218 of the drainage lumen or tube 1222 in the ureter and/or kidney. In some examples, the retention portion 1230 comprises a plurality of radially extending coils 1280, 1282, 1284. The retention portion 1230 can be flexible and bendable to permit positioning of the retention portion 1230 in the ureter, renal pelvis, and/or kidney. For example, the retention portion 1230 is desirably sufficiently bendable to absorb forces exerted on the catheter 1212 and to prevent such forces from being translated to the ureters. Further, if the retention portion 1230 is pulled in the proximal direction P (shown in FIGS. 22A-22E) toward the patient's bladder, the retention portion 1230 can be sufficiently flexible to begin to unwind or be straightened so that it can be drawn through the ureter. In some examples, the retention portion 1230 is integral with the tube 1222. In other examples, the retention portion 1230 can comprise a separate tubular member connected to and extending from the tube or drainage lumen 1224. In some examples, the catheter 1212 comprises a radiopaque band 1234 (shown in FIG. 38A) positioned on the tube 1222 at a proximal end of the retention portion 1230. The radiopaque band 1234 is visible by fluoroscopic imaging during deployment of the catheter 1212. In particular, a user can monitor advancement of the band 1234 through the urinary tract by fluoroscopy to determine when the retention portion 1230 is in the renal pelvis and ready for deployment.

In some examples, the retention portion 1230 comprises perforations, drainage ports, or openings 1232 in a sidewall of the tube 1222. As described herein, a position and size of the openings 1232 can vary depending upon a desired volumetric flow rate for each opening and size constraints of the retention portion 1230. In some examples, a diameter D21 of each of the openings 1232 can range independently from about 0.05 mm to about 2.5 mm and have an area of about 0.002 mm² to about 5 mm². Openings 1232 can be positioned extending along on a sidewall 119*b* of the tube 1222 in any direction desired, such as longitudinal and/or axial. In some examples, spacing between the closest adjacent edge of each of the openings 1232 can range from about 1.5 mm to about 15 mm Fluid passes through one or more of the perforations, drainage ports, or openings 1232 and into the drainage lumen 1234. Desirably, the openings 1232 are positioned so that they are not occluded by tissues 1003 of the ureters or kidney when negative pressure is applied to the drainage lumen 1224. For example, as described herein, openings 1233 can be positioned on interior portions or protected surfaces areas 1000 of coils or other structures of the retention portion 1230 to avoid occlusion of the openings 1232, 1233. In some examples, the middle portion 1226 and proximal portion 1228 of the tube 1222 can be essentially free of or free from perforations, ports, openings or openings to avoid occlusion of openings along those portions of the tube 1222. In some examples, a portion 1226, 1228 which is essentially free from perforations or openings comprises substantially fewer openings 1232 than other portions such as distal portion 1218 of the tube 1222. For example, a total area of openings 1232 of the distal portion 1218 may be greater than or substantially greater than a total area of openings of the middle portion 1226 and/or the proximal portion 1228 of the tube 1222.

In some examples, the openings 1232 are sized and spaced to improve fluid flow through the retention portion 1230. In particular, the present inventors have discovered that when a negative pressure is applied to the drainage lumen 1224 of the catheter 1212 a majority of fluid is drawn into the drainage lumen 1224 through proximal-most perforations or openings 1232. In order to improve flow dynamics so that fluid is also received through more distal openings and/or through the open distal end 1220 of the tube 1222, larger size or a greater number of openings 1232 can be provided towards the distal end 1220 of the retention portion 1230. For example, a total area of openings 1232 on a length of tube 1222 near a proximal end 1228 of the retention portion 1230 may be less than a total area of openings 1232 of a similar sized length of the tube 1222 located near the open distal end 1220 of the tube 1222. In particular, it may be desirable to produce a flow distribution through the drainage lumen 1224 in which less than 90%, preferably less than 70%, and, more preferably, less than 55% of fluid flow is drawn into the drainage lumen 1224 through a single opening 1232 or a small number of openings 1232 positioned near the proximal end 1228 of the retention portion 1230.

In many examples, the openings 1232 are generally a circular shape, although triangular, elliptical, square-shaped, diamond shaped, and any other opening shapes may also be used. Further, as will be appreciated by one of ordinary skill in the art, a shape of the openings 1232 may change as the tube 1222 transitions between an uncoiled or elongated position and a coiled or deployed position. It is noted that while the shape of the openings 1232 may change (e.g., the orifices may be circular in one position and slightly elongated in the other position), the area of the openings 1232 is substantially similar in the elongated or uncoiled position compared to the deployed or coiled position.

Helical Coil Retention Portions

Referring now to FIGS. 23A-23E, an exemplary retention portion 1230 comprises helical coils 1280, 1282, 1284. In some examples, the retention portion 1230 comprises a first or half coil 1280 and two full coils, such as a second coil 1282 and a third coil 1284. As shown in FIGS. 23A-23D, in some examples, the first coil 1280 comprises a half coil extending from 0 degrees to 180 degrees around a curvilinear central axis A of the retention portion 1230. In some examples, as shown the curvilinear central axis A is substantially straight and co-extensive with a curvilinear central axis of the tube 1222. In other examples, the curvilinear central axis A of the retention portion 1230 can be curved giving the retention portion 1230, for example, a cornucopia shape. The first coil 1280 can have a diameter D12 of about 1 mm to 20 mm and preferably about 8 mm to 10 mm. The second coil 1282 can be a full coil extending from 180 degrees to 540 degrees along the retention portion 1230 having a diameter D13 of about 5 mm to 50 mm, preferably about 10 mm to 20 mm, and more preferably about 14 mm±2 mm. The third coil 1284 can be a full coil extending between 540 degrees and 900 degrees and having a diameter D23 of between 5 mm and 60 mm, preferably about 10 mm to 30 mm, and more preferably about 18 mm±2 mm. In other examples, multiple coils 1282, 1284 can have the same inner and/or outer diameter. For example, an outer diameter of the full coils 1282, 1284, can each be about 18±2 mm.

In some examples, an overall height H10 of the retention portion 1230 ranges from about 10 mm to about 30 mm and, preferably about 18±2 mm A height H12 of a gap between adjacent coils 1284, namely between the sidewall 1219 of the tube 1222 of the first coil 1280 and the adjacent sidewall 1221 of the tube 122 of the second coil 1282 is less than 3.0 mm, preferably between about 0.25 mm and 2.5 mm, and more preferably between about 0.5 mm and 2.0 mm.

The retention portion 1230 can further comprise a distal-most curved portion 1290. For example, the distal most portion 1290 of the retention portion 1230, which comprises the open distal end 1220 of the tube 1222, can be bent inwardly relative to a curvature of the third coil 1284. For example, a curvilinear central axis X1 (shown in FIG. 23D) of the distal-most portion 1290 can extend from the distal end 1220 of the tube 1222 towards the curvilinear central axis A of the retention portion 1230.

The retention portion 1230 is capable of moving between a contracted position, in which the retention portion 1230 is straight for insertion into the patient's urinary tract, and the deployed position, in which the retention portion 1230 comprises the helical coils 1280, 1282, 1284. Generally, the tube 1222 is naturally biased toward the coiled configuration. For example, an uncoiled or substantially straight guidewire can be inserted through the retention portion 1230 to maintain the retention portion 1230 in its straight contracted position, as shown for example in FIGS. 24-27. When the guidewire is removed, the retention portion 1230 naturally transitions to its coiled position.

In some examples, the openings 1232, 1233 are disposed essentially only or only on a radially inwardly facing side 1286 or protected surface area or inner surface area 1000 of the coils 1280, 1282, 1284 to prevent occlusion or blockage of the openings 1232, 1233. A radially outwardly facing side 1288 of the coils 1280, 1282, 1284 may be essentially free of the openings 1232. In similar examples, a total area of openings 1232, 1233 on the inwardly facing side 1286 of the retention portion 1230 can be substantially greater than a total area of openings 1232 on the radially outwardly facing side 1288 of the retention portion 1230. Accordingly, when negative pressure is induced in the ureter and/or renal pelvis, mucosal tissue of the ureter and/or kidney may be drawn against the retention portion 1230 and may occlude some openings 1232 on the outer periphery 1002 or protective surface area 1001 of the retention portion 1230. However, openings 1232 located on the radially inward side 1286 or protected surface area or inner surface area 1000 of the retention portion 1230 are not appreciably occluded when such tissues contacts the outer periphery 1002 or protective surface area 1001 of the retention portion 1230. Therefore, risk of injury to the tissues from pinching or contact with the drainage openings 1232 can be reduced or eliminated.

Retention Portions with Variable Hole or Opening Distribution

In some examples, the first coil 1280 can be free or essentially free from openings 1232. For example, a total area of openings 1232 on the first coil 1280 can be less than or substantially less than a total area of openings 1232 of the full coils 1282, 1284. Examples of various arrangements of openings or openings 1232, which could be used for a coiled retention portion (such as coiled retention portion 1230 shown in FIGS. 23A-23E), are illustrated in FIGS. 24-27. As shown in FIGS. 24-27, a retention portion 1330 is depicted in its uncoiled or straight position, as occurs when a guidewire is inserted through the drainage lumen.

Figure 24:
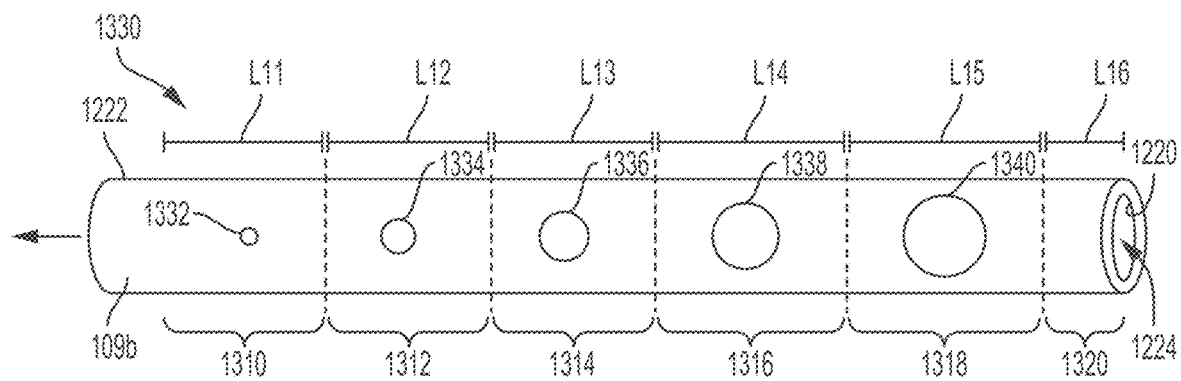
FIG. 24 is a schematic drawing of a retention portion of a catheter in a constrained or linear position according to an example of the present invention.

An exemplary retention portion 1330 is illustrated in FIG. 24. In order to more clearly describe positioning of openings of the retention portion 1330, the retention portion 1330 is referred to herein as being divided into a plurality of sections or perforated sections, such as a proximal-most or first section 1310, a second section 1312, a third section 1314, a fourth section 1316, a fifth section 1318, and a distal-most or sixth section 1320. One of ordinary skill in the art would understand that fewer or additional sections can be included, if desired. As used herein, "section" refers to a discrete length of the tube 1322 within the retention portion 1330. In some examples, sections are equal in length. In other examples, some sections can have the same length, and other sections can have a different length. In other examples, each section has a different length. For example, each of sections 1310, 1312, 1314, 1316, 1318 and 1320 can have a length L11-L16, respectively, ranging from about 5 mm to about 35 mm, and preferably from about 5 mm to 15 mm.

In some examples, each section 1310, 1312, 1314, 1316, 1318 and 1320 comprises one or more openings 1332. In some examples, each section each comprises a single opening 1332. In other examples, the first section 1310 comprises a single opening 1332 and other sections comprise multiple openings 1332. In other examples, different sections comprise one or more openings 1332, each of the opening(s) having a different shape or different total area.

In some examples, such as the retention portion 1230 shown in FIGS. 23A-23E, the first or half coil 1280, which extends from 0 to about 180 degrees of the retention portion 1230 can be free from or essentially free from openings. The second coil 1282 can comprise the first section 1310 extending between about 180 and 360 degrees. The second coil 1282 can also comprise the second and third sections 1312, 1314 positioned between about 360 degrees and 540 degrees of the retention portion 1230. The third coil 1284 can comprise the fourth and fifth sections 1316, 1318 positioned between about 540 degrees and 900 degrees of the retention portion 1230.

In some examples, the openings 1332 can be sized such that a total area of openings of the first section 1310 is less than a total area of openings of the adjacent second section 1312. In a similar manner, if the retention portion 1330 further comprises a third section 1314, then openings of a third section 1314 can have a total area that is greater than the total area of the openings of the first section 1310 or the second section 1312. Openings of the forth 1316, fifth 1318, and sixth 1320 sections may also have a gradually increasing total area and/or number of openings to improve fluid flow through the tube 1222.

As shown in FIG. 24, the retention portion 1230 of the tube comprises five sections 1310, 1312, 1314, 1316, 1318, each of which comprises a single opening 1332, 1334, 1336, 1338, 1340. The retention portion 1330 also comprises a sixth section 1320 which comprises the open distal end 1220 of the tube 1222. In this example, the opening 1332 of the first section 1310 has the smallest total area. For example, a total area of the opening 1332 of the first section can range from about 0.002 $mm^2$ and about 2.5 $mm^2$, or about 0.01 $mm^2$ and 1.0 $mm^2$, or about 0.1 $mm^2$ and 0.5 $mm^2$. In one example, the opening 1332 is about 55 mm from the distal end 1220 of the catheter, has a diameter of 0.48 mm, and an area of 0.18 $mm^2$. In this example, a total area of openings 1334 of the second section 1312 is greater than the total area of openings 1232 of the first section 1310 and can range in size from about 0.01 $mm^2$ to about 1.0 $mm^2$. The third 1336, fourth 1338, and fifth 1350 openings can also range in size from about 0.01 mm² to about 1.0 mm². In one example, the second opening 1334 is about 45 mm from the distal end of the catheter 1220, has a diameter of about 0.58 mm, and an area of about 0.27 mm². The third opening 1336 can be about 35 mm from the distal end of the catheter 1220 and have a diameter of about 0.66 mm. The fourth opening 1338 can be about 25 mm from the distal end 1220 and have a diameter of about 0.76 mm. The fifth opening 1340 can be about 15 mm from the distal end 1220 of the catheter and have a diameter of about 0.889 mm. In some examples, the open distal end 1220 of the tube 1222 has the largest opening having an area ranging from about 0.5 mm² to about 5.0 mm² or more. In one example, the open distal end 1220 has a diameter of about 0.97 mm and an area of about 0.74 mm².

As described herein, openings 1332, 1334, 1336, 1338, 1340 can be positioned and sized so that a volumetric flow rate of fluid passing through the first opening 1332 more closely corresponds to a volumetric flow rate of openings of more distal sections, when negative pressure is applied to the drainage lumen 1224 of the catheter 1212, for example from the proximal portion 1228 of the drainage lumen 1224. As described above, if each opening were the same area, then, when negative pressure is applied to the drainage lumen 1224, the volumetric flow rate of fluid passing through the proximal-most of first opening 1332 would be substantially greater than a volumetric flow rate of fluid passing through openings 1334 closer to the distal end 1220 of the retention portion 1330. While not intending to be bound by any theory, it is believed that when negative pressure is applied, the pressure differential between the interior of the drainage lumen 1224 and external to the drainage lumen 1224 is greater in the region of the proximal-most opening and decreases at each opening moving towards the distal end of the tube. For example, sizes and positions of the openings 1332, 1334, 1336, 1338, 1340 can be selected so that a volumetric flow rate for fluid which flows into openings 1334 of the second section 1312 is at least about 30% of a volumetric flow rate of fluid which flows into the opening(s) 1332 of the first section 1310. In other examples, a volumetric flow rate for fluid flowing into the proximal-most or first section 1310 is less than about 60% of a total volumetric flow rate for fluid flowing through the proximal portion of the drainage lumen 1224. In other examples, a volumetric flow rate for fluid flowing into openings 1332, 1334 of the two proximal-most sections (e.g., the first section 1310 and the second section 1312) can be less than about 90% of a volumetric flow rate of fluid flowing through the proximal portion of the drainage lumen 1224 when a negative pressure, for example a negative pressure of about −45 mmHg, is applied to the proximal end of the drainage lumen.

As will be appreciated by one of ordinary skill in the art, volumetric flow rate and distribution for a catheter or tube comprising a plurality of openings or perforations can be directly measured or calculated in a variety of different ways. As used herein, "volumetric flow rate" means actual measurement of the volumetric flow rate downstream and adjacent to each opening or using a method for "Calculated Volumetric Flow Rate" described below.

For example, actual measurement of the dispersed fluid volume over time can be used to determine the volumetric flow rate through each opening 1332, 1334, 1336, 1338, 1340. In one exemplary experimental arrangement, a multi-chamber vessel comprising individual chambers sized to receive sections 1310, 1312, 1314, 1316, 1318, 1320 of the retention portion 1330 could be sealed around and enclose the retention portion 1330. Each opening 1332, 1334, 1336, 1338, 1340 could be sealed in one of the chambers. An amount of fluid volume drawn from the respective chamber into the tube 3222 through each opening 1332, 1334, 1336, 1338, 1340 could be measured to determine an amount of fluid volume drawn into each opening over time when a negative pressure is applied. The cumulative amount of fluid volume collected in the tube 3222 by a negative pressure pump system would be equivalent to the sum of fluid drawn into each opening 1332, 1334, 1336, 1338, 1340.

Alternatively, volumetric fluid flow rate through different openings 1332 1334, 1336, 1338, 1340 can be calculated mathematically using equations for modeling fluid flow through a tubular body. For example, volumetric flow rate of fluid passing through openings 1332 1334, 1336, 1338, 1340 and into the drainage lumen 1224 can be calculated based on a mass transfer shell balance evaluation.

Figure 25:
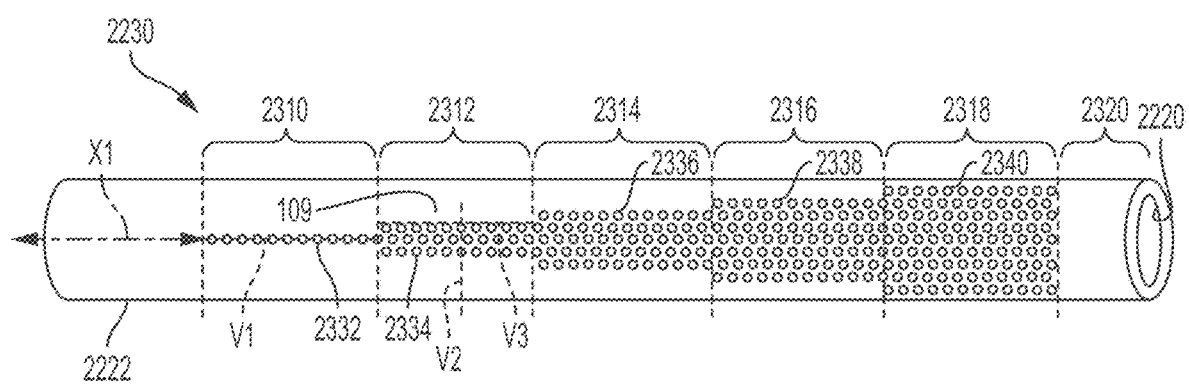
FIG. 25 is a schematic drawing of another example of a retention portion of a catheter in a constrained or linear position according to an example of the present invention.

Another exemplary retention portion 2230 with openings 2332, 2334, 2336, 2338, 2340 is illustrated in FIG. 25. As shown in FIG. 25, the retention portion 2230 comprises numerous smaller perforations or openings 2332, 2334, 2336, 2338, 2340. Each of the openings 2332, 2334, 2336, 2338, 2340 can have a substantially identical cross-sectional area or one or more openings 2332, 2334, 2336, 2338, 2340 can have different cross-sectional areas. As shown in FIG. 25, the retention portion 2330 comprises six sections 2310, 2312, 2314, 2316, 2318, 2320, such as are described above, wherein each section comprises a plurality of the openings 2332, 2334, 2336, 2338, 2340. In the example shown in FIG. 25, a number of openings 2332, 2334, 2336, 2338, 2340 per section increases towards the distal end 2220 of the tube 2222, such that a total area of openings 1332 in each section increases compared to a proximally adjacent section.

As shown in FIG. 25, openings 2332 of the first section 2310 are arranged along a first virtual line V1, which is substantially parallel to a central axis X1 of the retention portion 2230. Openings 2334, 2336, 2338, 2340 of the second 2312, third 2314, fourth 2316, and fifth 2318 sections, respectively, are positioned on the sidewall of the tube 2222 in a gradually increasing number of rows, such that openings 2334, 2336, 2338, 2340 of these sections also line up around a circumference of the tube 2222. For example, some of the openings 2334 of the second section 2312 are positioned such that a second virtual line V2 extending around a circumference of the sidewall of the tube 2222 contacts at least a portion of multiple openings 2334. For example, the second section 2312 can comprise two or more rows of perforations or openings 2334, in which each opening 2334 has an equal or different cross-sectional area. Further, in some examples, at least one of the rows of the second section 2312 can be aligned along a third virtual line V3, which is parallel with the central axis X1 of the tube 2222, but is not co-extensive with the first virtual line V1. In a similar manner, the third section 2314 can comprise five rows of perforations or openings 2336, in which each opening 2336 has an equal or different cross-sectional area; the fourth section 2316 can comprise seven rows of perforations or openings 2338; and the fifth section 2318 can comprise nine rows of perforations or openings 2340. As in previous examples, the sixth section 2320 comprises a single opening, namely the open distal end 2220 of the tube 2222. In the example of FIG. 25, each of the openings has the same area, although the area of one or more openings can be different if desired.

Figure 26:
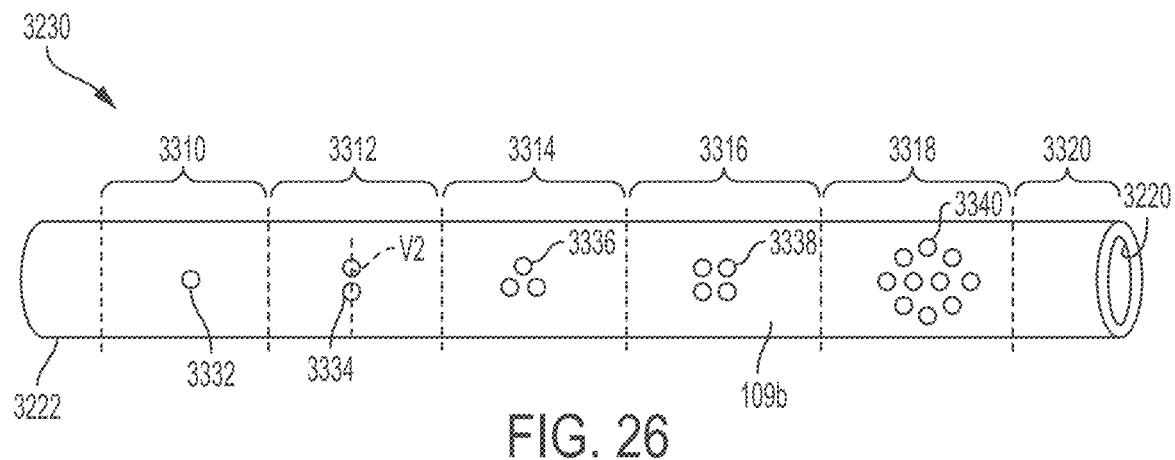
FIG. 26 is a schematic drawing of another example of a retention portion of a ureteral catheter in a constrained or linear position according to an example of the present invention.

Another exemplary retention portion 3230 with openings 3332, 3334, 3336, 3338, 3340 is illustrated in FIG. 26. The retention portion 3230 of FIG. 26 comprises a plurality of similarly sized perforations or openings 3332, 3334, 3336, 3338, 3340. As in previous examples, the retention portion 3230 can be divided into six sections 3310, 3312, 3314, 3316, 3318, 3320, each of which comprises at least one opening. The proximal-most or first section 3310 comprises one opening 3332. The second section 3312 comprises two openings 3334 aligned along the virtual line V2 extending around a circumference of the sidewall of the tube 3222. The third section 3314 comprises a grouping of three openings 3336, positioned at vertices of a virtual triangle. The fourth section 3316 comprises a grouping of four openings 3338 positioned at corners of a virtual square. The fifth section 3318 comprises ten openings 3340 positioned to form a diamond shape on the sidewall of the tube 3222. As in previous examples, the sixth section 3320 comprises a single opening, namely the open distal end 3220 of the tube 3222. The area of each opening can range from about 0.001 mm² and about 2.5 mm². In the example of FIG. 26, each of the openings has the same area, although the area of one or more openings can be different if desired.

Figure 27:
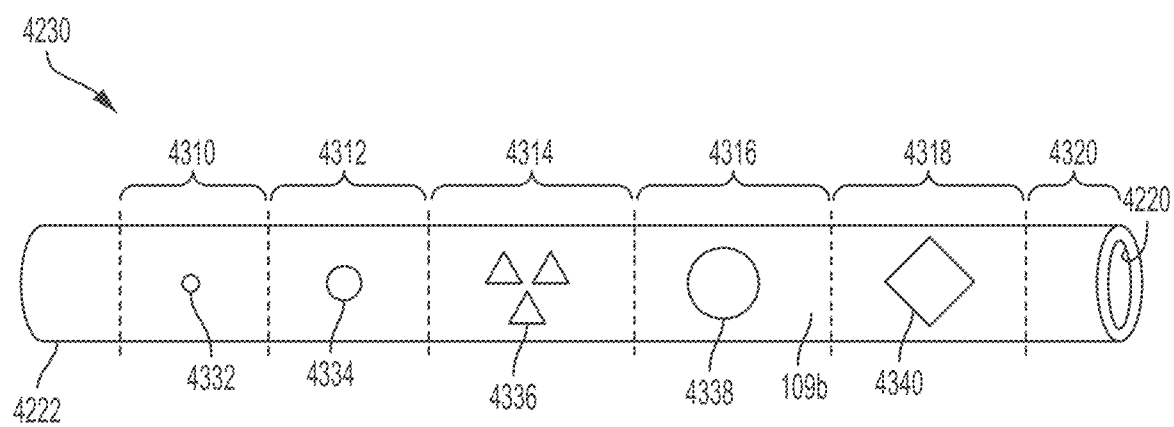
FIG. 27 is a schematic drawing of another example of a retention portion of a catheter in a constrained or linear position according to an example of the present invention.

Another exemplary retention portion 4230 with openings 4332, 4334, 4336, 4338, 4340 is illustrated in FIG. 27. The openings 4332 4334, 4336, 4338, 4340 of the retention portion 4330 have different shapes and sizes. For example, the first section 4310 comprises a single circular opening 4332. The second section 4312 has a circular opening 4334 with a larger cross sectional area than the opening 4332 of the first section 4310. The third section 4314 comprises three triangular shaped openings 4336. The fourth section 4316 comprises a large circular opening 4338. The fifth section 4318 comprises a diamond shaped opening 4340. As in previous examples, the sixth section 4320 comprises the open distal end 4220 of the tube 4222. FIG. 27 illustrates one example of an arrangement of different shapes of openings in each section. It is understood that the shape of each opening in each section can be independently selected, for example the first section 4310 can have one or more diamond-shaped openings or other shapes. The area of each opening can be the same or different and can range from about 0.001 mm² and about 2.5 mm².

FIGS. 28A-50B show additional examples of ureteral catheters 5000 comprising distal portions 5004 comprising a retention portion 5012 for maintaining the distal portion 5004 of a drainage lumen or tube 5002 of the catheter 5000 in the ureter, renal pelvis, and/or kidney. As in previous examples, the retention portions 5012 can be flexible and/or bendable to permit positioning of the retention portions 5012 in the ureter, renal pelvis, and/or kidney. For example, the retention portions 5012 may desirably be sufficiently bendable to absorb forces exerted on the catheter 5000 and to prevent such forces from being translated to the ureters. Further, if the retention portions 5012 are pulled in a proximal direction toward the patient's bladder, the retention portions 5012 can be sufficiently flexible to begin to unwind, straightened or collapsed so that it can be drawn through the ureter.

In some examples, the retention portion comprises a funnel support. Non-limiting examples of different shapes of funnel supports are shown in FIGS. 28A-50B, which are discussed in detail below. Generally, the funnel support comprises at least one sidewall. The at least one sidewall of the funnel support comprises a first diameter and a second diameter, the first diameter being less than the second diameter. The second diameter of the funnel support is closer to an end of the distal portion of the drainage lumen than the first diameter.

Figure 28A:
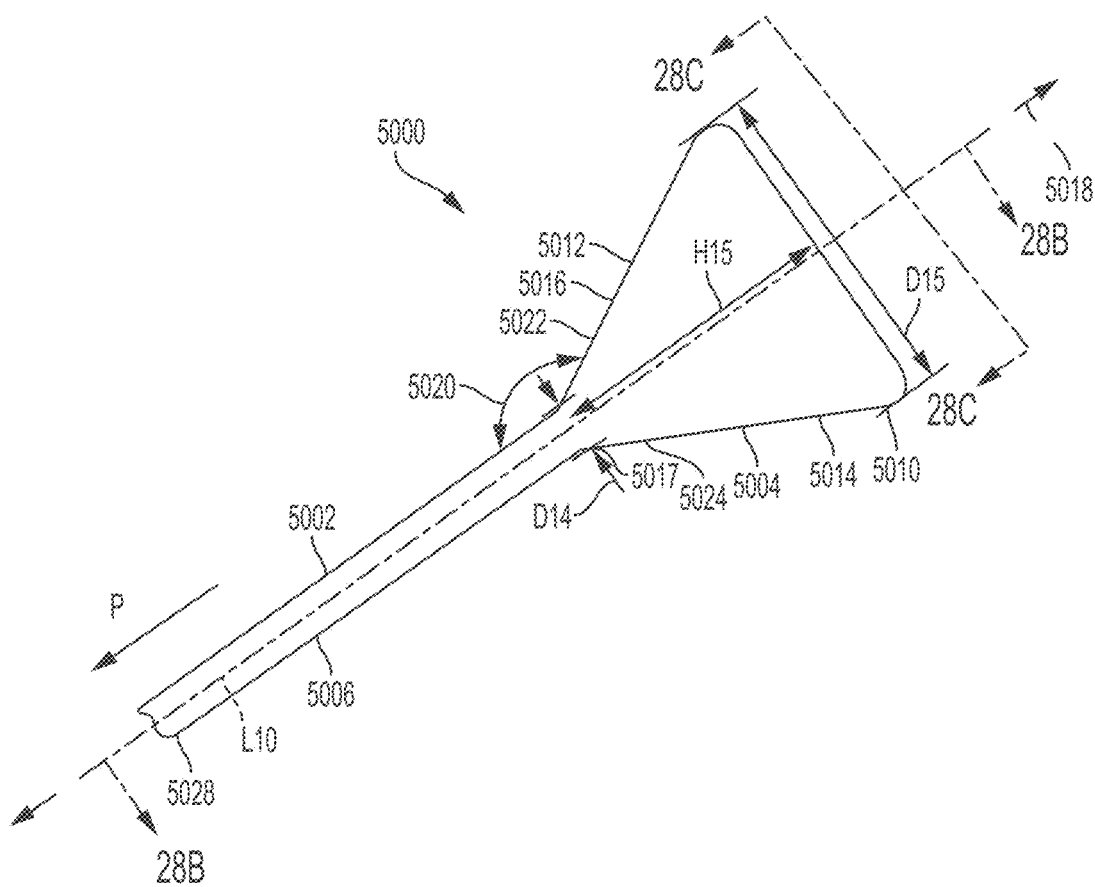
FIG. 28A is side elevational view of a retention portion of a catheter according to an example of the present invention.
Figure 28B:
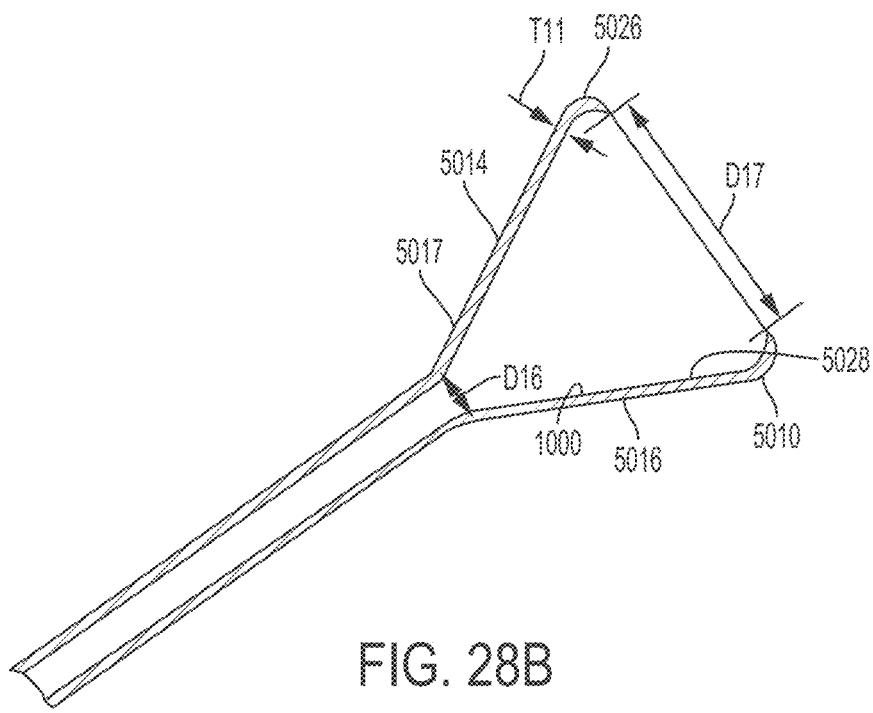
FIG. 28B is cross-sectional view of the retention portion of the catheter of FIG. 28A taken along lines B-B of FIG. 28A.
Figure 28C:
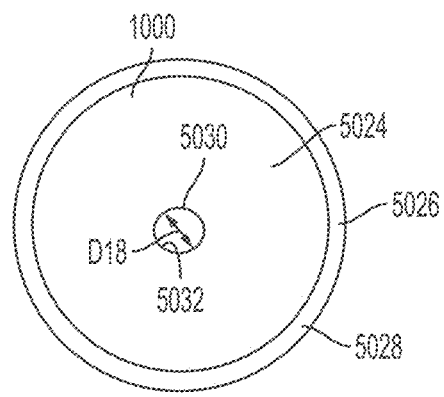
FIG. 28C is a top plan view of the retention portion of the catheter of FIG. 28A taken along lines C-C of FIG. 28A.
Figure 28D:
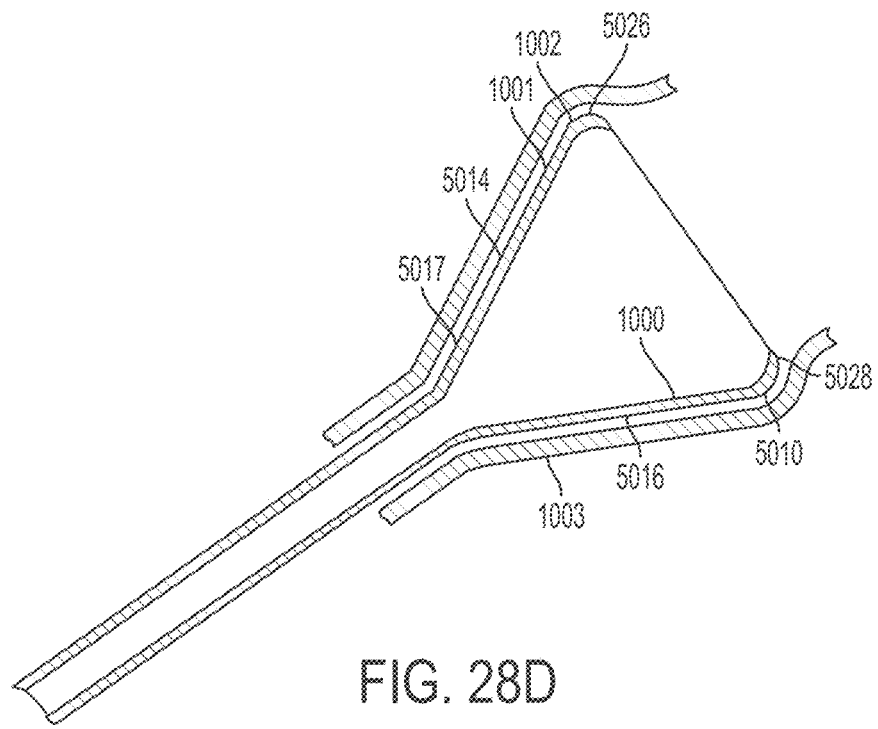
FIG. 28D is cross sectional view of a retention portion of a ureteral catheter according to an example of the present invention positioned in the renal pelvis region of the kidney showing in general changes believed to occur in the renal pelvis tissue in response to application of negative pressure through the ureteral catheter.

Referring now to FIGS. 28A-28D, in some examples, the retention portion 5012 comprises a funnel-shaped support 5014. The funnel-shaped support 5014 comprises at least one sidewall 5016. As shown in FIGS. 28C and 28D, the outer periphery 1002 or protective surface area 1001 comprises the outer surface or outer wall 5022 of the funnel-shaped support 5014. The one or more drainage holes, ports or perforations, or interior opening 5030, are disposed on the protected surface areas or inner surface areas 1000 of the funnel-shaped support 5014. As shown in FIGS. 28C and 28D, there is a single drainage hole 5030 at the base portion 5024 of the funnel-shaped support, although multiple holes can be present.

The at least one sidewall 5016 of the funnel support 5014 comprises a first (outer) diameter D14 and a second (outer) diameter D15, the first outer diameter D14 being less than the second outer diameter D15. The second outer diameter D15 of the funnel support 5014 is closer to the distal end 5010 of the distal portion 5004 of the drainage lumen 5002 than is the first outer diameter D14. In some examples the first outer diameter D14 can range from about 0.33 mm to 4 mm (about 1 Fr to about 12 Fr (French catheter scale)), or about 2.0±0.1 mm. In some examples, the second outer diameter D15 is greater than first outer diameter D14 and can range from about 1 mm to about 60 mm, or about 10 mm to 30 mm, or about 18 mm±2 mm.

In some examples, the at least one sidewall 5016 of the funnel support 5014 can further comprise a third diameter D17 (shown in FIG. 28B), the third diameter D17 being less than the second outer diameter D15. The third diameter D17 of the funnel support 5014 is closer to the distal end 5010 of the distal portion 5004 of the drainage lumen 5002 than is the second diameter D15. The third diameter D17 is discussed in greater detail below regarding the lip. In some examples, the third diameter D17 can range from about 0.99 mm to about 59 mm, or about 5 mm to about 25 mm.

The at least one sidewall 5016 of the funnel support 5014 comprises a first (inner) diameter D16. The first inner diameter D16 is closer to the proximal end 5017 of the funnel support 5014 than is the third diameter D17. The first inner diameter D16 is less than the third diameter D17. In some examples the first inner diameter D16 can range from about 0.05 mm to 3.9 mm, or about 1.25±0.75 mm.

Figure 33A:
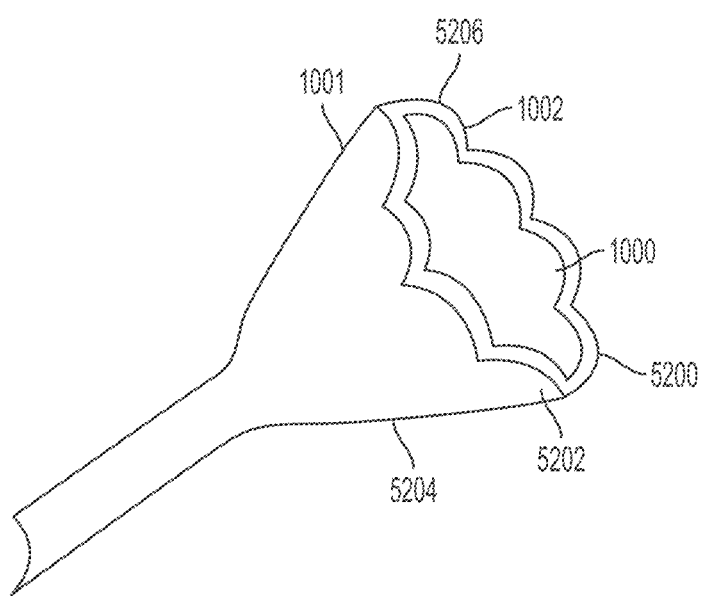
FIG. 33A is a perspective view of a retention portion of another catheter according to an example of the present invention.

In some examples, an overall height H15 of the sidewall 5016 along a central axis 5018 of the retention portion 5012 can range from about 1 mm to about 25 mm. In some examples, the height H15 of the sidewall can vary at different portions of the sidewall, for example if the sidewall has an undulating edge or rounded edges such as is shown in FIG. 33A. In some examples, the undulation can range from about 0.01 mm to about 5 mm or more, if desired.

In some examples, as shown in FIGS. 28A-50B, the funnel support 5014 can have a generally conical shape. In some examples, the angle 5020 between the outer wall 5022 near the proximal end 5017 of the funnel support 5014 and the drainage lumen 5002 adjacent to the base portion 5024 of the funnel support 5014 can range from about 100 degrees to about 180 degrees, or about 100 degrees to about 160 degrees, or about 120 degrees to about 130 degrees. The angle 5020 may vary at different positions about the circumference of the funnel support 5014, such as is shown in FIG. 31A, in which the angle 5020 ranges from about 140 degrees to about 180 degrees.

Figure 31A:
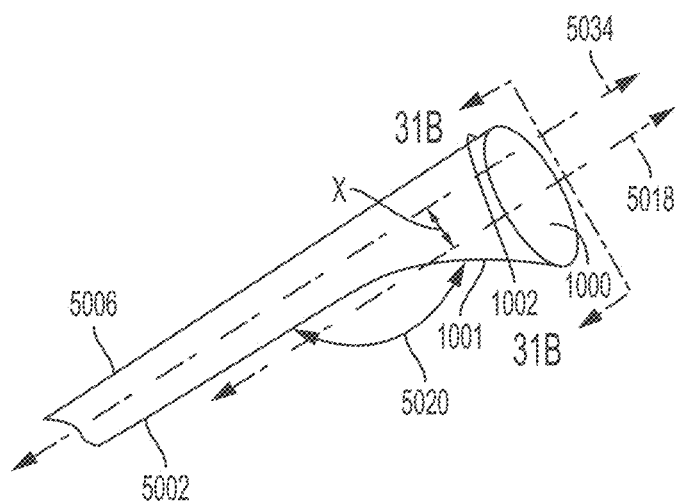
FIG. 31A is a perspective view of a retention portion of another ureteral catheter according to an example of the present invention.
Figure 31B:
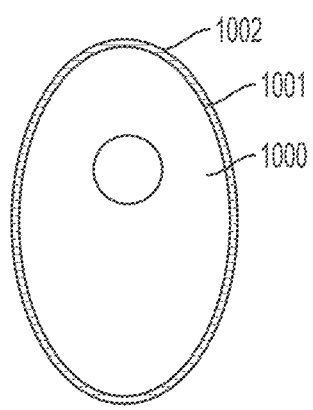
FIG. 31B is a top plan view of the retention portion of the catheter of FIG. 31A taken along lines 31B-31B of FIG. 31A.
Figure 32A:
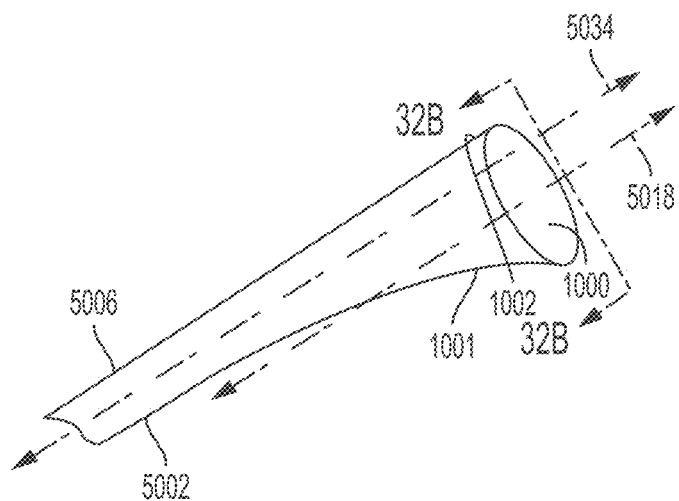
FIG. 32A is a perspective view of a retention portion of another catheter according to an example of the present invention.
Figure 32B:
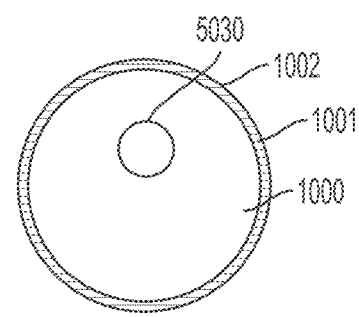
FIG. 32B is a top plan view of the retention portion of the catheter of FIG. 32A taken along lines 32B-32B of FIG. 32A.
Figures 37A, 37B:
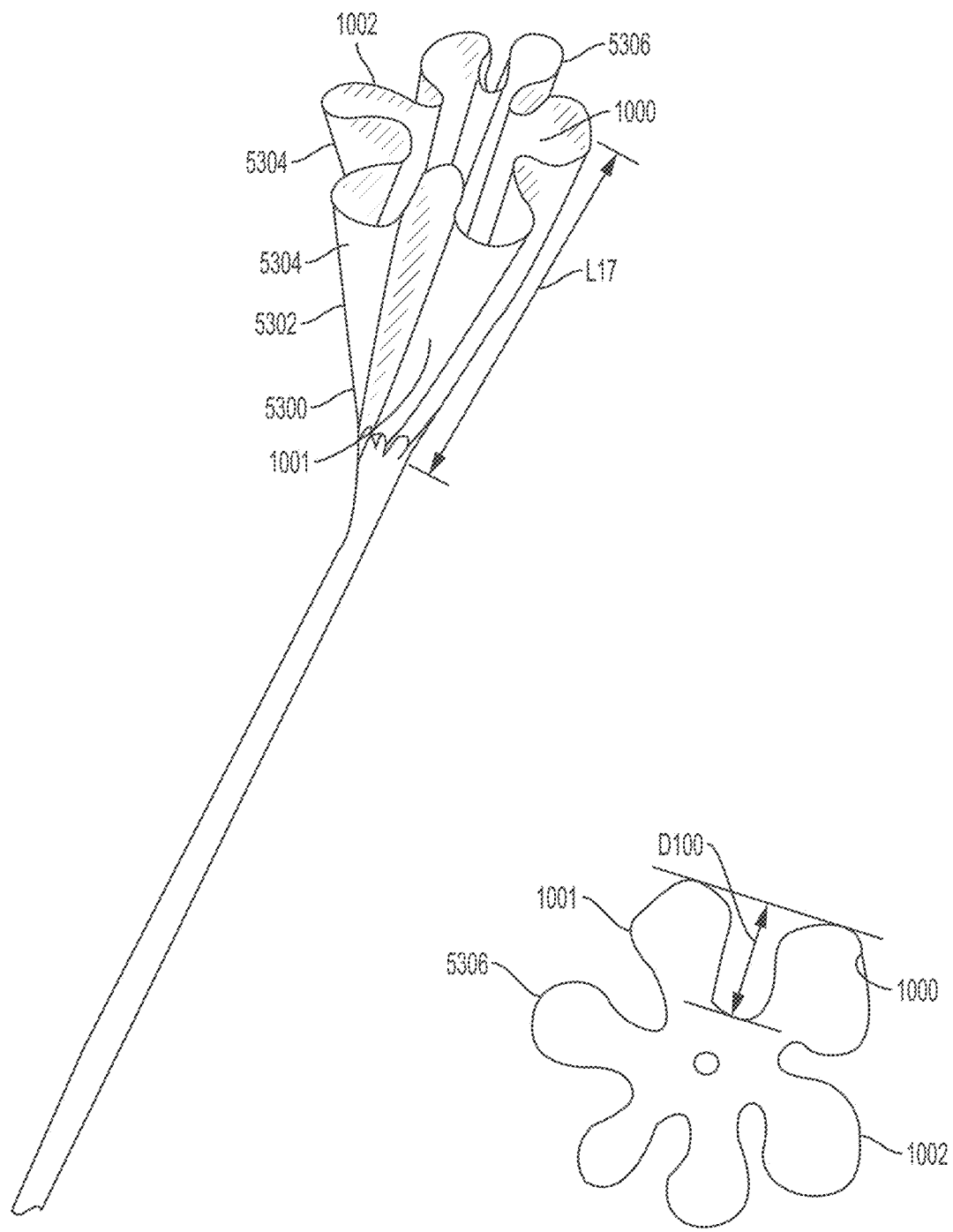
FIG. 37A is a perspective view of a retention portion of another catheter according to an example of the present invention.
FIG. 37B is a top plan view of the retention portion of the catheter of FIG. 37A.
Figure 40:
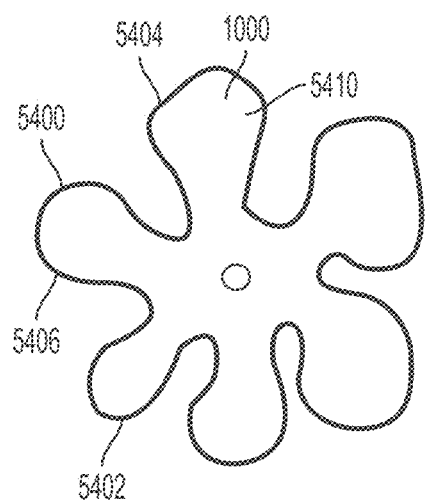
FIG. 40 is a top plan view of the retention portion of the catheter of FIG. 39.

In some examples, the edge or lip 5026 of the distal end 5010 of the at least one sidewall 5016 can be rounded, square, or any shape desired. The shape defined by the edge 5026 can be, for example, circular (as shown in FIGS. 28C and 32B), elliptical (as shown in FIG. 31B), lobes (as shown in FIGS. 37B, 38B and 40), square, rectangular, or any shape desired.

Referring now to FIGS. 37A-40, there is shown a funnel support 5300 wherein the at least one sidewall 5302 comprises a plurality of lobe-shaped longitudinal folds 5304 along the length L17 of the sidewall 5302. The outer periphery 1002 or protective surface area 1001 comprises the outer surface or outer wall 5032 of the funnel-shaped support 5300. The one or more drainage holes, ports or perforations, or interior opening, are disposed on the protected surface areas or inner surface areas 1000 of the funnel-shaped support 5300. As shown in FIG. 37B, there is a single drainage hole at the base portion of the funnel-shaped support, although multiple holes can be present.

The number of folds 5304 can range from 2 to about 20, or about 6, as shown. In this example, the folds 5304 can be formed from one or more flexible materials, such as silicone, polymer, solid material, fabric, or a permeable mesh to provide the desired lobe shape. The folds 5304 can have a generally rounded shape as shown in the cross-sectional view shown in FIG. 37B. The depth D100 of each fold 5304 at the distal end 5306 of the funnel support 5300 can be the same or vary, and can range from about 0.5 mm to about 5 mm.

Figures 38A, 38B:
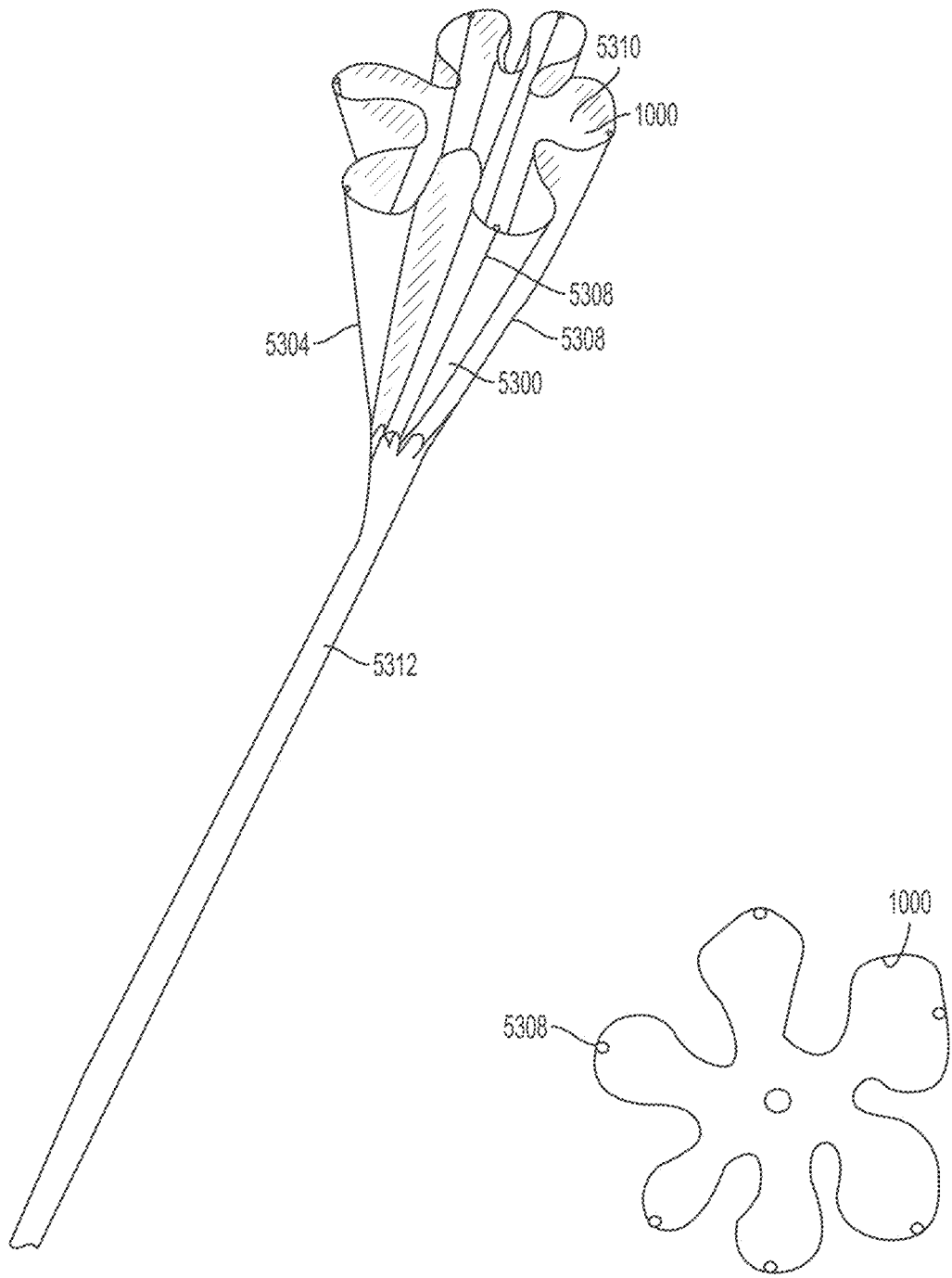
FIG. 38A is a perspective view of a retention portion of another catheter according to an example of the present invention.
FIG. 38B is a top plan view of the retention portion of the catheter of FIG. 38A.
Figure 38C:
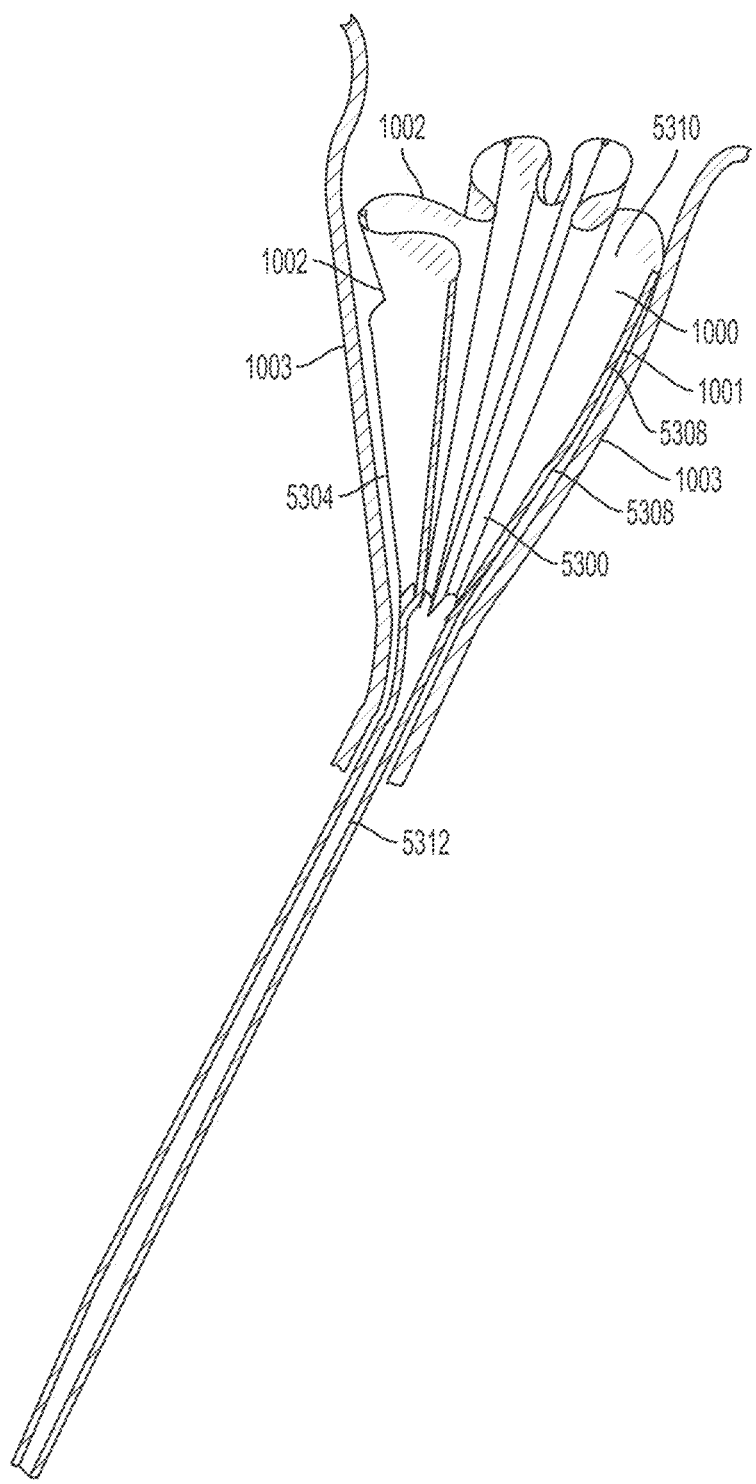
FIG. 38C is a cross sectional view of a retention portion of a ureteral catheter according to an example of the present invention positioned in the renal pelvis region of the kidney showing in general changes believed to occur in the renal pelvis tissue in response to application of negative pressure through the ureteral catheter.

Referring now to FIGS. 38A-38C, one or more folds 5304 can comprise at least one longitudinal support member 5308. The longitudinal support member(s) 5308 can span the entire length L17 or a portion of the length L17 of the funnel support 5300. The longitudinal support members 5308 can be formed from a flexible yet partially rigid material, such as a temperature sensitive shape memory material, for example nitinol. The thickness of the longitudinal support members 5308 can range from about 0.01 mm to about 1 mm, as desired. In some examples, the nitinol frame can be covered with a suitable waterproof material such as silicone to form a tapered portion or funnel. In that case, fluid is permitted to flow down the inner surface 5310 of the funnel support 5300 and into the drainage lumen 5312. In other examples, the folds 5304 are formed from various rigid or partially rigid sheets or materials bended or molded to form a funnel-shaped retention portion.

Figure 39:
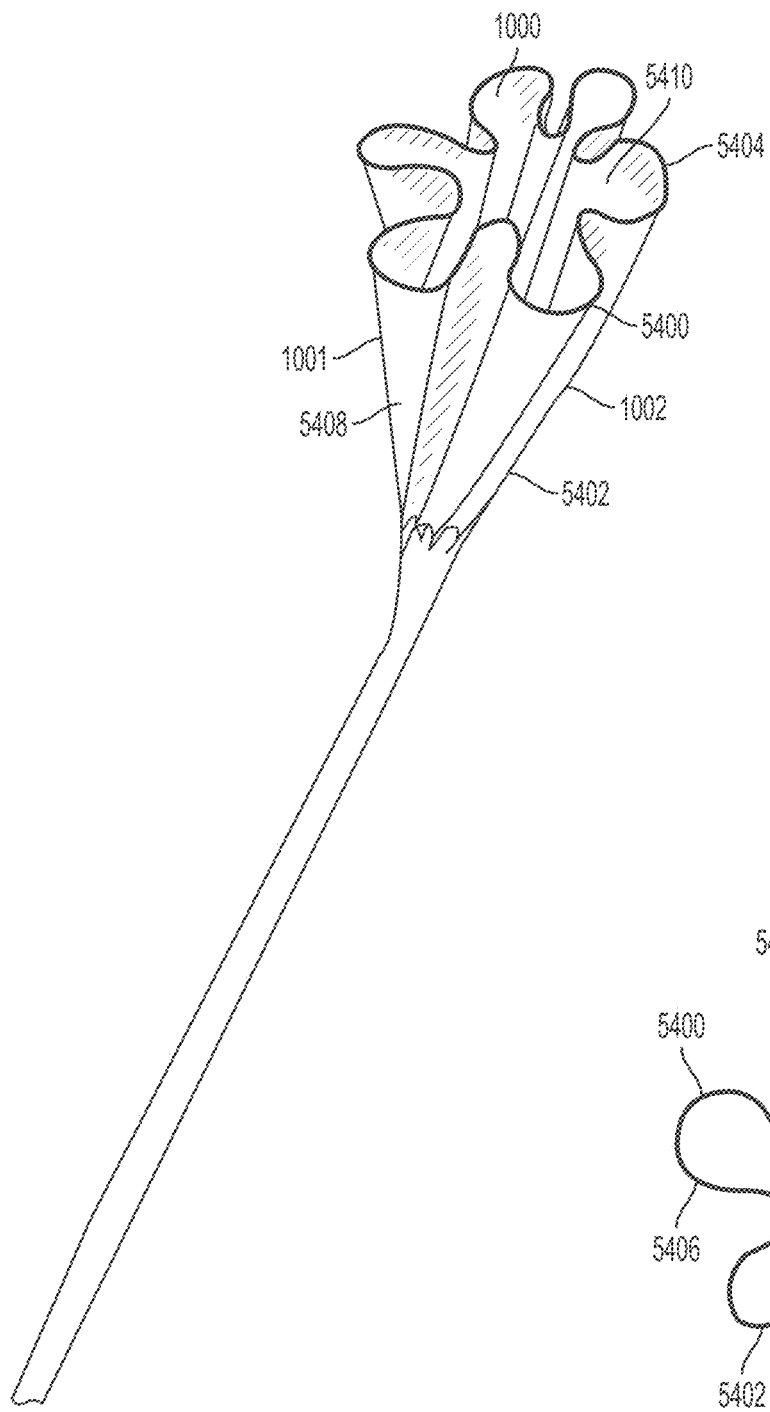
FIG. 39 is a perspective view of a retention portion of another catheter according to an example of the present invention.

Referring now to FIGS. 39 and 40, the distal end or edge 5400 of the folds 5402 can comprise at least one edge support member 5404. The edge support member(s) 5404 can span the entire circumference 5406 or one or more portions of the circumference 5406 of the distal edge 5400 of the funnel support 5408. The edge support member(s) 5404 can be formed from a flexible yet partially rigid material, such as a temperature sensitive shape memory material, for example nitinol. The thickness of the edge support member(s) 5404 can range from about 0.01 mm to about 1 mm, as desired.

In some examples, such as are shown in FIGS. 28A-28C, the distal end 5010 of the drainage lumen 5002 (or funnel support 5014) can have an inwardly facing lip 5026 oriented towards the center of the funnel support 5014, for example of about 0.01 mm to about 1 mm, to inhibit irritating the kidney tissue. Thus, the funnel support 5014 can comprise a third diameter D17 less than the second diameter D15, the third diameter D17 being closer to an end 5010 of the distal portion 5004 of the drainage lumen 5002 than the second diameter D15. The outer surface 5028 of the lip 5026 can be rounded, a square edge, or any shape desired. The lip 5026 may assist in providing additional support to the renal pelvis and internal kidney tissues.

Figure 33B:
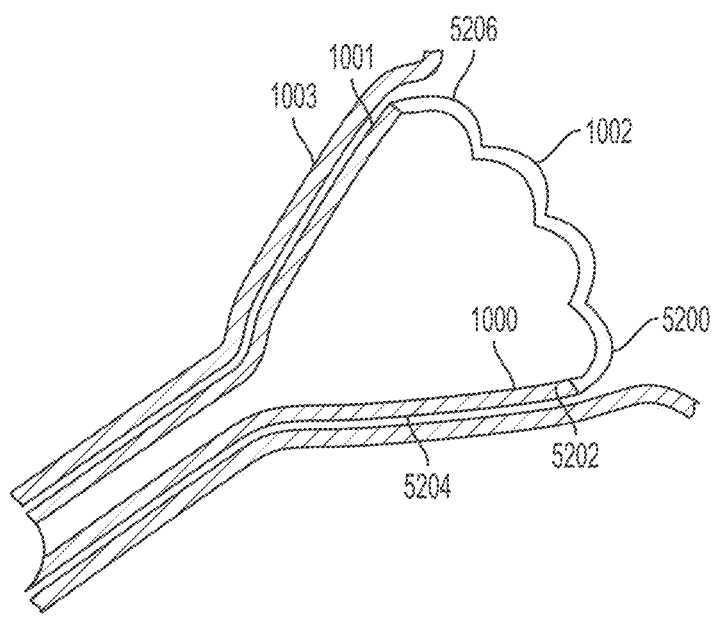
FIG. 33B is a cross sectional view of a retention portion of a ureteral catheter according to an example of the present invention positioned in the renal pelvis region of the kidney showing in general changes believed to occur in the renal pelvis tissue in response to application of negative pressure through the ureteral catheter.

Referring now to FIGS. 33A and 33B, in some examples, the edge 5200 of the distal end 5202 of the at least one sidewall 5204 can be shaped. For example, the edge 5200 can comprise a plurality of generally rounded edges 5206 or scallops, for example about 4 to about 20 or more rounded edges. The rounded edges 5206 can provide more surface area than a straight edge to help support the tissue of the renal pelvis or kidney and inhibit occlusion. The edge 5200 can have any shape desired, but preferably is essentially free of or free of sharp edges to avoid injuring tissue.

In some examples, such as are shown in FIGS. 28A-28C and 31A-32B, the funnel support 5014 comprises a base portion 5024 adjacent to the distal portion 5004 of the drainage lumen 5002. The base portion 5024 comprises at least one interior opening 5030 aligned with an interior lumen 5032 of the drainage lumen 5002 of the proximal portion 5006 of the drainage lumen 5002 for permitting fluid flow into the interior lumen 5032 of the proximal portion 5006 of the drainage lumen 5002. In some examples, the cross-section of the opening 5030 is circular, although the shape may vary, such as ellipsoid, triangular, square, etc.

In some examples, such as is shown in FIGS. 31A-32B, a central axis 5018 of the funnel support 5014 is offset with respect to a central axis 5034 of the proximal portion 5006 of the drainage lumen 5002. The offset distance X from the central axis 5018 of the funnel support 5014 with respect to the central axis 5034 of the proximal portion 5006 can range from about 0.1 mm to about 5 mm.

The at least one interior opening 5030 of the base portion 5024 has a diameter D18 (shown, for example, in FIGS. 28C and 32B) ranging from about 0.05 mm to about 4 mm. In some examples, the diameter D18 of the interior opening 5030 of the base portion 5024 is about equal to the first inner diameter D16 of the adjacent proximal portion 5006 of the drainage lumen.

In some examples, the ratio of the height H15 of the at least one sidewall 5016 funnel support 5014 to the second outer diameter D15 of the at least one sidewall 5016 of the funnel support 5014 ranges from about 1:25 to about 5:1.

In some examples, the at least one interior opening 5030 of the base portion 5024 has a diameter D18 ranging from about 0.05 mm to about 4 mm, the height H15 of the at least one sidewall 5016 of the funnel support 5014 ranges from about 1 mm to about 25 mm, and the second outer diameter D15 of the funnel support 5014 ranges from about 5 mm to about 25 mm.

In some embodiments, the thickness T11 (shown in FIG. 28B, for example) of the at least one sidewall 5016 of the funnel support 5014 can range from about 0.01 mm to about 1.9 mm, or about 0.5 mm to about 1 mm. The thickness T11 can be generally uniform throughout the at least one sidewall 5016, or it may vary as desired. For example, the thickness T11 of the at least one sidewall 5016 can be less or greater near the distal end 5010 of the distal portion 5004 of the drainage lumen 5002 than at the base portion 5024 of the funnel support 5014.

Figure 29:
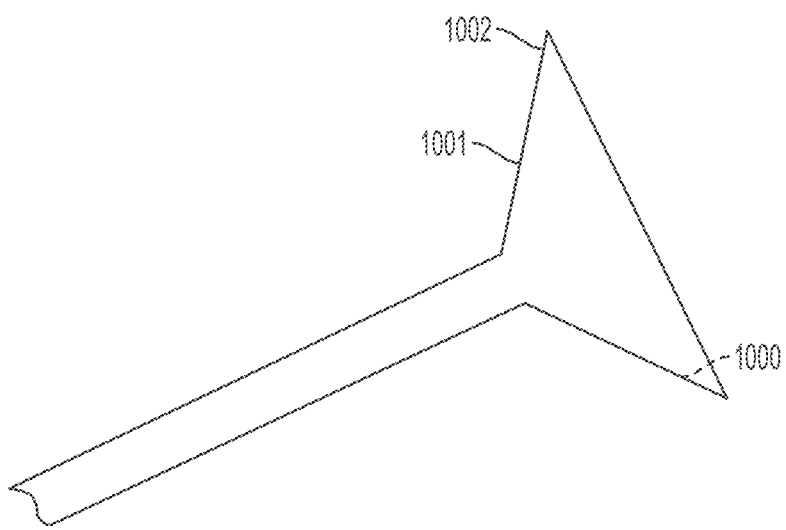
FIG. 29 is a side elevational view of a retention portion of another catheter according to an example of the present invention.
Figure 30:
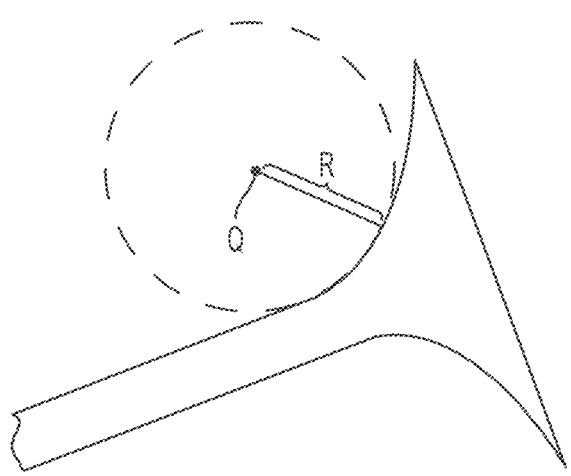
FIG. 30 is a side elevational view of a retention portion of another catheter according to an example of the present invention.

Referring now to FIGS. 28A-30, along the length of the at least one sidewall 5016, the sidewall 5016 can be straight (as shown in FIGS. 28A and 29), concave (as shown in FIG. 30), or any combination thereof. As shown in FIG. 30, the curvature of the sidewall 5016 can be approximated from the radius of curvature R from the point Q such that a circle centered at Q meets the curve and has the same slope and curvature as the curve. In some examples, the radius of curvature ranges from about 2 mm to about 12 mm. In other examples, the funnel support 5014 may have a generally hemispherical shape.

Figure 44A:
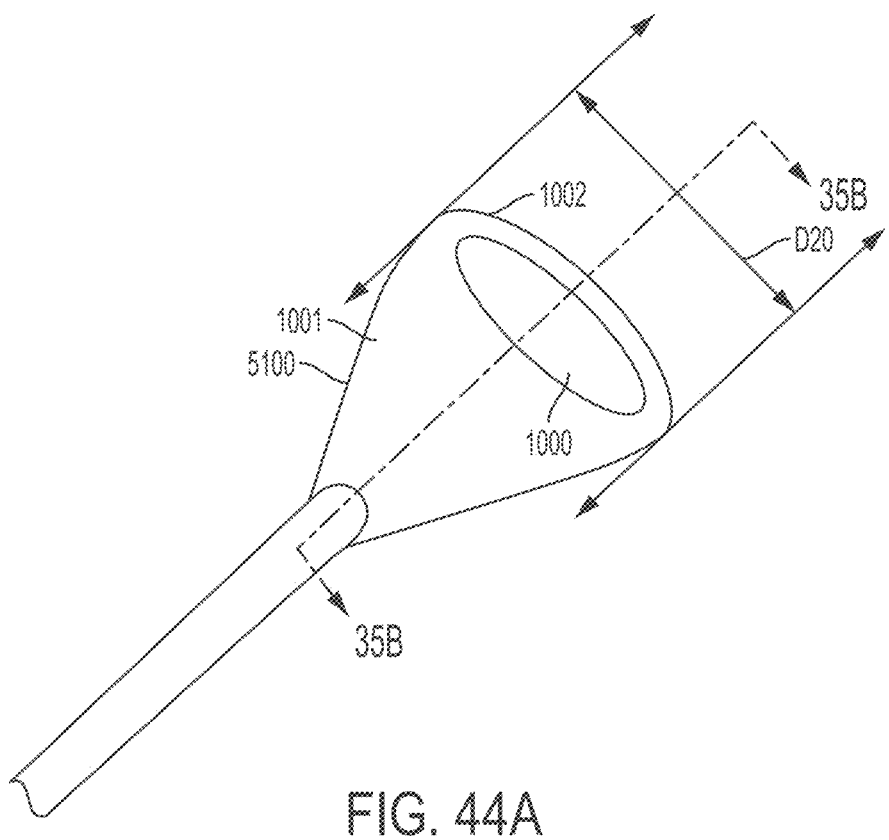
FIG. 44A is a perspective view of a retention portion of another catheter according to an example of the present invention.
Figure 44B:
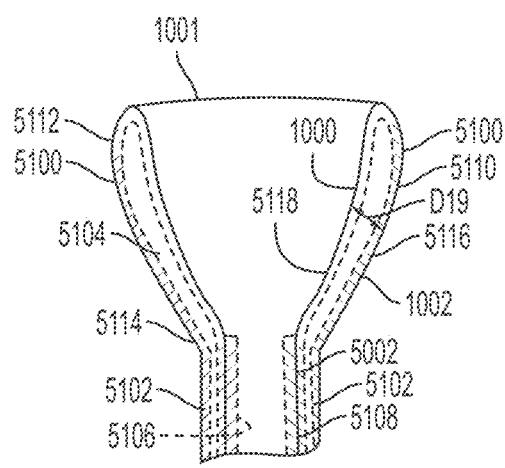
FIG. 44B is a cross-sectional side elevational view of the retention portion of the catheter of FIG. 44A taken along lines B-B of FIG. 44A.

In some examples, the at least one sidewall 5016 of the funnel support 5014 is formed from a balloon 5100, for example as shown in FIGS. 44A, 44B, 47A and 47B. The balloon 5100 can have any shape that provides a funnel support to inhibit occlusion of the ureter, renal pelvis, and/or the rest of the kidney. As shown in FIGS. 44A and 44B, the balloon 5100 has the shape of a funnel. The balloon can be inflated after insertion or deflated before removal by adding or removing gas or air through the gas port(s) 5102. The gas port(s) 5102 can simply be contiguous with the interior 5104 of the balloon 5100, e.g., the balloon 5100 can be adjacent to the interior 5106 or encase the exterior 5108 of an adjacent portion of the proximal portion 5006 of the drainage lumen 5002. The diameter D19 of the sidewall 5110 of the balloon 5100 can range from about 1 mm to about 3 mm, and can vary along its length such that the sidewall has a uniform diameter, tapers toward the distal end 5112 or tapers toward the proximal end 5114 of the funnel support 5116. The outer diameter D20 of the distal end 5112 of the funnel support 5116 can range from about 5 mm to about 25 mm.

In some examples, the at least one sidewall 5016 of the funnel support 5014 is continuous along the height H15 of the at least one sidewall 5016, for example as shown in FIGS. 28A, 29, and 30. In some examples, the at least one sidewall 5016 of the funnel support 5014 comprises a solid wall, for example the sidewall 5016 is not permeable through the sidewall after 24 hours of contact with a fluid such as urine on one side.

In some examples, the at least one sidewall of the funnel support is discontinuous along the height or the body of the at least one sidewall. As used herein, "discontinuous" means that the at least one sidewall comprises at least one opening for permitting the flow of fluid or urine therethrough into the drainage lumen, for example by gravity or negative pressure. In some examples, the opening can be a conventional opening through the sidewall, or openings within a mesh material, or openings within a permeable fabric. The cross-sectional shape of the opening can be circular or non-circular, such as rectangular, square, triangular, polygonal, ellipsoid, as desired. In some examples, an "opening" is a gap between adjacent coils in a retention portion of a catheter comprising a coiled tube or conduit.

As used herein, "opening" or "hole" means a continuous void space or channel through the sidewall from the outside to the inside of the sidewall, or vice versa. In some examples, each of the at least one opening(s) can have an area which can be the same or different and can range from about 0.002 mm$^2$ to about 100 mm$^2$, or about 0.002 mm$^2$ to about 10 mm$^2$. As used herein, the "area" or "surface area" or "cross-sectional area" of an opening means the smallest or minimum planar area defined by a perimeter of the opening. For example, if the opening is circular and has a diameter of about 0.36 mm (area of 0.1 mm$^2$) at the outside of the sidewall, but a diameter of only 0.05 mm (area of 0.002 mm$^2$) at some point within the sidewall or on the opposite side of the sidewall, then the "area" would be 0.002 mm$^2$ since that is the minimum or smallest planar area for flow through the opening in the sidewall. If the opening is square or rectangular, the "area" would be the length times the width of the planar area. For any other shapes, the "area" can be determined by conventional mathematical calculations well known to those skilled in the art. For example, the "area" of an irregular shaped opening is found by fitting shapes to fill the planar area of the opening, calculating the area of each shape and adding together the area of each shape.

In some examples, at least a portion of the sidewall comprises at least one (one or more) openings. Generally, the central axis of the opening(s) can be generally perpendicular to the planar outer surface of the sidewall, or the opening(s) can be angled with respect to the planar outer surface of the sidewalls. The dimensions of the bore of the opening may be uniform throughout its depth, or the width may vary along the depth, either increasing, decreasing, or alternating in width through the opening from the exterior surface of the sidewall to the interior surface of the sidewall.

Referring now to FIGS. 22A-22E, 23A, 23E, 24-27, 36, 41A, 41B, 42 and 43, in some examples at least a portion of the sidewall comprises at least one (one or more) openings. The opening(s) can be positioned anywhere along the sidewall. For example, the openings can be uniformly positioned throughout the sidewall, or positioned in specified regions of the sidewall, such as closer to the distal end of the sidewall or closer to the proximal end of the sidewall, or in vertical or horizontal or random groupings along the length or circumference of the sidewall. While not intending to be bound by any theory, it is believed that, when negative pressure is applied at the proximal end of the proximal portion of the drainage lumen, openings in the proximal portion of the funnel support that are directly adjacent to the ureter, renal pelvis and/or other kidney tissue may be undesirable as such openings may diminish the negative pressure at the distal portion of the ureteral catheter and thereby diminish the draw or flow of fluid or urine from the kidney and renal pelvis of the kidney, as well as perhaps irritate the tissue.

The number of openings can vary from 1 to 1000 or more, as desired. For example, in FIG. 36, six openings (three on each side) are shown. As discussed above, in some examples, each of the at least one opening(s) can have an area which can be the same or different and can range from about 0.002 mm$^2$ to about 50 mm$^2$, or about 0.002 mm$^2$ to about 10 mm$^2$.

Figure 36:
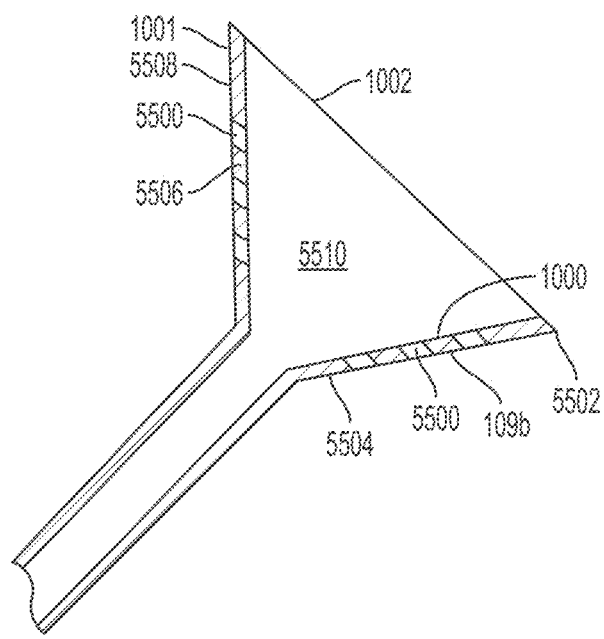
FIG. 36 is a cross-sectional side view of a retention portion of another catheter according to an example of the present invention.

In some examples, as shown in FIG. 36, the openings 5500 can be positioned closer the distal end 5502 of the sidewall 5504. In some examples, the opening(s) are positioned in the distal half 5506 of the sidewall towards the distal end 5502. In some examples, the openings 5500 are evenly distributed around the circumference of the distal half 5506 or even closer to the distal end 5502 of the sidewall 5504.

Figure 41A:
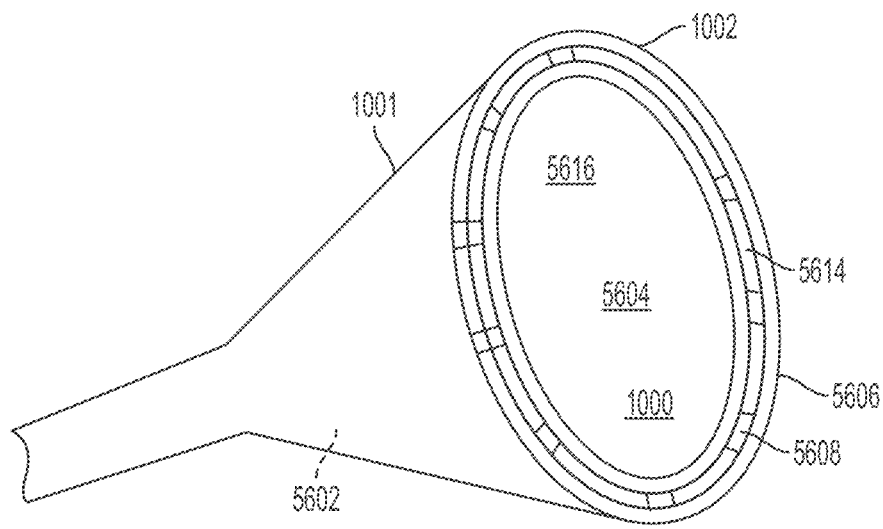
FIG. 41A is a perspective view of a retention portion of another catheter according to an example of the present invention.
Figure 41B:
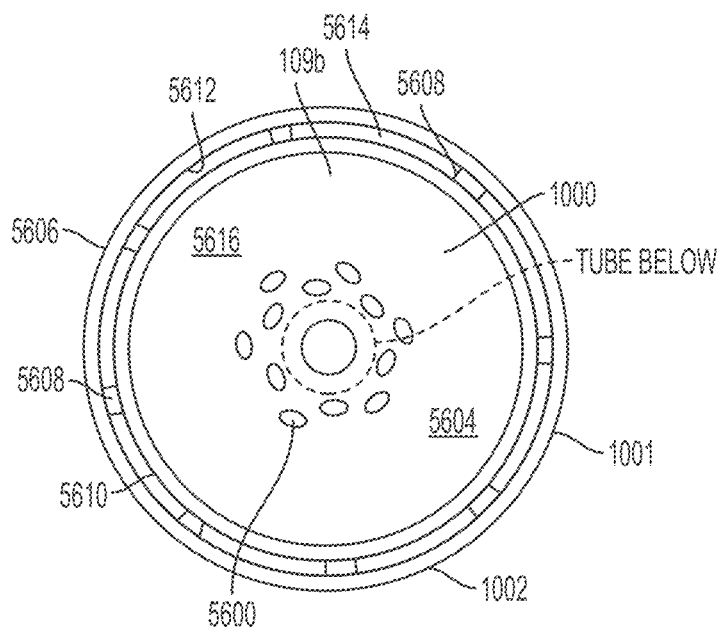
FIG. 41B is a top plan view of the retention portion of the catheter of FIG. 41A.
Figure 42:
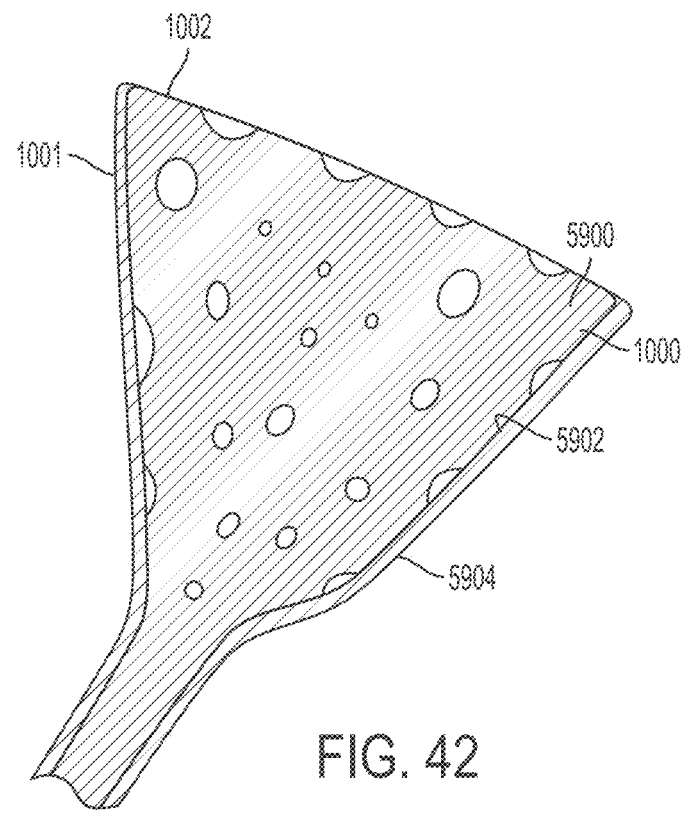
FIG. 42 is a cross-sectional side elevational view of a retention portion of another catheter according to an example of the present invention.
Figure 43:
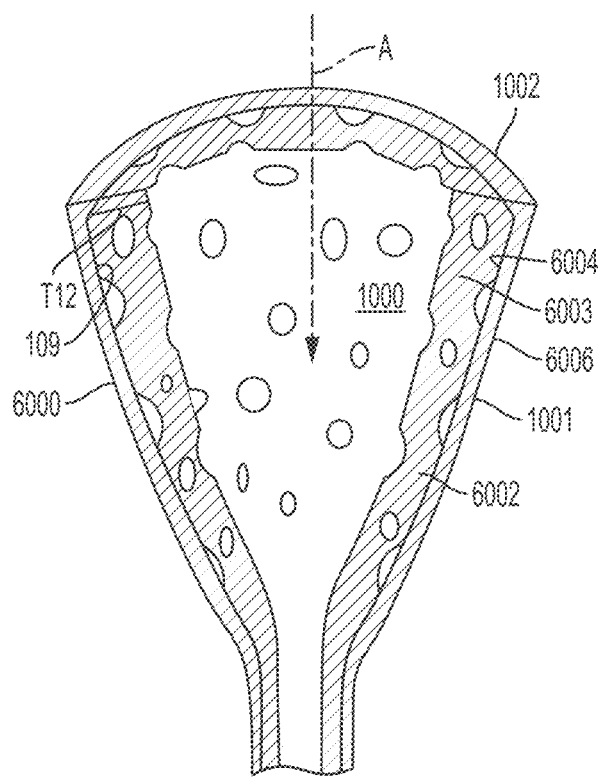
FIG. 43 is a cross-sectional side elevational view of a retention portion of another catheter according to an example of the present invention.

In contrast, in FIG. 41B, the openings 5600 are positioned near the proximal end 5602 of an inner sidewall 5604, and do not directly contact the tissue since there is an outer sidewall 5606 between the opening 5600 and the tissue. Alternatively or additionally, one or more opening(s) 5600 can be positioned near the distal end of the inner sidewall, as desired. The inner sidewall 5604 and outer sidewall 5606 can be connected by one or more supports 5608 or ridges connecting the outside 5610 of the inner sidewall 5604 to the inside 5612 of the outer sidewall 5606.

In some non-limiting examples, such as are shown in FIGS. 22A-22E, 23A, 23D-23F, 28B, 28D, 29, 31A, 31B, 32A, 32B, 33A, 33B, 34, 35, 36, 37A, 37B, 38A-38C, 39, 40, 41A, 41B, 42, 43, 44A, 44B, 46B, 46A, 48B, 49A, 49B, 50A, and 50B, a protected surface area(s) or inner surface area(s) 1000 can be established by a variety of different shapes or materials. Non-limiting examples of protected surface areas or inner surface areas 1000 can comprise, for example, the interior portions 152*b*, 5028, 5118, 5310, 5410, 5510, 5616, 5710, 5814, 6004 of a funnel 150*b*, 5014, 5116, 5300, 5408, 5508, 5614, 5702, 5802, 6000, the interior portions 164*b*, 166*b*, 168*b*, 170*b*, 338*b*, 1281, 1283, 1285 of a coil 183*b*, 184*b*, 185*b*, 187*b*, 334*b*, 1280, 1282, 1284, the interior portions 5902, 6003 of a porous material 5900, 6002, the interior portions 162*b*, 5710, 5814 of a mesh 5704, 5804, or the interior portions 536*b* of a cage 530*b* with protected drainage holes 533*b*.

In some non-limiting examples, at least one protected drainage hole(s), port(s) or perforation(s) 133*b*, 1233 are disposed on the protected surface area 1000. Upon application of negative pressure therapy through the catheter, the urothelial or mucosal tissue 1003, 1004 conforms or collapses onto the outer periphery 189*b*, 1002 or protective surface area 1001 of the retention portion 130*b*, 330*b*, 410*b*, 500*b*, 1230, 1330, 2230, 3230, 4230, 5012, 5013 of the catheter and is thereby prevented or inhibited from occluding one or more of the protected drainage holes, ports or perforations 133*b*, 1233 disposed on the protected surface area or inner surface area 1000, and thereby a patent fluid column or flow is established, maintained, or enhanced between the renal pelvis and calyces and the drainage lumen 124*b*, 324*b*, 424*b*, 524*b*, 1224, 5002, 5003, 5312, 5708, 5808.

In some examples, the retention portion 130*b*, 330*b*, 410*b*, 500*b*, 1230, 1330, 2230, 3230, 4230, 5012, 5013 comprises one or more helical coils having outwardly facing sides 1288 and inwardly facing sides 1286, and wherein the outer periphery 1002 or protective surface area 1001 comprises the outwardly facing sides 1288 of the one or more helical coils, and the at least one protected drainage hole(s), port(s) or perforation(s) 133*b*, 1233 are disposed on the inwardly facing sides 1286 (protected surface area or inner surface area 1000) of the one or more helical coils.

Figure 34:
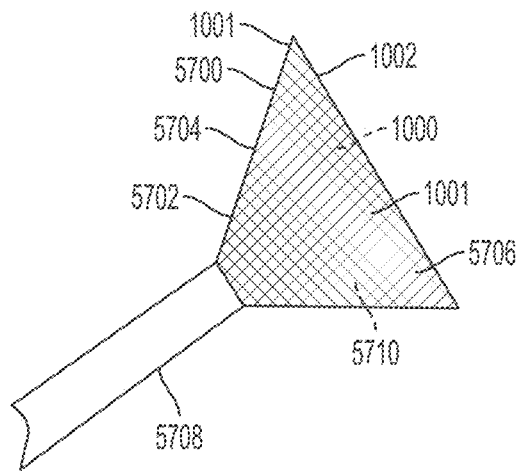
FIG. 34 is a side elevational view of a retention portion of another catheter according to an example of the present invention.

For example, a funnel shape, as shown in FIG. 34, can create a sidewall 5700 that conforms to the natural anatomical shape of the renal pelvis preventing the urothelium from constricting the fluid column. The interior 5710 of the funnel support 5702 provides a protected surface area 1000 having openings 5706 therethrough which provide a passageway through which a fluid column can flow from the calyces into the drainage lumen 5708. Similarly, the mesh form of FIG. 35 can also create a protected surface area 1000, such as interior 5814 of the mesh 5804, between the calyces and the drainage lumen 5808 of the catheter. The mesh 5704, 5804 comprises a plurality of openings 5706, 5806 therethrough for permitting fluid flow into the drainage lumen 5708, 5808. In some examples, the maximum area of an opening can be less than about 100 mm$^2$, or less than about 1 mm$^2$, or about 0.002 mm$^2$ to about 1 mm$^2$, or about 0.002 mm$^2$ to about 0.05 mm$^2$. The mesh 5704, 5804 can be formed from any suitable metallic or polymeric material such as are discussed above.

Figure 35:
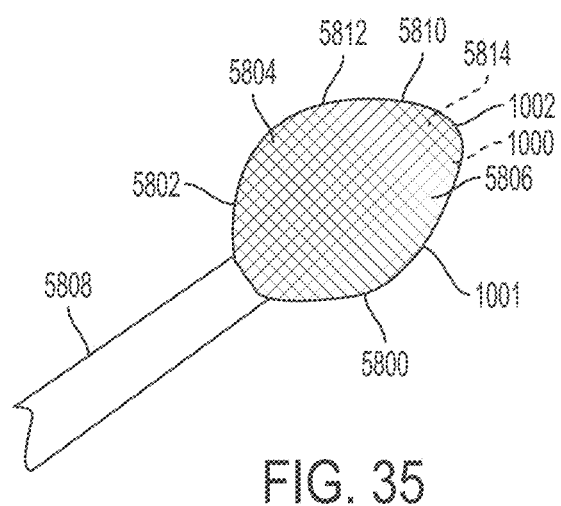
FIG. 35 is a side elevational view of a retention portion of another catheter according to an example of the present invention.

In some examples, the funnel support further comprises a cover portion over the distal end of the funnel support. This cover portion can be formed as an integral part of the funnel support or connected to the distal end of the funnel support. For example, as shown in FIG. 35, the funnel support 5802 comprises a cover portion 5810 across the distal end 5812 of the funnel support 5802 and projecting from the distal end 5812 of the funnel support 5802. The cover portion 5810 can have any shape desired, such as flat, convex, concave, undulating, and combinations thereof. The cover portion 5810 can be formed from mesh or any polymeric solid material as discussed above. The cover portion 5810 can provide an outer periphery 1002 or protective surface area 1001 to assist in supporting the pliant tissue in the kidney region to facilitate urine production.

Figure 48A:
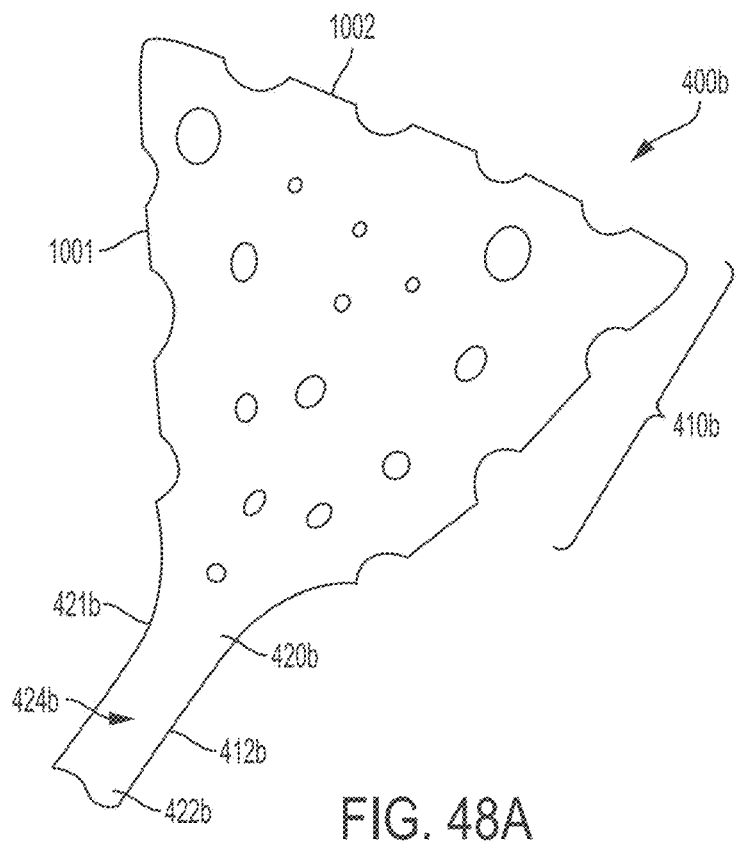
FIG. 48A is a schematic drawing of another example of a retention portion for a catheter according to an example of the present invention.
Figure 48B:
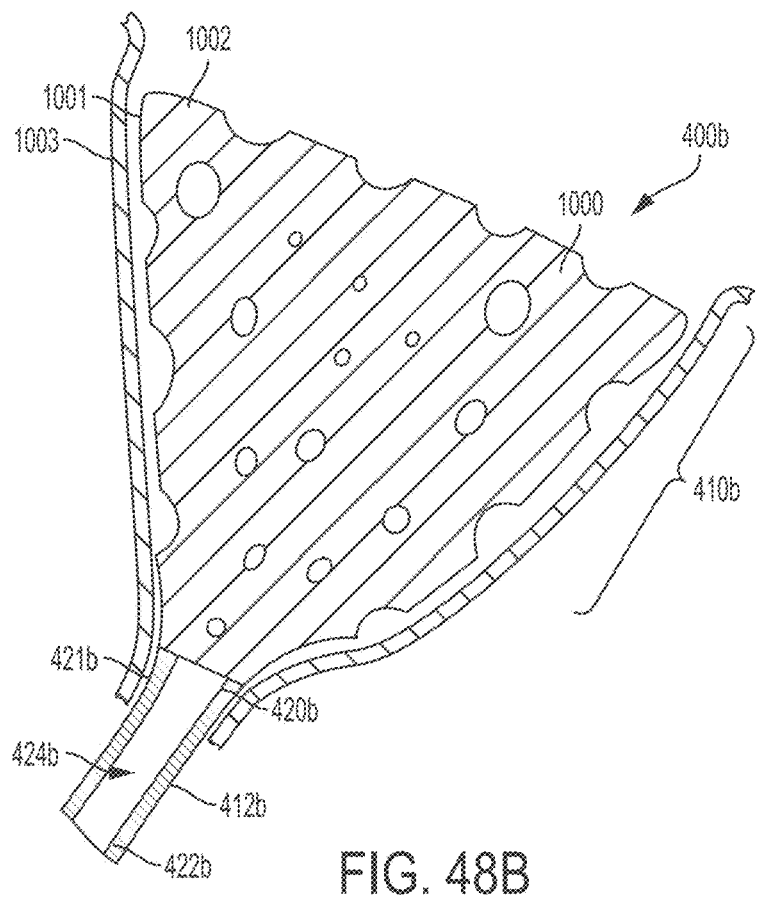
FIG. 48B is a schematic drawing of a cross section of another example of a retention portion for a ureteral catheter according to an example of the present invention positioned in the renal pelvis region of the kidney showing in general changes believed to occur in the renal pelvis tissue in response to application of negative pressure through the ureteral catheter.
Figure 49A:
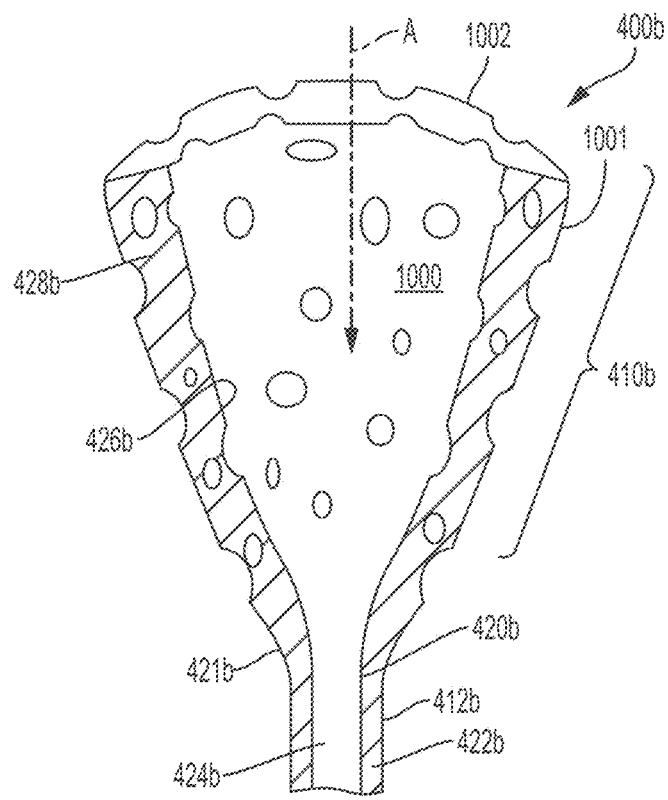
FIG. 49A is a schematic drawing of a cross section of another example of a retention portion for a catheter according to an example of the present invention.
Figure 49B:
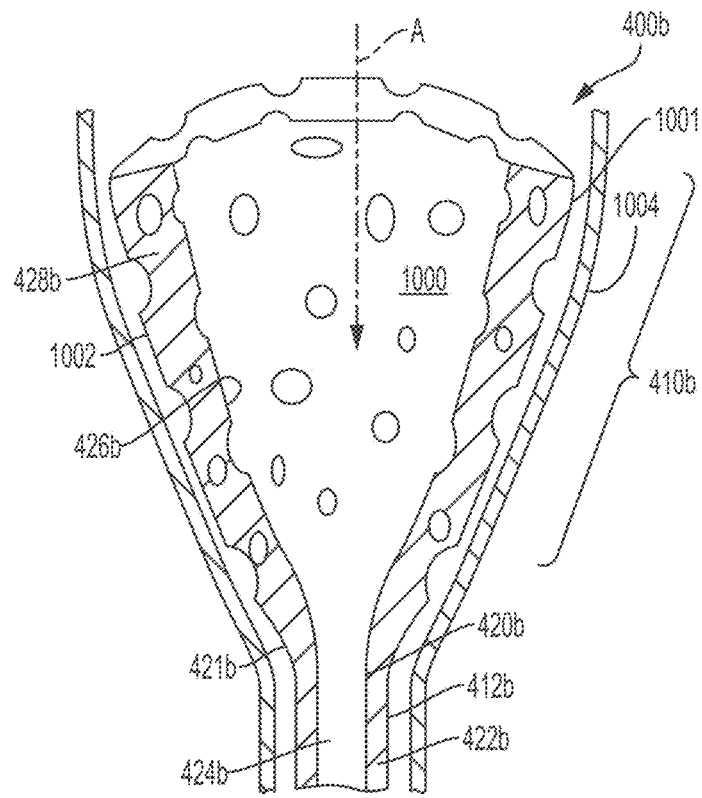
FIG. 49B is a schematic drawing of a cross section of another example of a retention portion for a ureteral catheter according to an example of the present invention positioned in the renal pelvis region of the kidney showing in general changes believed to occur in the renal pelvis tissue in response to application of negative pressure through the ureteral catheter.

In some examples, the funnel support comprises a porous material, for example as shown in FIGS. 48A-49B. FIGS. 48A-49B and suitable porous materials are discussed in detail below. Briefly, in FIGS. 48A-49B, the porous material itself is the funnel support. In FIGS. 48A and 48B, the funnel support is a wedge of porous material. In FIGS. 49A and 49B, the porous material is in the shape of a funnel. In some examples, such as FIG. 42, the porous material 5900 is positioned within the interior 5902 of the sidewall 5904. In some examples, such as FIG. 43, the funnel support 6000 comprises a porous liner 6002 positioned adjacent to the interior 6004 of the sidewall 6006. The thickness T12 of the porous liner 6002 can range from about 0.5 mm to about 12.5 mm, for example. The area of the openings within the porous material can be about 0.002 mm$^2$ to about 100 mm$^2$, or less.

Figure 46A:
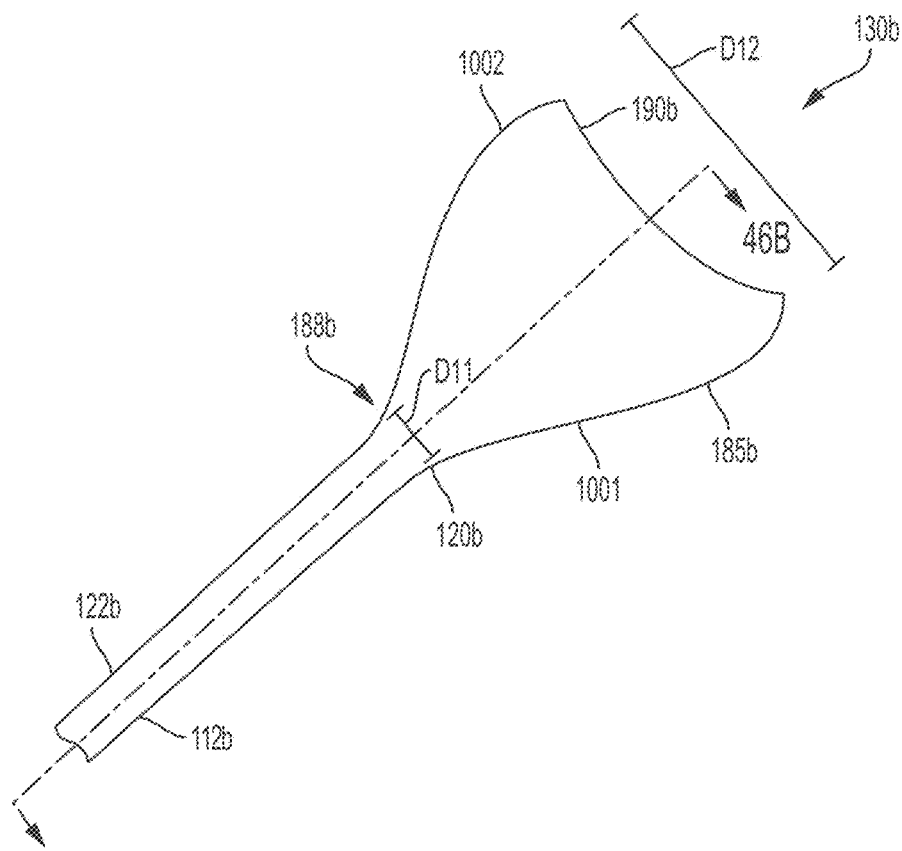
FIG. 46A is a schematic drawing of another example of a retention portion for a catheter according to an example of the present invention.
Figure 46B:
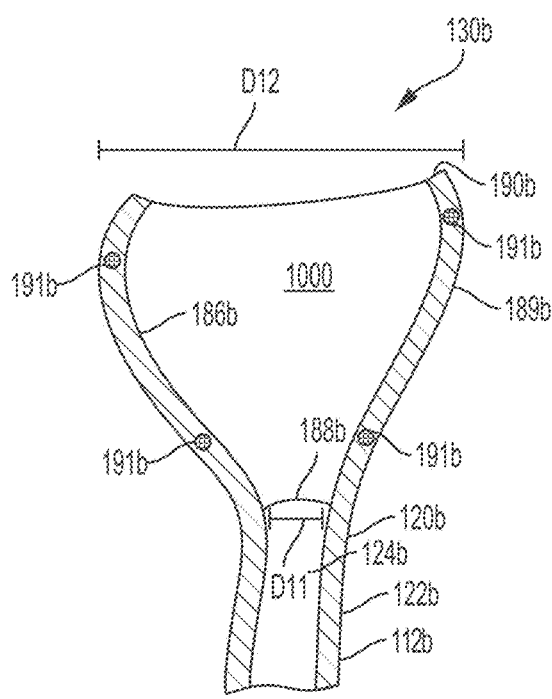
FIG. 46B is a schematic drawing of a cross-sectional view of a portion of the retention portion of FIG. 46A, taken along lines B-B of FIG. 46A.

Referring now to FIGS. 46A and 46B, for example, a retention portion 130*b* of a ureteral catheter 112*b* comprises a catheter tube 122*b* having a widened and/or tapered distal end portion which, in some examples, is configured to be positioned in the patient's renal pelvis and/or kidney. For example, the retention portion 130*b* can be a funnel-shaped structure comprising an outer surface 185*b* configured to be positioned against the ureter and/or kidney wall and comprising an inner surface 186*b* configured to direct fluid toward a drainage lumen 124*b* of the catheter 112*b*. The retention portion can be configured into a funnel-shaped support having an outer surface 185*b* and an inner surface 186*b*, and wherein the outer periphery 189*b* or protective surface area 1001 comprises the outer surface 185*b* of the funnel-shaped support, and the one or more drainage holes, ports or perforations 133*b*, 1233 are disposed on the inner surface 186*b* at the base of the funnel-shaped support. In another example shown in FIGS. 41A and 41B, the retention portion can be configured into a funnel-shaped support 5614 having an outer surface and an inner surface 5616, and wherein the outer periphery 1002 or protective surface area 1001 comprises the outer surface of the outer sidewall 5606. The protected surface area 1000 can comprise the inner sidewall 5604 of the inner funnel and the one or more drainage holes, ports or perforations 5600 can be disposed on the inner sidewall 5604 of the funnel-shaped support.

Referring now to FIGS. 46A and 46B, the retention portion 130*b* can comprise a proximal end 188*b* adjacent to the distal end of the drainage lumen 124*b* and having a first diameter D11 and a distal end 190*b* having a second diameter D12 that is greater than the first diameter D11 when the retention portion 130*b* is in its deployed position. In some examples, the retention portion 130*b* is transitionable from a collapsed or compressed position to the deployed position. For example, the retention portion 130*b* can be biased radially outward such that when the retention portion 130*b* is advanced to its fluid collecting position, the retention portion 130*b* (e.g., the funnel portion) expands radially outward to the deployed state.

The retention portion 130*b* of the ureteral catheter 112*b* can be made from a variety of suitable materials that are capable of transitioning from the collapsed state to the deployed state. In one example, the retention portion 130*b* comprises a framework of tines or elongated members formed from a temperature sensitive shape memory material, such as nitinol. In some examples, the nitinol frame can be covered with a suitable waterproof material such as silicone to form a tapered portion or funnel. In that case, fluid is permitted to flow down the inner surface 186*b* of the retention portion 130*b* and into the drainage lumen 124*b*. In other examples, the retention portion 130*b* is formed from various rigid or partially rigid sheets or materials bended or molded to form a funnel-shaped retention portion as illustrated in FIGS. 46A and 46B.

In some examples, the retention portion of the ureteral catheter 112b can comprise one or more mechanical stimulation devices 191b for providing stimulation to nerves and muscle fibers in adjacent tissues of the ureter(s) and renal pelvis. For example, the mechanical stimulation devices 191b can comprise linear or annular actuators embedded in or mounted adjacent to portions of the sidewall of the catheter tube 122b and configured to emit low levels of vibration. In some examples, mechanical stimulation can be provided to portions of the ureters and/or renal pelvis to supplement or modify therapeutic effects obtained by application of negative pressure. While not intending to be bound by theory, it is believed that such stimulation affects adjacent tissues by, for example, stimulating nerves and/or actuating peristaltic muscles associated with the ureter(s) and/or renal pelvis. Stimulation of nerves and activation of muscles may produce changes in pressure gradients or pressure levels in surrounding tissues and organs which may contribute to or, in some cases, enhance therapeutic benefits of negative pressure therapy.

Figure 47A:
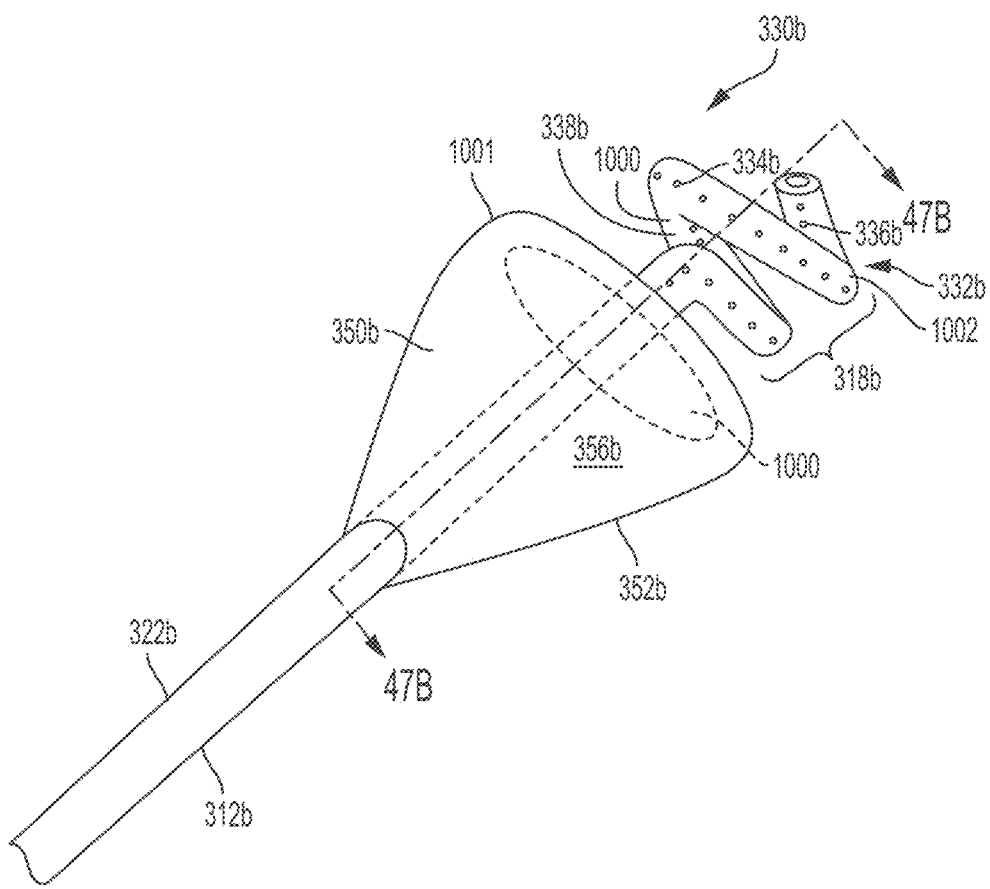
FIG. 47A is a schematic drawing of another example of a retention portion for a catheter according to an example of the present invention.
Figure 47B:
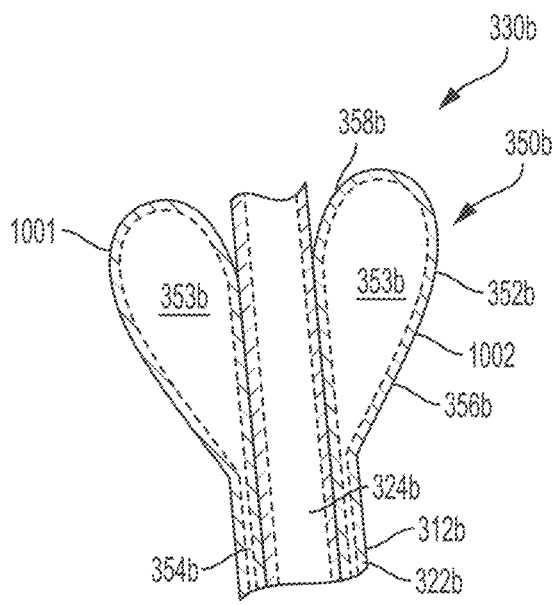
FIG. 47B is a schematic drawing of a portion of a cross-sectional view of the retention portion of FIG. 47A, taken along lines B-B of FIG. 47A.

With reference to FIGS. 47A and 47B, according to another example, a retention portion 330b of a ureteral catheter 312b comprises a catheter tube 322b having a distal portion 318b formed in a helical structure 332b and an inflatable element or balloon 350b positioned proximal to the helical structure 332b to provide an additional degree of retention in the renal pelvis and/or fluid collection location. A balloon 350b can be inflated to pressure sufficient to retain the balloon in the renal pelvis or ureter, but low enough to avoid distending or damaging these structures. Suitable inflation pressures are known to those skilled in the art and are readily discernible by trial and error. As in previously-described examples, the helical structure 332 can be imparted by bending the catheter tube 322b to form one or more coils 334b. The coils 334b can have a constant or variable diameter and height as described above. The catheter tube 322b further comprises a plurality of drainage ports 336b disposed on the sidewall of the catheter tube 322b to allow urine to be drawn into the drainage lumen 324b of the catheter tube 322b and to be directed from the body through the drainage lumen 324b, for example on the inwardly facing and/or outwardly facing sides of the coil 334b.

As shown in FIG. 47B, the inflatable element or balloon 350b can comprise an annular balloon-like structure having, for example, a generally heart-shaped cross section and comprising a surface or cover 352b defining a cavity 353b. The cavity 353b is in fluid communication with an inflation lumen 354b extending parallel to the drainage lumen 324b defined by the catheter tube 322b. The balloon 350b can be configured to be inserted in the tapered portion of the renal pelvis and inflated such that an outer surface 356b thereof contacts and rests against an inner surface of the ureter and/or renal pelvis. The inflatable element or balloon 350b can comprise a tapered inner surface 358b extending longitudinally and radially inward towards the catheter tube 322b. The inner surface 358b can be configured to direct urine toward the catheter tube 322b to be drawn into the drainage lumen 324b. The inner surface 358b can also be positioned to prevent fluid from pooling in the ureter, such as around the periphery of the inflatable element or balloon 350b. The inflatable retention portion or balloon 350b is desirably sized to fit within the renal pelvis and can have a diameter ranging from about 10 mm to about 30 mm.

With reference to FIGS. 48A-49B, in some examples, the retention portion 410b comprises a porous and/or sponge-like material that is attached to a distal end 421b of a catheter tube 422b. The porous material can be configured to channel and/or absorb urine and direct the urine toward a drainage lumen 424b of the catheter tube 422b. The retention portion 410b can be configured into a funnel-shaped support having an outer surface and an inner surface, and wherein the outer periphery 1002 or protective surface area 1001 comprises the outer surface of the funnel-shaped support, and the one or more drainage holes, ports or perforations in the porous material can be disposed within the porous material or on the inner surface 426b of the funnel-shaped support.

As shown in FIGS. 49A and 49B, the retention portion 410b can be a porous wedge shaped-structure configured for insertion and retention in the patient's renal pelvis. The porous material comprises a plurality of holes and/or channels. Fluid can be drawn through the channels and holes, for example, by gravity or upon inducement of negative pressure through the catheter 412b. For example, fluid can enter the wedge-shaped retention portion 410b through the holes and/or channels and is drawn toward a distal opening 420b of the drainage lumen 424b, for example, by capillary action, peristalsis, or as a result of the inducement of negative pressure in the holes and/or channels. In other examples, as shown in FIGS. 49A and 49B, the retention portion 410b comprises a hollow, funnel structure formed from the porous sponge-like material. As shown by arrow A, fluid is directed down an inner surface 426b of the funnel structure into the drainage lumen 424b defined by the catheter tube 422b. Also, fluid can enter the funnel structure of the retention portion 410b through holes and channels in the porous sponge-like material of a sidewall 428b. For example, suitable porous materials can comprise open-celled polyurethane foams, such as polyurethane ether. Suitable porous materials can also comprise laminates of woven or non-woven layers comprising, for example, polyurethane, silicone, polyvinyl alcohol, cotton, or polyester, with or without antimicrobial additives such as silver, and with or without additives for modifying material properties such as hydrogels, hydrocolloids, acrylic, or silicone.

Figure 50A:
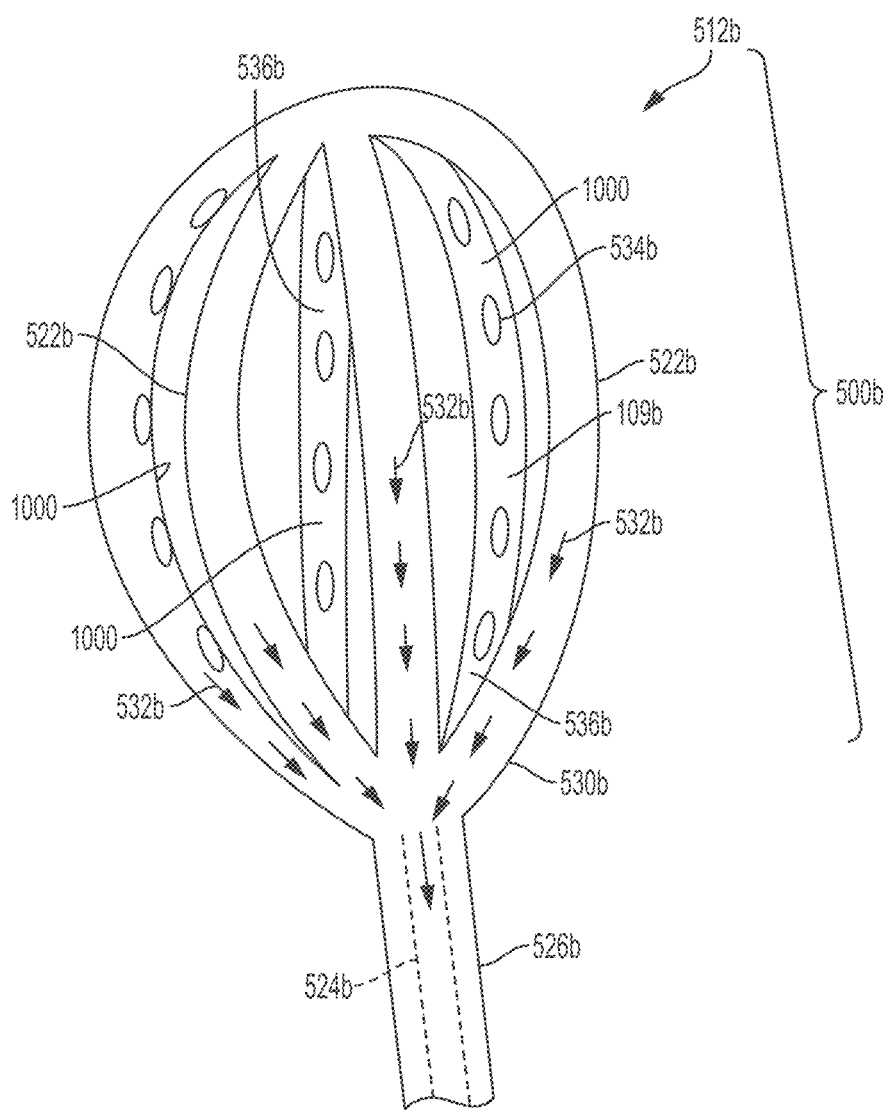
FIG. 50A is a schematic drawing of another example of a retention portion for a catheter according to an example of the present invention.
Figure 50B:
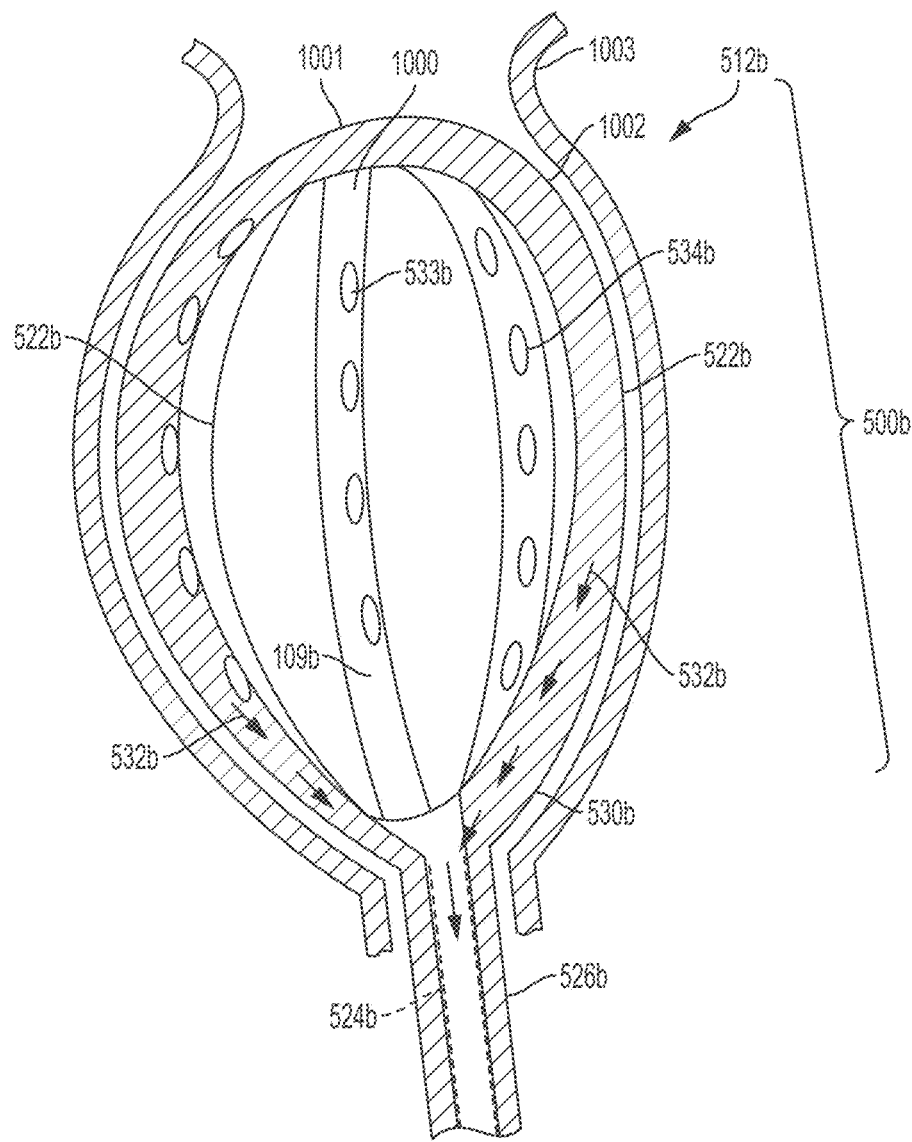
FIG. 50B is a schematic drawing of a cross section of another example of a retention portion for a ureteral catheter according to an example of the present invention positioned in the renal pelvis region of the kidney showing in general changes believed to occur in the renal pelvis tissue in response to application of negative pressure through the ureteral catheter.
Figure 51:
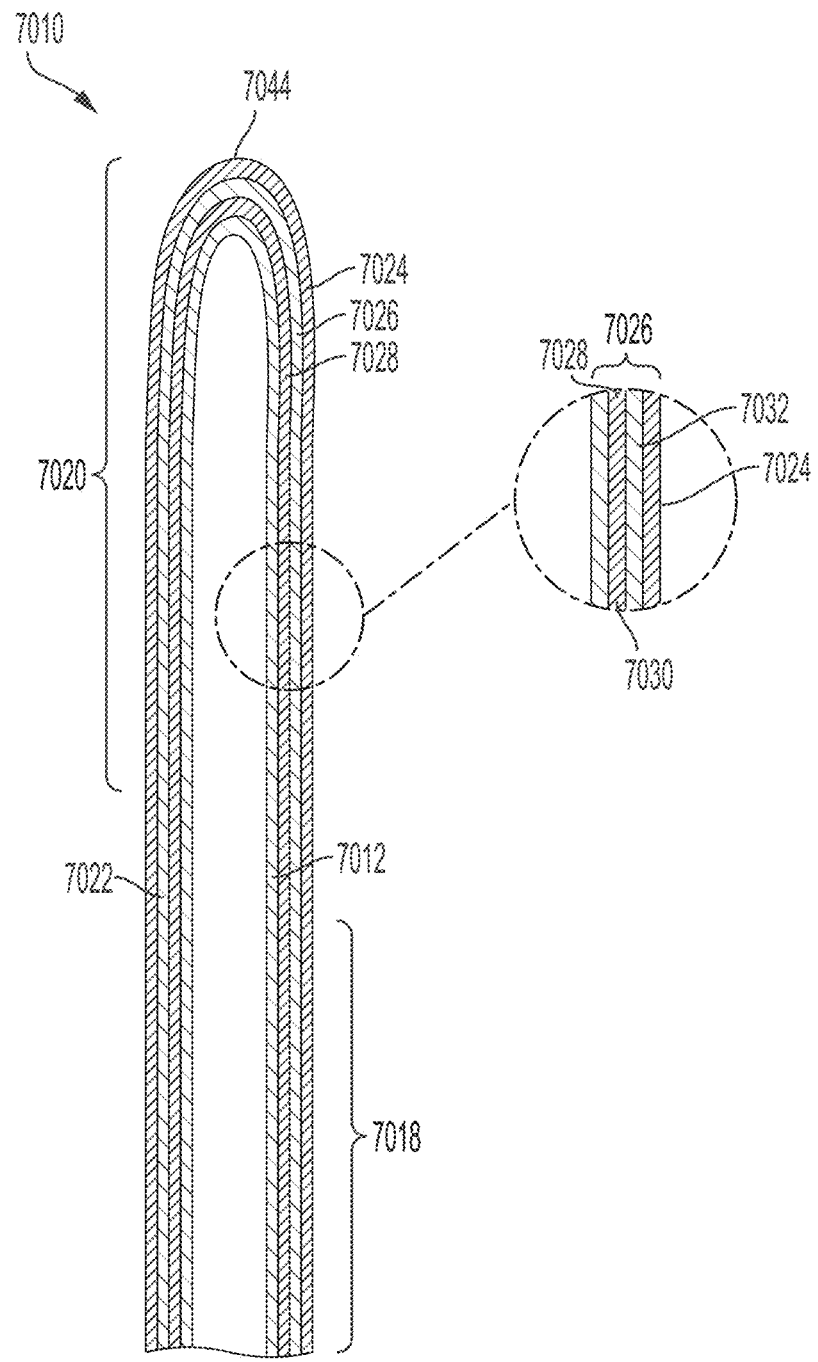
FIG. 51 is a cross-sectional view of a portion of a ureteral catheter in a linear, uncoiled state including a multi-functional coating according to an example of the disclosure.

With reference to FIGS. 50A and 50B, according to another example, a retention portion 500b of a ureteral catheter 512b comprises an expandable cage 530b. The expandable cage 530b comprises one or more longitudinally and radially extending hollow tubes 522b. For example, the tubes 522b can be formed from an elastic, shape memory material such as nitinol. The cage 530b is configured to transition from a contracted state, for insertion through the patient's urinary tract, to a deployed state for positioning in the patient's ureters and/or kidney. The hollow tubes 522b comprise a plurality of drainage ports 534b which can be positioned on the tubes, for example, on radially inward facing sides thereof. The ports 534b are configured to permit fluid to flow or be drawn through the ports 534b and into the respective tubes 522b. The fluid drains through the hollow tubes 522b into a drainage lumen 524b defined by a catheter body 526b of the ureteral catheter 512b. For example, fluid can flow along the path indicated by the arrows 532b in FIGS. 50A and 50B. In some examples, when negative pressure is induced in the renal pelvis, kidneys, and/or ureters, portions of the ureter wall and/or renal pelvis may be drawn against the outward facing surfaces of the hollow tubes 522b. The drainage ports 534b are positioned and configured so as not to be appreciably occluded by ureteral structures upon application of negative pressure to the ureters and/or kidney.

Coated and/or Impregnated Ureteral Catheters

Referring to FIGS. 51-54, in some examples, at least a portion or all of the devices, such as any or all of the catheter(s) and/or outflow catheters described herein, can be coated and/or impregnated with at least one of the coating/impregnant material(s) described herein. Portions or all of any of the devices described herein, generally designated collectively as 7010, such as catheter(s), can be coated and/or impregnated with at least one of the coating/impregnant materials described herein.

In some examples, the device 7010 can be configured to facilitate insertion and/or removal of the coated device 7010 within a urinary tract of the patient and/or, once inserted, the at least one coating(s) and/or impregnation(s) 7022 can improve function of the device 7010. The device 7010 can be configured for insertion in one or more of a ureter, renal pelvis, and/or kidney of a patient. The device 7010 can be deployed to maintain an end 7044 or retention portion 7020 of the device 7010 at a desired position within the urinary tract. The device 7010 can be sized to fit securely at a desired position within the urinary tract, as described in detail herein. The device 7010 can be narrow enough in a retracted state so that the coated device 7010 can be easily inserted and removed. The device 7010 can have any of the configurations described herein, for example a catheter or stent. In some examples, the retention portion 7020 of a suitable catheter comprises a funnel, coil, balloon, cage, sponge, and/or combinations thereof.

The device 7010 to be coated and/or impregnated can be formed from or comprise at least one device material(s) comprising at least one of copper, silver, gold, nickel-titanium alloy, stainless steel, titanium, and/or biocompatible polymer(s), such as polyurethane, polyvinyl chloride, polytetrafluoroethylene (PTFE), latex, silicone coated latex, silicone, polyglycolide or poly(glycolic acid) (PGA), Poly-lactide (PLA), Poly(lactide-co-glycolide), Polyhydroxyalkanoates, Polycaprolactone and/or Poly(propylene fumarate), as discussed in detail above.

In some examples, the at least one coating(s) and/or impregnation(s) 7022 can be present on and/or in at least the outer periphery 1002 or the protective surface area 1001, 7038 of the device 7010 that inhibits mucosal tissue 1003 from occluding the at least one protected drainage hole(s), port(s) or perforation(s) 7036 upon application of negative pressure through the catheter. In some examples, the at least one coating(s) and/or impregnation(s) 7022 can be present on and/or in any portion(s) of the device 7010, and/or on or in the entire device 7010. In some examples, the at least one coating(s) and/or impregnation(s) 7022 can be present on and/or in at least a portion(s) of the retention portion 7020, or on and/or in all of the retention portion 7020. In some examples, the at least one coating(s) and/or impregnation(s) 7022 can be present on and/or in at least a portion(s) of a surface of the device, or on and/or in the entire surface of the device. In some examples, the at least one coating(s) and/or impregnation(s) 7022 can be present on and/or in at least an outer surface 7028 of the device, or on and/or in the entire outer surface 7028 of the device. In some examples, the at least one coating(s) and/or impregnation(s) 7022 can be present on and/or in other portions of the device 7010, such as portions or all of the delivery catheters of any of the above described catheter assemblies. In some examples, the at least one coating(s) and/or impregnation(s) 7022 are formed from one or more flexible coating materials, which do not appreciably or substantially affect a flexibility of the coated and/or impregnated device 7010.

In some examples, the at least one coating(s) 7022 can comprise one or more coatings, for example one to ten coatings, or two to four coatings. In some examples, the material(s) from which the device 7010 is formed (device material(s) discussed herein) can be coated with at least one of the coating/impregnant material(s) discussed herein. The coating(s) 7022 may be applied or formed in layers, with the understanding that it is possible that components of one coating layer may migrate into one or more adjacent or proximate layers, and or into the surface or within the device 7010.

In some examples, the material(s) from which the device 7010 is formed (device material(s) discussed herein) can be impregnated with at least one of the coating/impregnant material(s) discussed herein. As used herein, "impregnated" means that at least a portion of the coating/impregnant material(s) discussed herein permeate beneath an outer surface of and/or within at least a portion of the device material(s) from which the device 7010 is formed. In some examples, different coating/impregnant material(s) and/or different amounts of respective coating/impregnant material(s) discussed herein can be used to impregnate different portions or regions of the device 7010. For example, the retention portion 7020 can be impregnated with at least one of the coating/impregnant material(s) described herein, such as at least one lubricant material(s) and/or at least one antimicrobial material(s), while the drainage tube is impregnated only with at least one antimicrobial material(s). Portions or all of the device 7010 can be both impregnated and/or coated, as desired. In some examples, there can be layers of different impregnants at different depths within the device 7010.

The at least one coating/impregnant material(s) (which can be used as a coating material(s) and/or impregnant material(s), referred to as "coating/impregnant material(s)" for brevity) comprises at least one (one or more) of lubricant(s), antimicrobial material(s), pH buffer(s) or anti-inflammatory material(s). In some examples, the at least one coating(s) and/or impregnation(s) 7022 can be used to improve short term or long term performance of the device 7010, reduce pain during insertion/removal of the device 7010 into the urinary tract, and/or mitigate risks associated with prolonged use of an indwelling device.

For example, at least a portion of the device 7010 can be coated and/or impregnated with at least one coating/impregnant material(s) comprising at least one lubricant(s). The at least one coating(s) and/or impregnation(s) 7022 comprising the at least one lubricant(s) can, for example, have a lower coefficient of friction than the uncoated/unimpregnated device, function as a lubricant, and/or become lubricated or slippery in the presence of fluid such as moisture or urine. The presence of a lubricant in the at least one coating(s) and/or impregnation(s) 7022 may make the device 7010 easier to deploy and remove. Generally, in some examples, the at least one coating(s) and/or impregnation(s) 7022 can comprise materials configured to address issues and sources of discomfort associated with indwelling catheters.

Alternatively or additionally, the device 7010 can be coated and/or impregnated with at least one of antimicrobial material(s), pH buffer(s) and/or anti-inflammatory material(s). The at least one of antimicrobial material(s), pH buffer(s) and/or anti-inflammatory material(s) may mitigate risks associated with prolonged use of indwelling catheters, such as tissue ingrowth through portions of the device, foreign body reactions caused when portions of the device contact surrounding fluid and/or tissues, infection to tissues surrounding the device, and/or formation of encrustations on portions of the device. Encrustations can be caused by, for example, protein adsorption and/or buildup of minerals or urine crystals.

In some examples, the at least one coating(s) and/or impregnation(s) 7022 comprises at least one lubricant. In some examples, outer surface(s) or layer(s) of the at least one coating(s) and/or impregnation(s) 7022 comprise at least one lubricant. Lubricious coating(s)/impregnant(s) can be described in terms of their degree of lubricity or kinetic coefficient of friction, or the amount of friction reduction provided compared to an uncoated device, or a device comprising one or more coating(s)/impregnant(s) having an outer layer(s) having a kinetic coefficient of friction which is greater than the kinetic coefficient of friction of a lubricant coated comparable device. The kinetic coefficient of friction can be determined using ASTM Method D1894-14 (March 2014). A rigid mandrel can be inserted through the inner lumen of the stent/catheter section being tested, which is sized to minimize the amount of open space inside the stent/catheter inner lumen and any potential resultant constriction of the inner lumen when the sled is dragged along the material. Alternatively, the catheter tube can be slit and opened into a flattened sheet for testing.

In some examples, the lubricant(s) can comprise at least one hydrophilic lubricant material. Exemplary hydrophilic lubricant materials comprise at least one (one or more) of polyethylene glycol, polyvinylpyrrolidone, polytetrafluoroethylene, polyvinyl alcohol, polyacrylamide, polymethacrylate, as well as other acrylic polymers or copolymers of the above-listed materials, or polyelectrolytes. An exemplary hydrophilic coating material/impregnant is ComfortCoat® polyelectrolyte-containing hydrophilic coating which is available from Koninklijke DSM N.V. Examples of suitable hydrophilic coating/impregnant material(s) comprising polyelectrolyte(s) are disclosed in U.S. Pat. No. 8,512,795, which is incorporated by reference herein.

In some examples, the at least one coating(s)/impregnation(s) 7022 can comprise at least one material(s) which is not hydrophilic. For example, one or more layers of the at least one coating(s) and/or impregnation(s) 7022 can be comprise or be formed from polytetrafluoroethylene (e.g., Teflon), siloxane(s), silicone or polysiloxane(s), or other slippery and/or low friction materials.

In some examples, the lubricant can comprise at least one polymer material(s), such as at least partially cross-linked polymer material(s) (e.g., a gel or hydrogel). In some examples, the at least one polymer material(s) readily takes up or entraps fluid or liquid. Gels or hydrogels are systems that comprise three-dimensional, physically or chemically bonded polymer networks that entrap fluid or liquid, such as water, in intermolecular space. As known in the art, a gel or hydrogel can refer to an at least partially cross-linked material comprising a substantial liquid portion, but which exhibits little or no flow when in a steady state. By weight, a gel is generally mostly liquid, but may behave like a solid due to the cross-linked structure. Due to their ability to accommodate high water content, porosity, and soft consistency, hydrogels closely simulate natural living tissue, Gels and hydrogels may be chemically stable or they may degrade and eventually disintegrate and dissolve. In some examples, the at least one lubricant is biocompatible.

For example, useful gels or hydrogels can comprise one or more of polyethylene glycol, polyvinylpyrrolidone, polytetrafluoroethylene, polyvinyl alcohol, polyacrylamide, polymethacrylate, and/or hydrogels comprising polyacrylic acid (PAA) and/or disulphide-crosslinked (poly(oligo(ethyleneoxide) monomethyl ether methacrylate)) (POEMA). As a result of taking up or entrapping fluid (such as moisture), some hydrophilic materials can become gel-like, slick, and/or smooth.

Accordingly, when in the presence of fluid (such as moisture and/or urine), the hydrophilic material of the lubricant can provide increased lubricity between the stent or catheter device 7010 and adjacent portions of the urinary tract of the patient.

Combinations or mixtures of hydrophilic lubricant material(s), non-hydrophilic lubricant material(s) and/or polymer lubricant material(s) can be used in the same coating/impregnant or different coating(s)/impregnant(s), or layers thereof, as desired. In some examples, the concentration of the at least one lubricant(s) in the at least one coating(s) and/or impregnation(s) 7022 prior to drying or curing can range from about 0.1 to about 99.9 weight percent or 100 weight percent based upon the total weight of the coating/impregnant material(s) composition, or about 20 to 100 weight percent, or about 50 to about 100 weight percent. In some examples, the concentration of the at least one lubricant(s) in the at least one coating(s) and/or impregnation(s) 7022 after drying or curing can range from about 0.1 to about 99.9 weight percent or 100 weight percent based upon the total weight of the dried or cured coating/impregnation, or about 20 to 100 weight percent, or about 50 to about 100 weight percent.

In some examples, the at least one coating(s) and/or impregnation(s) 7022 can comprise at least one antimicrobial material(s), for example to inhibit tissue growth and/or to prevent infection. For example, any of the at least one coating(s) and/or impregnation(s) 7022, such as the outermost layer 7024 and/or any of the sublayer(s) 7026, can comprise the at least one antimicrobial material itself, or one or more material(s) comprising the at least one antimicrobial material, for example a polymer matrix formed from a suitable biocompatible material impregnated with antimicrobial material(s). Alternatively or additionally, the sublayer(s) 7026 can comprise a liposome-coating or similar material, and can be configured to deliver bacteriophages or drug therapies. An antimicrobial material can refer to, for example, at least one of antiseptic material(s), antiviral material(s), antibacterial material(s), antifungal material(s), and/or an antibiotic material(s), such as antibiotic medication or therapeutic agent. Examples of suitable antibacterial, antifungal, and/or antiseptic agents and materials can comprise chlorhexidine, silver ions, nitric oxide, bacteriophages, sirolimus, and/or sulfonamides. Some antibacterial materials, such as sirolimus, may also act as an immunosuppressant to reduce a foreign body response induced by an indwelling catheter. Examples of suitable antibiotic materials that can be included in at least one coating(s) and/or impregnation(s) 7022 can comprise amdinocillin, levofloxacin, penicillin, tetracyclines, sparfloxacin, and/or vancomycin. Doses or concentrations of such antimicrobial medications can be selected to avoid or reduce occurrence of infection, such as are known to those skilled in the art, such as about 1 to about 100 mcg/cm$^3$. The antimicrobial and/or antibacterial materials of the coating(s) can also comprise materials such as heparin, phosphorylcholine, silicone dioxide, and/or diamond-like carbon, to inhibit any of protein adsorption, biofilm formation, mineral and/or crystal buildup, and similar risk factors. Other suitable antimicrobial materials, which provide useful functional properties for the coating(s), can comprise other antimicrobial peptides, caspofungin, chitosan, parylenes, as well as organosilanes and other materials that impart mechanical antimicrobial properties.

In some examples, the concentration of the at least one antimicrobial material(s) in the at least one coating(s) and/or impregnation(s) 7022 prior to drying or curing can range from about 0.1 to about 99.9 weight percent or 100 weight percent based upon the total weight of the coating/impregnant material(s) composition, or about 20 to 100 weight percent, or about 50 to about 100 weight percent. In some examples, the concentration of the at least one antimicrobial material(s) in the at least one coating(s) and/or impregnation (s) 7022 after drying or curing can range from about 0.1 to about 99.9 weight percent or 100 weight percent based upon the total weight of the dried or cured coating/impregnation, or about 20 to 100 weight percent, or about 50 to about 100 weight percent.

In some examples, the at least one coating(s) and/or impregnation(s) 7022 comprising the antimicrobial material(s) should provide suitable protection for the coated device 7010 for the entire usable life of the device 7010, although the time period in which antimicrobial properties are present may be shorter. Accordingly, the at least one coating(s) and/or impregnation(s) 7022 should be thick enough and contain enough antimicrobial material to continue to exhibit antimicrobial properties for the usable life of the coated device 7010, which can be from about 1 day to about one year, or from about 10 days to about 180 days, or from about 30 days to about 90 days.

In some examples, alternatively or additionally, the at least one coating(s) and/or impregnation(s) 7022 can comprise at least one pH buffering material(s) to buffer the pH of the fluid in the urinary tract, such as urine. Such a buffering material(s), for example, may reduce or eliminate encrustations, which may adhere to surfaces of the coated device 7010. A pH buffering material is believed to reduce encrustations by inhibiting or preventing formation of urine crystals, which often adhere to indwelling structures positioned within the urinary tract. For example, in the presence of organisms capable of producing the urease enzyme, local increases in ammonium concentration and pH can result in the formation of crystals of at least one of calcium phosphate, magnesium phosphate, or magnesium ammonium phosphate, while crystals of urates and oxalates are more commonly seen with decreased pH level. The pH of urine can range from about 4.5 to about 8.0, typically about 6.0.

When the pH of the fluid in the urinary tract rises above a predetermined value, such as 6.0 or 7.0, for example, the at least one coating(s) and/or impregnation(s) 7022 can release a portion or all of the at least one buffering material into the fluid. Alternatively or additionally, when the pH of the fluid in the urinary tract falls below a predetermined value, such as 5.5 or 6.0, for example, the at least one coating(s) and/or impregnation(s) 7022 can release a portion or all of the at least one buffering material into the fluid. Alternatively or additionally, the at least one coating(s) and/or impregnation(s) 7022 can release a portion or all of the at least one buffering material into the fluid when the concentration of at least one of calcium, magnesium, phosphorous, oxalates or uric acid reaches a predetermined value. For example in patients with elevated levels of at least one of calcium, magnesium, phosphorous, oxalates or uric acid in their fluid or urine, examples of suitable predetermined values of analytes at which the at least one coating(s) and/or impregnation(s) 7022 can release a portion or all of the at least one buffering material into the fluid are: for calcium at least about 15 mg/deciliter (dl), for magnesium at least about 9 mg/dl, for phosphorous at least about 60 mg/dl, for oxalates at least about 1.5 mg/dl, and for uric acid at least about 36 mg/dl. Calcium specifically is commonly referenced as a ratio to urinary creatinine, i.e., normal value would be urine calcium:urine creatinine <0.14. The levels of these analytes in fluid or urine can be determined using one or more of colorimetric analysis, spectrometry or microscopy methods of the fluid or urine samples. "Normal" values and reference ranges are often provided in units of 'mg/24 hrs' since the excretion is highly driven by dietary intake and so would be expected to be variable over time. Excretion of these analytes can also be significantly impacted by the use of certain medications, such as diuretics. A device could intrinsically "sense" and react to analyte levels by releasing one or more buffer agents as a result of the binding of analytes to at least a portion of or a component of a coating layer. Predetermined thresholds can be set for specific analytes in order to determine binding affinities of a coating layer so that different levels of binding would trigger release of varying amounts of the one or more buffer agents, as desired.

Examples of suitable pH buffering material(s) can comprise, for example, an acid salt impregnated in a dissolvable polymer material layer. As will be appreciated by those skilled in the art, as the acid salt dissolves in the presence of bodily fluid or moisture, an acid solution is produced. Desirably, the produced acidic solution inhibits formation of the encrustations, but is not so acidic as to damage body tissues. Examples of suitable acid salts that can be used as a suitable pH buffer layer can comprise weakly acidic salts, such as sodium citrate, sodium acetate, and/or sodium bicarbonate. In some examples, the pH buffering material(s) can be dispersed in a hydrogel, colloid and/or copolymer matrix, such as methacrylic acid and methyl methacrylate copolymer, and dispersed or layered with high affinity calcium- or phosphate-binding agent(s), such as ethylene glycol tetraacetic acid (EGTA).

In some examples, the concentration of the at least one pH buffering material(s) in the at least one coating(s) and/or impregnation(s) 7022 prior to drying or curing can range from about 0.1 to about 99.9 weight percent or 100 weight percent based upon the total weight of the coating/impregnant material(s) composition, or about 20 to 100 weight percent, or about 50 to about 100 weight percent. In some examples, the concentration of the at least one pH buffering material(s) in the at least one coating(s) and/or impregnation(s) 7022 after drying or curing can range from about 0.1 to about 99.9 weight percent or 100 weight percent based upon the total weight of the dried or cured coating/impregnation, or about 20 to 100 weight percent, or about 50 to about 100 weight percent.

In some examples, the at least one coating(s) and/or impregnation(s) 7022 can comprise outermost layer(s) 7024 and a single or multiple sublayer(s) 7026 (e.g., comprising either an antimicrobial sublayer or a pH buffering sublayer). In other examples, the sublayer(s) 7026 of the at least one coating(s) and/or impregnation(s) 7022 can comprise, for example, a first sublayer 7030 applied to the outer surface 7028 of the device 7010 comprising a pH buffering material, for example for reducing encrustation of urine crystals, and a second sublayer 7032 covering at least a portion of the first sublayer 7030. The second sublayer 7032 can comprise the antimicrobial material(s), for example. Alternatively, the first sublayer 7030 can comprise the antimicrobial material(s) and the second sublayer 7032 can comprise the pH buffering material(s).

In some examples, alternatively or additionally, the at least one coating(s) and/or impregnation(s) 7022 can comprise at least one anti-inflammatory material(s). Following insertion into the body, proteins and other biomolecules in the body, such as in the blood plasma and biological fluids, absorb onto the surface of the biomaterial of the device or implant. Nonspecific biomolecule and protein adsorption and subsequent leukocyte adhesion, known as "biofouling" may result. Subsequent inflammatory reactions can result, such as biomaterial-mediated inflammation, which is a complex reaction of protein adsorption, leukocyte recruitment/activation, secretion of inflammatory mediators, and fibrous encapsulation of part or all of the device or implant. Reducing the inflammatory response, for example by reducing the protein binding and ability of the immune response to propagate, can prevent or reduce possible injury to the urinary tract tissues by contact with the device in the absence or presence of negative pressure.

Non-limiting examples of suitable anti-inflammatory material(s) comprise anti-inflammatory agent(s) and non-fouling surface treatment material(s). Examples of suitable anti-inflammatory agent(s) comprise at least one of Dexamethasone (DEX), Heparin or Alpha-melanocyte-stimulating hormone α-MSH). Examples of suitable non-fouling surface treatment material(s) comprise at least one of polyethylene glycol-containing polymers, poly(2-hydroxyethyl methacrylate), poly(N-isopropyl acrylamide), poly(acrylamide), phosphoryl choline-based polymers, mannitol, oligomaltose, and taurine groups.

In some examples, the concentration of the at least one anti-inflammatory material(s) in the at least one coating(s) and/or impregnation(s) 7022 prior to drying or curing can range from about 0.1 to about 99.9 weight percent or 100 weight percent based upon the total weight of the coating/impregnant material(s) composition, or about 20 to 100 weight percent, or about 50 to about 100 weight percent. In some examples, the concentration of the at least one anti-inflammatory material(s) in the at least one coating(s) and/or impregnation(s) 7022 after drying or curing can range from about 0.1 to about 99.9 weight percent or 100 weight percent based upon the total weight of the dried or cured coating/impregnation, or about 20 to 100 weight percent, or about 50 to about 100 weight percent.

In some examples, the at least one coating(s) and/or impregnation(s) 7022 can comprise the outermost layer(s) 7024 and a single or multiple sublayer(s) 7026 comprising the at least one anti-inflammatory material(s). In some examples, the outermost layer(s) 7024 can comprise at least one pH buffer material, and one or more sublayer(s) 7026 can comprise the at least one anti-inflammatory material(s).

In some examples, an overall thickness of the at least one coating(s) and/or impregnation(s) 7022, or depth of impregnation into the device material(s), can range from about 0.001 micrometer (about 1 nanometer) to about 10.0 millimeters, or about 0.001 micrometer to about 5 mm, or about 0.001 mm to about 5.0 mm, or about 0.01 mm to about 1.0 mm, or about 0.001 micrometer to about 0.2 mm, after application and drying and/or curing of the coating(s)/impregnant(s). In some examples, each coating/impregnant layer within multiple coating(s)/impregnant(s) layers can have a thickness ranging from about 0.001 micrometer to about 10.0 millimeters, or about 0.001 micrometer to about 5.0 mm, or about 0.001 micrometer to about 500 micrometers, after application and drying or curing of the coating(s)/impregnant(s) layer.

In some examples, an overall thickness of the at least one hydrated or swelled coating(s) and/or impregation(s) 7022, or depth of impregnation into the device material(s), can range from about 0.1 micrometer to about 25.0 millimeters, or about 0.1 micrometer to about 500 micrometers, or about 20 micrometers±20%.

In some examples, the density of the coating/impregnant material(s) composition can range from about 0.1 to about 200 mg/microliter prior to drying or curing, or about 1 mg/microliter. The coating/impregnant material(s) to be applied to the device 7010, prior to drying or curing, can further comprise at least one carrier or adjuvant, such as water, alcohol(s), silica oils such as polydimethylsiloxane(s), and/or polymeric matrix materials such as hydrogels, for example comprising polyacrylic acid (PAA) and/or disulphide-crosslinked (poly(oligo(ethylene-oxide) monomethyl ether methacrylate)) (POEMA).

In some examples, the concentration of at least one of lubricant(s), antimicrobial material(s), pH buffer(s) or anti-inflammatory material(s) in the coating/impregnant material(s) composition prior to drying or curing can range from about 0.1 to about 99.9 weight percent or 100 weight percent based upon the total weight of the coating/impregnant composition used for the respective layer. In some examples, the coating/impregnant material(s) composition can be applied to the device 7010, prior to drying or curing, in an amount ranging from at about 0.001 mg/cm$^2$ to about 5 mg/cm$^2$, or about 2 mg/cm$^2$±50%, per layer. In some examples, for coating/impregnant material(s) composition comprising at least one antimicrobial(s), the coating(s)/impregnant(s) can be applied to the device 7010, prior to drying or curing, in an amount ranging from at about 0.001 mg/cm$^2$ to about 5 mg/cm$^2$, or about 2 mg/cm$^2$±50%, or about 0.005 mg/cm$^2$ to about 0.025 mg/cm$^2$ per layer.

In some examples, an outermost coating/impregnant layer(s) 7024 comprises the at least one lubricant. In some examples, the at least one lubricant (such as a hydrophilic material, gel or hydrogel) is configured to remain or to at least partially or fully dissipate when exposed to fluid (such as moisture and/or urine), such as occurs when the catheter device 7010 is deployed in the patient's urinary tract, to reveal or uncover other materials of the at least one coating(s) and/or impregnation(s) 7022 or the outer surface 7028 of the catheter device 7010 beneath the lubricant coating. For example, as the lubricant dissipates, one or more sublayer(s) or underlying layers positioned below the outermost layer(s) 7024 may be exposed. The lubricant of the outermost layer(s) 7024 can be configured to dissipate into surrounding fluid or tissue within a desired time period following implantation. Since the lubricant can be primarily intended to facilitate insertion and positioning of the coated device 7010, a portion or all of the outermost layer 7024 may dissipate within a rather short period of time following insertion in the urinary tract. For example, the outermost layer 7024 may be configured to entirely, substantially or partially dissipate within 6 hours to 10 days, or 12 hours to 5 days, or 1 day to 3 days, following insertion and/or placement within the urinary tract. As used herein, a material, such as a portion or all of the outermost layer 7024, substantially dissipates when at least about 90%, or at least about 95%, or about 95%, or about 98%, of the outermost layer 7024 has released from the surface of the catheter 7010, or coating beneath the outermost layer, and been absorbed into surrounding fluid and/or tissues 1003, 1004, and/or expelled from the patient's body. In some examples, an outermost layer 7024 which dissipates within 1 day to 10 days can have a total thickness, prior to or when hydrated or activated, ranging from 0.01 micrometer to 5.0 millimeters, or 0.001 mm to 2.5 mm, or 0.01 mm to 1.0 mm. In some embodiments, a thickness of the outermost layer 7024 may be largely dependent on how long the outermost layer 7024 should remain in place when within the urinary tract before dissolving to expose sublayer(s) 7026 of the at least one coating(s) and/or impregnation(s) 7022 and/or the outer surface 7028 of the catheter device 7010.

Upon dissipation of the outermost layer 7024, material of one or more sublayer(s) 7026 positioned below the outermost layer(s) 7024 may remain in place to provide a particular property or function for an extended period of time or may be configured to release into surrounding fluid and/or tissue to, for example, provide a desired therapeutic or beneficial effect for the surrounding fluid and/or tissue. For example, the material of the one or more sublayer(s) 7026 can be configured for slow release into surrounding tissue over a period ranging from about 1 day to about one year, or about 30 days to about 180 days, or about 45 days to about 90 days. In some examples, a rate of dissipation for the sublayer(s) 7026 is dependent on a thickness of the outermost layer 7024. For example, the sublayer(s) 7026 can have a total thickness ranging from about 0.01 micrometer to 5.0 millimeter, or about 0.01 mm to 4.0 mm, or about 0.1 mm to 3.0 mm. In some examples, the thickness of the sublayer(s) 7026 can be selected so that it can remain, or dissolve and release materials, for improving function of the catheter device 7010 for the entire useful life or time that the device 7010 is within the urinary tract.

In other examples, the outermost layer 7024 can be configured to remain adhered to the coated device 7010, and in some examples to maintain its beneficial properties, throughout some or all of the time period in which the coated device 7010 is within the urinary tract. For example, the outermost layer(s) 7024 may remain in place for a period of up to 10 days, 45 days, 90 days, or up to, at least, one year, when within a patient's urinary tract. In order to maintain beneficial or hydrophilic properties for up to at least one year, the outermost layer 7024 may be as thin as or thinner than 0.01 mm, or may be thicker than 5.0 mm, possibly up to 10.0 mm thick. Alternatively or additionally, the outermost layer 7024 can be formed from a material that does not dissolve or degrade, or only degrades slowly when within the urinary tract. For example, certain slippery or low friction non-hydrophilic materials, such as polytetrafluoroethene (PTFE) (e.g., Teflon), may remain in place without dissolving for extended periods of time.

When configured to maintain properties, such as hydrophilic properties, for an extended duration, the outermost layer 7024 can be configured for time-dependent permeability or release, such that bulk material of the sublayer(s) 7026 can pass through the outermost layer(s) 7024 and to surrounding fluid and/or tissue. For example, the outermost layer 7024 can comprise structures and/or void spaces for permitting moisture or fluid to penetrate through the outermost layer 7024 and to the one or more sublayer(s) 7026. In order to obtain such permeability, the outermost layer(s) 7024 can comprise a composite material wherein bulk hydrophilicity is maintained, while the at least one contributing material of the outermost layer 7024 provides properties, such as selective diffusibility, solubility, and/or porosity (e.g., microporosity, mesoporosity, or macroporosity). According to International Union of Pure and Applied Chemistry (IUPAC) nomenclature, microporosity, mesoporosity, and macroporosity describe materials exhibiting pores with diameters of less than 2.0 nanometers, between 2.0 and 50 nanometers, and greater than 50 nanometers, respectively. Processes that may be used to form porous materials can comprise, for example, phase separation, gas foaming, and soft and hard templating techniques, as well as other selective and additive manufacturing methods.

Figure 53:
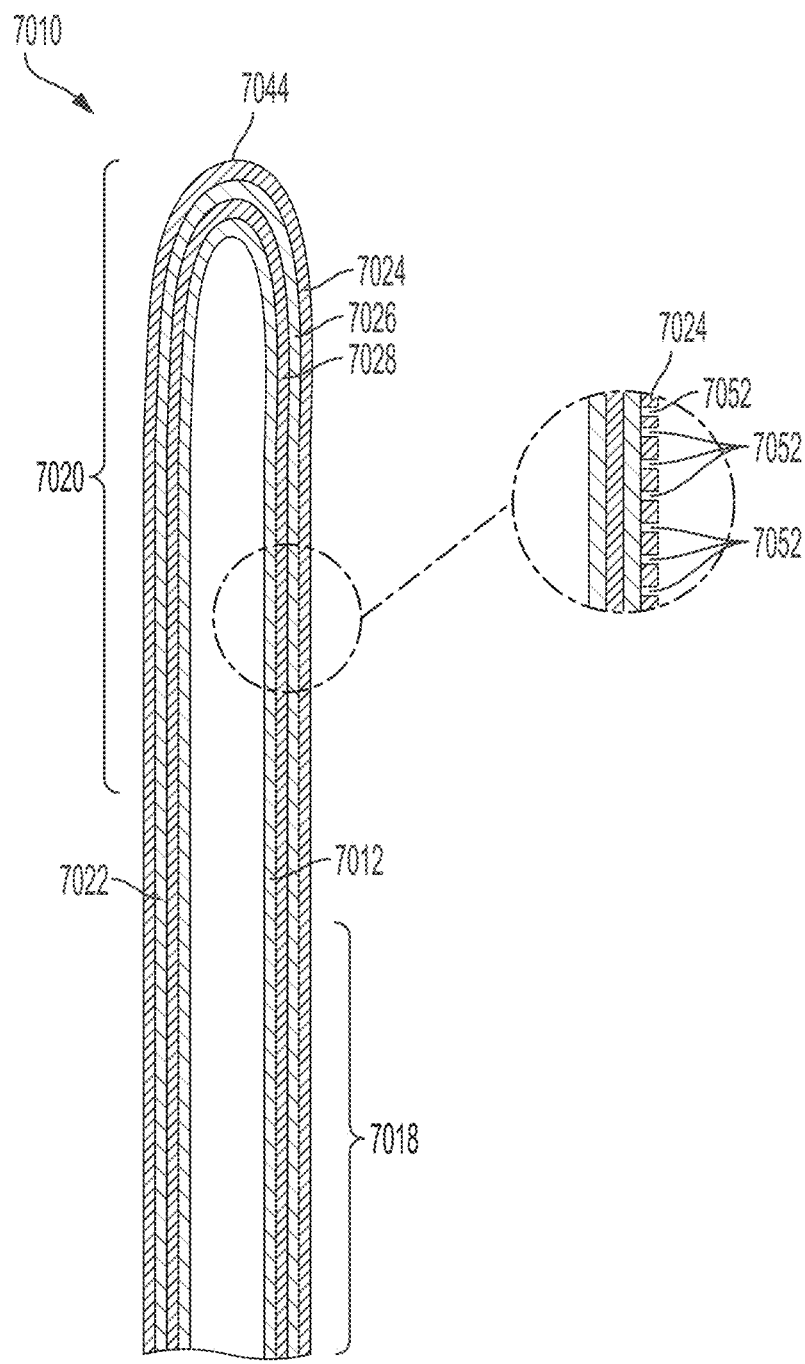
FIG. 53 is a cross-sectional view of a portion of a ureteral catheter in a linear, uncoiled state, including another exemplary multi-functional coating according to an example of the disclosure.

Alternatively or additionally, as shown schematically in FIG. 53, the outermost layer 7024 can comprise at least one opening(s), hole(s), space(s), and/or micro-channel(s) 7052 extending through the outermost layer 7024 to the one or more sublayer(s) 7026. The at least one opening(s), hole(s), space(s), and/or micro-channel(s) 7052 can be inherent, naturally occurring, or created (man-made) in the material of the outermost layer 7024. For example, the outermost layer 7024 may be naturally porous. In some examples, at least one opening(s), hole(s), space(s), and/or micro-channel(s) can be formed by any suitable process including, for example, pressing a pin or puncture needle through the cured outermost layer 7024. In other examples, the at least one opening(s), hole(s), space(s), and/or micro-channel(s) 7052 can be formed by etching or dissolving portions of the outermost layer 7024. The at least one opening(s), hole(s), space(s), and/or micro-channel(s) 7052 can be configured such that fluid, such as moisture, passes through the outermost layer 7024 to the sublayer(s) 7026, and dissolved material from the sublayer(s) 7026 passes through the at least one opening(s), hole(s), space(s), and/or micro-channel(s) 7052 of the outermost layer 7024 to the surrounding fluid and/or tissue. In some examples, the at least one opening(s), hole(s), space(s), and/or micro-channel(s) 7052 initially extend through the entire outermost layer 7024, such that fluid can penetrate to the one or more sublayer(s) 7026 as soon as the device 7010 is positioned in the urinary tract. In other examples, the at least one opening(s), hole(s), space(s), and/or micro-channel(s) 7052 may extend partially through the outermost layer 7024. In that case, fluid, such as moisture or urine, may collect in the at least one opening(s), hole(s), space(s), and/or micro-channel(s) 7052, causing portions of the at least one opening(s), hole(s), space(s), and/or micro-channel(s) 7052 to dissolve during an initial period following insertion into the urinary tract. Over time, the at least one opening(s), hole(s), space(s), and/or micro-channel(s) 7052 dissolve through the remaining portion of the outermost layer(s) 7024, eventually contacting and exposing portions of the one or more sublayer(s) 7026. In this way, release of the functional material(s) of the sublayer(s) 7026 is delayed until a period of time after the device 7010 is inserted into the urinary tract. The at least one opening(s), hole(s), space(s), and/or micro-channel(s) 7052 can be of any size and number sufficient for permitting fluid, such as moisture, to pass to contact the one or more sublayer(s) 7026 and for permitting dissolved material of the sublayer(s) 7026 to pass through the at least one opening(s), hole(s), space(s), and/or micro-channel(s) 7052 to surrounding body fluid and tissues. For example, the at least one opening(s), hole(s), space(s), and/or micro-channel(s) 7052 can have a cross-sectional area of about 0.01 micrometer to about 1.0 milimeter$^2$, or about 0.1 mm$^2$ to about 0.5 mm$^2$, or about 0.2 mm$^2$ to about 0.4 mm$^2$. The at least one opening(s), hole(s), space(s), and/or micro-channel(s) 7052 can be formed in or on the outermost layer 7024 in a variety of configurations and arrangements. For example, the at least one opening(s), hole(s), space(s), and/or micro-channel(s) 7052 can be a plurality of openings having any configuration desired, for example, substantially circular, elliptical, or any shape in cross section. In other examples, the at least one opening(s), hole(s), space(s), and/or micro-channel(s) 7052 can be troughs or burrows extending in any direction (e.g., axially and/or or circumferentially) along a surface of or within the outermost layer(s) 7024.

Figure 52:
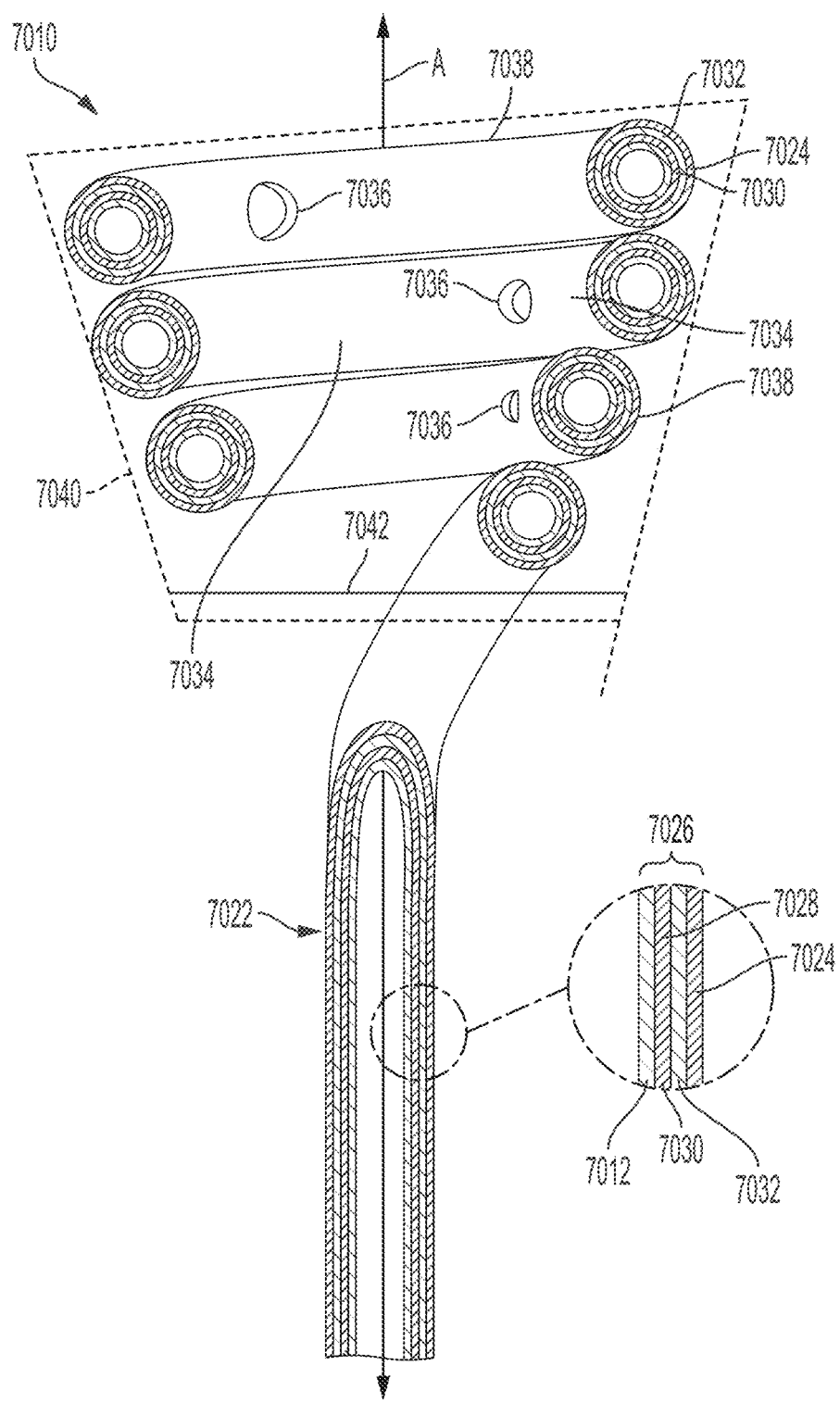
FIG. 52 is a cross-sectional view of a portion of the ureteral catheter of FIG. 51 in a deployed or coiled state.

As shown in FIGS. 52 and 53, in some examples, the sublayer(s) 7026 are positioned between an outer surface 7028 of the device 7010 (such as elongated tube 7012) and the outermost layer(s) 7024. The sublayer(s) 7026 can be configured to improve long-term performance of the coated device 7010, for example, by addressing one or more of the above-described issues associated with prolonged use of the device 7010, such as an indwelling catheter. For example, the one or more sublayer(s) 7026 can improve long-term performance of the coated device 7010 by one or more of: inhibiting tissue ingrowth; mitigating a foreign body reaction for tissues surrounding the deployed coated device 7010; reducing infection of tissues surrounding the coated device 7010; and/or reducing encrustation of urine crystals onto the coated device 7010.

In some examples, the at least one coating(s) and/or impregnation(s) 7022 are intended to contact portions of fluid and/or tissue 1003, 1004 surrounding the coated device 7010, which can be brought into contact with the device 7010 by natural forces or applied negative pressure. Accordingly, the at least one coating(s) and/or impregnation(s) 7022 may need only to be applied to at least a portion or all of the outer periphery 1002, or the outwardly facing side, or the protective surface(s) 1001, 7038, of at least a portion of, such as the retention portion 7020, or all of the device 7010. In some instances, as previously described, the inner periphery, inwardly facing side, or protected surface area 1000, 7034 of the retention portion 7020, which comprises at least one protected drainage hole(s), port(s) or perforation(s) 7036, can be substantially free of or free from the at least one coating(s) and/or impregnation(s) 7022. Alternatively, as described in connection with FIG. 54, both the protected surface 1000, 7034 and the protective surface 1001, 7038 of the device 7010 may be coated with the at least one coating(s) and/or impregnation(s) 7022, for example to provide one or more of the aforementioned benefits of the coating(s) and/or facilitate manufacturability (e.g., deposition of the coating onto the device 7010).

The at least one coating(s) and/or impregnation(s) 7022 described herein can be adapted for use with any or all of the devices 7010, such as the ureteral catheters described herein. For example, the at least one coating(s) and/or impregnation(s) 7022 can be applied to a device 7010 comprising a distal portion 7018 comprising an expandable retention portion 7020 which, when deployed at a desired location within the kidney and/or renal pelvis, defines a three-dimensional shape 7040 sized and positioned to maintain patency of fluid flow between the kidney and a proximal portion 7014 and/or proximal end 7016 of the device 7010, such that at least a portion of the fluid flows through the expandable retention portion 7020. In that case, the at least one coating(s) and/or impregnation(s) 7022 may be applied to portions of the retention portion 7020 that contact a surface of the three dimensional shape 7040. Further, as in previously described examples, in order to match a size and shape of the renal pelvis, an area of two-dimensional slices 7042 of the three-dimensional shape 7040 defined by the deployed expandable retention portion 7020 in a plane transverse to a central axis A of the expandable retention portion 7020 can increase towards a distal end 7044 of the expandable retention portion 7020.

In some examples, the retention portion 7020 comprises a coiled retention portion extending radially from the renal pelvis to the kidney. The coiled retention portion 7020 can comprise at least a first coil 7046 having a first diameter and at least a second coil 7048 having a second diameter, which can be larger than the first diameter to correspond to a size and shape of the renal pelvis. In some examples, the at least one coating(s) and/or impregnation(s) 7022 need only be applied to the outer or protective surfaces 1001, 7038 of the coil(s) 7046, 7048 since only such outer or protective surfaces 1001, 7038 are contacted by body tissues. The protected surfaces 1000, 7034 of the coils 7046, 7048 may not be coated by the at least one coating(s) and/or impregnation(s) 7022.

In some examples, at least a portion or all of both of the protective surfaces 1001, 7038 and the protected surfaces 1000, 7034 of the device 7010, such as coil(s) 7046, 7048 can be coated by the at least one coating(s) and/or impregnation(s) 7022. For example, applying the at least one coating(s) and/or impregnation(s) 7022 to all surfaces of the device 7010 or elongated tube 7012 may be easier for manufacturing or production. In some examples, the device 7010, for example the entire elongated tube 7012, may be coated by a hydrophilic or outermost layer(s) 7024, since the elongated tube 7012 or device 7010 may be in a substantially linear (e.g., uncoiled) configuration during insertion through the patient's urinary tract. The sublayers 7030, 7032, which may help to improve long term performance of the device 7010, need only be applied to portions of the device 7010 or elongated tube 7012 likely to be contacted by bodily fluid or tissues (e.g., outwardly facing portions of the tube 7012).

Multi-Layer Coating(s)/Impregnant(s) for Sequential Functionality

Figure 54:
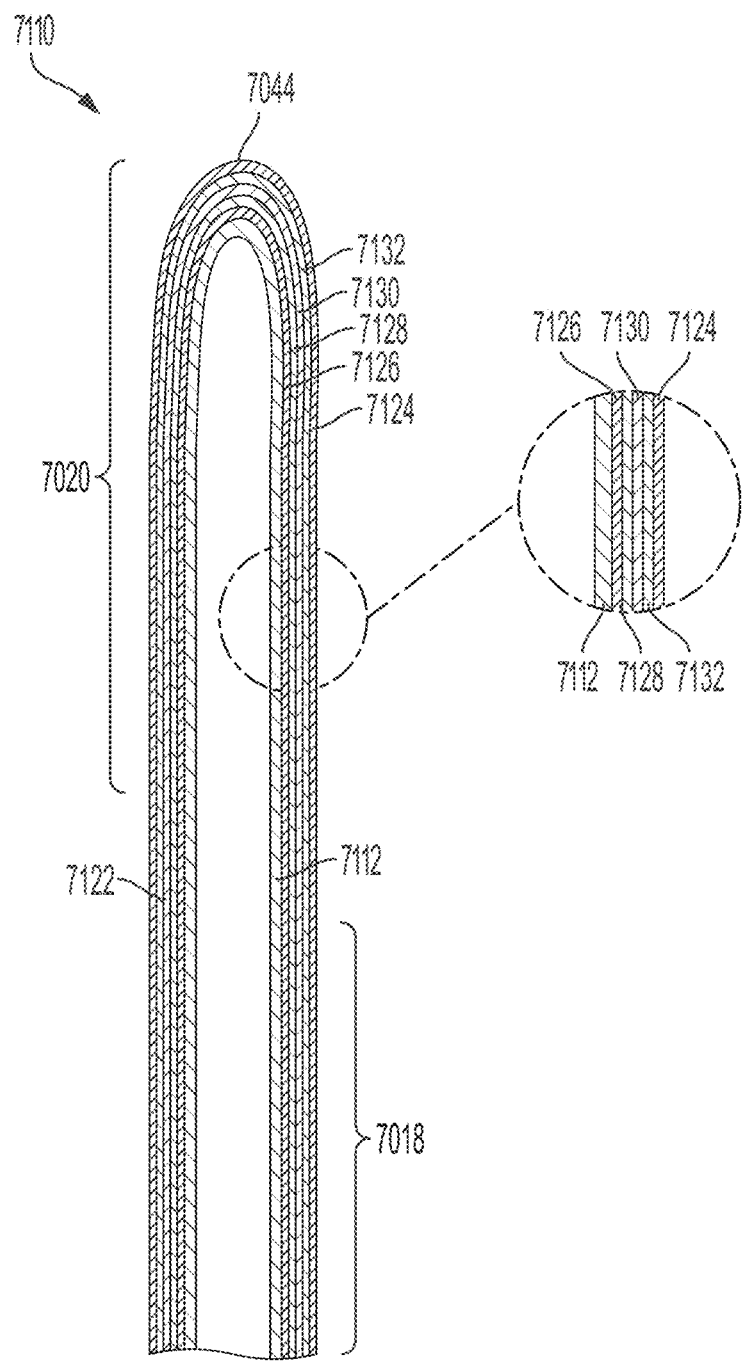
FIG. 54 is a cross sectional view of a portion of a ureteral catheter in a linear, uncoiled state, including another exemplary multi-functional coating according to an example of the disclosure.

In other examples, as shown in FIG. 54, a coated device 7110 comprises one or more coating(s) and/or impregnation(s) 7122 having multiple or different functionalities. The coating(s) and/or impregnation(s) 7122 can be applied to at least a portion or all of the device 7010. As in prior examples, the coating(s) and/or impregnation(s) 7122 can comprise one or more outermost layer(s) 7124 and one or more innermost layer(s) 7126. The coating(s) and/or impregnation(s) 7122 can further comprise multiple sublayers 7128, 7130, 7132 positioned between the one or more outermost layer(s) 7124 and the one or more innermost layer(s) 7126. The multiple sublayers 7128, 7130, 7132 can be formed from different materials and can each address different issue(s) of indwelling catheters and/or provide different functional improvements for the device 7110. The one or more outermost layer(s) 7124 and multiple sublayers 7128, 7130, 7132 may be configured to dissipate sequentially, such that the coating(s) and/or impregnation(s) provides a first property or functionality for a predetermined period, a second property for a predetermined second period, and a third property for a predetermined third period. For example, the one or more coating(s) and/or impregnation(s) 7122 may be configured such that dissipation of outermost layer(s) 7124 and sublayers 7128, 7130, 7132 over time results in periodic and/or intermittent effects including, but not limited to, periods of antimicrobial and/or antibacterial effects cycled with intermittent periods of drug delivery. In some instances, drug delivery could be controlled to occur at pre-specified times, such as limiting drug delivery to a 12-hour release, or to a 24-hour release, or to a 48-hour release, following insertion of the coated device 7110 into the urinary tract. Similarly, another 12-hour release, 24-hour release, or 48 hour release of drug may be provided prior to removal of the coated device 7110.

The outermost layer(s) 7124 can be substantially similar in thickness and material properties to the outermost layers previously described. For example, the outermost layer(s) 7124 can provide a lubricious outer surface configured to make insertion and placement of the device 7110 in the urinary tract easier than when no lubricated coating is present. The outermost layer(s) 7124 can be configured to remain or can dissipate shortly after being implanted in the body, such as within from 1 day to 10 days of implantation.

The multiple sublayers 7128, 7130, 7132 can be selected such that the sublayers remain for a predetermined period and dissipate over the lifespan or intended duration of the catheter device 7110 in the urinary tract. For example, for a catheter designed to be present in the urinary tract for a period of ten to twenty days, each of five sublayers may be configured to dissipate or dissolve in about two to four days. As discussed above, in another example, a layer comprising a therapeutic agent may dissipate within 12 hours, 24 hours, or 48 hours of insertion. Sublayers containing other materials, such as antimicrobial materials and/or pH buffering materials, may dissipate over a longer period of time, such as over periods of 1 day to 10 days, or 2 days to 8 days, or 3 days to 5 days.

In some examples, the multiple sublayers 7128, 7130, 7132 comprise a first sublayer 7128, positioned below the outermost layer(s) 7124. The first sublayer 7128 can be configured to begin to dissipate into surrounding tissue when contacted by moisture, as occurs once portions of the outermost layer(s) 7124 dissipate. As in previous examples, material of the first sublayer 7128 can be configured to address issues with indwelling catheters and/or improve functional properties of the coating(s) 7122. For example, the first sublayer 7128 can comprise an antimicrobial layer that provides protection from ingress of microbes into or onto the coating(s) 7122 for a predetermined time period, such as a few days following implantation.

Over the course of the few hours and/or days following insertion, the first sublayer 7128 dissipates, exposing the second sublayer 7130 to fluid or moisture. The second sublayer 7130 can comprise one or more coating(s) and/or impregnation(s) material(s) for providing another property for improving a function of the device 7110. For example, the second sublayer 7130 can comprise a dose of the therapeutic agent, such as a dose of an antibiotic. The second sublayer 7130 can be configured to deliver the dose of the therapeutic agent over either a short period of time (e.g., a few hours or one day) or for slow release of the therapeutic agent over a slightly longer time period (e.g., from one day to ten days, or from 2 days to 8 days, or from 3 days to 5 days). Once the therapeutic agent is released and the second sublayer 7130 dissipates into surrounding fluid or tissues, a third sublayer 7132 can be exposed to moisture or fluid of the urinary tract. The third sublayer 7132 may comprise material(s) with additional or different functional properties. For example, the third sublayer 7132 can be a pH buffering layer for reducing or eliminating a presence of encrustations on the device 7110. In other examples, the third sublayer 7132 could be another antimicrobial and/or antibacterial layer. The third sublayer 7132 can be configured to remain in place for a number of hours or days, as was the case with previous sublayers or layers.

The device 7110 can further comprise one or more additional sublayer(s) 7026 including materials with different properties for addressing issues of indwelling catheters and/or for improving a function of the coating(s) 7122 and coated device 7110. For example, the coating(s) 7122 could comprise a number of therapeutic layers including a dose of an antibiotic agent positioned between sublayer(s) 7026 comprising antimicrobial materials. Accordingly, the coating(s) 7122 can provide intermittent antibiotic doses separated by time periods in which no antibiotic is being delivered, thereby reducing a risk that antibiotic concentration would increase above suitable levels.

In some examples, the coating(s) 7122 also comprise the innermost layer 7126 positioned between the outer surface 7124 of the device 7110 or elongated tube 7112 and an innermost sublayer 7128. The innermost layer 7126 can be similar in size and material composition to the outermost layers 7124 described herein. For example, the innermost layer 7126 may comprise any of the coating materials discussed above, such as a hydrophilic material that becomes lubricated when exposed to moisture. In some examples, the innermost layer 7126 can be exposed shortly before removal of the device 7110. Once exposed to fluid or moisture, the innermost layer 7126 can be configured to become slippery and lubricious, which assists in removal of the device 7110 through the urinary tract. For example, when the innermost layer 7126 becomes lubricated, the elongated tube 7112 of the device 7110 can slide more easily through body tissues, facilitating removal of the device 7110.

Percutaneous Urinary Catheters

Examples of ureteral catheters configured to be inserted into the kidney and/or renal pelvis through a percutaneous access site will now be discussed. These ureteral catheters may be used, in particular, with the previously described pump system 800 shown in FIGS. 21A and 21B. As with previous examples, ureteral catheters configured for percutaneous insertion may comprise a variety of retention portions configured to maintain a distal portion and/or distal end of the catheter within the kidney and/or renal pelvis. For example, any of the coils, funnels, expandable cages, balloons, and/or sponges described herein can be used us retention portions for maintaining an end of a catheter inserted through a percutaneous access site at a desired position within the urinary tract (e.g., within the renal pelvis, ureters, and/or kidneys).

Figure 55:
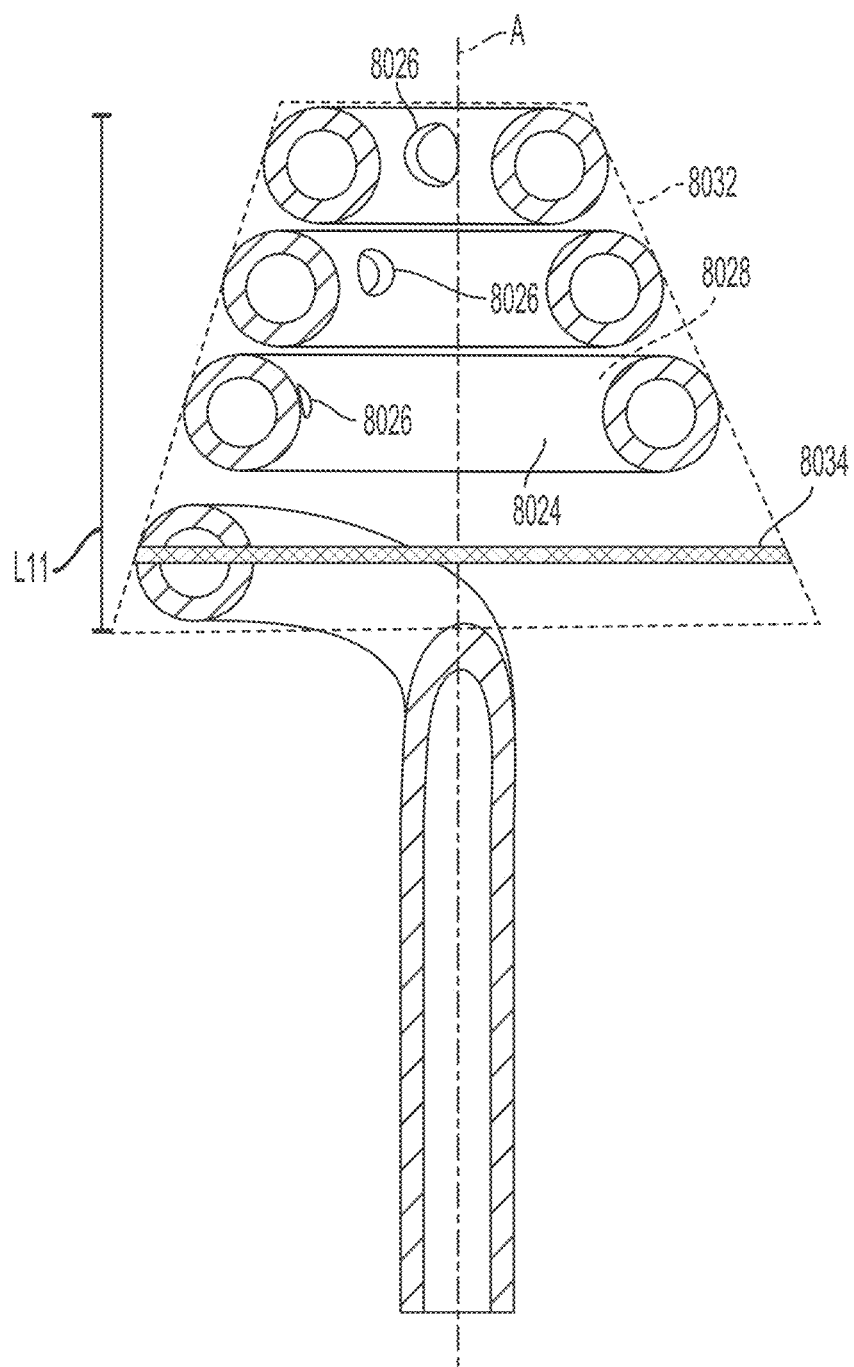
FIG. 55 is a cross sectional view of an example of a catheter configured to be inserted to the renal pelvis through a percutaneous access site accord to an example of the disclosure.

Referring to FIG. 55, an exemplary percutaneous nephrostomy tube or urinary bypass catheter 8010 will be discussed. It is understood, however, that any of the catheters discussed herein can be used in a similar manner as described below. The exemplary urinary bypass catheter 8010 is configured to be deployed in a urinary tract and comprises a retention portion 8016 for maintaining the catheter 8010 at a desired position within the urinary tract. The retention portion 8016 of the bypass catheter 8010 can be integrally formed with a distal portion 8014 of the catheter 8010 or can be a separate structure mounted to the distal end 8022 of an elongated tube 8018 of the catheter 8010 by a conventional fastener or adhesive. Many exemplary retention portions 8016 suitable for retaining the distal end 8022 of the elongated tube 8018 within the renal pelvis are provided in previous exemplary embodiments of ureteral catheters 8010. For example, retention portions 8016 comprising one or more of coils, funnels, cages, balloons, and/or sponges can be adapted for use with the bypass catheter 8010. In some cases, such retention portions 8016 can be adapted for use with urinary bypass catheters 8010 by, for example, inverting the retention portion(s) 8016 to account for the fact that a urinary bypass catheter 8010 enters the renal pelvis through the kidney, rather than through the ureters.

Regardless of the embodiment selected, the retention portion 8016 creates an outer periphery or protected surface area to prevent urinary tract tissues from constricting or occluding a fluid column extending between nephrons of the kidney and a lumen of the elongated tube 8018. In some examples, such a retention portion 8016 could comprise an inwardly facing side or protected surface area 8024 comprising one or more drainage openings, perforations, and/or ports 8026 for receiving fluid, such as urine, produced by the kidneys 8102 and an outwardly facing side or protective surface area 8028, which can be free from or substantially free from the drainage ports 8026. Desirably, the inwardly facing side or protected surface area 8024 and the outwardly facing side or protective surface area 8028 are configured such that, when negative pressure is applied through the elongated tube 8018, the urine is drawn into a lumen of the tube 8018 through the one or more drainage ports 8026, while mucosal tissues, such as tissue of the ureters and/or renal pelvis, are prevented from appreciably occluding the one or more drainage ports 8026. As in previously described ureteral catheters, sizes and spacing between the drainage ports 8026 may vary to achieve different distributions of negative pressure within the renal pelvis and/or kidney, as are disclosed herein. In some examples, each of the one or more drainage ports 8026 has a diameter of about 0.0005 mm to about 2.0 mm, or about 0.05 mm to 1.5 mm, or about 0.5 mm to about 1.0 mm. In some examples, the drainage ports 8026 can be non-circular, and can have a surface area of about 0.0002 mm$^2$ to about 100 mm$^2$, or about 0.002 mm$^2$ to about 10 mm$^2$, or about 0.2 mm$^2$ to about 1.0 mm$^2$. The drainage ports 8026 can be spaced equidistantly along an axial length of the retention portion 8016. In other examples, drainage ports 8026 nearer to the distal end 8022 of the retention portion 8016 may be spaced more closely together to increase fluid flow through more distal drainage ports 8026, compared to examples where the ports 8026 are evenly spaced.

The retention portion 8016 can be any structure suitable for maintaining the distal end 8022 of the elongated tube 8018 in the desired location within the urinary tract. For example, a sufficiently sized retention portion 8016 can have an axial length L11 ranging from about 5 mm to about 100 mm, or from 20 mm to 80 mm, or about 50 mm.

In some examples, the retention portion 8016 comprises an expandable structure that transitions from a retracted state, when inserting or removing the catheter 8010 from the patient, to an expanded or deployed state configured to anchor and retain the retention portion 8016 in the renal pelvis and/or kidney. In order to sufficiently retain the catheter 8010 in the desired location within the urinary tract, in some examples, the retention portion 8016, when deployed, defines a three-dimensional shape 8032 sized and positioned to maintain patency of the fluid column flowing between the kidney and a proximal end of the catheter 8010. Further, desirably, at least a portion of the fluid produced by the kidneys 8102 flows through the retention portion 8016 and tube 8018, rather than through the ureters. An area of two-dimensional slices 8034 of the three-dimensional shape 8032 defined by the deployed expandable retention portion 8016 in a plane transverse to a central axis A of the expandable retention portion 8016 can decrease towards the distal end 8022 of the expandable retention portion 8016, giving the retention portion 8016 a pyramid or reversed conical shape. In some examples, a maximum cross-sectional area of the three-dimensional shape 8032 defined by the deployed expandable retention portion 8016 in a plane transverse to the central axis A of the expandable retention portion 8016 is less than or equal to about 500 mm$^2$, or less than or equal to about 350 mm$^2$, or from 100 mm$^2$ to 500 mm$^2$, or from 200 mm$^2$ to 350 mm$^2$.

In some examples, the retention portion 8016 comprises a coiled retention portion comprising an inverted helical coil. The coiled retention portion 8016 can comprise a plurality of helical coils 8036, 8038, 8040 arranged such that an outer periphery or outer region of the helical coils 8036, 8038, 8040 contacts and supports tissues of the kidney and/or renal pelvis to inhibit occlusion or blockage of protected drainage holes, ports 8026 or perforations positioned in inwardly facing sides or protected surface areas of the helical coils 8036, 8038, 8040.

The coiled retention portion 8016 can comprise at least the first coil 8036 having a first diameter, at least a second coil 8038 having a second diameter, and at least a third coil 8040 having a third diameter. In order for the retention portion 8016 to fit within the renal pelvis, the diameter of the distal-most or third coil 8040 can be smaller than a diameter of either the first coil 8036 or the second coil 8038. Accordingly, a diameter of the coils 8036, 8038, 8040, and/or a step distance or height between adjacent coils 8036, 8038, 8040 can vary in a regular or irregular manner. In some examples, the plurality of coils 8036, 8038, 8040 can form a tapered or reverse pyramid shape. In some examples, the coiled retention portion 8016 can comprise a plurality of similarly sized coils or, for example, can comprise a plurality of proximal similarly sized coils and a distal-most coil having a smaller diameter than other coils of the plurality of coils.

Figure 56A:
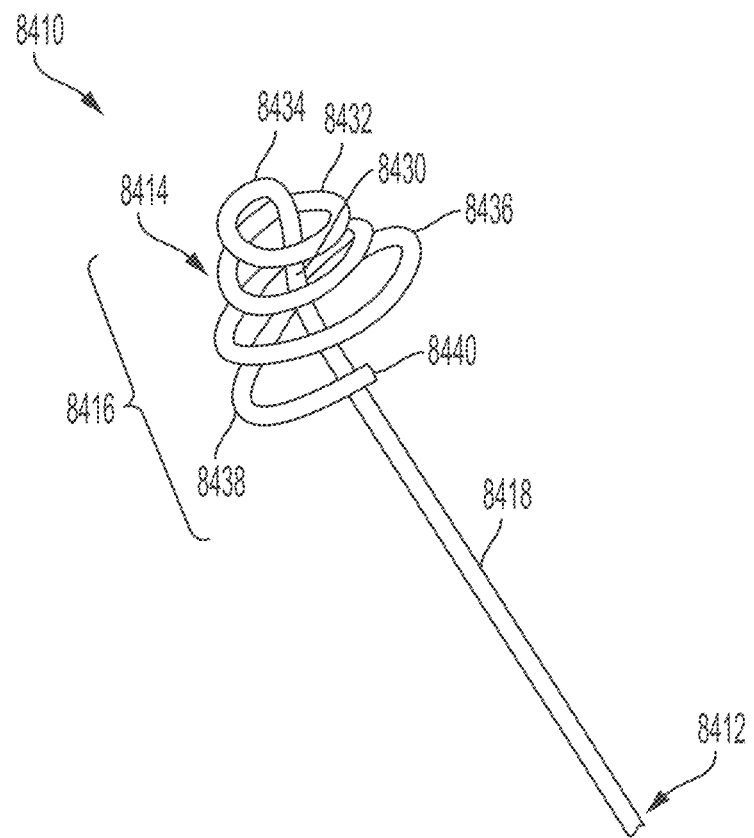
FIG. 56A is a perspective view of another example of a catheter configured to be inserted to the renal pelvis through a percutaneous access site.
Figure 56B:
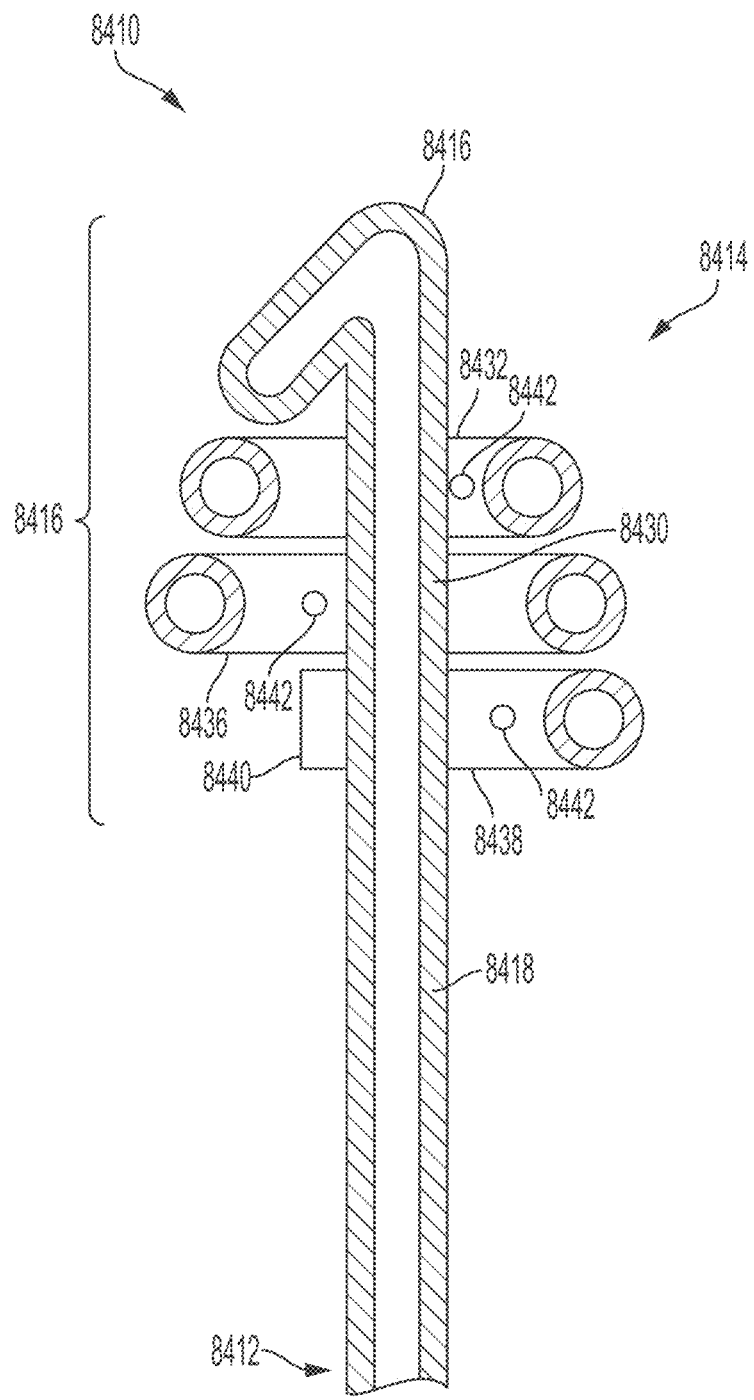
FIG. 56B is a cross-sectional view of the catheter of FIG. 56A.

The diameter of the coils 8036, 8038, 8040 and step distance or height between adjacent coils is selected so that the retention portion 8016 remains in the renal pelvis and/or kidney for a desired period of time. In particular, the coiled retention portion 8016 is desirably large enough so that it remains in the renal pelvis and does not pass either into the ureters or back into the kidney until the catheter 8010 is ready to be removed. For example, the outer diameter of the proximal most or first coil 8036 can range from about 10 mm to about 30 mm, or about 15 mm to 25 mm, or be about 20 mm. The second coil 8038 can have a diameter of about 5 mm to 25 mm, or about 10 mm to 20 mm, or can be about 15 mm. The distal-most or third coil 8040 can have a diameter ranging from about 1 mm to 20 mm, or about 5 mm to 15 mm, or can be about 10 mm Additional Retention Portions for Percutaneous Ureteral Catheters Another example of a ureteral catheter 8410 configured for percutaneous insertion into the renal pelvis of a patient is shown in FIGS. 56A and 56B. As in previous examples, the ureteral catheter 8410 is formed from an elongated tube 8418 comprising a distal portion 8414 comprising a retention portion 8416. The retention portion 8416 is a coiled retention portion comprising a plurality of coils wrapped around a substantially linear or straight segment or portion 8430 of the elongated tube 8418.

The coiled retention portion 8416 further comprises a distal-most coil 8432 formed from a bend 8434 of from about 90 degrees to 180 degrees at a distal end of the straight segment or portion 8430 of the retention portion 8416. The retention portion 8416 further comprises one or more additional coils, such as a second or middle coil 8436 and a third or proximal most coil 8438, which are wrapped around the straight portion 8430 of the tube 8418. The elongated tube 8418 further comprises a distal end 8440 following the proximal most coil 8438. The distal end 8440 can be closed or can be open to receive urine from the patient's urinary tract.

As in previous examples, the size and orientation of the coils 8432, 8436, 8438 is selected so that the retention portion 8416 remains in the renal pelvis and does not pass into the ureter or retract back into the kidney. For example, the largest or proximal most coil 8438 can be about 10 mm to 30 mm in diameter, or about 15 mm to 25 mm in diameter, or about 20 mm in diameter. Coils 8436 and 8438 can have a smaller diameter of, for example, 5 mm to 25 mm, or about 10 mm to 20 mm, or about 15 mm. As in previous examples, the coiled retention portion 8416 can have a tapered appearance in which the coils 8432, 8436, 8438 become progressively narrower, giving the retention portion 8416 a reverse pyramid or reverse conical appearance.

As in previous examples, the retention portion 8416 further comprises openings or drainage ports 8442 positioned on a radially inward side or protected surface area of the coiled retention portion 8416. Since the coils 8432, 8436, 8438 extend around the straight portion 8430 and prevent tissue of the renal pelvis and/or kidneys from contacting the straight portion 8430, openings or drainage ports 8442 can also be positioned on the straight portion 8430 of the retention portion 8416. As in previous examples, the retention portion 8416 is inserted through the kidney and renal pelvis in a linear orientation over a guidewire. When the guidewire is removed, the retention portion 8416 adopts the coiled or deployed configuration.

Negative Pressure Systems Controlled Based on Pulmonary Artery Pressure

The devices, systems, and treatment methods described hereinabove can be used to treat any patient who may benefit from fluid removal. For example, the devices, systems, and treatment methods described hereinabove can be used to remove fluids that cause venous congestion by increasing urine and/or sodium output. Increased fluid retention, fluid overload, venous congestion, increased blood pressure, and/or edema can be indications of worsening or decompensated heart failure, which can appear days or weeks before other symptoms that would lead to hospitalization of the patient. Other symptoms of decompensation can include dyspnea, fatigue, swelling of extremities, rapid or irregular heartbeat, or persistent cough or wheezing. It would be beneficial to begin treatment for venous decongestion and/or fluid removal with the devices, systems, and treatment methods of the present disclosure as early as possible and prior to onset of symptoms that require hospitalization. In some instances, use of the devices, systems, and methods of the present disclosure may slow down or stop a patient's progression towards acute decompensation, so that hospitalization can be avoided. In some examples, the devices, systems, and methods of the present disclosure may improve patient condition by relieving or reducing stress on the patient's heart so that the patient is less likely to compensate in the future. The devices, systems, and methods of the present disclosure may reduce occurrence of compensation, improve patient outcomes, patient quality of life, and/or life expectancy by providing earlier treatment for conditions known to contribute to worsening heart failure than provided by currently available treatment methods.

A number of hemodynamic indicators or parameters, particularly parameters that indicate increases in filling pressure for pulmonary arteries, can provide early indications of worsening congestion. Hemodynamic parameters that may indicate increases in filling pressure may include, for example, blood pressure, pulmonary artery pressure, central venous pressure, or pulmonary capillary wedge pressure. A magnitude of these parameters may increase in the days or weeks prior to decompensation and may represent increasing congestion. Pulmonary artery pressure, as used herein, means a direct blood pressure measurement obtained from the right or left pulmonary artery of a patient. The systems and treatment methods described hereinafter provide examples of how hemodynamic parameters, for example pulmonary artery pressure, can be used to control aspects of a renal negative pressure therapy system in order to control excretion of fluid from the patient's body. The systems and treatment methods may provide one or more beneficial effects, such as reducing and/or alleviation of fluid overload and/or conditions leading to decompensation of the patient.

In some examples, patients with acute decompensation and/or increased cardiovascular stress due to physiological status of the patient may have a blood pump implanted to assist the heart in blood circulation. Non-limiting examples of such blood pumps can comprise, for example, a left ventricular assist device or a left ventricular support device. Such devices can be configured to provide blood flow (usually continuous fluid flow) through tubing extending between an opening in a wall of the patient's left ventricle and an opening on the aorta. When properly installed and in use, the blood pump can be configured to increase blood flow volume through vasculature of the patient and/or to assist the heart in circulation. The increased circulation support provided by the implanted blood pump can reduce stress on the heart, which if not addressed for a period of time, could weaken the heart and contribute to the progression to heart failure.

Any or all of the previously described pump and/or renal negative pressure therapy systems or assemblies, including the pump systems shown in FIGS. 1A-1D, 14, 15A-16C, 21A, and/or 21B, can be adapted to comprise and/or to receive data from pulmonary artery pressure sensors and to use the received measurements to control and/or to provide feedback about operation of the implanted, indwelling, or external pump. Pulmonary artery pressure measurements can also be used to control other aspects of patient treatment within the scope of the present disclosure. For example, pulmonary artery pressure may be used to determine when certain medications should be delivered to a patient and/or to control dosing for such medications. Pulmonary artery pressure measurements can also be used, for example, to control other treatment devices provided to the patient. For example, any or all of the negative pressure systems or pump systems of FIGS. 1A-1D, 14, 15A-16C, and/or 21A and 21B can be adapted to include and/or to provide negative pressure therapy treatment in combination with left ventricular support provided by a blood pump. Further, pump systems using any type of urinary catheter, such as ureteral catheters (shown in FIGS. 15A and 16A) or kidney percutaneous catheters (shown in FIG. 21A), and including any of the previously described retention portions, shown in FIGS. 22A-56B, can be adapted for use along with the pulmonary artery pressure sensors and blood pump, within the scope of the present disclosure.

Examples of negative pressure therapy systems that comprise a pulmonary artery pressure sensor and a blood pump are shown in FIGS. 57A-58B. FIGS. 57A-58B are intended to be examples of types of pump systems that can be configured to include a pulmonary artery pressure sensor and blood pump. It is understood that over types of negative pressure therapy and/or pump systems can also be configured to include the pulmonary artery pressure sensors and blood pump, within the scope of the present disclosure of the present disclosure. For example, the pulmonary artery pressure sensor and blood pump of the present disclosure can be configured for use with any type of indwelling pump, implantable pump, or external pump (for an ambulatory or non-ambulatory patient) and associated pump systems within the scope of the present disclosure.

FIGS. 57A-57E show some examples of renal negative pressure therapy systems 9000 for removal of fluid from the urinary system of a patient having components that are fully or partially implanted and/or deployed within the patient's cardiopulmonary and urinary systems and/or within the cardiothoracic or abdominal regions of the patient.

Figure 57A:
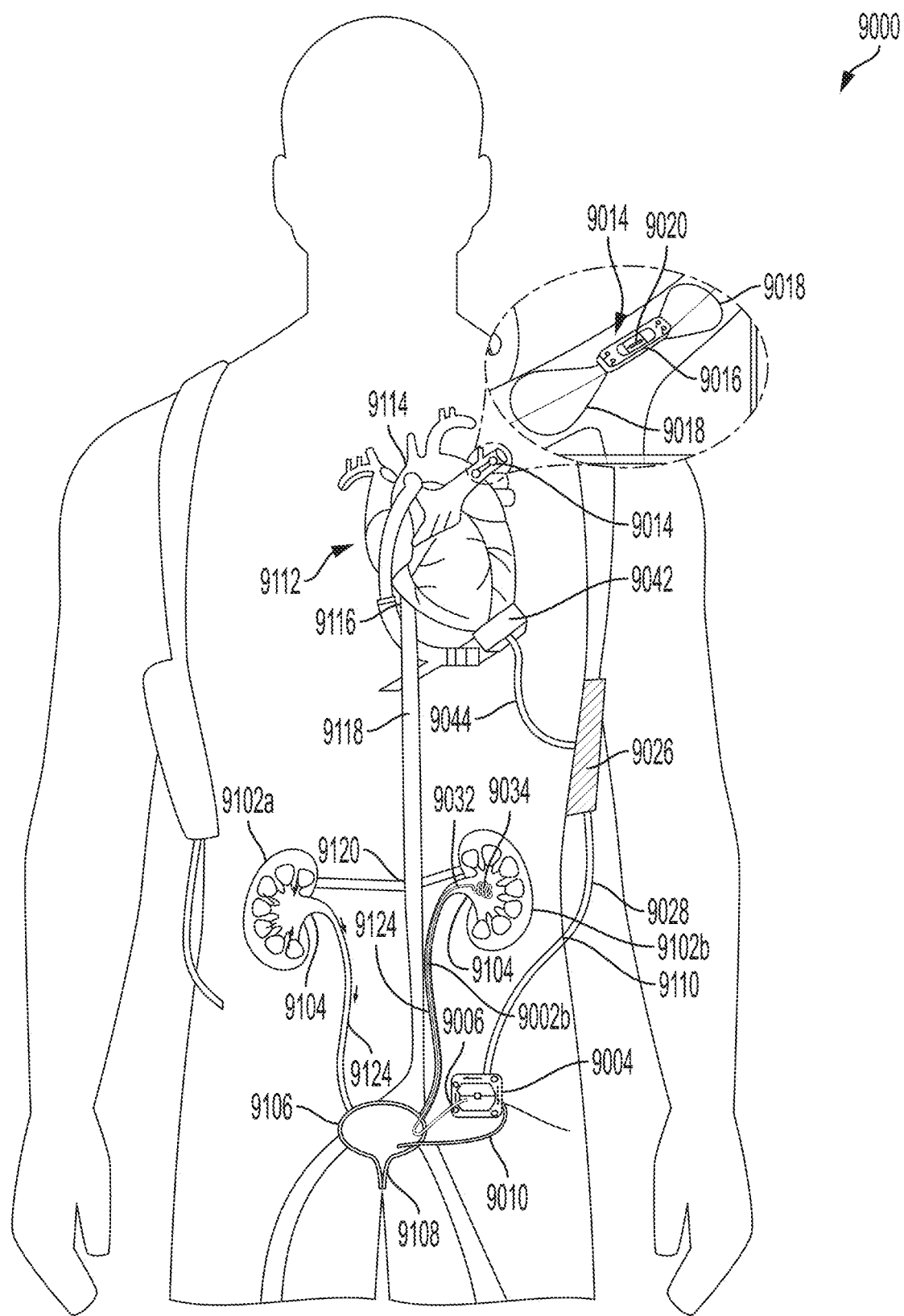
FIGS. 57A-57D are schematic drawings showing systems for providing negative pressure therapy to a patient comprising implanted pulmonary artery pressure sensors and circulation support devices, according to examples of the present disclosure.

FIG. 57A shows a system 9000 comprising, in part, one or two ureteral catheter(s) 9002*b* and an implanted pump 9004. Any of the ureteral catheter(s) disclosed herein can be used in the system 9000, such as, for example, the ureteral catheters of FIGS. 16A, 22A-23F, 28A-50B. The implanted pump 9004 can be any of the implantable pumps disclosed herein, for example, as shown in FIGS. 15A-16C. In other examples, the pump 9004 can be an indwelling pump, such as any of the indwelling pumps disclosed herein, for example as shown in FIGS. 1A-14.

Figure 57B:
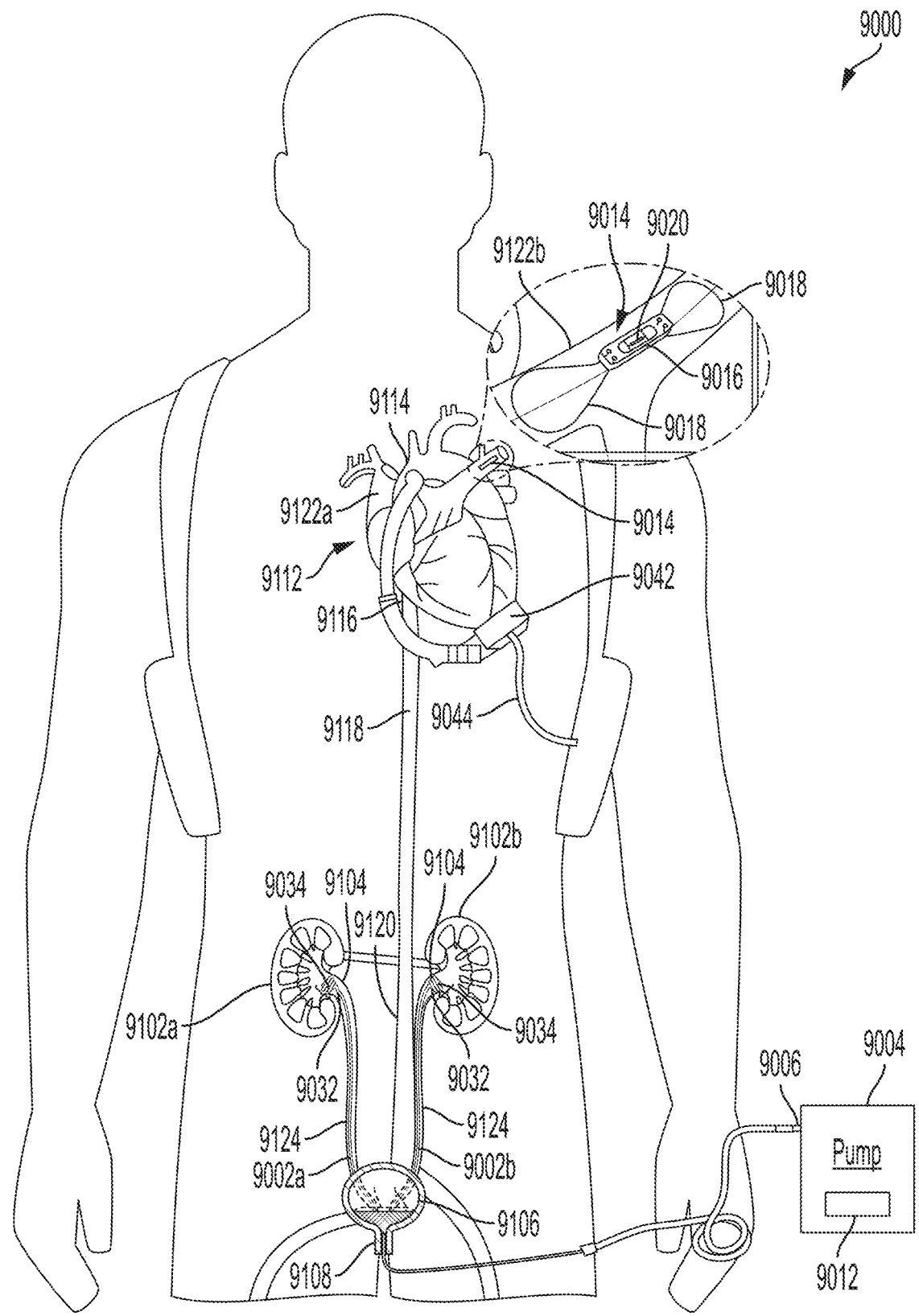

FIG. 57B shows a system 9000 comprising ureteral catheters 9002a, 9002b extending from the kidney 9102a, 9102b or renal pelvis 9104 through the bladder 9106 and urethra 9108, and an external pump 9004 connected to proximal ends 9006 of the ureteral catheters 9002a, 9002b. The system 9000 of FIG. 57B comprises two ureteral catheters 9002a, 9002b, such as a first catheter 9002a deployed proximate to the right kidney 9102a and a second catheter 9002b deployed proximate to the left kidney 9102b. It is understood, however, that for certain treatments and/or for some patients, it may be advantageous to provide only one ureteral catheter.

Figure 57C:
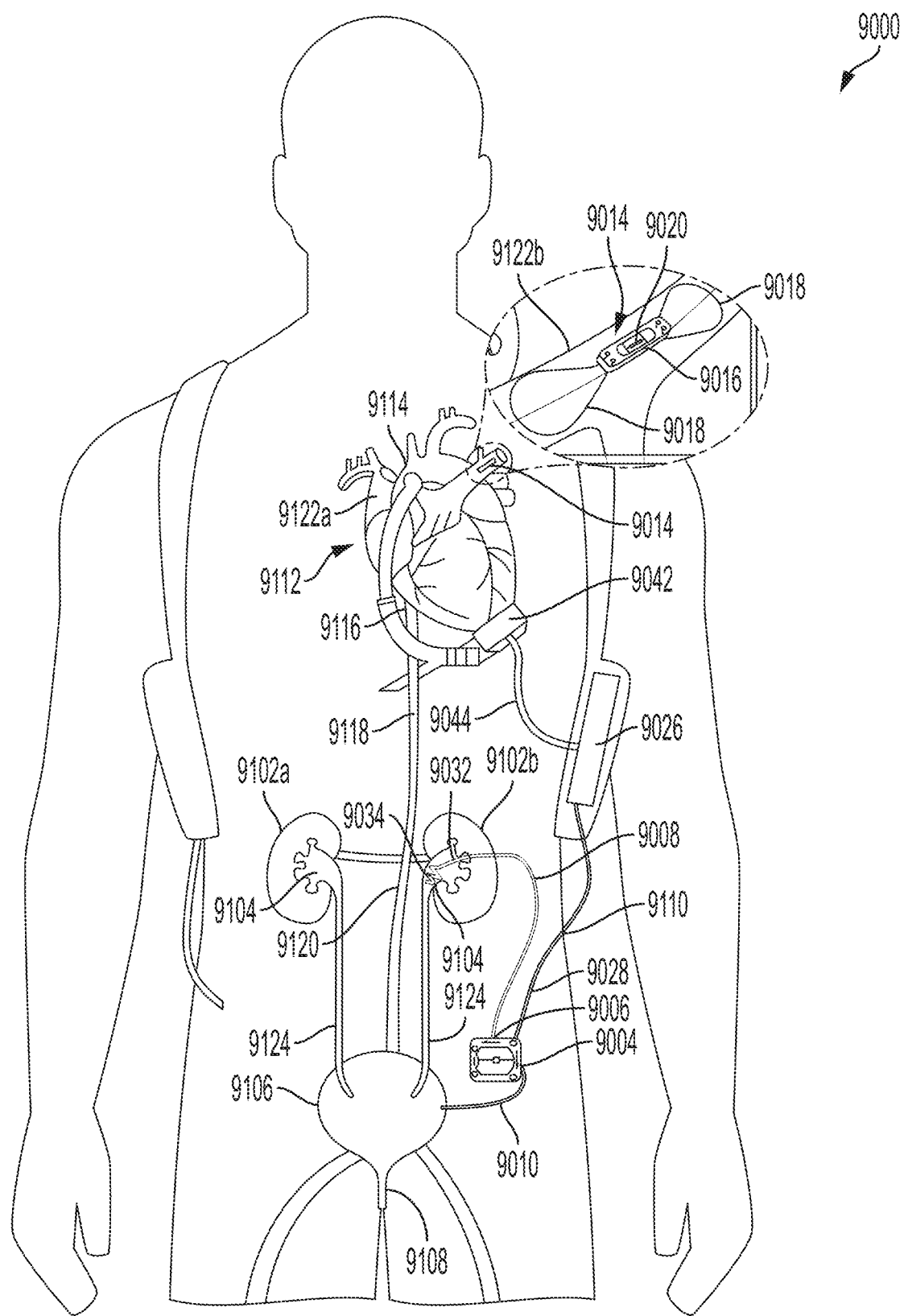

FIG. 57C shows a system 9000 comprising a percutaneous urinary catheter 9008 positioned in the kidney 9102b and/or renal pelvis 9104 and an implanted pump 9004 positioned in the abdominal cavity of the patient. The percutaneous urinary catheter 9008 can comprise features of any of the percutaneous urinary catheters disclosed herein, such as the percutaneous catheters shown in FIGS. 21A and 21B. The percutaneous catheter 9008 passes through the kidney 9102b and to the implanted pump 9004. A discharge catheter 9010 passes from the pump 904 through a wall of the patient's bladder 9106, such that fluid passing through the discharge catheter 9010 is expelled from a drainage lumen of the discharge catheter 9010 into the bladder 9106.

Figure 57D:
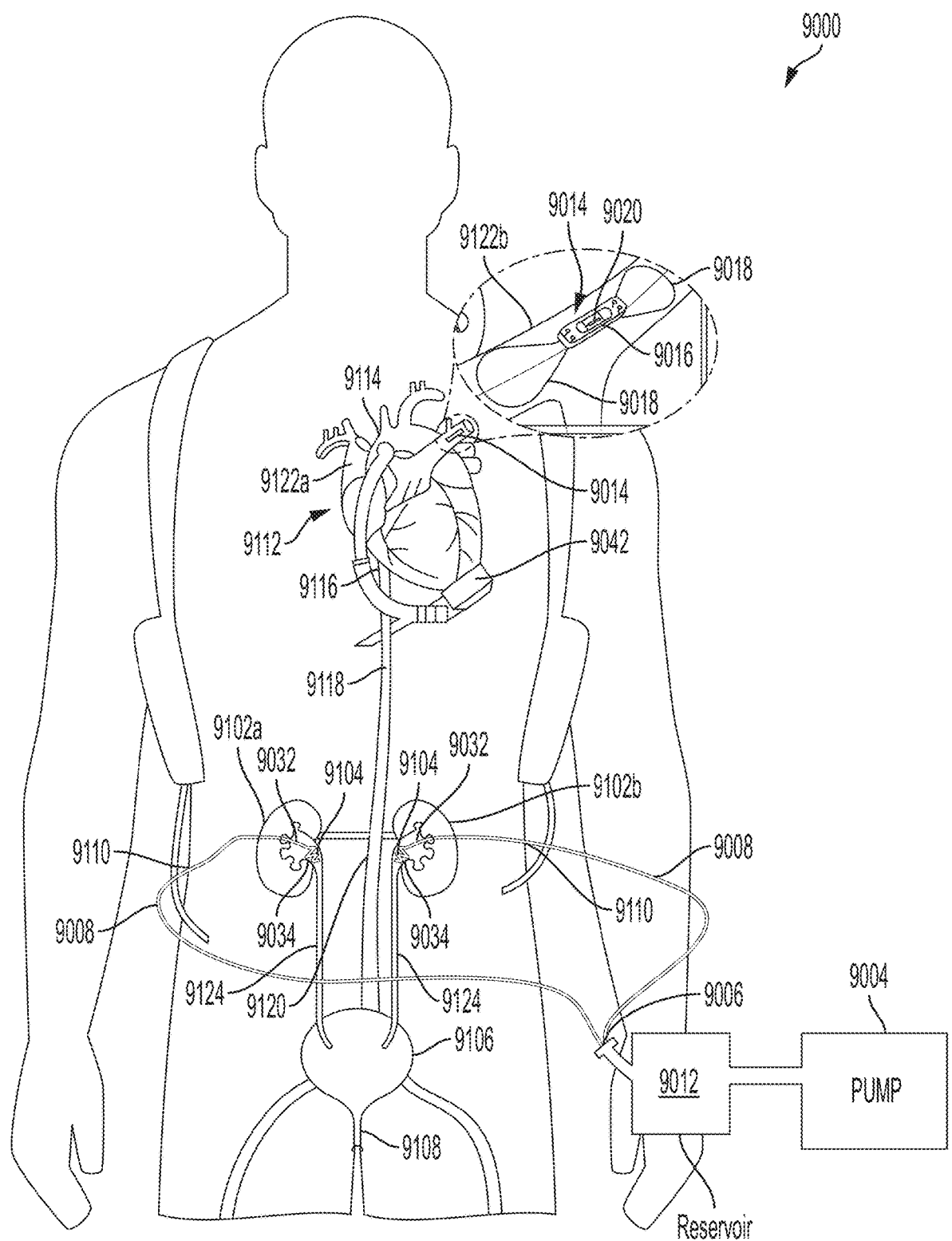

FIG. 57D shows a system 9000 including two percutaneous catheters 9008. The percutaneous catheters 9008 extend from the renal pelvis 9104, through the kidneys 9102a, 9102b, and through a percutaneous access sites 9110 to an external pump 9004. The external pump 9004 can comprise a reservoir 9012 for collecting fluid drawn from the patient's urinary tract. The external pumps 9004 shown in FIGS. 57B and 57D can be portable and/or wearable pumps 9004, such as pumps 9004 sized to be carried in a pocket, fanny pack, holster, or harness worn by the patient. In other examples, the external pumps 9004 can be free-standing or stationary pumps configured to be positioned, for example, on a table, shelf, IV pole, bedside table, and/or attached to other pieces of furniture, such as to a bed frame.

Figure 57E:
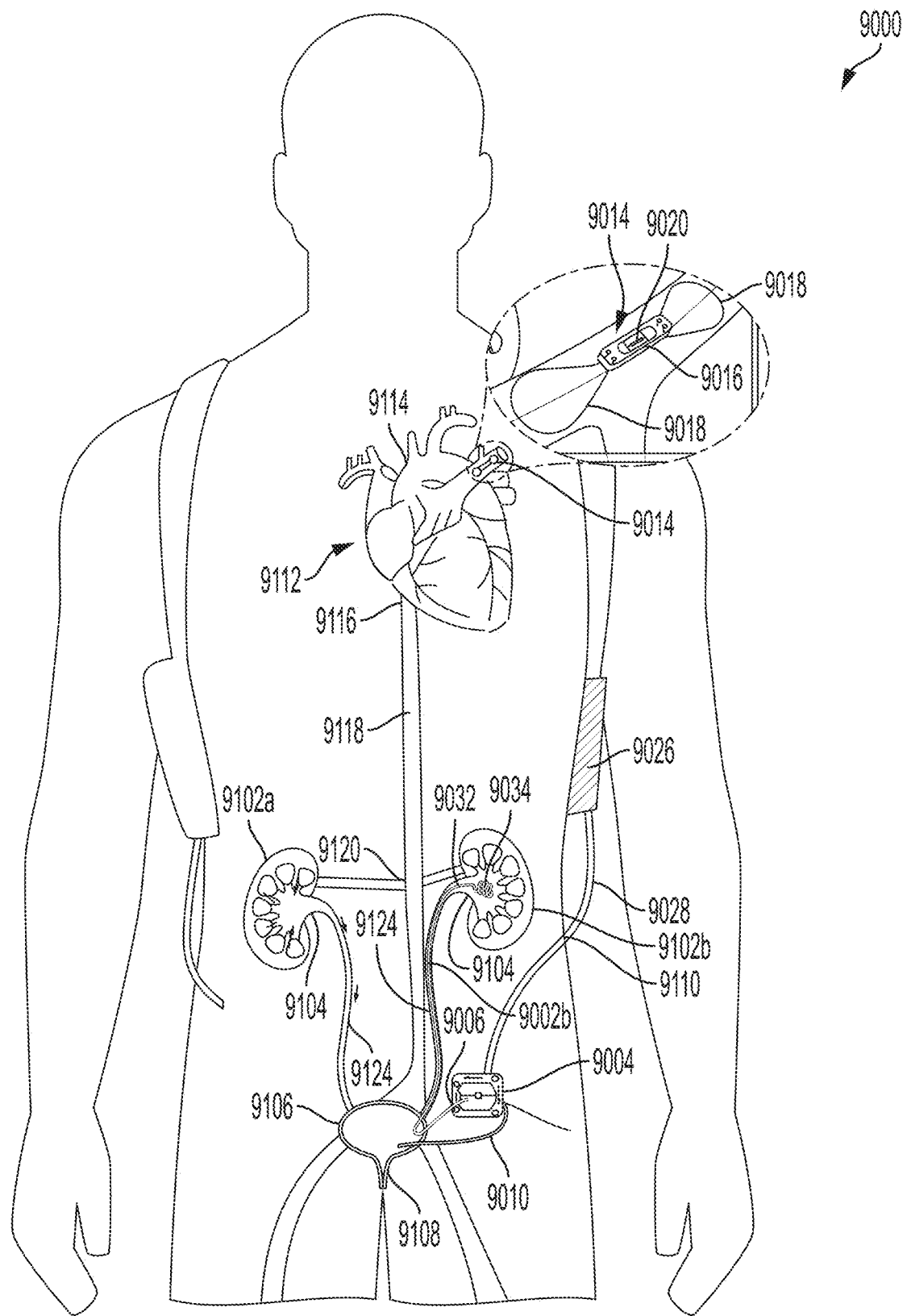
FIG. 57E is a schematic drawing showing a system for providing negative pressure therapy to a patient comprising an implanted pulmonary artery pressure sensor, according to an example of the present disclosure.

FIG. 57E shows a system 9000 comprising many of the components of the system 9000 of FIG. 57A, namely ureteral catheter(s) 9002b, the implanted negative pressure pump 9004, and a sensor 9014 configured to detect signal(s) representative of pulmonary artery pressure of the patient. Unlike previous examples, the system 9000 of FIG. 57E does not include a blood pump.

A number of organs and other anatomical structures are shown in FIGS. 57A-57E including cardiopulmonary organs and associated structures including the patient's heart 9112, aorta (including the aortic arch 9114, descending thoracic aorta 9116, suprarenal abdominal aorta 9118, and segments of the infra-renal aorta 9120), and right and left pulmonary arteries 9122a, 9122b. The right kidney 9102a and left kidney 9102b are also shown in FIGS. 57A-57D. FIGS. 57A-57D also show portions of the patient's urinary tract including the right and left ureters 9124, the bladder 9106, and the urethra 9108.

As shown in FIGS. 57A-57E, the negative pressure therapy systems 9000 for removing fluid from the urinary tract of the patient comprise the sensor 9014 configured to detect signal(s) representative of pulmonary artery pressure of the patient and communicate the signal(s) representative of the pulmonary artery pressure to other electronic devices, such as to the implanted pumps 9004 (shown in FIGS. 57A and 57C) or external pumps 9004 (shown in FIGS. 57B and 57D) and/or to any other previously described indwelling, implanted, or external pump, electronic device, or external or remote controller. As previously described, pulmonary artery pressure refers to blood pressure of the right and/or left pulmonary artery 9122a, 9122b measured directly by the sensor 9014 and/or pressure transducer implanted or deployed within the pulmonary arteries 9122a, 9122b. Pulmonary artery pressure can be an early indicator of worsening heart failure. In particular, increasing pulmonary pressure means that the heart must work harder to force blood through the pulmonary arteries 9122a, 9122b. Continued vigorous pumping to overcome increasing pulmonary artery pressure places added stress on the patient's heart 9112 hastening the progression to heart failure.

In some examples, the sensor 9014 is an implanted pressure transducer deployed in the right or left pulmonary artery 9122a, 9122b of the patient. Preferably, the sensor 9014 is deployed in the left descending pulmonary artery 9122b. The sensor 9014 can also be positioned elsewhere in the right or left pulmonary arteries 9122a, 9122b, as determined based on preference of the treating physician. The sensor 9014 can be configured to be deployed for an extended period of time, such as for days, weeks, months, or years, for periodic or continuous monitoring of a patient's pulmonary artery pressure over time. In some examples, the sensor 9014 can be deployed using a delivery catheter over a guidewire by a non-invasive deployment method through, for example, a femoral or carotid artery of the patient. In order to allow for delivery using the delivery catheter, the sensor 9014 can comprise and/or be mounted to a flexible and/or rollable substrate 9016. The substrate 9016, desirably, can be folded or rolled to a small size compatible with conventional delivery catheters. When deployed from the delivery catheter at a desired implantation or deployment location, the substrate 9016 can unfold or unroll to a deployed or use position. In some examples, the sensor 9014 can further comprise anchors 9018 for maintaining the sensor 9014 in the desired implanted location. Exemplary sensors 9014 and pulmonary artery pressure sensing systems that can be used with the negative pressure therapy systems 9000 of the present disclosure can comprise, for example, the CardioMEMS™ implanted sensor and heart failure system by Abbott Laboratories or the Cordella™ sensor and heart failure system by Endotronix, Inc. Exemplary sensors that can be used with the systems 9000 of the present disclosure are also described, for example, in U.S. Pat. No. 6,111,520, entitled "System and method for the wireless sensing of physical properties", U.S. Pat. No. 7,550,978, entitled "Communication with an Implanted Wireless Sensor", and U.S. Pat. No. 8,021,307, entitled "Apparatus and method for sensor deployment and fixation", which are incorporated herein by reference in their entireties.

In some examples, the sensor 9014 comprises a passive sensor comprising, for example, an inductor-capacitor circuit 9020 configured to generate an electromagnetic field in response to an external radio frequency signal. Passive sensors are configured to generate radio frequency signals representative of the pressure when exposed to radio frequency signals from an external source. For example, the external source can be a radio frequency antenna 9022 contained in an external control and/or reader device. When exposed to the radio frequency signal, the inductor-capacitor circuit 9020 generates signals at a pressure-dependent resonant frequency that changes based on pressure surrounding and/or in proximity to the sensor 9014. In other examples, the sensor 9014 can be an active or powered sensor that receives power from a battery and/or from a dedicated power source. In that case, the sensor 9014 can comprise, for example, a pressure transducer, such as a strain gauge, that measures pressure and a wireless transmitter or transceiver that periodically or continually communicates measured pressure values from the sensor 9014 to a remote device, such as to the pump 9004 or to the external controller.

The sensor 9014 can further comprise structures, such as the anchors 9018, for maintaining a position of the sensor 9014 within the body lumen (i.e., within the right or left pulmonary artery 9122a, 9122b). For example, the anchors 9018 can comprise loops, hooks, barbs, protrusions, and similar structures that, when deployed, are configured to contact a wall of the body lumen to prevent the sensor 9014 from passing through the body lumen when exposed to pulsating blood flow.

Figure 58A:
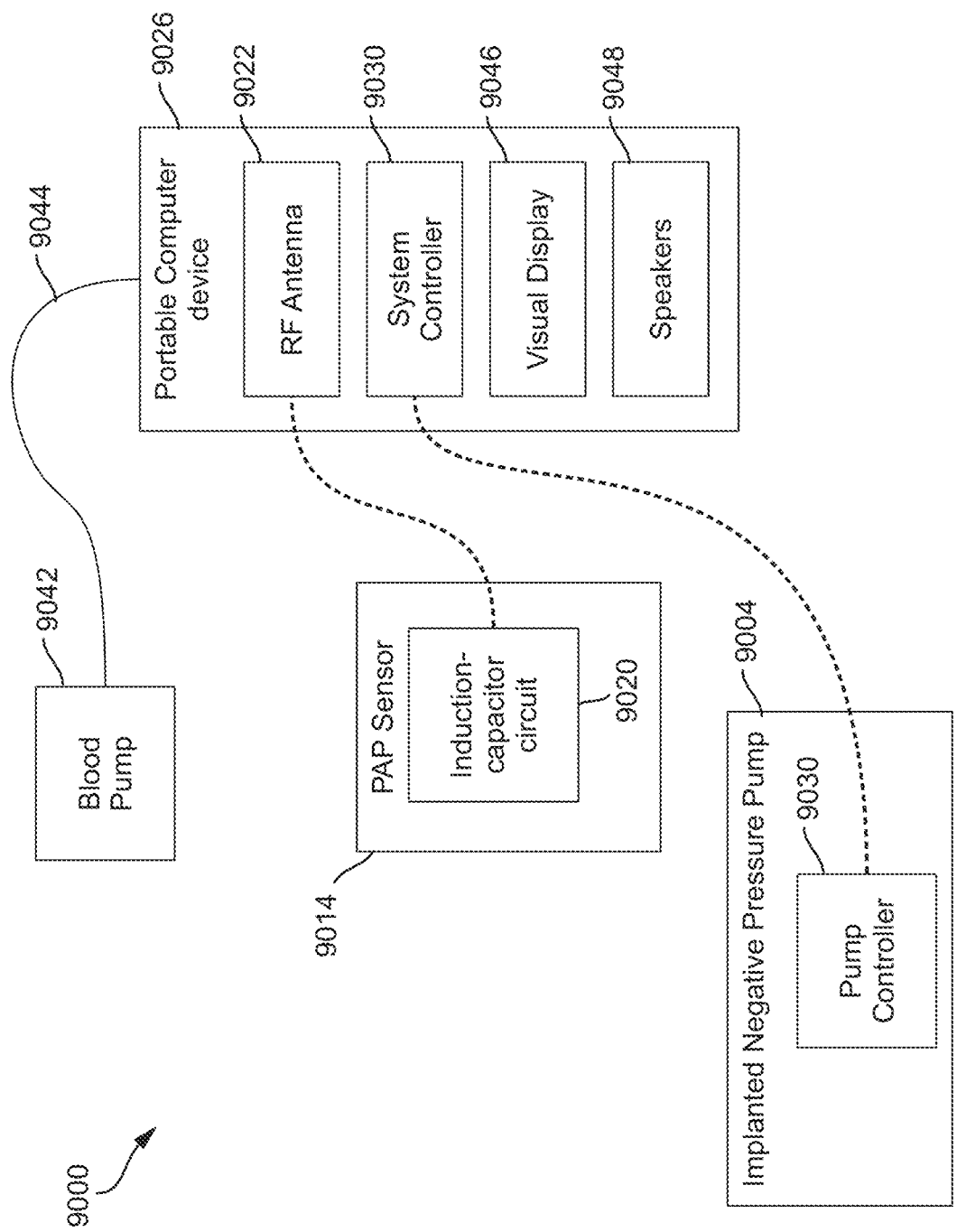
FIGS. 58A and 58B are schematic drawings showing electrical components of the systems of FIGS. 57A-57D.
Figure 58B:
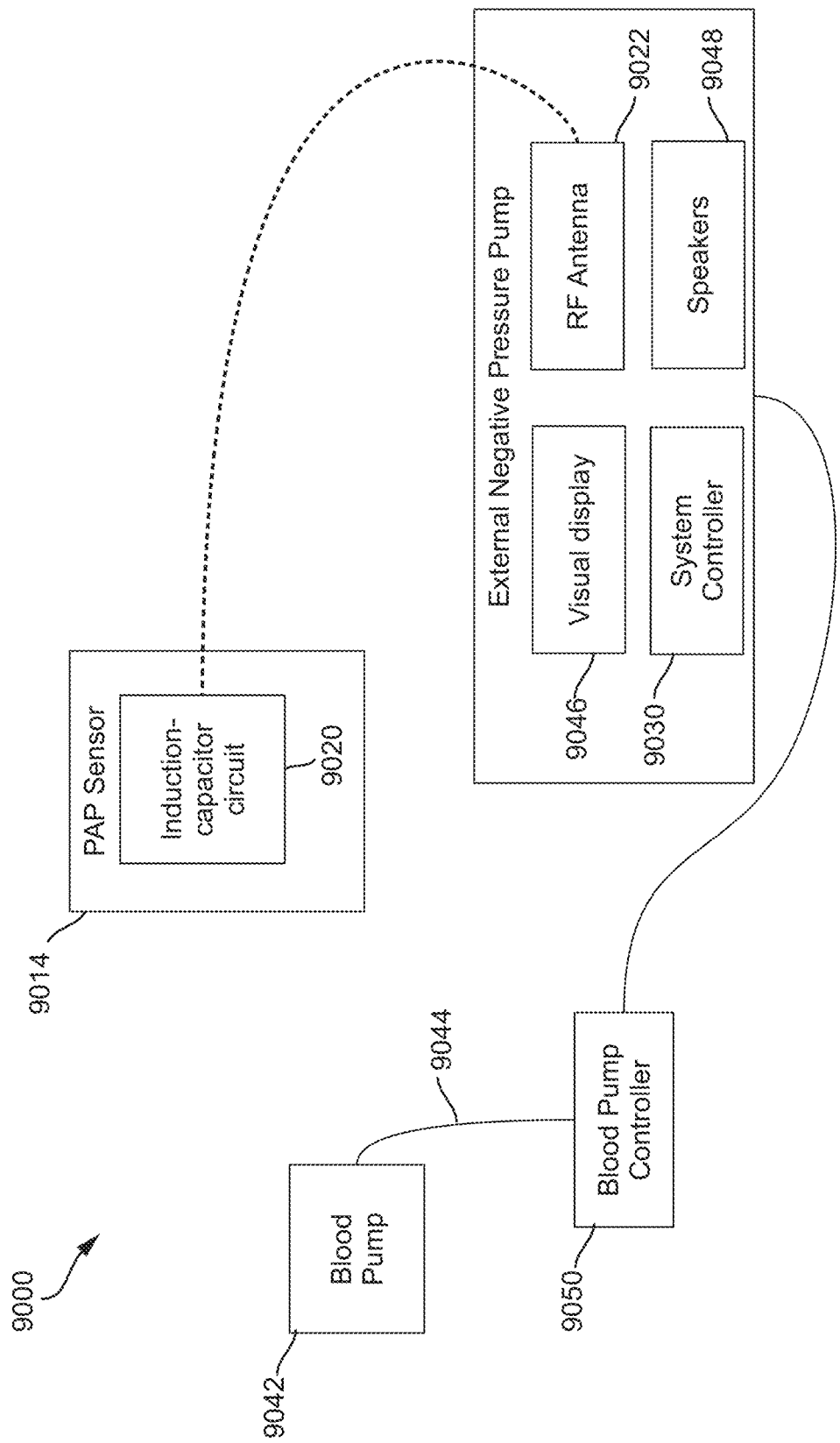

With reference to FIGS. 58A and 58B, the systems 9000 can further comprise an indwelling, implanted, or external system controller 9024 that receives signals from the sensor 9014 of the system 9000 and generates control signals for controlling different treatment devices and other electronic components of the system 9000. The system controller 9024 can be a separate device or can be connected to or integral with various implanted or external electronic devices of the system 9000. For example, the system controller 9024 can be integral with the implanted pump 9004, or with the external negative pressure pump 9004 as shown in FIG. 58B. In some examples, the system controller 9024 can comprise a computer processor or microprocessor disposed on a printed circuit board within a housing of the negative pressure pump 9004.

In other examples, as shown in FIG. 58A, the system controller 9024 can be a component of an external portable computer device 9026, such as a smartphone, tablet computer, dedicated electronic control device, remote controller, or similar portable electronic device, that is separate from the pump 9004. As shown in FIG. 58A (as well as in FIGS. 57A and 57C), the external computer device 9026 can be electrically connected to the implanted pump 9004 by, for example, a percutaneous wire 9028 and, in particular, can be configured to provide instructions to a pump controller 9030 for controlling operation of the pump 9004. Alternatively, the external computer device 9026 can be in communication with the implanted pump 9004 and/or pump controller 9030 by a wireless data connection, such as a short-range data connection using, for example, BLUETOOTH®. As described in further detail hereinafter, the portable computer device 9026 can also comprise the radio frequency antenna 9022 for interacting with and inducing generation of pressure-dependent signals for the sensor 9014.

In some examples, the system controller 9024 is configured to receive and process the signal(s) from the sensor 9014 to determine if the patient's pulmonary artery pressure is above, below, or at a predetermined value. The system controller 9024 can also receive sensor data from other patient physiological, pump, and/or environmental sensors of any of the previously described negative pressure therapy systems and/or from other sensing or monitoring devices receiving physiological information for the patient. For example, the system controller 9024 can receive patient information from physiological sensors, such as capacitance and/or analyte sensors for measuring information representative of the chemical composition of generated urine, pH sensors for measuring acidity of urine, or temperature sensors for measuring urine temperature as shown in FIG. 7. The system controller 9024 can also receive information from fluid sensors positioned in the catheters 9002a, 9002b configured to measure fluid flow characteristics or parameters, such as fluid pressure or flow volume measured in the catheters 9002a, 9002b. The system controller 9024 can also receive information from a catheter probe positioned near a distal end 9032 and/or retention portion 9034 of the catheters 9002a, 9002b that measures negative pressure in the renal pelvis 9104 or kidney 9102a, 9102b. In some examples, the system controller 9024 can also be configured to receive information about intra-abdominal pressure measured, for example, by a pressure sensor positioned on an external surface of an implanted pump 9004, as shown in FIG. 21B.

The system controller 9024 can also be configured to provide control signal(s), determined at least in part from the pulmonary artery pressure signal(s) received from the sensor 9014, to a negative pressure source to: (a) apply negative pressure to a urinary catheter to remove fluid from the urinary tract of the patient when the patient's pulmonary artery pressure is above the predetermined value; or (b) to cease applying negative pressure when the patient's pulmonary artery pressure is at or below the predetermined value. The control signal(s) generated by the system controller 9024 can also be based, at least in part, on sensed data from any of the other physiological, pump, and/or environmental sensors described herein.

The negative pressure source can be the implanted negative pressure therapy pump 9004 (shown in FIGS. 57A, 57C, and 58A) or the external negative pressure therapy pump 9004 (shown in FIGS. 57B, 57D, and 58B). Alternatively, the negative pressure source can be any other negative pressure source known in the art and available in medical and/or patient treatment settings. For example, the negative pressure source can be a negative pressure system of a hospital or another medical facility that can be accessed by, for example, a wall-mounted negative pressure port. The pump 9004 and/or other negative pressure source can be configured to provide negative pressure ranging from 0 mmHg to about 150 mmHg to the drainage lumen of the urinary catheter, as measured at the at least one fluid port of the pump 9004 and/or at a proximal end of the urinary catheter.

The urinary catheter that transmits the negative pressure from the negative pressure source (i.e., the implanted or external pump 9004) to the urinary tract of the patient can be ureteral catheters 9002a, 9002b or the percutaneous catheters 9008 shown in FIGS. 57A-57D. In other examples, the urinary catheter can comprise and/or can include components of any of the previously described catheters shown in FIGS. 22A-56B. In some particular examples, urinary catheters can also comprise bladder catheters (not shown) inserted into the bladder 9106 through the urethra 9108.

In some examples, as shown in FIGS. 57A and 57B, the urinary catheter can be a ureteral catheter 9002a, 9002b comprising a distal portion 9032 comprising a retention portion 9034 positioned in a patient's kidney 9102a, 9102b, renal pelvis 9104, and/or ureter 9024. As in previously described exemplary ureteral catheters, the retention portion 9034 comprises one or multiple drainage ports that permit fluid flow into a drainage lumen of the catheter 9002a, 9002b.

As shown in FIGS. 57C and 57D, in other examples, the urinary catheter is the percutaneous catheter 9008 inserted into and deployed in the kidneys 9102a, 9102b, renal pelvis 9104, and/or ureter 9124 through a rear portion of the kidney 9102a. The percutaneous catheter 9008 can comprise, for example, a proximal portion 9006 configured to pass through a percutaneous opening and a distal portion 9032 comprising the retention portion 9034 configured to be deployed in the kidney 9102a, 9102b, renal pelvis 9104, and/or ureter 9124 of the patient. As previously described, the retention portion 9034 comprises one or multiple of the drainage ports. The retention portion 9034 is configured, when deployed, to establish an outer periphery or protective surface area that inhibits mucosal tissue from occluding the one or multiple ports upon application of negative pressure through the catheter 9002a, 9002b. The retention portions 9034 can also comprise any of the previously described retention portions, such as the retention portions shown in FIGS. 22A-56B.

As previously described, the system controller 9024 is configured to provide operating instructions, in the form of control signals, to the negative pressure source, such as to the negative pressure therapy pump 9004. The control signals are based, at least in part, on pulmonary artery pressure measurements received from the implanted pressure sensor(s) 9014 and, in some examples, can provide a feedback loop in which continuously-obtained or periodic pulmonary artery pressure measurements are relied upon to incrementally adjust the applied negative pressure. For example, the system controller 9024 can initially be configured to provide negative pressure therapy to the patient when a measured pulmonary artery pressure value is above a predetermined value. A target range for pulmonary artery pressure for a patient can be, for example, from 12 mmHg to 16 mmHg (diastolic) and from 18 mmHg to 25 mmHg (systolic). Accordingly, the predetermined value for pulmonary artery pressure can be, for example, when pulmonary artery pressure measured by the sensor 9014 is above 16 mmHg (diastolic) and/or above 25 mmHg (systolic).

In a simple example, the negative pressure can be provided at a predetermined pressure level (i.e., a predetermined pressure of between 10 mmHg and 150 mmHg, as measured at a proximal end of the ureteral catheter 9002a, 9002b) for a predetermined duration of time (i.e., 30 minutes, 1 hour, 2 hours, 8 eight hours, 12 hours, or longer). After the predetermined duration, the pulmonary artery pressure can be measured again. If the measured pulmonary artery pressure remains above the predetermined value, negative pressure can continue to be applied to the patient for another instance of the predetermined duration. If measured pulmonary artery pressure is below the predetermined value, the system controller 9024 can be configured to cease the application of the negative pressure.

In other examples, the system controller 9024 can be configured to periodically incrementally increase or decrease the applied negative pressure. For example, the system controller 9024 can be configured to periodically compare the pulmonary artery pressure of the patient to the predetermined value for pulmonary artery pressure. The system controller 9024 can then be configured to provide additional control signals to the negative pressure source, such as to the implanted or external pump 9004, to increase a magnitude of the negative pressure applied by the negative pressure source to the catheter 9002a, 9002b, when the pulmonary artery pressure of the patient is greater than the predetermined value. For example, the control signals generated by the system controller 9024 can cause an absolute value or magnitude of the applied negative pressure to increase by an incremental amount (i.e., 1 mmHg, 5 mmHg, or 10 mmHg) each time that a measured pulmonary artery pressure is greater than the predetermined value.

With continued reference to FIGS. 57A-57D, the systems 9000 can further comprise a blood pump 9042, such as a left-ventricular assist device and/or a left ventricular support pump, implanted proximate to a left ventricle of the patient's heart. As described hereinabove, the negative pressure therapy system 9000 of the present disclosure can be provided to assist in management of patient fluid status in an effort to relieve stress on the heart and other organ systems. In particular, elevated fluid levels can increase stress for the heart, weakening the heart muscle and hastening the progression towards heart failure. Accordingly, the systems 9000 of the present disclosure can be used in conjunction with or can comprise the blood pump 9042, for example, to relieve stress on the heart and/or help the heart to provide sufficient blood circulation.

The blood pump 9042 can be in wired or wireless electronic communication with and can receive operating instructions, such as control signals, from the system controller 9024 and/or from a blood pump controller 9050 (shown in FIG. 58B). For example, as shown in FIGS. 57A and 57C, the blood pump 9042 can be in wired communication with the external portable computer device 9026 comprising the system controller 9024. Alternatively, as shown in FIGS. 57B and 57D, the blood pump 9042 can be in wired communication with the blood pump controller 9050 and/or with the external negative pressure therapy pump 9004 comprising the system controller 9024 by, for example, a percutaneous wire 9044.

As shown in FIGS. 57A-57D, the blood pump 9042 is positioned near the left ventricle of the patient's heart 9112. The blood pump 9042 is configured to draw blood from the left ventricle, through the pump 9042 and associating tubing, and to expel the blood into the aorta proximate to the aortic arch 9114. Generally, blood pumps 9042 provide continuous blood flow through tubing extending from an incision or opening in the left ventricle to an incision in the aorta proximate to the aortic notch. The continuous blood flow can be provided at a constant cardiac output to assist the heart 9112 in blood circulation. Implantable blood pumps 9042 or left-ventricular assist devices are manufactured by a number of medical device manufacturers including Abbott Laboratories, HeartWare International, Medtronic, ReliantHeart Inc., and others. One exemplary blood pump 9042 that can be used with the systems of the present disclosure is the HeartMate 3 LVAD manufactured by Abbott Laboratories. An exemplary blood pump 9042 that can be used with the systems 9000 of the present disclosure is described in U.S. Pat. No. 9,849,224, entitled "Ventricular assist devices", which is incorporated by reference herein in its entirety.

In some examples, the system controller 9024 is configured to provide operating instructions, in the form of control signals, to the blood pump 9042. For example, control signals can cause the blood pump 9042 to begin providing circulation support for the patient, to cease providing circulation support for the patient, and/or to increase or decrease a flow rate for the pump 9042 to increase or decrease a cardiac output volume and/or flow rate. In some examples, the operating instructions for the blood pump 9042 are based, at least in part, on pulmonary artery pressure measurements for the patient received from the implanted sensor 9014. Operating instructions and/or control signals for the blood pump 9042 can be based, at least in part, on information from any of the one or more of sensors of the negative pressure therapy system discussed herein. For example, information detected by sensors about total urine output, rate of urine output, blood and/or urine characteristics and/or trends in patient physiological condition can be used to at least partially control the operation of the blood pump.

As shown in FIGS. 58A and 58B, the sensor 9014 comprises the inductor-capacitor circuit 9020 or coil. The portable computer device 9026 (in FIG. 58A) or the external pump (in FIG. 58B) comprises the radio frequency antenna 9022 that, as shown schematically in FIGS. 58A and 58B, is configured to provide the radio frequency signal to the inductor-capacitor circuit 9020 to induce the frequency response signal indicative of the measured pulmonary artery pressure. As previously described, the system controller 9024 and/or another computer processor of the portable computer device 9026 and/or of the external pump 9004 can be configured to determine the pulmonary artery pressure based on signals sensed by the sensor 9014. Further, the system controller 9024 can be configured to generate control signals for the negative pressure therapy pump 9004 and/or blood pump 9042 based on measured values for pulmonary artery pressure.

In some examples, the portable computer device 9026 and/or the external pump 9004 can include components for providing measured values and other feedback for a user, such as for a medical professional responsible for treatment of the patient. For example, the portable computer device 9026 and/or external pump 9004 can comprise visual output components, such as a visual display screen 9046 or touch screen display, and/or audio output components, such as speakers 9048, that provide information and feedback to a user. For example, information about operational status of the pump 9004 (i.e., is the pump on or off), a magnitude of negative pressure being applied by the pump 9004, and measured patient information or parameters, such as pulmonary artery pressure measured by the sensor 9014, urine output, and any other measured parameters useful for determining a status of the patient and/or for monitoring negative pressure therapy.

Treatment Methods

The negative pressure therapy systems 9000 of the present disclosure can be used in connection with treatment methods for removal of excess fluid from a patient. In some examples, the fluid removal methods can be used together with circulation support methods, such as providing circulation support using a blood pump (i.e., a left ventricular assist device). In some examples, the method for removing fluid from a patient comprises: (a) monitoring a pulmonary artery pressure of the patient; (b) determining if the patient's pulmonary artery pressure is above, below, or at a predetermined value; and (c) applying negative pressure to a urinary catheter to remove fluid from the urinary tract of the patient when the patient's pulmonary artery pressure is above the predetermined value or ceasing to apply the negative pressure when the patient's pulmonary artery pressure is at or below the predetermined value.

In some examples, use of the systems and treatment methods of the present disclosure for removal of fluid and/or increasing urine output are enhanced by administering medication to the patient along with, prior to, or after providing negative pressure therapy for the patient. The method can comprise, for example: (a) administering at least one medicament to a patient, wherein the medicament increases urine output and/or sodium output from the patient; (b) monitoring a pulmonary artery pressure of the patient; (c) determining if the patient's pulmonary artery pressure is above, below, or at a predetermined value; and (d) applying negative pressure to a urinary catheter to remove fluid from the urinary tract of the patient when the patient's pulmonary artery pressure is above the predetermined value or ceasing application of the negative pressure when the patient's pulmonary artery pressure is at or below the predetermined value, wherein administering the at least one medicament occurs before, during, and/or after applying negative pressure.

In some examples, a method is provided for treating venous congestion and/or renal dysfunction in a patient in need thereof. The method can comprise, for example: (a) administering at least one medicament to a patient, wherein the medicament modulates at least one of electrolyte reabsorption, electrolyte excretion or renal blood flow in the patient; (b) applying negative pressure to a drainage lumen of a urinary catheter such that flow of urine from a ureter and/or kidney of the patient is transported within the drainage lumen to extract urine from the patient, (b) monitoring a pulmonary artery pressure of the patient; (c) determining if the patient's pulmonary artery pressure is above, below, or at a predetermined value; and (d) applying negative pressure to a urinary catheter to remove fluid from the urinary tract of the patient when the patient's pulmonary artery pressure is above the predetermined value or ceasing application of the negative pressure when the patient's pulmonary artery pressure is at or below the predetermined value, wherein administering the at least one medicament occurs before, during and/or after applying negative pressure.

In some examples, a method is provided for reducing fluid overload in a patient in need thereof. For example, the method can comprise: (a) administering at least one medicament to a patient, wherein the medicament modulates at least one of electrolyte reabsorption, electrolyte excretion or renal blood flow in the patient; (b) monitoring a pulmonary artery pressure of the patient; (c) determining if the patient's pulmonary artery pressure is above, below, or at a predetermined value; and (d) applying negative pressure to a urinary catheter to remove fluid from the urinary tract of the patient when the patient's pulmonary artery pressure is above the predetermined value or ceasing application of the negative pressure when the patient's pulmonary artery pressure is at or below the predetermined value, wherein administering the at least one medicament occurs before, during and/or after applying negative pressure.

In some examples, a method is provided for increasing renal blood flow in a patient in need thereof. The method comprises: (a) administering at least one medicament to a patient, wherein the medicament modulates renal blood flow in the patient; (b) monitoring a pulmonary artery pressure of the patient; (c) determining if the patient's pulmonary artery pressure is above, below, or at a predetermined value; and (d) applying negative pressure to a urinary catheter to remove fluid from the urinary tract of the patient when the patient's pulmonary artery pressure is above the predetermined value or ceasing application of the negative pressure when the patient's pulmonary artery pressure is at or below the predetermined value, wherein administering the at least one medicament occurs before, during and/or after applying negative pressure.

As used herein, "renal blood flow" can refer to a volume of blood reaching the kidneys of a patient per unit time. Blood passing through the kidneys is then filtered in glomerulus which in turn gives rise to the glomerular filtrate rate (GFR) which measures the efficiency in which a patient's kidneys are functioning. Thus, an increased blood volume passing through the glomerulus increases the opportunity for the blood to be filtered and/or excess fluids to be removed from the blood stream. In some examples, the medicament is a vasodilator as discussed elsewhere herein which increases the amount of blood that flows through the kidneys of a patient. In some examples, the medicament is one which increases renal blood flow.

In some examples, a method is provided for modulating electrolyte reabsorption and/or electrolyte excretion in a patient in need thereof. For example, the method can comprise: (a) administering at least one medicament to a patient, wherein the medicament modulates electrolyte reabsorption and/or electrolyte excretion in the patient; (b) monitoring a pulmonary artery pressure of the patient; (c) determining if the patient's pulmonary artery pressure is above, below, or at a predetermined value; and (d) applying negative pressure to a urinary catheter to remove fluid from the urinary tract of the patient when the patient's pulmonary artery pressure is above the predetermined value or ceasing application of the negative pressure when the patient's pulmonary artery pressure is at or below the predetermined value, wherein administering the at least one medicament occurs before, during and/or after applying negative pressure.

Electrolyte reabsorption and/or electrolyte excretion refer to a two-step process where (1) water and dissolved substances are passively or actively moved inside the tubule of the kidney through the tubule wall and into the space outside the tubule, and (2) water and/or dissolved substances move through the capillary walls back into the bloodstream of the patient. The movement can be via active or passive transport in either direction. Sodium is the most important essential substance that is reabsorbed because other nutrients (e.g., glucose, phosphate, amino acids, lactate, citrate, etc.) piggyback on the sodium co-transport proteins. When the proper sodium gradient is maintained, this process continues properly. When it is disrupted, reabsorption of vital and essential nutrients is likewise disrupted. In some examples, medicaments that help maintain this balance are used with the methods disclosed herein. In some examples, diuretic medicaments as discussed elsewhere herein are used to modulate electrolyte reabsorption and/or electrolyte excretion. In some examples, vasodilators as discussed elsewhere herein are used to modulate electrolyte reabsorption and/or electrolyte excretion.

In some examples, vasodilators and/or diuretic medicaments are provided for use in a method of inducing negative pressure in at least one location within the urinary tract of a patient having venous congestion and/or fluid overload.

In some examples, furosemide, or a pharmaceutically salt or formulation thereof, is provided for use in a method of inducing negative pressure in at least one location within the urinary tract of a patient to increase urine output from the patient.

In some examples, the use of a medicament is provided in a method for inducing negative pressure in at least one location within the urinary tract of a patient having venous congestion and/or fluid overload.

In some examples, the use of a medicament is provided in a method for inducing negative pressure in at least one location within the urinary tract of a patient having edema. In some examples, the medicament comprises one or more diuretic(s) and/or one or more vasodilator(s).

As used herein, the term "treating" or "treatment" of a medical condition or ailment is defined as: (1) preventing or delaying the appearance or development of one or more clinical symptoms of the state, disease, disorder or condition associated with or caused by said medical condition or ailment in the patient that may be afflicted with or predisposed to the state, disease, disorder or condition but does not yet experience or display clinical or subclinical symptoms of the state, disease, disorder or condition, (2) inhibiting the state, disease, disorder or condition associated with or caused by the medical condition or ailment, e.g., arresting or reducing the development of the state, disease, disorder or condition associated with or caused by the medical condition or ailment or at least one clinical or subclinical symptom thereof, and/or (3) relieving or ameliorating the state, disease, disorder or condition associated with or caused by the medical condition or ailment, e.g., causing regression or amelioration of the state, the state, disease, disorder or condition associated with or caused by the medical condition or ailment or at least one of its clinical or subclinical symptoms. The benefit to a subject to be treated is either statistically significant or at least perceptible to the patient or to the physician (e.g., decreased edema). "Treating" or "treatment" does not imply that the medical condition is cured or eliminated although that is one of several possible patient outcomes. Additional patient outcomes from being treated include the alleviation and/or reduction in severity of one or more symptoms of the medical condition or ailment. Thus, the methods contemplated herein are suitable to treat any form of venous congestion, edema and/or heart failure, or any other disease state or medical condition discussed herein. The methods contemplated herein are also be suitable to treat any medical condition or ailment where diuresis is desirable and/or would provide a medical benefit to the patient.

As used herein, "improving" or "improvement" with respect to a medical condition or ailment means reducing the severity of at least one symptom associated with a specific medical condition or ailment. Such an improvement may completely alleviate at least one symptom or it may provide partial relief from at least one symptom. In some examples, the medical condition is one in which increased urine output and/or sodium output is desirable or would provide a medical benefit to the patient. In some examples, the medical condition is venous congestion, and/or heart failure. In some examples, the medical condition exhibits edema as one of the symptoms. In some examples, "improving" means reducing edema in a patient in need thereof.

Edema can be categorized as trace/mild (0 points), moderate (1 point), or severe (2 points). Orthopnea can be assessed by determining if the patient needs at least 2 pillows to breathe comfortably (2 points) or absent (0 points). An Orthodema Score can be generated by the sum of the individual orthopnea and edema scores (below). A total score of 1 represents the presence of moderate edema without orthopnea. A score of 2 indicates the presence of orthopnea or severe peripheral edema, but not both. Scores of 1 to 2 represent low-grade congestion. High-grade congestion includes orthopnea and edema, with a score of 3 for orthopnea plus moderate edema, and a score of 4 if orthopnea is accompanied by severe edema.

| Orthodema Scores | | | |
|---|---|---|---|
| Mild edema, no orthopnea | 0 | No congestion | |
| Moderate edema, no orthopnea | 1 | Low-grade orthodema/congestion | |
| Severe edema OR orthopnea | 2 | | |
| Moderate edema and orthopnea | 3 | High-grade orthodema/congestion | |
| Severe edema and orthopnea | 4 | | |

As used herein, the term "therapeutically effective amount" or "therapeutically effective dose" means the amount of a medicament or drug, that, when administered to a patient in need thereof for treating a medical condition or ailment, is sufficient to treat such medical condition. The "therapeutically effective amount" will vary depending on the specific medicament and the particular state, disease, disorder or condition being treated and its severity. It will also depend on the age, weight, physical condition and responsiveness of the patient to be treated. Thus, one or more of these parameters can be used to select and adjust the therapeutically effective amount of the medicament. Also, the amount can be determined using pharmacologic methods known in the art such as dose response curves. In some examples, the therapeutically effective dose is selected by the medical professional overseeing or administering the treatment of the patient and is based on the professional medical judgement of the medical professional. In some examples, the therapeutically effective dose of the medicament administered in the methods used in conjunction with at least one medical device as described elsewhere herein will be lower than the therapeutically effective dose when said medicament is administered alone (i.e., not in combination with a medical device as described herein). In some examples, the therapeutically effective dose is based on the Prescribing Information for the medicament administered to the patient. In some examples, the dose is the minimum dose listed as being effective for the medicament as described in the Prescribing Information for that medicament. In some examples, the dose is within the suggested dosage range for the medicament as included in the Prescribing Information for that medicament.

Venous congestion, heart impairment or heart failure are complex medical ailments where treatment may require administering one or more different medicaments to a patient. Patients are often administered multiple medicaments based on the nature and/or severity of their symptoms and medical condition.

In some examples of the present methods, a patient is administered at least one (one, two, or more) medicament(s). In some examples, when a patient is administered two or more medicaments, the medicaments may be in the same class or from different classes, and may be administered at the same time, or at different times as determined by the medical practitioner.

The administration of the at least one medicament can occur before, during and/or after applying negative pressure, at any time as determined by the medical practitioner. For example, the medicament(s) can be administered in a range of about two months before application of negative pressure to about 2 months after application of negative pressure, or at any time therebetween. In some examples, the medicament(s) can be administered in a range of about one week, or about 3 days, or about 1 day, or about 12 hours, or about 8 hours, or about 6 hours, or about 4 hours, or about 2 hours, or about 1 hour before application of negative pressure, or 0 to 60 minutes before application of negative pressure, or at any time during application of negative pressure, or 0 to 60 minutes after application of negative pressure, or about 1 hour, or about 2 hours, or about 4 hours, or about 6 hours, or about 8 hours, or about 12 hours, or about 1 day, or about 3 days, or about one week after application of negative pressure, or at any time therebetween. In some examples, the medicament is administered from about 1 to about 300 minutes before the application of negative pressure. In some examples, the medicament is administered about 15 minutes, or about 30 minutes, or about 45 minutes, or about 60 minutes, or about 90 minutes, or about 120 minutes, or about 150 minutes, or about 180 minutes, or about 2 hours, or about 2.5 hours, or about 3.5 hours, or about 4 hours, or about 5 hours, or about 6 hours, or about 9 hours, or about 12 hours before the application of negative pressure.

Different medicaments each have a different time period to reach its peak effectiveness. This time period is known to persons skilled in the art and the medical professional overseeing the treatment of the patient. It is often included in the Prescribing Information for the medicament. In some examples, the medicament is administered at such a time that the peak effectiveness of said medicament occurs while negative pressure is being induced in the urinary tract of the patient.

The medicament(s) can be administered orally, subcutaneously, intravenously, transdermally, by inhalation, etc. In some examples, the medicament is in a unit dosage form. In such form, the preparation is subdivided into suitably sized unit doses containing appropriate quantities of the active component, e.g., an effective amount to achieve the desired purpose.

The quantity of active compound in a unit dose of preparation may be varied or adjusted from about 1 mg to about 500 mg, or from about 1 mg to about 120 mg, or about 40 mg to about 120 mg, or from about 1 mg to about 25 mg, according to the particular application.

The actual dosage employed may be varied depending upon the requirements of the patient and the severity of the condition being treated. Determination of the proper dosage regimen for a particular situation is within the skill of the art. For convenience, the total daily dosage may be divided and administered in portions during the day as required.

The amount and frequency of administration of the compounds of the invention and/or the pharmaceutically acceptable salts thereof will be regulated according to the judgment of the attending clinician considering such factors as age, condition and size of the patient as well as severity of the symptoms being treated. A typical recommended daily dosage regimen for oral administration can range from about 1 mg/day to about 1000 mg/day, preferably 1 mg/day to 200 mg/day, given in a single dose or 2-4 divided doses. The exact dose, however, is determined by the attending clinician and is dependent on the potency of the compound administered, the age, weight, condition and response of the patient.

For administration of pharmaceutically acceptable salts of the above compounds, the weights indicated above refer to the weight of the acid equivalent or the base equivalent of the therapeutic compound derived from the salt.

A useful dosage can be about 0.001 to 500 mg/kg of body weight/day of the medicament(s), or about 0.01 to 25 mg/kg of body weight/day. In some examples, when the patient is administered a medicament(s), the dose is administered as a single dosage unit or it is divided into multiple doses. In some examples, the total daily dosage is administered in two, three, four or more divided doses. The exact timing and amount of each dose is determined by the attending medical professional based on the needs of the patient. For example, a first dose can be administered before the induction of negative pressure in the urinary tract of the patient and a second dose can be administered while negative pressure is being induced in the urinary tract of the patient. In some examples, the timing of the dose or doses is determined based on the Prescribing Information for the specific medicament administered to the patient.

Non-limiting examples of suitable medicaments for use in the present methods include, but are not limited to, one or more of angiotensin-converting enzyme inhibitor(s) (ACE inhibitor(s)), angiotensin II receptor blocker(s) (ARB(s)), beta blocker(s), diuretic(s), aldosterone antagonist(s), inotrope(s), angiotensin-receptor-neprilysin-inhibitor(s) (ARNI(s)), sodium glucose co-transporter(s) (SGLT-2), vasodilator(s), or combinations thereof. In some examples, the at least one medicament is selected from the group consisting of diuretic(s), SGLT-2 inhibitor(s), and combinations thereof. In some examples, the at least one medicament comprises at least one diuretic.

Diuretics, colloquially called water pills, are medicaments that increase the amount of water and salt expelled from the body as urine (i.e., by diuresis). Non-limiting examples of suitable diuretics for use in the present methods include, but are not limited to, one or more of loop diuretic(s), carbonic anhydrase inhibitor(s), potassium-sparing diuretic(s), calcium-sparing diuretic(s), osmotic diuretic(s), thiazide diuretic(s), miscellaneous diuretics or combinations thereof.

Loop diuretics are medicaments that act on the ascending limb of Henle in the kidney of a patient. They inhibit the reabsorption of sodium potassium chloride (NKCC2) co-transporter in the thick limb of the loop of Henle. By inhibiting reabsorption of sodium, the hypertonic filtrate inhibits the reabsorption of water via diffusion leading to volume removal. Non-limiting examples of suitable loop diuretics for use in the present methods include, but are not limited to, one or more of bumetanide, ethacrynic acid, torsemide, or furosemide. In some examples, the patient is administered bumetanide. In some examples, the patient is administered ethacrynic acid. In some examples, the patient is administered torsemide. In some examples, the patient is administered furosemide.

In some examples where the medicament is furosemide, a patient is administered from about 20 to about 600 mg/day, or about 20 to about 500 mg/day, or about 20 to about 400 mg/day, or about 20 to about 300 mg/day, or about 20 to about 200 mg/day, or about 20 to about 100 mg/day, or about 20 to 80 mg/day, or about 20 mg/day, or about 40 mg/day, or about 60 mg/day, or about 80 mg/day, or about 100 mg/day, or about 120 mg/day, or about 140 mg/day, or about 160 mg/day, or about 180 mg/day, or about 200 mg/day, or about 300 mg/day, or about 400 mg/day, or about 500 mg/day, or about 600 mg/day, in a single dose or divided into multiple doses.

In some examples where the medicament is bumetanide, a patient is administered from about 0.5 to 10 mg/day, or about 0.5 mg/day, or about 1 mg/day, or about 1.5 mg/day, or about 2 mg/day, or about 3 mg/day, or about 4 mg/day, or about 5 mg/day, or about 6 mg/day, or about 7 mg/day, or about 8 mg/day, or about 9 mg/day, or about 10 mg/day, in a single dose or divided into multiple doses.

In some examples where the medicament is torsemide, a patient is administered from about 1.25 to about 200 mg/day, or about 10 mg/day, or about 20 mg/day, or about 30 mg/day, or about 40 mg/day, or about 50 mg/day, or about 60 mg/day, or about 70 mg/day, or about 80 mg/day, or about 90 mg/day, or about 100 mg/day, or about 120 mg/day, or about 140 mg/day, or about 160 mg/day, or about 180 mg/day, or about 200 mg/day, in a single dose or divided into multiple doses.

In some examples where the medicament is ethacrynic acid, a patient is administered from about 25 to about 400 mg/day, or about 50 to about 200 mg/day, or about 50 mg/day, or about 75 mg/day, or about 100 mg/day, or about 125 mg/day, or about 150 mg/day, or about 175 mg/day, or about 200 mg/day, in a single dose or divided into multiple doses.

Thiazide diuretics act directly on the kidney and promote diuresis by inhibiting the sodium/chloride cotransporter in the distal tubule of the nephrons in the kidney of a patient. They decrease sodium reabsorption which decreases extracellular fluid and plasma volume. Non-limiting examples of suitable thiazide diuretics include, but are not limited to, one or more of indapamide, hydrochlorothiazide, chlorthalidone, metolazone, methyclothiazide, chlorothiazide, bendroflumethiazide, polythiazide, hydroflumethiazide, or combinations thereof. In some examples, the patient is administered indapamide. In some examples, the patient is administered hydrochlorothiazide. In some examples, the patient is administered chlorthalidone. In some examples, the patient is administered metolazone. In some examples, the patient is administered methyclothiazide. In some examples, the patient is administered chlorothiazide. In some examples, the patient is administered bendroflumethiazide. In some examples, the patient is administered polythiazide. In some examples, the patient is administered hydroflumethiazide. In some examples, the patient is administered from about 0.5 to about 1000 mg/day, or about 1 to 500 mg/day, or about 2 to 400 mg/, or about 3 to 300 mg/day, in a single dose or divided into multiple doses.

Carbonic anhydrase inhibitors reduce the activity of carbonic anhydrase, the enzyme that catalyzes the reaction between carbon dioxide and water to form carbonic acid and eventually bicarbonate. This reduces the reabsorption of bicarbonate in the proximal tubules of the kidneys of a patient which increases bicarbonate extraction. This causes an increase in both sodium and potassium extraction also. Non-limiting examples of suitable carbonic anhydrase inhibitors include, but are not limited to, one or more of acetazolamide, dichlorphenamide, methazolamide and combinations thereof. In some examples, the patient is administered acetazolamide. In some examples, the patient is administered dichlorphenamide. In some examples, the patient is administered methazolamide. In some examples, the patient is administered from about 0.5 to about 1000 mg/day, or about 1 to about 500 mg/day, or about 2 to about 400 mg/day, or about 3 to about 300 mg/day, in a single dose or divided into multiple doses.

Potassium-sparing diuretics increase diuresis without also causing an increase in potassium excretion. They function by inhibiting the sodium-potassium exchange in the distal convoluted tubules in the kidneys of a patient. Non-limiting examples of suitable potassium-sparing diuretics include, but are not limited to, one or more of eplerenone, triamterene, spironolactone, amiloride, or combinations thereof. In some examples, the patient is administered eplerenone. In some examples, the patient is administered triamterene. In some examples, the patient is administered spironolactone. In some examples, the patient is administered amiloride. In some examples, the patient is administered from about 0.5 to about 1000 mg/day, or about 1 to 500 mg/day, or about 2 to 400 mg/, or about 3 to 300 mg/day, in a single dose or divided into multiple doses.

Calcium-sparing diuretics reduce the rate of excretion of calcium by a patient. Certain thiazide and potassium-sparing diuretics are also calcium-sparing. The thiazide diuretics and potassium-sparing diuretics are also considered as calcium-sparing diuretics.

Osmotic diuretics inhibit the reabsorption of water and sodium. They are generally inert but function by increasing the osmolarity of the blood and renal filtrate in a patient. Non-limiting examples of suitable osmotic diuretics include, but are not limited to, one or more of mannitol and/or isosorbide. In some examples, the patient is administered mannitol. In some examples, the patient is administered isosorbide. In some examples, the patient is administered from about 0.5 to about 1000 mg/day, or about 1 to about 500 mg/day, or about 2 to about 400 mg/day, or about 3 to about 300 mg/day, in a single dose or divided into multiple doses.

Sodium-glucose cotransporter-2 (SGLT-2) inhibitors, also called gliflozins, inhibit the SGLT-2 proteins in the renal tubules in the kidneys that are responsible for reabsorbing glucose back into the bloodstream. As a result, more glucose is excreted in the urine. This helps lower the level of hemoglobin A1c which improves weight loss and lowers blood pressure. Non-limiting examples of suitable SGLT-2 inhibitors include, but are not limited to, one or more of ertugliflozin, canagliflozin, empagliflozin, dapagliflozin or combinations thereof. In some examples, the patient is administered ertugliflozin. In some examples, the patient is administered canagliflozin. In some examples, the patient is administered empagliflozin. In some examples, the patient is administered dapagliflozin. In some examples, the patient is administered from about 0.5 to about 1000 mg/day, or about 1 to about 500 mg/day, or about 2 to about 400 mg/day, or about 3 to about 300 mg/day, in a single dose or divided into multiple doses.

Non-limiting examples of suitable miscellaneous diuretics include, but are not limited to, one or more of pamabrom, glucose, mannitol, or combinations thereof. In some examples, the patient is administered pamabrom. In some examples, the patient is administered mannitol. In some examples, the patient is administered glucose. In most instances, the miscellaneous diuretics are over-the-counter medicaments where a doctor's prescription is not necessary. As such, a patient should carefully follow any instructions and warnings with respect thereto before taking any such medicament. In some examples, the dose taken by or administered to a patient should closely follow the recommended dosing regimen as provided with the medicament.

As used herein, the term "vasodilator" is defined as a drug that dilates (widens) blood vessels, allowing blood to flow more easily therethrough. Some vasodilators act directly on the smooth muscle cells lining the blood vessels. Other have a central effect, and regulate blood pressure most likely through the vasomotor center located within the medulla oblongata of the brain. Non-limiting examples of suitable vasodilators include, but are not limited to, one or more of nitrovasodilator(s) (such as nitroglycerin, isosorbide mononitrate, isosorbide dinitrate or sodium nitroprusside), ACE inhibitor(s), angiotensin receptor antagonist(s), phosphodiesterase inhibitor(s), direct vasodilator(s), adrenergic receptor antagonist(s), calcium channel blocking drug(s), alpha blocker(s), beta blocker(s), lymphthomimetic(s), vitamin(s), organic nitrate(s), serotonin receptor-blocking agent(s), angina blocking agent(s), other hypertensive agent(s), cardiac stimulating agent(s), agent(s) which improve renal, vascular function, sympathomimetic amine, and salts, derivatives, precursors, pharmaceutically active sequences or regions, natriuretic peptides (such as ularitide, cenderitide or serelaxin), peptidomimetic(s), mimetic(s), and mixtures thereof. In some examples, the patient is administered from about 0.5 to about 1000 mg/day, or about 1 to about 500 mg/day, or about 2 to about 400 mg/day, or about 3 to about 300 mg/day, in a single dose or divided into multiple doses.

As used herein, the term "RAAS inhibitor" refers to drugs that inhibit the renin-antiotensin-aldosterone system in a patient. In many instances RAAS inhibitors are also vasodilators as disclosed elsewhere herein. Non-limiting examples of suitable RAAS inhibitors diuretics include, but are not limited to, one or more of ACE inhibitor(s), angiotensin receptor antagonist(s), beta blocker(s), calcium channel blocker(s), and angiotensin receptor neprilysin inhibitors (ARNIs). In some examples, the patient is administered from about 0.5 to about 1000 mg/day, or about 1 to about 500 mg/day, or about 2 to about 400 mg/day, or about 3 to about 300 mg/day, in a single dose or divided into multiple doses.

Any of the medicaments disclosed can be used alone or in combination, and can be administered at the same time or at different times, for example as discussed herein.

In all aspects for the one or more medicaments administered in the methods disclosed herein, each medicament can be present in the form of a pharmaceutically acceptable formulation, and can include pharmaceutically acceptable excipients. In some examples, the medicament is in the form of one or more salt(s), ester(s), polymorph(s), or prodrug(s), as they exist. The pharmaceutically acceptable formulation may have received regulatory approval for commercial marketing or it may still be under development (e.g., clinical trials). In all aspects, the pharmaceutically acceptable formulation is deemed appropriate and suitable for administration to human patients."

While not intending to be bound by any theory, the present inventors theorized that the application of negative pressure might help to facilitate fluid flow from the kidney, and that a very particular tool, designed to deploy a protective surface area in order to open or maintain the opening of the interior of the renal pelvis while inhibiting the surrounding tissues from contracting or collapsing into the fluid column under negative pressure, is needed to facilitate the application of negative pressure within the renal pelvis. While not intending to be bound by any theory, the present inventors theorized that application of negative pressure before, during and/or after the use of medicaments as disclosed herein can unexpectedly and/or synergistically enhance the flow of fluid from the kidney. For example, Loop diuretics are medicaments that inhibit the reabsorption of sodium in the thick limb of the loop of Henle. By inhibiting the reabsorption of sodium, the hypertonic filtrate inhibits the reabsorption of water via solvent drag leading to increased urine volume. However, during congestion, renal blood flow is reduced and delivery of the medicament to the lumen of the tubule is reduced. As a consequence, the effectiveness of the loop diuretics is diminished. The application of negative pressure into the collection system of the kidney results in an increase in renal blood flow and filtrate delivered to the tubules, even during congestion. Combining these approaches leads to an augmentation of the urine produced via either method alone. Negative pressure will increase the production of filtrate, hence sodium delivery to the tubule. Negative pressure will also increase renal blood flow, hence delivery of more loop diuretic to the tubule. Therefore, more sodium can be blocked from reabsorption and more urine is produced.

Figure 59:
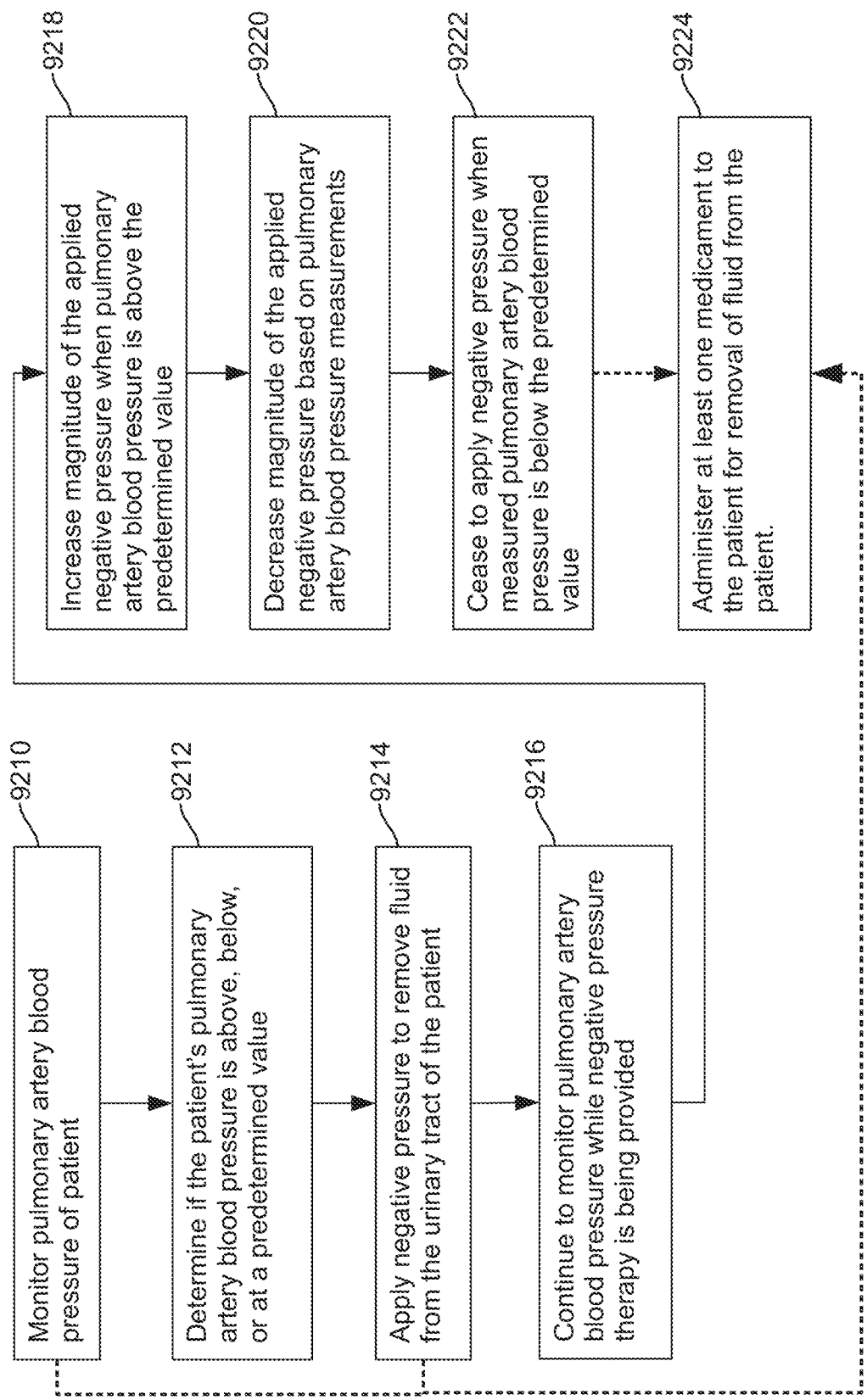
FIG. 59 is a flow chart showing steps for providing negative pressure therapy to a patient determined based on pulmonary artery pressure measurements according to an example of the present disclosure.

A method comprising the following steps for removing fluid from a patient using the devices and systems 9000 described herein is shown in the flow chart of FIG. 59. In some examples, the methods disclosed herein can be used for treatment of an ambulatory patient who is asymptomatic for congestion, meaning that the patient is not showing physiological symptoms of decompensated heat failure (i.e., edema, dyspnea, shortness of breath, etc.). For patients with an implanted pulmonary artery pressure sensor, the patient's pulmonary artery pressure could be checked periodically (i.e., daily or every few days). If the patient's pulmonary artery pressure rises, a urinary catheter (i.e., a kidney percutaneous catheter or an indwelling catheter inserted in the urinary tract) could be provided in the patient's urinary tract for providing renal negative pressure therapy for the patient. Once the urinary catheter(s) are in place, renal negative pressure therapy treatment could be provided for any suitable period of time sufficient for relieving fluid overload and/or reducing the patient's pulmonary artery pressure. For example, renal negative pressure therapy could be provided to the patient for a period of time of about 12 hours to about 96 hours. After the regnal negative pressure therapy is completed, the urinary catheter(s) could be removed. After removal of the urinary catheter(s), the patient's pulmonary artery pressure measurements could continue to be monitored periodically (i.e., daily or every few days) to determine whether the patient would benefit from additional treatments of negative pressure therapy.

In some examples, as shown in the flowchart, a treatment method for a patient comprises, at step 9210, monitoring the pulmonary artery pressure of the patient. As previously described, monitoring the pulmonary artery pressure can comprise, for example, exposing an implanted, passive pressure sensor 9014 to a radio frequency signal generated by a radio frequency antenna of an external device, such as any of the previously described external portable computer devices 9026 and/or pumps 9004, and monitoring a frequency response from the implanted sensor 9014 with the radio frequency antenna. The implanted sensor 9014 can be provided in the right pulmonary artery or the left pulmonary artery of the patient. The external portable computer device 9026 can comprise electronic circuitry, such as the system controller 9024, for receiving and processing the response signal to determine an instantaneous or real-time measurement for the pulmonary artery pressure of the patient. As previously discussed, monitoring the pulmonary artery pressure can comprise determining a pulmonary artery pressure for the patient continuously or at predetermined intervals, such as once an hour, once every two hours, once every four hours, or once a day.

At step 9212, the method further comprises determining if the patient's pulmonary artery pressure is above, below, or at a predetermined value. The predetermined value or, in other examples, a predetermined range of acceptable values can be determined based on normal values for a healthy patient (i.e., for a patient without worsening heart failure). For example, the predetermined value can be within a range of about 12 mmHg to about 16 mmHg (diastolic) and from about 18 mmHg to about 25 mmHg (systolic). In other examples, the predetermined value can be a measured baseline value for a particular patient. For example, the predetermined value can be the patient's systolic and/or diastolic pulmonary artery pressure when the sensor 9014 is first implanted in the patient's pulmonary artery 9122a, 9122b.

At step 9214, the method can further comprise applying the negative pressure to a urinary catheter 9002a, 9002b to remove fluid from the urinary tract of the patient when the patient's pulmonary artery pressure is above the predetermined value or ceasing to apply the negative pressure when the patient's pulmonary artery pressure is at or below the predetermined value. The negative pressure applied by the pump 9004 through the catheters 9002a, 9002b can also be based, at least in part, on patient information from other sensors, such as any of the previously described physiological, pump parameter, and/or environmental sensors. For example, the system controller 9024 may be configured to receive sensor data indicating a negative pressure at the renal pelvis and may modify operating parameters of the pump 9004 based on the received pressure measurements from the renal pelvis. In other examples, operating parameters of the pump 9004 could be modified based on, for example, patient urine output, a total amount of urine that has passed through the catheter and/or pump, analyte concentration of the collected urine, and/or trends in physiological parameters of the patient detected by the sensors.

In some examples, applying negative pressure therapy can comprise deploying a retention portion 9034 of a ureteral stent or a urinary catheter, such as a ureteral catheter 9002a, 9002b, in the ureter 9124 and/or kidney 9102a, 9102b of a patient, such that flow of urine from the ureter 9024 and/or kidney 9102a, 9102b passes into the stent or catheter 9002a, 9002b. The catheter 9002a, 9002b may be positioned within the kidney 9102 or renal pelvis 9104 to avoid occluding the ureter 9024 and/or kidney 9102a, 9102b. In some examples, a fluid collecting portion of the stent or catheter may be positioned in the renal pelvis of the patient's kidney 9102a, 9102b. In some examples, a ureteral stent or ureteral catheter 9002a, 9002b may be positioned in each of the patient's kidneys 9102a, 9102b. In other examples, a urine collection catheter may be deployed in the bladder or ureter. In some examples, the ureteral catheter 9002a, 9002b comprises one or more of the retention portions 9034 described herein. For example, the ureteral catheter 9002a, 9002b can comprise a tube defining a drainage lumen comprising a helical retention portion 9024 and a plurality of drainage ports. In other examples, the ureteral catheters 9002a, 9002b can comprise a funnel-shaped fluid collection and retention portion 9034 or a pigtail coil. Alternatively, a ureteral stent 9002a, 9002b, having, for example, a pigtail coil, can be deployed.

In some examples, the negative pressure is applied at a predetermined magnitude (i.e., a magnitude of from 10 mmHg to 150 mmHg) for a predetermined duration (i.e., one hour, two hours, or four hours). After the predetermined duration, the pulmonary artery pressure can be detected again. If the detected pulmonary artery pressure remains above the predetermined value, negative pressure can be applied again at the predetermined magnitude for the predetermined duration. If the detected pulmonary artery pressure is below the predetermined value, then the method can comprise ceasing to apply the negative pressure for a predetermined duration.

In some examples, the system controller 9024 of a negative pressure therapy system 9000 can be configured to automatically modify the applied negative pressure in response to measured pulmonary artery pressure values and/or in response to sensor measurements from other physiological, pump parameter, and/or environmental sensors of the system 9000. In other examples, modification of negative pressure therapy can be performed manually by, for example, a medical professional or, in some instances, by the patient. For example, the user (either the trained medical professional or patient) may review pulmonary artery pressure measurements displayed on, for example, the visual display 9046 of the external portable computer device 9026 or external pump 9004. The user may determine when to turn-on or to turn-off the negative pressure therapy pump 9004 and/or to adjust a magnitude of the applied negative pressure based on the displayed measured values for pulmonary artery pressure.

In some examples, the method further comprises, at step 9216, continuing to monitor the pulmonary artery pressure of the patient while negative pressure therapy is being provided. For example, continuing to monitor the pulmonary artery pressure can including periodically receiving measurements for the patient's pulmonary artery pressure at predetermined intervals. The method can further comprise, at step 9218, increasing a magnitude of the negative pressure applied by the negative pressure source when the patient's pulmonary artery pressure is above the predetermined value. For example, increasing the magnitude of the negative pressure can comprise increasing the magnitude of the pressure incrementally (i.e., by a predetermined about, such as 1.0 mmHg, 0.5 mmHg, or 0.1 mmHg) each time that a new measurement for pulmonary artery pressure is received that is greater than the predetermined value.

At step 9220, optionally, the method can further comprise a step of decreasing the magnitude of the negative pressure applied to the urinary catheter, such as the ureteral catheter 9002a, 9002b, based on pulmonary artery pressure measurements received from the external portable computer device 9026 and/or pump 9004. For example, the magnitude of the negative pressure may be reduced by a set amount (i.e., 1.0 mmHg, 0.5 mmHg, or 0.1 mmHg) each time that a measurement for pulmonary artery pressure is received that is less than the previously received pulmonary artery pressure value, even if the measured value remains above the predetermined value (i.e., the predetermined target value for systolic or diastolic pressure). Reducing a magnitude of the applied negative pressure incrementally by small amounts may serve to reduce severity of a transition between applying negative pressure and when no pressure is applied.

At step 9222, the method can further comprise a step of ceasing to apply negative pressure when a measured pulmonary artery pressure for the patient is less than the predetermined or baseline value. For example, the system controller 9024 can be configured to automatically turn off the pump 9004 when the measured pulmonary artery pressure for the patient is below the predetermined value. In other examples, a user may manually turn off the pump 9004 to cease applying negative pressure to the urinary tract of the patient when a pulmonary artery pressure value display, for example, on the visual display 9046 of the external portable computer device 9026 or external pump is below the predetermined value.

With continued reference to FIG. 59, removal of excess fluid from the patient by the negative pressure therapy system 9000 and associated methods of the present disclosure can be enhanced by medication provided to the patient before, during, or after negative pressure therapy is applied to the urinary tract of the patient. For example, as shown at step 9224, the method, optionally, further comprises administering at least one medicament to a patient. The medicament can be any of the previously described medications, therapeutic agents, and/or active agents having the effect of increasing urine output and/or sodium output from the patient. For example, the medicament can comprise a medicament known or expected to modulate electrolyte reabsorption, electrolyte excretion, and/or renal blood flow in the patient. Alternatively or in addition, the medicament can be a medicament known or expected to modulate renal blood flow. In still other examples, the medicament can be a medicament that modulates electrolyte reabsorption and/or electrolyte excretion in the patient.

As shown in FIG. 59, the medicament can be provided before, during, and/or after providing negative pressure therapy to the urinary system of the patient. In some examples, a decision to administer the medicament to the patient can be based on and/or modified in view of the pulmonary artery pressure measurements from the implanted sensor. For example, medication may be provided when a patient's pulmonary artery pressure is greater than a predetermined value. Medication may not be administered to the patient or an amount of medication provided to the patient or frequency with which medication is provided to the patient may be reduced when the patient's pulmonary artery pressure is below the predetermined value.

EXAMPLES

Inducement of negative pressure within the renal pelvis of farm swine was performed for the purpose of evaluating effects of negative pressure therapy on renal congestion in the kidney. An objective of these studies was to demonstrate whether a negative pressure delivered into the renal pelvis significantly increases urine output in a swine model of renal congestion. In Example 1, a pediatric Fogarty catheter, normally used in embolectomy or bronchoscopy applications, was used in the swine model solely for proof of principle for inducement of negative pressure in the renal pelvis. It is not suggested that a Fogarty catheter be used in humans in clinical settings to avoid injury of urinary tract tissues. In Example 2, the ureteral catheter 1212 shown in FIGS. 23A-23F, and including a helical retention portion for mounting or maintaining a distal portion of the catheter in the renal pelvis or kidney, was used.

Example 1

Method

Figure 60:
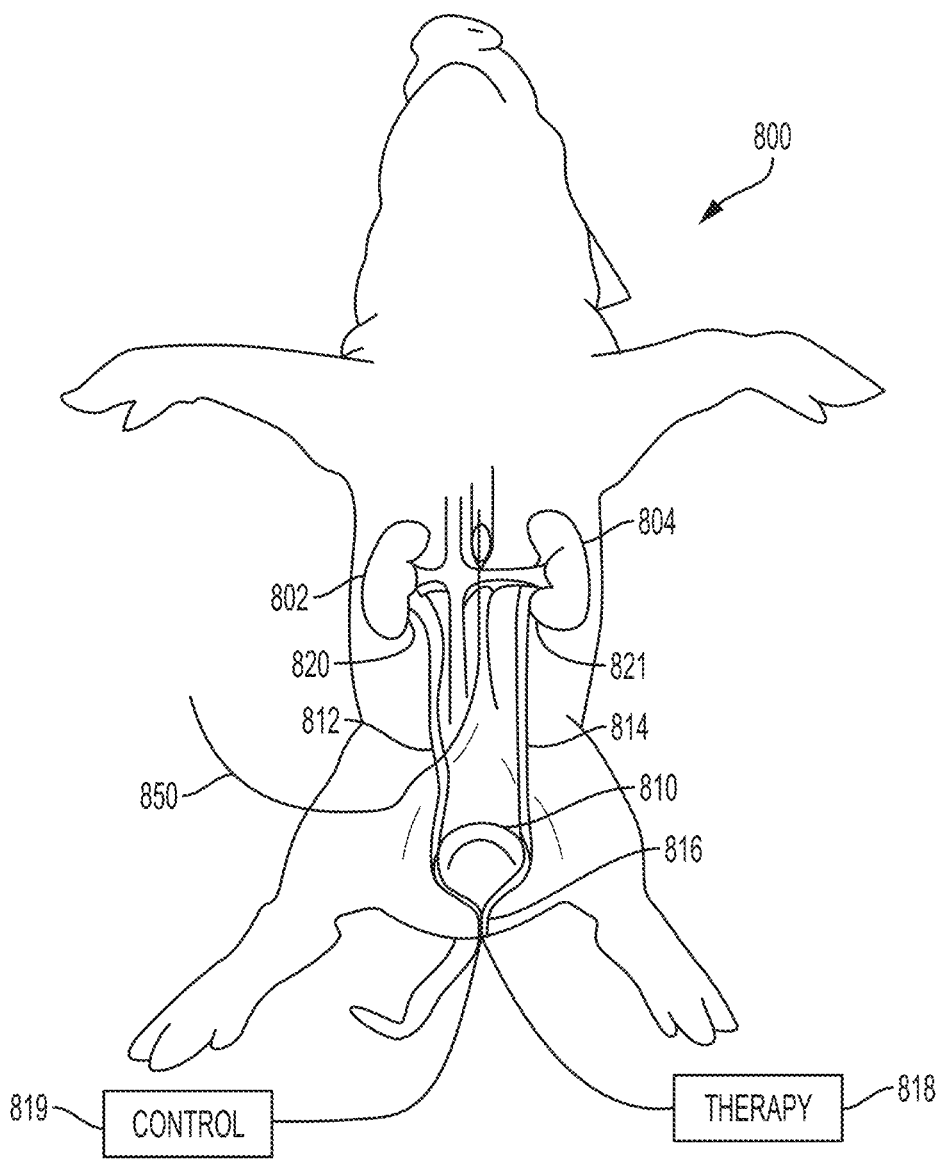
FIG. 60 is a schematic drawing of an experimental set-up for evaluating negative pressure therapy in a swine model according to the present invention.

Four farm swine 800 were used for purposes of evaluating effects of negative pressure therapy on renal congestion in the kidney. As shown in FIG. 60, pediatric Fogarty catheters 812, 814 were inserted to the renal pelvis region 820, 821 of each kidney 802, 804 of the four swine 800. The catheters 812, 814 were deployed within the renal pelvis region by inflating an expandable balloon to a size sufficient to seal the renal pelvis and to maintain the position of the balloon within the renal pelvis. The catheters 812, 814 extend from the renal pelvis 802, 804, through a bladder 810 and urethra 816, and to fluid collection containers external to the swine.

Urine output of two animals was collected for a 15 minute period to establish a baseline for urine output volume and rate. Urine output of the right kidney 802 and the left kidney 804 were measured individually and found to vary considerably. Creatinine clearance values were also determined.

Renal congestion (e.g., congestion or reduced blood flow in the veins of the kidney) was induced in the right kidney 802 and the left kidney 804 of the animal 800 by partially occluding the inferior vena cava (IVC) with an inflatable balloon catheter 850 just above to the renal vein outflow. Pressure sensors were used to measure IVC pressure. Normal IVC pressures were 1-4 mmHg By inflating the balloon of the catheter 850 to approximately three quarters of the IVC diameter, the IVC pressures were elevated to between 15-25 mm Hg. Inflation of the balloon to approximately three quarters of IVC diameter resulted in a 50-85% reduction in urine output. Full occlusion generated IVC pressures above 28 mm Hg and was associated with at least a 95% reduction in urine output.

One kidney of each animal 800 was not treated and served as a control ("the control kidney 802"). The ureteral catheter 812 extending from the control kidney was connected to a fluid collection container 819 for determining fluid levels. One kidney ("the treated kidney 804") of each animal was treated with negative pressure from a negative pressure source (e.g., a therapy pump 818 in combination with a regulator designed to more accurately control the low magnitude of negative pressures) connected to the ureteral catheter 814. The pump 818 was an Air Cadet Vacuum Pump from Cole-Parmer Instrument Company (Model No. EW-07530-85). The pump 818 was connected in series to the regulator. The regulator was an V-800 Series Miniature Precision Vacuum Regulator—⅛ NPT Ports (Model No. V-800-10-W/K), manufactured by Airtrol Components Inc.

The pump 818 was actuated to induce negative pressure within the renal pelvis 820, 821 of the treated kidney according to the following protocol. First, the effect of negative pressure was investigated in the normal state (e.g., without inflating the IVC balloon). Four different pressure levels (−2, −10, −15, and −20 mm Hg) were applied for 15 minutes each and the rate of urine produced and creatinine clearance were determined. Pressure levels were controlled and determined at the regulator. Following the −20 mm Hg therapy, the IVC balloon was inflated to increase the pressure by 15-20 mm Hg. The same four negative pressure levels were applied. Urine output rate and creatinine clearance rate for the congested control kidney 802 and treated kidney 804 were obtained. The animals 800 were subject to congestion by partial occlusion of the IVC for 90 minutes. Treatment was provided for 60 minutes of the 90 minute congestion period.

Following collection of urine output and creatinine clearance data, kidneys from one animal were subjected to gross examination then fixed in a 10% neutral buffered formalin. Following gross examination, histological sections were obtained, examined, and magnified images of the sections were captured. The sections were examined using an upright Olympus BX41 light microscope and images were captured using an Olympus DP25 digital camera. Specifically, photomicrograph images of the sampled tissues were obtained at low magnification (20× original magnification) and high magnification (100× original magnification). The obtained images were subjected to histological evaluation. The purpose of the evaluation was to examine the tissue histologically and to qualitatively characterize congestion and tubular degeneration for the obtained samples.

Surface mapping analysis was also performed on obtained slides of the kidney tissue. Specifically, the samples were stained and analyzed to evaluate differences in size of tubules for treated and untreated kidneys. Image processing techniques calculated a number and/or relative percentage of pixels with different coloration in the stained images. Calculated measurement data was used to determine volumes of different anatomical structures.

Results

Urine Output and Creatinine Clearance

Urine output rates were highly variable. Three sources of variation in urine output rate were observed during the study. The inter-individual and hemodynamic variability were anticipated sources of variability known in the art. A third source of variation in urine output, upon information and belief believed to be previously unknown, was identified in the experiments discussed herein, namely, contralateral intra-individual variability in urine output.

Baseline urine output rates were 0.79 ml/min for one kidney and 1.07 ml/min for the other kidney (e.g., a 26% difference). The urine output rate is a mean rate calculated from urine output rates for each animal.

When congestion was provided by inflating the IVC balloon, the treated kidney urine output dropped from 0.79 ml/min to 0.12 ml/min (15.2% of baseline). In comparison, the control kidney urine output rate during congestion dropped from 1.07 ml/min to 0.09 ml/min (8.4% of baseline). Based on urine output rates, a relative increase in treated kidney urine output compared to control kidney urine output was calculated, according to the following equation:

$$\text{Relative Increase} = \frac{\text{Therapy Treated}/\text{Baseline Treated}}{\text{Therapy Contol}/\text{Baseline Control}}$$

$$\frac{0.12 \text{ mL/min} / 0.79 \text{ mL/min}}{0.09 \text{ mL/min} / 1.07 \text{ mL/min}} = 180.6\% \text{ Relative Increase}$$

Thus, the relative increase in treated kidney urine output rate was 180.6% compared to control. This result shows a greater magnitude of decrease in urine production caused by congestion on the control side when compared to the treatment side. Presenting results as a relative percentage difference in urine output adjusts for differences in urine output between kidneys.

Figure 61:
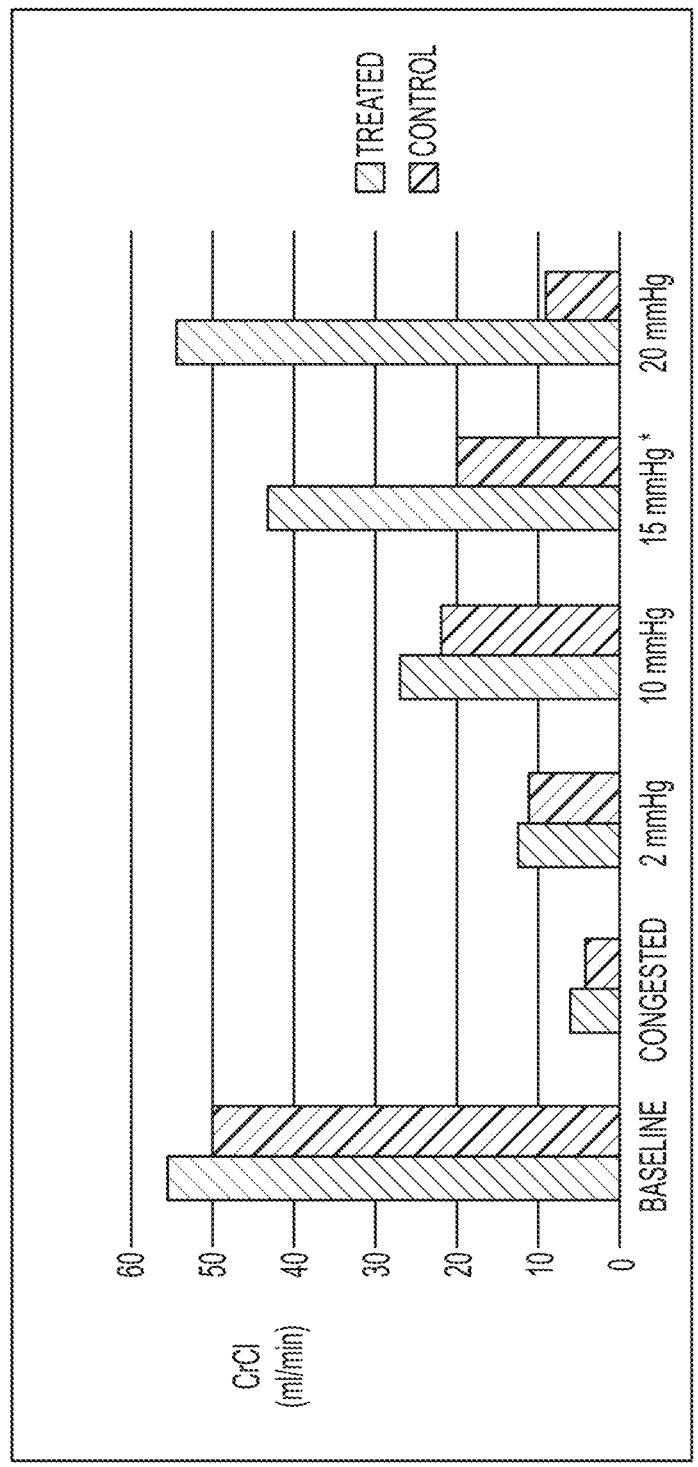
FIG. 61 is a graph of creatinine clearance rates for tests conducted using the experimental set-up shown in FIG. 60.

Creatinine clearance measurements for baseline, congested, and treated portions for one of the animals are shown in FIG. 61.

Gross Examination and Histological Evaluation

Based on gross examination of the control kidney (right kidney) and treated kidney (left kidney), it was determined that the control kidney had a uniformly dark red-brown color, which corresponds with more congestion in the control kidney compared to the treated kidney. Qualitative evaluation of the magnified section images also noted increased congestion in the control kidney compared to the treated kidney. Specifically, as shown in Table 1, the treated kidney exhibited lower levels of congestion and tubular degeneration compared to the control kidney. The following qualitative scale was used for evaluation of the obtained slides.

TABLE 1

| Lesion | Score |
|---|---|
| Congestion | |
| None: | 0 |
| Mild: | 1 |
| Moderate: | 2 |
| Marked: | 3 |
| Severe: | 4 |
| Tubular degeneration | |
| None: | 0 |
| Mild: | 1 |
| Moderate: | 2 |
| Marked: | 3 |
| Severe: | 4 |

TABULATED RESULTS

| Animal ID/Organ/Gross lesion | Slide number | Histologic lesions | | |
|---|---|---|---|---|
| | | Congestion | Tubular byaline casts | Granulomas |
| 6343/Left Kidney/Normal | R16-513-1 | 1 | 1 | 0 |
| 6343/Left Kidney/Normal with hemorrhagic streak | R16-513-2 | 1 | 1 | 0 |

-continued

TABULATED RESULTS

| | | Histologic lesions | | |
|---|---|---|---|---|
| Animal ID/Organ/Gross lesion | Slide number | Congestion | Tubular hyaline casts | Granulomas |
| 6343/Right Kidney/Congestion | R16-513-3 | 2 | 2 | 1 |
| 6343/Right Kidney/Congestion | R16-513-4 | 2 | 1 | 1 |

As shown in Table 1, the treated kidney (left kidney) exhibited only mild congestion and tubular degeneration. In contrast, the control kidney (right kidney) exhibited moderate congestion and tubular degeneration. These results were obtained by analysis of the slides discussed below.

Figure 62A:
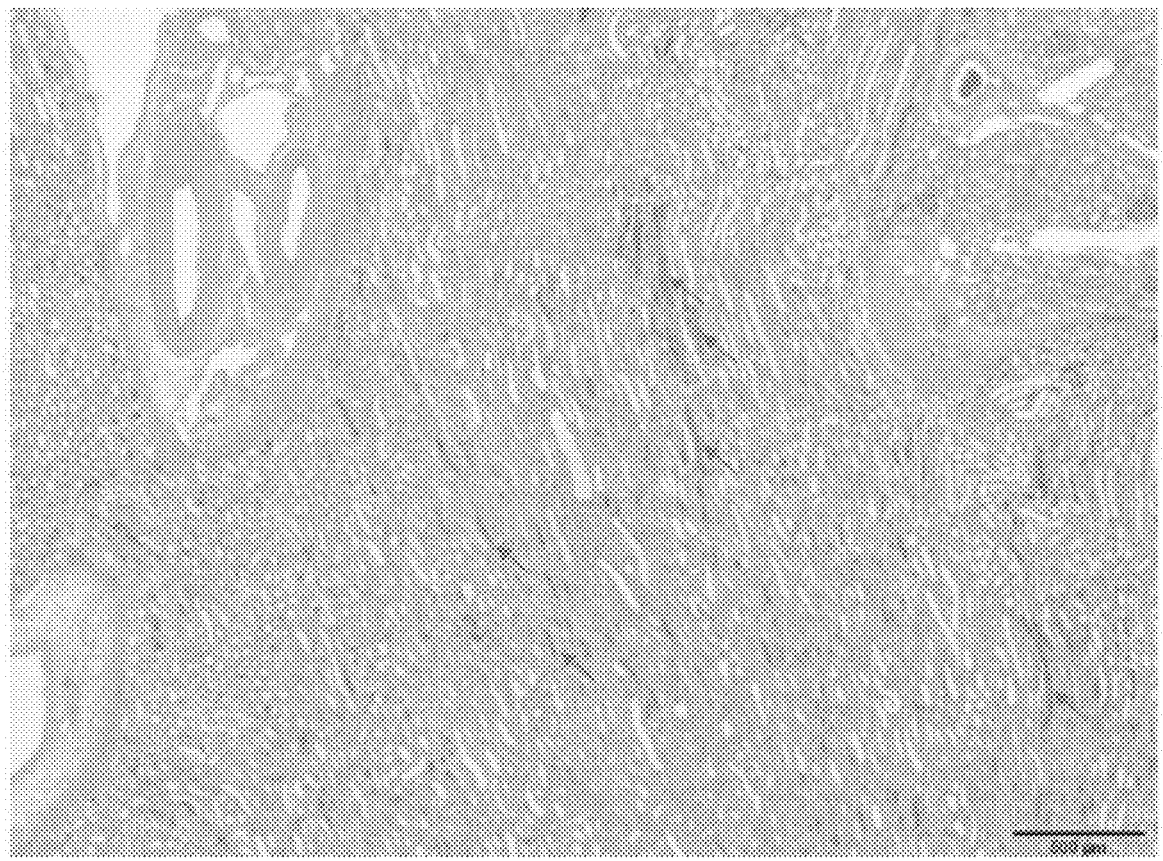
FIG. 62A is a low magnification photomicrograph of kidney tissue from a congested kidney treated with negative pressure therapy.
Figure 62B:
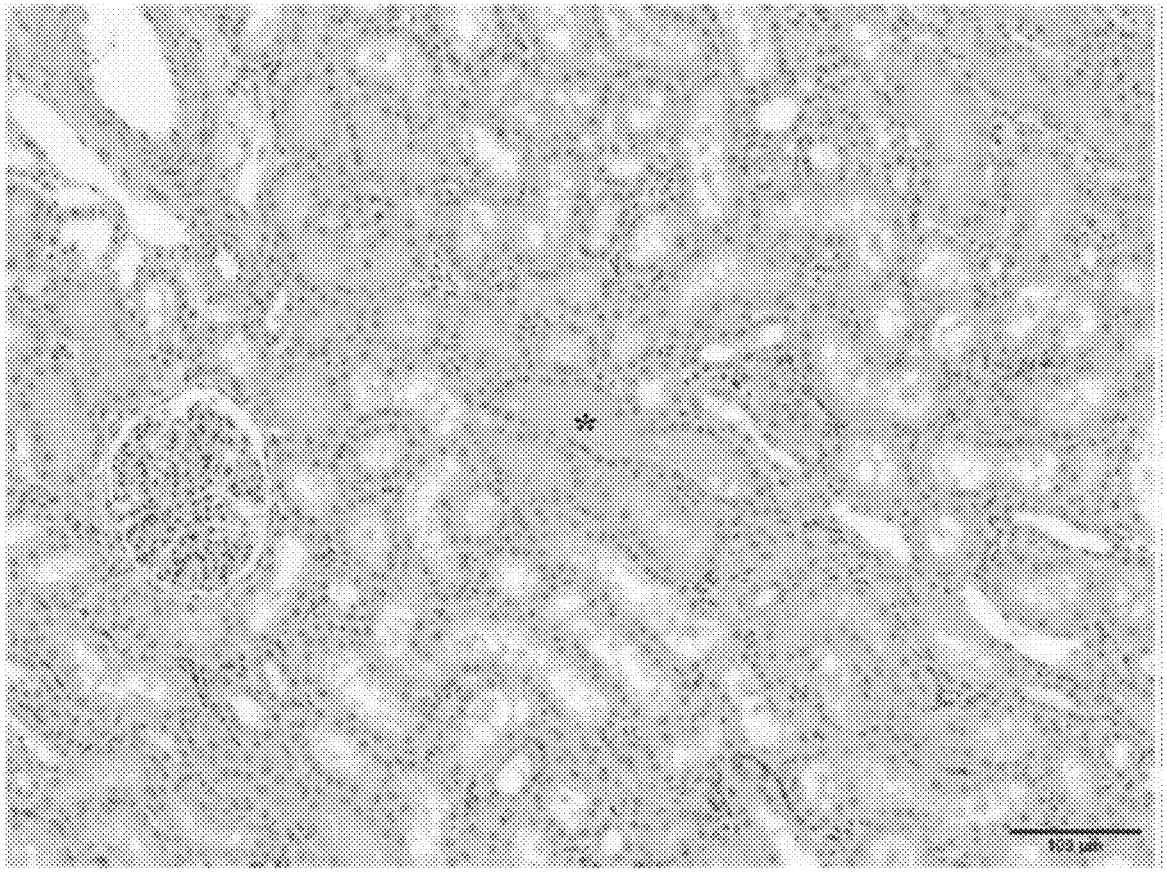
FIG. 62B is a high magnification photomicrograph of the kidney tissue shown in FIG. 62A.

FIGS. 62A and 62B are low and high magnification photomicrographs of the left kidney (treated with negative pressure) of the animal. Based on the histological review, mild congestion in the blood vessels at the corticomedullary junction was identified, as indicated by the arrows. As shown in FIG. 62B, a single tubule with a hyaline cast (as identified by the asterisk) was identified.

Figure 62C:
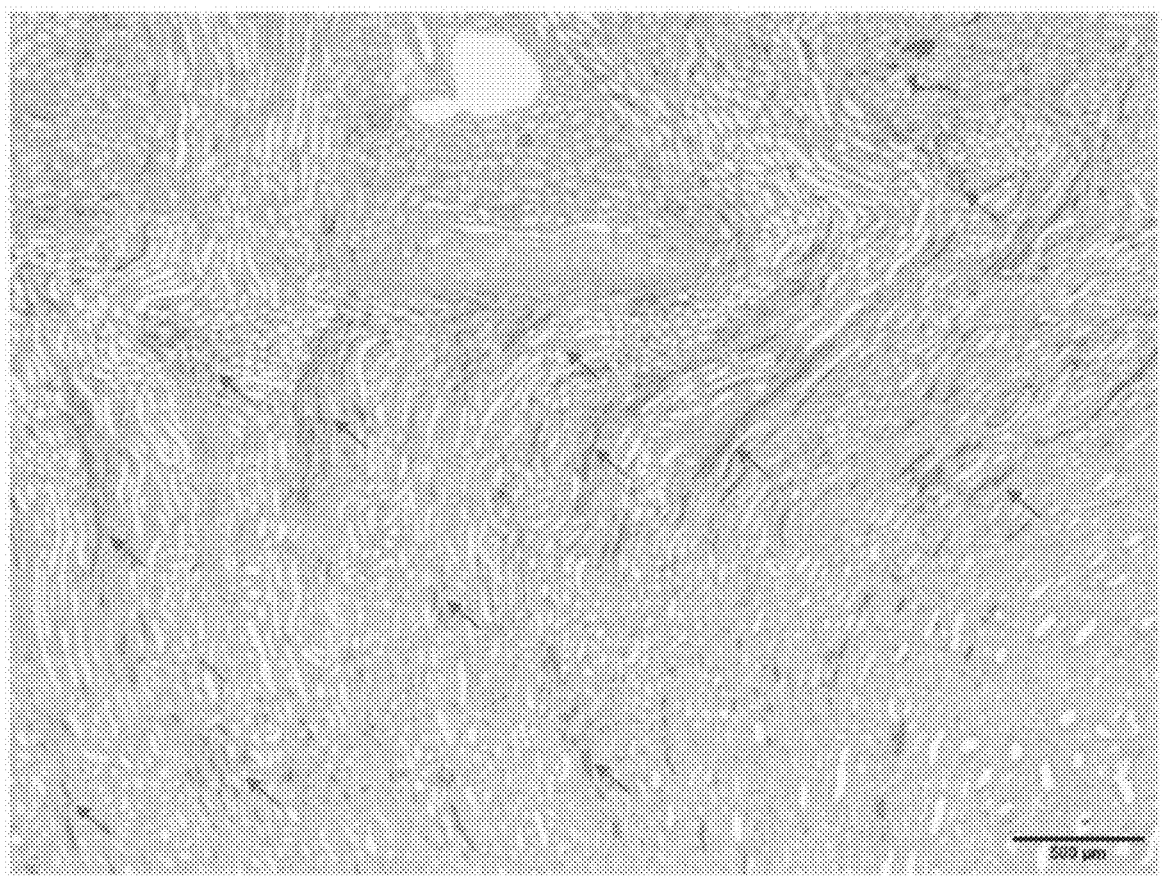
FIG. 62C is a low magnification photomicrograph of kidney tissue from a congested and untreated (e.g., control) kidney.
Figure 62D:
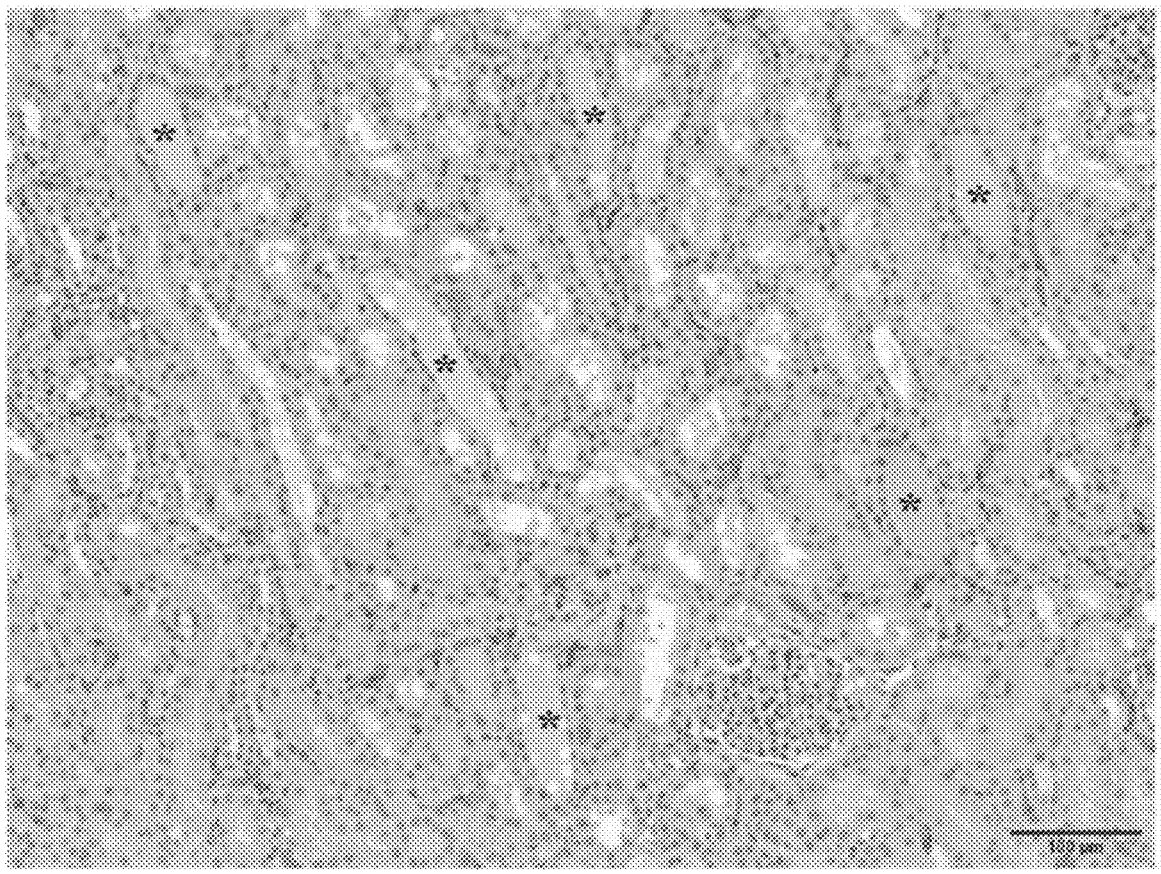
FIG. 62D is a high magnification photomicrograph of the kidney tissue shown in FIG. 62C.
Figure 63A:
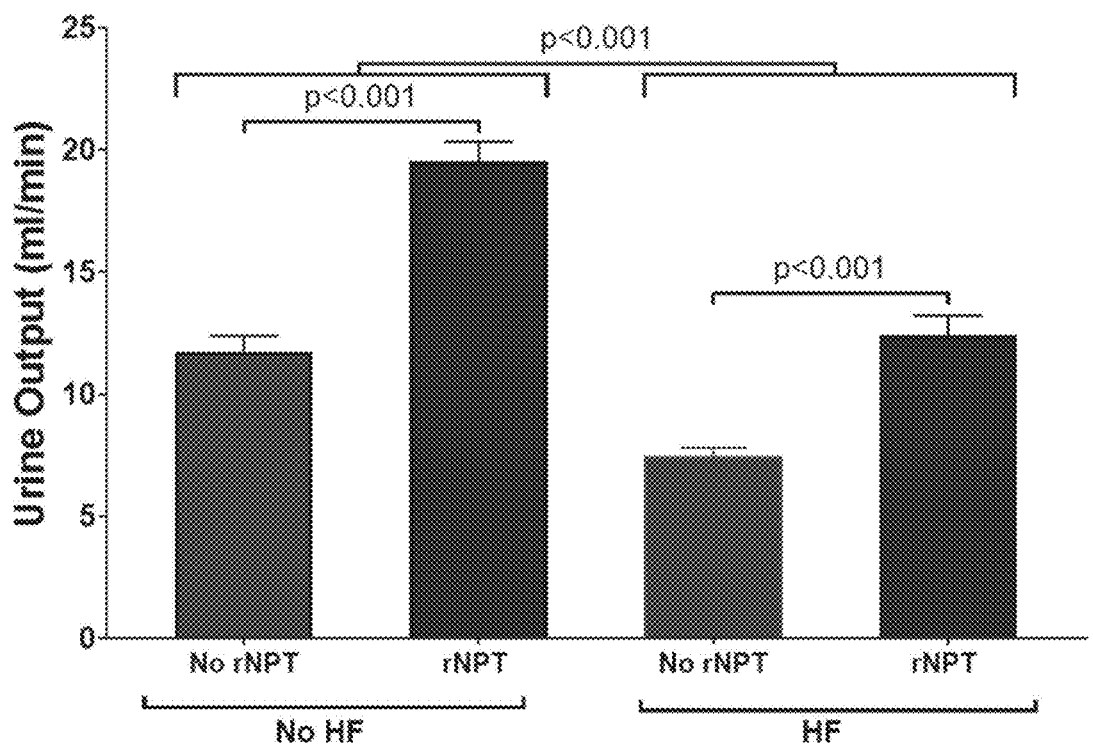
FIGS. 63A-63F are graphs showing measured hemodynamic variables for a 15-minute baseline period without renal negative pressure therapy and a 15-minute period of renal negative pressure therapy in a no heart failure (No-HF) state, as described in Example 3.
Figure 63B:
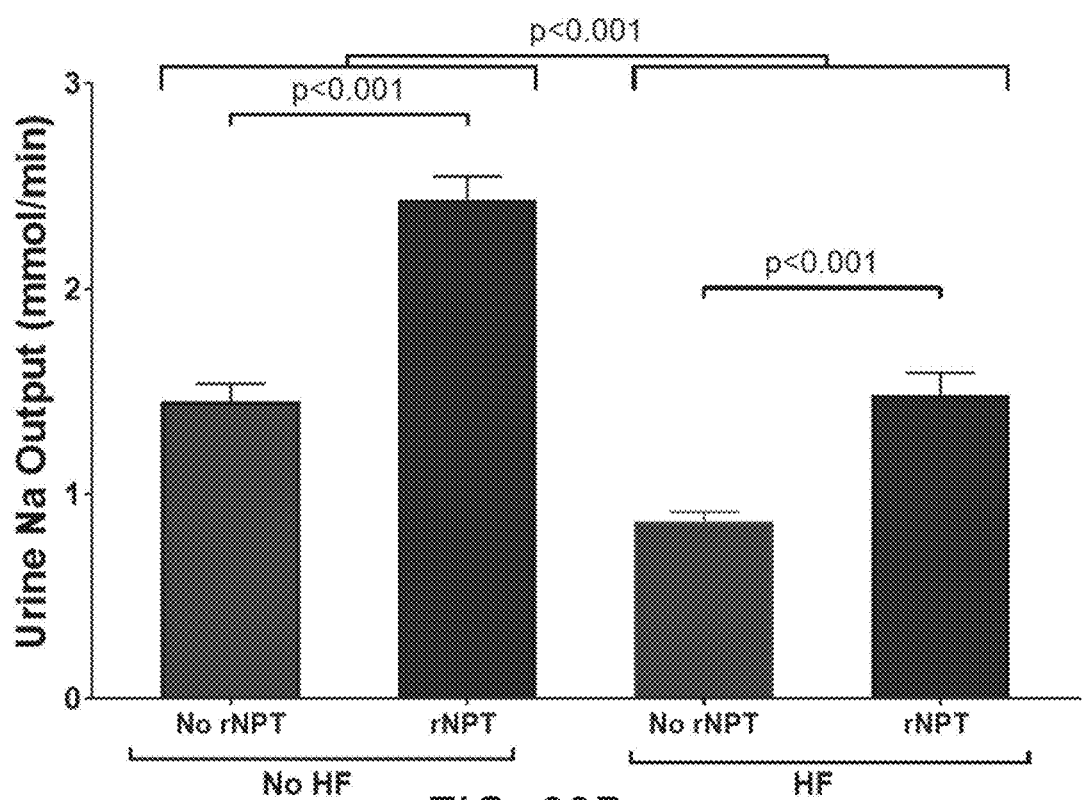
Figure 63C:
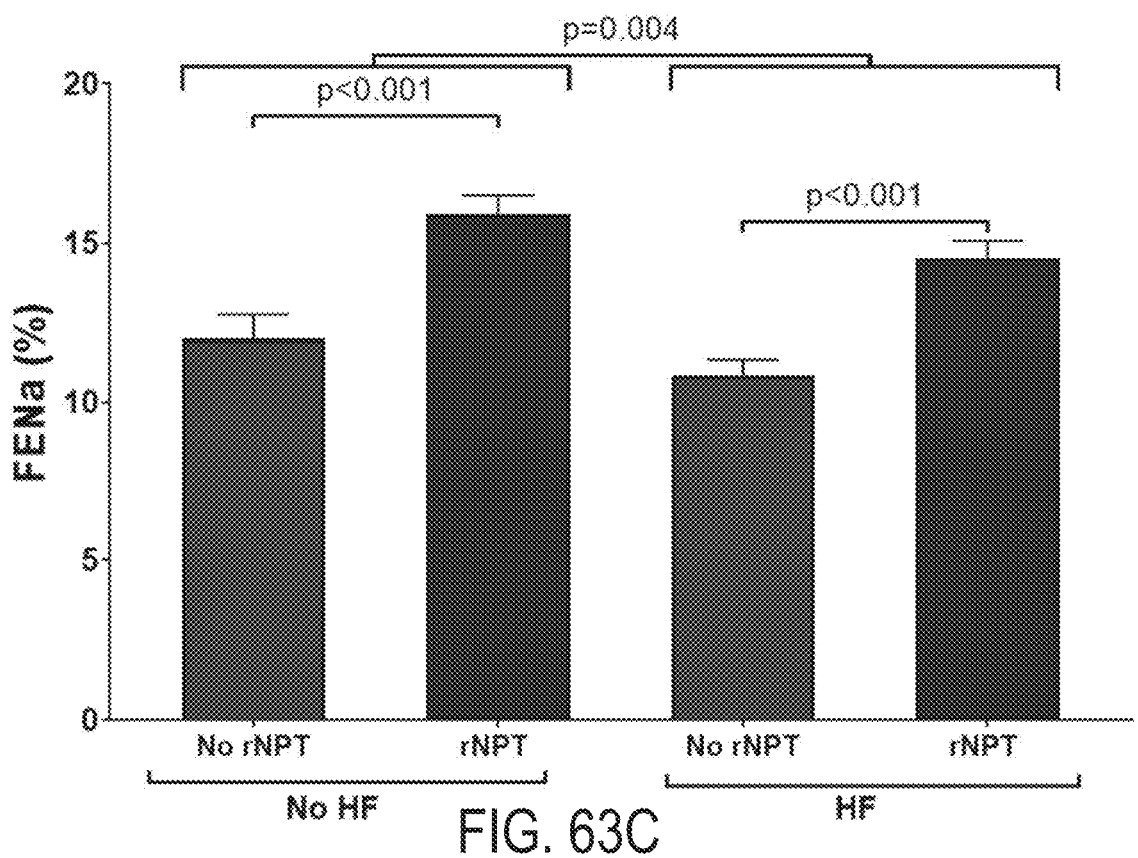
Figure 63D:
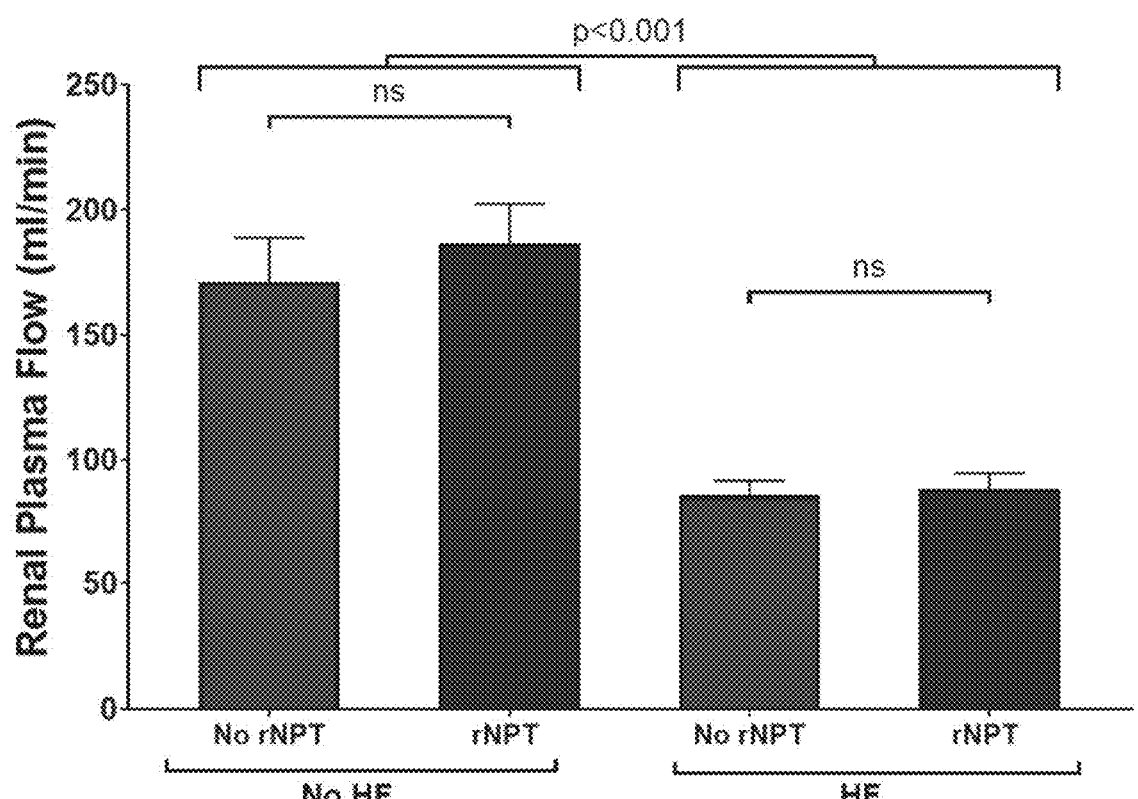
Figure 63E:
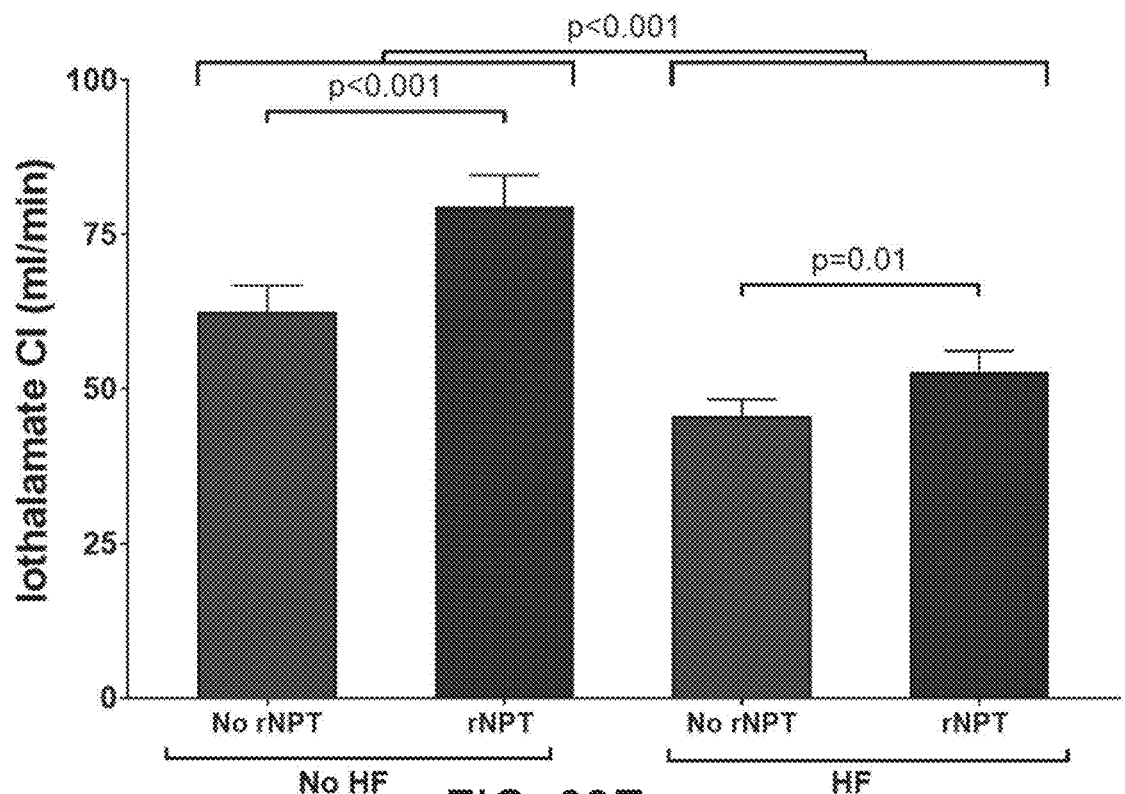
Figure 63F:
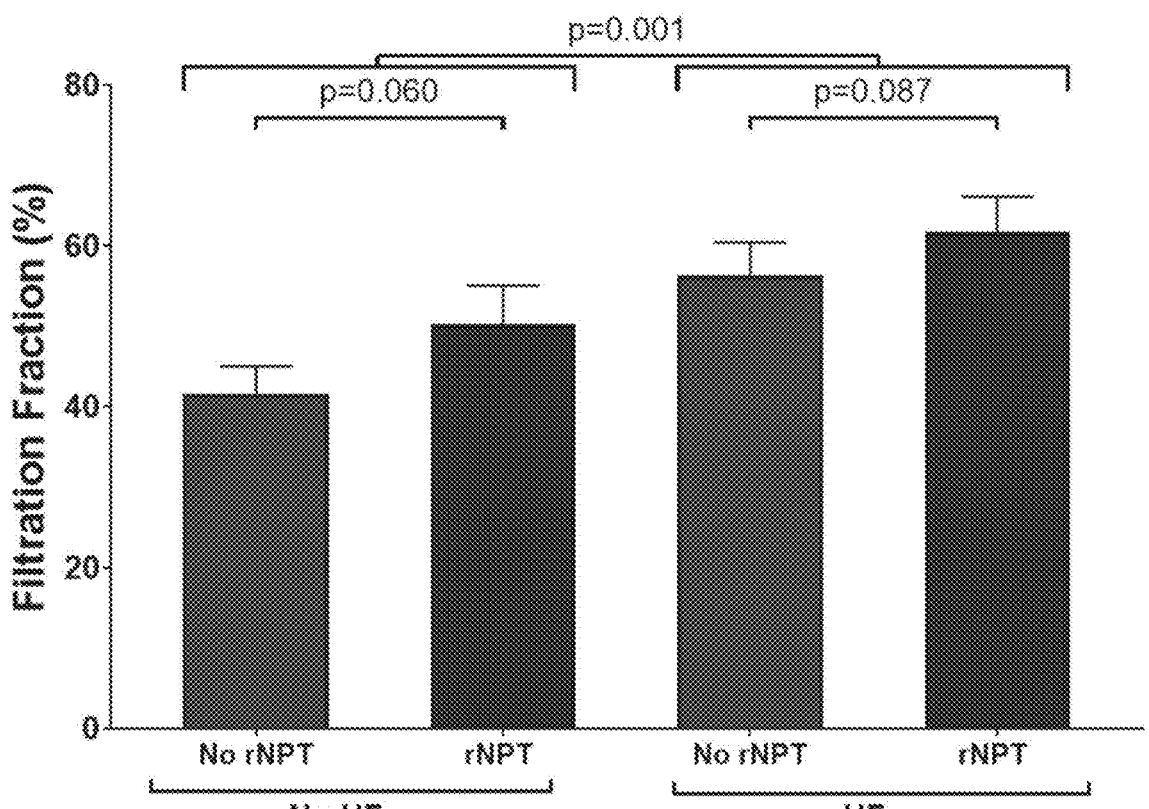

FIGS. 62C and 62D are low and high resolution photomicrographs of the control kidney (right kidney). Based on the histological review, moderate congestion in the blood vessel at the corticomedullary junction was identified, as shown by the arrows in FIG. 62C. As shown in FIG. 62D, several tubules with hyaline casts were present in the tissue sample (as identified by asterisks in the image). Presence of a substantial number of hyaline casts is evidence of hypoxia.

Surface mapping analysis provided the following results. The treated kidney was determined to have 1.5 times greater fluid volume in Bowman's space and 2 times greater fluid volume in tubule lumen. Increased fluid volume in Bowman's space and the tubule lumen corresponds to increased urine output. In addition, the treated kidney was determined to have 5 times less blood volume in capillaries compared to the control kidney. The increased volume in the treated kidney appears to be a result of (1) a decrease in individual capillary size compared to the control and (2) an increase in the number of capillaries without visible red blood cells in the treated kidney compared to the control kidney, an indicator of less congestion in the treated organ.

Summary

These results indicate that the control kidney had more congestion and more tubules with intraluminal hyaline casts, which represent protein-rich intraluminal material, compared to the treated kidney. Accordingly, the treated kidney exhibits a lower degree of loss of renal function. While not intending to be bound by theory, it is believed that as severe congestion develops in the kidney, hypoxemia of the organ follows. Hypoxemia interferes with oxidative phosphorylation within the organ (e.g., ATP production). Loss of ATP and/or a decrease in ATP production inhibits the active transport of proteins causing intraluminal protein content to increase, which manifests as hyaline casts. The number of renal tubules with intraluminal hyaline casts correlates with the degree of loss of renal function. Accordingly, the reduced number of tubules in the treated left kidney is believed to be physiologically significant. While not intending to be bound by theory, it is believed that these results show that damage to the kidney can be prevented or inhibited by applying negative pressure to a ureteral catheter inserted into the renal pelvis to facilitate urine output.

Example 2

Method

Four (4) farm swine (A, B, C, D) were sedated and anesthetized. Vitals for each of the swine were monitored throughout the experiment and cardiac output was measured at the end of each 30-minute phase of the study. Ureteral catheters, such as the ureteral catheter 1212 shown in FIGS. 23A-23F, were deployed in the renal pelvis region of the kidneys of each of the swine. The deployed catheters were a 6 Fr catheter having an outer diameter of 2.0±0.1 mm. The catheters were 54±2 cm in length, not including the distal retention portion. The retention portion was 16±2 mm in length. As shown in the catheter 1212 in FIGS. 23A-23F, the retention portion included two full coils and one proximal half coil. The outer diameter of the full coils, shown by line D23 in FIG. 23A, was 18±2 mm. The half coil diameter D12 was about 14 mm. The retention portion of the deployed ureteral catheters included six drainage openings, plus an additional opening at the distal end of the catheter tube. The diameter of each of the drainage openings was 0.83±0.01 mm. The distance between adjacent drainage openings 1232, specifically the linear distance between drainage openings when the coils were straightened, was 22.5±2.5 mm.

The ureteral catheters were positioned to extend from the renal pelvis of the swine, through the bladder, and urethra, and to fluid collection containers external to each swine. Following placement of the ureteral catheters, pressure sensors for measuring IVC pressure were placed in the IVC at a position distal to the renal veins. An inflatable balloon catheter, specifically a PTS® percutaneous balloon catheter (30 mm diameter by 5 cm length), manufactured by NuMED Inc. of Hopkinton, NY, was expanded in the IVC at a position proximal to the renal veins. A thermodilution catheter, specifically a Swan-Ganz thermodilution pulmonary artery catheter manufactured by Edwards Lifesciences Corp. of Irvine, CA, was then placed in the pulmonary artery for the purpose of measuring cardiac output.

Initially, baseline urine output was measured for 30 minutes, and blood and urine samples were collected for biochemical analysis. Following the 30-minute baseline period, the balloon catheter was inflated to increase IVC pressure from a baseline pressure of 1-4 mm Hg to an elevated congested pressure of about 20 mm Hg (+/−5 mm Hg). A congestion baseline was then collected for 30 minutes with corresponding blood and urine analysis.

At the end of the congestion period, the elevated congested IVC pressure was maintained and negative pressure diuresis treatment was provided for swine A and swine C. Specifically, the swine (A, C) were treated by applying a negative pressure of −25 mm Hg through the ureteral catheters with a pump. As in previously-discussed examples, the pump was an Air Cadet Vacuum Pump from Cole-Parmer Instrument Company (Model No. EW-07530-85). The pump was connected in series to a regulator. The regulator was a V-800 Series Miniature Precision Vacuum Regulator—1/8 NPT Ports (Model No. V-800-10-W/K), manufactured by Airtrol Components Inc. The swine were observed for 120 minutes, as treatment was provided. Blood and urine collection were performed every 30 minutes, during the treatment period. Two of the swine (B, D) were treated as congested controls (e.g., negative pressure was not applied to the renal pelvis through the ureteral catheters), meaning that the two swine (B, D) did not receive negative pressure diuresis therapy.

Following collection of urine output and creatinine clearance data for the 120-minute treatment period, the animals were sacrificed and kidneys from each animal were subjected to gross examination. Following gross examination, histological sections were obtained and examined, and magnified images of the sections were captured.

Results

Measurements collected during the Baseline, Congestion, and Treatment periods are provided in Table 2. Specifically, urine output, serum creatinine, and urinary creatinine measurements were obtained for each time period. These values allow for the calculation of a measured creatinine clearance as follows:

Creatinine Clearance: $CrCl = \text{Urine Output (ml/min)} * \dfrac{\text{Urinary Creatinine (mg/dl)}}{\text{Serum Creatinine (mg/dl)}}$ In addition, Neutrophil gelatinase-associated lipocalin (NGAL) values were measured from serum samples obtained for each time period and Kidney Injury Molecule 1 (KIM-1) values were measured from the urine samples obtained for each time period. Qualitative histological findings determined from review of the obtained histological sections are also included in Table 2.

TABLE 2

| | Animal | | | |
|---|---|---|---|---|
| Treatment assignment | A Treatment | B Control | C Treatment | D Control |
| Baseline: | | | | |
| Urine output (ml/min) | 3.01 | 2.63 | 0.47 | 0.98 |
| Serum creatinine (mg/dl) | 0.8 | 0.9 | 3.2 | 1.0 |
| Creatinine clearance (ml/min) | 261 | 172 | 5.4 | 46.8 |
| Serum NGAL (ng/ml) | 169 | * | 963 | 99 |
| Urinary KIM-1 (ng/ml) | 4.11 | * | 3.59 | 1.16 |
| Congestion: | | | | |
| Urine output (ml/min) | 0.06 (2%) | 0.53 (20%) | 0.12 (25%) | 0.24 (25%) |
| Serum creatinine (mg/dl) | 1.2 (150%) | 1.1 (122%) | 3.1 (97%) | 1.2 (120%) |
| Creatinine clearance (ml/min) | 1.0 (0.4%) | 30.8 (18%) | 1.6 (21%) | 16.2 (35%) |
| Serum NGAL (ng/ml) | 102 (60%) | * | 809 (84%) | 126 (127%) |
| Urinary KIM-1 (ng/ml) | 24.3 (591%) | * | 2.2 (61%) | 1.39 (120%) |
| Treatment: | | | | |
| Urine output (ml/min) | 0.54 (17%) | ** | 0.47 (101%) | 0.35 (36%) |
| Serum creatinine (mg/dl) | 1.3 (163%) | | 3.1 (97%) | 1.7 (170%) |
| Creatinine clearance (ml/min) | 30.6 (12%) | | 18.3 (341%) | 13.6 (29%) |
| Serum NGAL (ng/ml) | 197 (117%) | | 1104 (115%) | 208 (209%) |
| Urinary KIM-1 (ng/ml) | 260 (6326%) | | 28.7 (799%) | 233 (20000%) |
| Histological findings: | | | | |
| Blood volume in capillary space | 2.4% | ** | 0.9% | 4.0% |
| Hyaline casts | Mild/Mod | | None | Mod |
| Degranulation | Mild/Mod | | None | Mod |

Data are raw values (% baseline)
* not measured
** confounded by phenylephrine

Animal A: The animal weighed 50.6 kg and had a baseline urine output rate of 3.01 ml/min, a baseline serum creatinine of 0.8 mg/dl, and a measured CrCl of 261 ml/min. It is noted that these measurements, aside from serum creatinine, were uncharacteristically high relative to other animals studied. Congestion was associated with a 98% reduction in urine output rate (0.06 ml/min) and a >99% reduction in CrCl (1.0 ml/min). Treatment with negative pressure applied through the ureteral catheters was associated with urine output and CrCl of 17% and 12%, respectively, of baseline values, and 9× and >10×, respectively, of congestion values. Levels of NGAL changed throughout the experiment, ranging from 68% of baseline during congestion to 258% of baseline after 90 minutes of therapy. The final value was 130% of baseline. Levels of KIM-1 were 6 times and 4 times of baseline for the first two 30-minute windows after baseline assessment, before increasing to 68×, 52×, and 63× of baseline values, respectively, for the last three collection periods. The 2-hour serum creatinine was 1.3 mg/dl. Histological examination revealed an overall congestion level, measured by blood volume in capillary space, of 2.4%. Histological examination also noted several tubules with intraluminal hyaline casts and some degree of tubular epithelial degeneration, a finding consistent with cellular damage.

Animal B: The animal weighed 50.2 kg and had a baseline urine output rate of 2.62 ml/min and a measured CrCl of 172 ml/min (also higher than anticipated). Congestion was associated with an 80% reduction in urine output rate (0.5 ml/min) and an 83% reduction in CrCl (30 ml/min). At 50 minutes into the congestion (20 minutes after the congestion baseline period), the animal experienced an abrupt drop in mean arterial pressure and respiration rate, followed by tachycardia. The anesthesiologist administered a dose of phenylephrine (75 mg) to avert cardiogenic shock. Phenylephrine is indicated for intravenous administration when blood pressure drops below safe levels during anesthesia. However, since the experiment was testing the impact of congestion on renal physiology, administration of phenylephrine confounded the remainder of the experiment.

Animal C: The animal weighed 39.8 kg and had a baseline urine output rate of 0.47 ml/min, a baseline serum creatinine of 3.2 mg/dl, and a measured CrCl of 5.4 ml/min Congestion was associated with a 75% reduction in urine output (0.12 ml/min) and a 79% reduction in CrCl (1.6 ml/min). It was determined that baseline NGAL levels were >5× the upper limit of normal (ULN). Treatment with negative pressure applied to the renal pelvis through the ureteral catheters was associated with a normalization of urine output (101% of baseline) and a 341% improvement in CrCl (18.2 ml/min). Levels of NGAL changed throughout the experiment, ranging from 84% of baseline during congestion to 47% to 84% of baseline between 30 and 90 minutes. The final value was 115% of baseline. Levels of KIM-1 decreased 40% from baseline within the first 30 minutes of congestion, before increasing to 8.7×, 6.7×, 6.6×, and 8× of baseline values, respectively, for the remaining 30-minute windows. Serum creatinine level at 2 hours was 3.1 mg/dl. Histological examination revealed an overall congestion level, measured by blood volume in capillary space, of 0.9%. The tubules were noted to be histologically normal.

Animal D: The animal weighed 38.2 kg and had a baseline urine output of 0.98 ml/min, a baseline serum creatinine of 1.0 mg/dl, and a measured CrCl of 46.8 ml/min Congestion was associated with a 75% reduction in urine output rate (0.24 ml/min) and a 65% reduction in Cr Cl (16.2 ml/min). Continued congestion was associated with a 66% to 91% reduction of urine output and 89% to 71% reduction in CrCl. Levels of NGAL changed throughout the experiment, ranging from 127% of baseline during congestion to a final value of 209% of baseline. Levels of KIM-1 remained between 1× and 2× of baseline for the first two 30-minute windows after baseline assessment, before increasing to 190×, 219×, and 201× of baseline values for the last three 30-minute periods. The 2-hour serum creatinine level was 1.7 mg/dl. Histological examination revealed an overall congestion level 2.44× greater than that observed in tissue samples for the treated animals (A, C) with an average capillary size 2.33 times greater than that observed in either of the treated animals. The histological evaluation also noted several tubules with intraluminal hyaline casts as well as tubular epithelial degeneration, indicating substantial cellular damage.

Summary

While not intending to be bound by theory, it is believed that the collected data supports the hypothesis that venous congestion creates a physiologically significant impact on renal function. In particular, it was observed that elevation of the renal vein pressure reduced urine output by 75% to 98% within seconds. The association between elevations in biomarkers of tubular injury and histological damage is consistent with the degree of venous congestion generated, both in terms of magnitude and duration of the injury.

The data also appears to support the hypothesis that venous congestion decreases the filtration gradients in the medullary nephrons by altering the interstitial pressures. The change appears to directly contribute to the hypoxia and cellular injury within medullary nephrons. While this model does not mimic the clinical condition of AKI, it does provide insight into the mechanical sustaining injury.

The data also appears to support the hypothesis that applying negative pressure to the renal pelvis through ureteral catheters can increase urine output in a venous congestion model. In particular, negative pressure treatment was associated with increases in urine output and creatinine clearance that would be clinically significant. Physiologically meaningful decreases in medullary capillary volume and smaller elevations in biomarkers of tubular injury were also observed. Thus, it appears that by increasing urine output rate and decreasing interstitial pressures in medullary nephrons, negative pressure therapy may directly decrease congestion. While not intending to be bound by theory, by decreasing congestion, it may be concluded that negative pressure therapy reduces hypoxia and its downstream effects within the kidney in a venous congestion mediated AKI.

The experimental results appear to support the hypothesis that the degree of congestion, both in terms of the magnitude of pressure and duration, is associated with the degree of cellular injury observed. Specifically, an association between the degree of urine output reduction and the histological damage was observed. For example, treated Swine A, which had a 98% reduction in urine output, experienced more damage than treated Swine C, which had a 75% reduction in urine output. As would be expected, control Swine D, which was subjected to a 75% reduction in urine output without benefit of therapy for two and a half hours, exhibited the most histological damage. These findings are broadly consistent with human data demonstrating an increased risk for AKI onset with greater venous congestion. See e.g., Legrand, M. et al., *Association between systemic hemodynamics and septic acute kidney injury in critically ill patients: a retrospective observational study. Critical Care* 17:R278-86, 2013.

Example 3: Renal Negative Pressure Treatment with Furosemide

Example 3 evaluates use of Negative Pressure Treatment (rNPT) for improvement of diuresis, natriuresis, and renal function in a congestion heart failure (HF) model.

Method

Ten Yorkshire farm pigs that were from 18-20 weeks of age (~80 kg) were used to investigate effects of renal Negative Pressure Treatment (rNPT) using the JuxtaFlow® catheter and pump system. As previously discussed, the JuxtaFlow® catheter is a memory polymer catheter which deploys into a 3-dimensional helix when placed in the renal pelvis allowing application of negative pressure to the kidney without causing tissue collapse or obstruction. The JuxtaFlow® catheter is similar or identical to the ureteral catheter 1212 described previously and shown, for example, in FIGS. 23A-23F. The JuxtaFlow® pump is a tightly controlled, self-regulating negative pressure pump system designed for use with the JuxtaFlow® catheter and rNPT. The JuxtaFlow® pump includes features of the external pumps shown in FIGS. 57B and 57D.

In order to deploy the JuxtaFlow® catheters, after an overnight fast, pigs were anesthetized with a combination of intramuscular ketamine and tiletamine/zolazepam (Telazol), intubated, and maintained on inhaled isoflurane. An intrapericardial catheter was placed via a left lateral thoracotomy. A Swan-Ganz catheter was placed via a right internal jugular vein cutdown. An arterial line for continuous hemodynamic monitoring was placed in the carotid or femoral artery by either Seldinger technique or arterial cutdown. Large bore central venous access was similarly placed in either the contralateral jugular or a femoral vein for fluid and tracer infusions. To catheterize the ureters, the bladder was retracted caudally through a small suprapubic incision and each ureter was isolated and directly cannulated through a small incision. The JuxtaFlow® catheters were then advanced into the renal pelvis under fluoroscopic guidance. Each kidney was drained through the JuxtaFlow® catheters either passively or under negative pressure provided by the JuxtaFlow® pump for applying rNPT.

Given that the human heart failure use-case for the JuxtaFlow® catheter and system may be in conjunction with intravenous loop diuretic use, two experimental phases were conducted to investigate the effect of rNPT: 1) during maximal furosemide diuresis without heart failure (HF); and 2) in a state of HF characterized by venous congestion and concurrent furosemide diuresis. During the two phases, each animal served as its own control with randomization of either the left or right kidney to rNPT versus No-rNPT. The experiment was started with an equilibration period where intravenous (IV) boluses and continuous infusion of the following agents were initiated and maintained for a period of 2.5 hours: iothalamate ("IOT", 120 mg bolus with 0.3 mg/min infusion, Guerbet, USA); para-aminohippurate ("PAH", 800 mg bolus with 8.4 mg/min infusion, MilliporeSigma, USAsupplier); and furosemide (400 mg bolus with infusion at 80 mg/hr). To avoid volume depletion, a 4 Liter IV infusion of normal saline followed by a maintenance IV infusion titrated to match urine output 1:1 (mL) occurred during this equilibrium period.

Experimental Periods

After equilibration of tracers, the right and left kidneys were randomized (−30 mmHg rNPT was applied to one kidney, while the other kidney drained by passive drainage) and the rNPT therapy was started. In order to ensure that the pre-tamponade and tamponade experimental periods had similar background fluid status, a rapid, large-volume, normal saline infusion of 20% to 25% body weight occurred at this point. After 10 minutes of equilibration, the animals underwent two 15 minute "post fluid" clearance periods. Next, cardiac tamponade was induced by pericardial instillation of approximately 200 mL of 6% hydroxyethyl starch. Pericardial hydroxyethyl starch and additional IV normal saline infusion were titrated to maintain a hemodynamic profile sufficient for relative preservation of cardiac output and mean arterial pressure (compared to the baseline pre-fluid readings), while maintaining a central venous pressure of less than 20 mmHg After stabilization and a 10 minute equilibration, two 15 minute study periods were repeated.

Assays and Calculations

A Randox Imola automated clinical chemistry analyzer was used to measure concentration of urine or serum chemistry parameters. The calibrators, reagents, and urine Level 2 and Level 3 controls were purchased from Randox Laboratories. All assay measurements were carried out in accordance with the manufacturer's instructions (Randox Laboratories, UK). Creatinine measurements were standardized to Isotope Dilution Mass Spectrometry (IDMS) traceable National Institute of Standards and Technology reference material (SRM 967). Urine and plasma iothalamate were measured using Agilent 6490 QTOF equipped with Agilent 1290 UHPLC.

A stock solution of iothalamate was serially diluted in 0.1% formic acid containing deuterated iothalamate to create the calibration curve (1-2000 ng/ml). Plasma samples (100 µL) were deproteinized by adding 300 µL of 100% methanol containing deuterated iothalamate (1000 ng/ml) (Cambridge Isotope Laboratories, Inc), vortexed, and centrifuged at 12,000 rpm for 10 minutes. 200 µL of the supernatant was then transferred to glass sampler vials, and 10 µL of the sample was injected to the UHPLC-MS/MS system. The urine samples were diluted 10-fold with 0.1% formic acid containing the internal standard. 10 µL of the diluted urine sample was injected into the UHPLC-MS/MS system. Separation was achieved using Agilent Zorbax Eclipse plus RP 2.1×50 mm 1.8 µm column with a constant flow rate of 400 µL/min. An instrument-controlled gradient of 0.1% formic acid and 100% methanol were used as Buffer A and Buffer B, respectively. Quantitation was carried out using the Agilent MassHunter Quantitative analysis software. Urine and plasma PAH were measured using the PAH colorimetric assay kit from Abcam, according to manufacturer's recommendation. Urine neutrophil gelatinase-associated lipocalin (NGAL) was measured with porcine NGAL kit from Alpco (Alpco, Salem, NH). Urine cGMP concentrations were assayed using a commercially available competitive enzyme-linked immunosorbent assay kit according the manufacturer's guidelines (Parameter cGMP Assay, R&D Systems Inc, Minneapolis, MN USA).

Measured creatinine clearance was calculated as Urine creatinine×Volume of urine per minute/Plasma creatinine. Measured GFR was calculated as Urine iothalamate×Volume of urine per minute/Plasma iothalamate. Renal plasma flow was calculated as Urine PAH×Volume of urine per minute/Plasma PAH. Filtration fraction was calculated as GFR/(renal plasma flow/0.9). Fractional excretion of sodium (FENa) was calculated as was calculated as $(Na_{urine}/Na_{serum})\times(Cr_{serum}/Cr_{urine})\times100\%$.

Statistical Analysis

Continuous data is shown as mean±standard deviation or median (quartile 1-quartile 3) according to observed distribution. Categorical data is shown as frequency (percentage). Variables with skewed distribution were log transformed to approximate normal distribution. Changes in continuous variables from baseline to post-fluid (No HF) or to HF model of venous congestion were compared with the paired t test. Changes in continuous variables during the experiments were analyzed via linear mixed models accounting for correlations within animals. rNPT and HF models of venous congestion were included as main factors (binary variables) in a full factorial model. Statistical significance was defined as 2-tailed $P<0.05$. Statistical analysis was performed with IBM SPSS Statistics version 26 (IBM Corp, Armonk, NY) and Stata SE version 16.0 (StataCorp, College Station, TX).

Results for Example 3 are shown in FIGS. 63A-64D. FIGS. 63A-63F are graphs illustrating results for urine output (FIG. 63A), cumulative urine sodium excretion (FIG. 63B), fractional excretion of sodium (FIG. 63C), renal plasma flow (FIG. 63D), glomerular filtration rate measured by iothalamate (IOH) (FIG. 63E), and filtration fraction (FIG. 63F). The graphs are presented as mean±standard error of the mean. Each graph compares a 15-minute baseline period without renal negative pressure therapy to a 15-minute period of renal negative pressure therapy in a non-HF state and in a HF model.

Figure 64A:
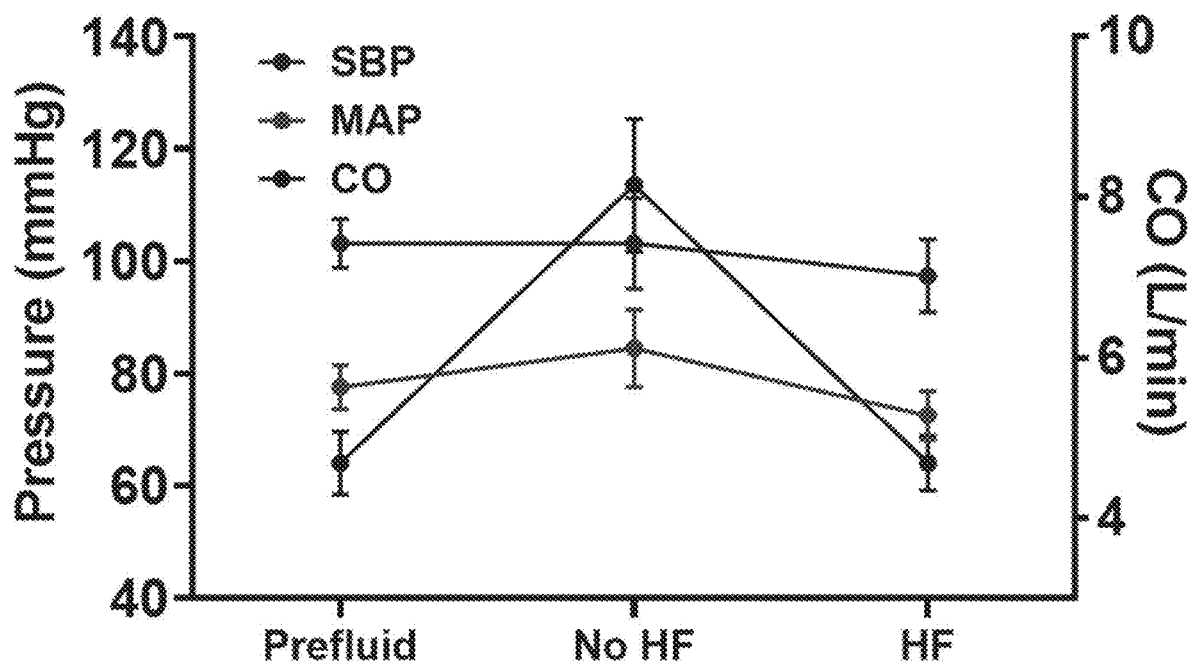
FIGS. 64A-64D are graphs showing measured hemodynamic variables measured in Example 3 for a pre-fluid state, a No-HF state, and an HF state.
Figure 64B:
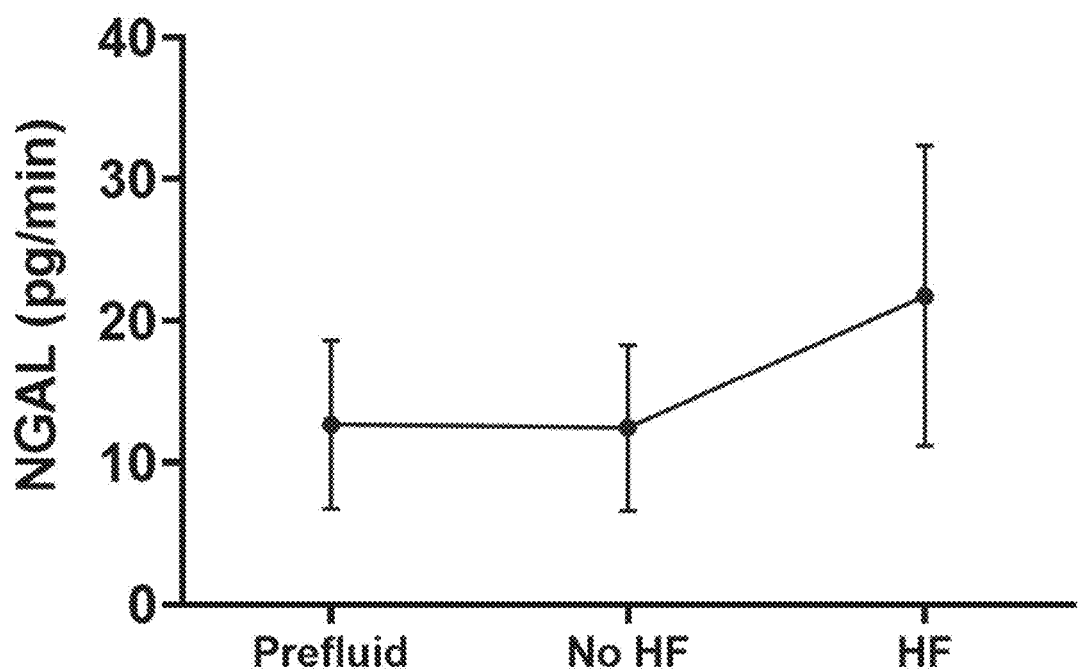
Figure 64C:
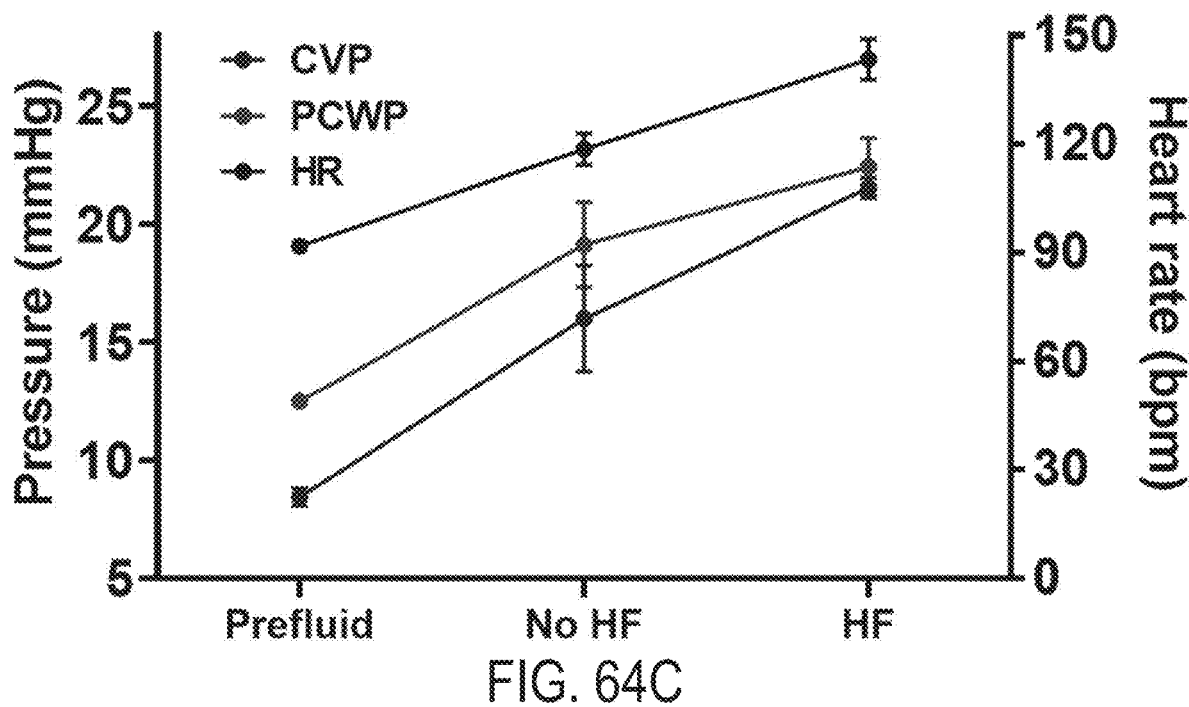
Figure 64D:
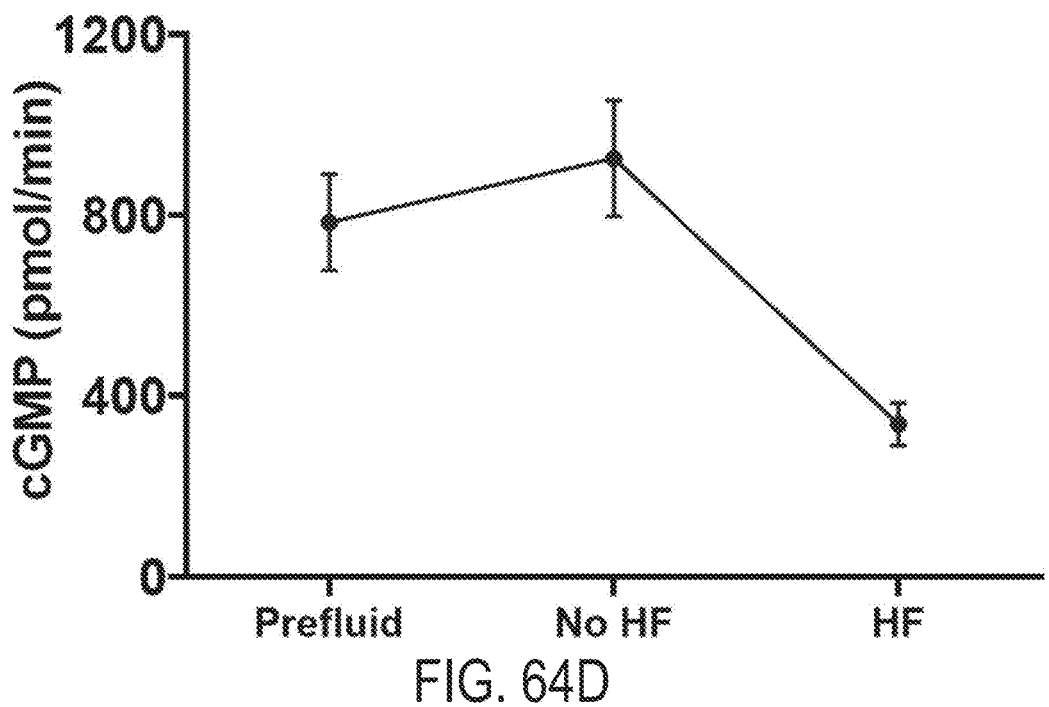

FIGS. 64A-64D are line graphs for hemodynamic variables collected during the experiments of Example 3. The hemodynamic variables are presented as mean±standard error of the mean across the three study periods: 1) before intravenous (IV) fluid administration (Prefluid), 2) after IV fluid administration with no heart failure (No HF), and 3) after induction of a HF model from cardiac tamponade. As shown in FIG. 64A, SBP and MAP (FIG. 64A) were not statistically different among the three periods (p>0.12 for each comparison), while CO increased from the prefluid to the No-HF period (p<0.01). CO was not statistically different in the HF model compared to the Prefluid period (p=0.90).

CVP, PCWP, and HR (FIG. 64C) increased significantly from the Prefluid to the No-HF period, and from the No-HF period to the HF model (p<0.05 for all comparisons). Neutrophil Gelatinase-Associated Lipocalin (NGAL) (FIG. 64B) did not change from the Prefluid to the No-HF period, but tended to increase from the No-HF to the HF period (p=0.053). Cyclic GMP (cGMP) (FIG. 66D) did not change from the Prefluid to the No-HF period, but decreased significantly from the No-HF to the HF period (p<0.001).

As illustrated by these figures, during furosemide diuresis, rNPT substantially increased natriuresis (2.4±0.6 mmol/min vs 1.5±0.5 mmol/min; p<0.001) and diuresis (19.7±4.5 ml/min vs 11.8±3.7 ml/min; p<0.001) compared to control. See FIGS. 63A and 63B. rNPT also increased iothalamate clearance (79±28 ml/min vs 62±23 ml/min; p<0.001) and creatinine clearance (105±38 vs. 85±30, p=0.001). See FIG. 63E. Renal plasma flow (p=0.13) did not differ significantly between rNPT and control. See FIG. 63D. The increased natriuresis with rNPT was not solely driven by increased sodium filtration, because the fractional excretion of sodium (FENa) was also higher with rNPT (15.9%±3.3% vs 12.0%±4.2%, p<0.001). See FIG. 63C.

The figures also show that induction of cardiac tamponade was successful in producing a "warm and wet" HF phenotype with preserved cardiac output and blood pressure, but with severely elevated right sided filling pressures. See FIGS. 64A and 64C. A cardio-renal phenotype also emerged as urine output (37%), renal sodium excretion (40%), measured GFR (27%), and renal plasma flow (50%) all decreased substantially with induction of HF (p<0.001). Furthermore, urine cyclic GMP decreased substantially (p<0.001) and NGAL tended to increase with induction of HF (p=0.053). Filtration fraction increased during induction of HF (42±18% vs 56±21%, p=0.001).

The effect of rNPT on GFR was similar between HF and No-HF periods (i.e., similar increments in GFR with rNPT; p interaction=0.23 for a different effect of rNPT in HF and no HF). rNPT did not significantly change renal plasma flow in either the HF or no HF periods (p=0.47 for the interaction). During HF, rNPT yielded greater urine output (276 ml±113 ml vs 167 ml±55 ml p<0.001) and urine sodium excretion (33.0±14.5 mmol vs 19.5±6.8 mmol; p<0.001) compared to the control kidney. See FIGS. 63A and 63B. FENa was also higher with rNPT (14.5%±3.0% vs 10.9%±2.7%, p<0.001). See FIG. 65C. Renal plasma flow did not change significantly with rNPT in HF (p=0.58). See FIG. 65D. Filtration fraction increased during rNPT (55.6±24.8% vs 49.0±20.8%; p=0.034) with a similar effect between HF and no HF periods (p=0.70 for the interaction). See FIG. 63F. Urine NGAL was similar with and without rNPT (p=0.70). Importantly, during HF, the rNPT kidney had similar urine output (p=0.52) and sodium excretion (p=0.87), and higher FENa (14.5±3.0% vs 12.0±4.2%; p=0.001) compared to the non-rNPT kidney without HF.

Discussion

The foregoing test results of Example 3 demonstrate that negative pressure applied to the renal pelvis during high dose furosemide therapy significantly improves a wide range of cardio-renal parameters, such as increased GFR, increased urine output, and increased sodium output. The mechanism of the increase in cumulative urine sodium excretion was not due purely to an increase in GFR, because both total and fractional sodium excretion increased. Importantly, the benefit appears to be of a clinically significant magnitude as urine output and sodium excretion with rNPT during experimental heart failure was similar to the non-rNPT kidney during the control period, i.e., after the heart failure model was shown to significantly decrease renal function, application of rNPT during heart failure appeared to restore renal function back to substantially normal levels.

As known to those skilled in the art, in ADHF, elevated central venous pressure is transmitted to renal veins. The transmission of central venous pressure to the renal veins increases renal venous pressure and decreases venous compliance, without changing renal arterial resistance or compliance. Renal venous congestion raises intrarenal and tubular pressure in the fixed space of the encapsulated kidney. While not intending to be bound by any theory, since alterations in renal venous blood flow normalize with decongestion, the inventors theorized that interventions to reduce intrarenal pressure may improve diuretic response and, potentially, ADHF outcomes. The experiments of Example 3 show that an intervention with renal negative pressure therapy increased urine output and urine sodium excretion. These findings are consistent with observations in humans with ADHF, where abnormal measurements of renal venous impedance and flow have been shown to be associated with higher sodium avidity, diminished diuretic response, and worsening HF outcomes independent of central venous pressure. In patients with ADHF, the inverse relationship between diuretic response and elevated renal venous impedance is independent of GFR.

In addition to the beneficial effects in a HF model, renal negative pressure therapy appears to improve natriuresis and GFR during high dose furosemide therapy. This is an unexpected result because one might hypothesize that, in the normal state, increased filtration from rNPT would activate tubular glomerular feedback (TGF), which reduces filtration and brings GFR back to baseline. However, it is known that furosemide can reduce GFR. For example, it has been reported that furosemide administration can acutely increase proximal tubular pressure by ~10 mmHg to ~15 mmHg and increase renal interstitial pressure by ~7 mmHg, both of which are likely contributors to the fall in GFR observed with loop diuretic administration. Thus, even in the absence of HF, furosemide would be expected to reduce GFR and elevate tubular and interstitial pressures, which could theoretically be improved with rNPT. This observation may be expected to have clinical relevance as the therapeutic value of rNPT may extend beyond the often-brief period when patients have intravascular congestion severe enough to negatively impact kidney function.

While not intending to be bound by theory, it is believed that the current observations from the congestion predominate HF model of Example 3 may shed light on the human literature on kidney dysfunction in human HF. The majority of contemporary human studies have not found a meaningful association between cardiac output and kidney function. Thus, the finding of Example 3 showing substantial deterioration in kidney function in an HF model with normal "forward flow" is congruent with conditions described in relevant literature. See e.g., Damman K, Navis G, Smilde T D et al., *Decreased cardiac output, venous congestion and the association with renal impairment in patients with cardiac dysfunction, European journal of heart failure* (2007) 9:872-878; Uthoff H, Breidthardt T, Klima T et al., *Central venous pressure and impaired renal function in patients with acute heart failure, European journal of heart failure* (2011) 13:432-9; and Nohria A, Hasselblad V, Stebbins A et al., *Cardiorenal interactions: insights from the ESCAPE trial, Journal of the American College of Cardiology* (2008) 51:1268-74. Further, these several human studies have noted an association between central venous pressure and renal function. However, it appears that these findings are heterogeneous with studies reporting that decongestion of patients with high CVP is associated with worsening kidney function in some individuals and improved kidney function for others. In Example 3, a large volume of intravenous normal saline substantially increased cardiac filling pressures, but available metrics of renal function were either unaffected or even improved. Upon induction of cardiac tamponade, a substantial reduction in natriuresis, renal plasma flow, GFR, and urinary cGMP was observed. Much like the human literature showing sometimes opposite effects of congestion on renal function and diuresis, the experiments of Example 3 appear to illustrate that the overall balance of natriuretic and anti-natriuretic factors ultimately determine the impact of volume expansion on kidney function.

While interpreting the results in Example 3, it should be considered that although the acute cardiac tamponade model employed sought to provide a relatively stable, predictable, and titratable "warm and wet" HF phenotype, acute tamponade is a rare human HF presentation. Thus, the findings of Example 3 may not extrapolate to acute or chronic decompensated human HF. Although the human-use case for the Juxtaflow® catheter and system may involve high dose loop diuretics, the lack of data in humans on the effect of rNPT in the absence of diuretics is a consideration. While the presumed mechanism underlying the improved renal function with rNPT is reduction of intra-tubular and interstitial pressure, this was not directly measured. Although utilizing the JuxtaFlow® catheter for both negative and atmospheric pressure provided a control for any mechanical effects of instrumenting the renal pelvis, the experiments of Example 3 did not measure delivered pressure at the level of the renal pelvis through the single lumen of the Juxtaflow® catheter. Thus, it was not determined if the actual delivered pressure deviated from −30 mmHg in the rNPT group and 0 mmHg in the non-rNPT group. However, Example 3 provides proof of concept results showing the benefits of rNPT to improve renal function in an acute cardiac tamponade model in pigs.

Example 3 shows that in the setting of high dose loop diuretic therapy in pigs, rNPT with the JuxtaFlow® catheter and pump system resulted in significantly increased diuresis, natriuresis, and mGFR. Importantly, the benefit appeared to be of clinically significant magnitude as urine output and sodium excretion with rNPT during experimental heart failure was similar to the non-rNPT kidney during the control period.

The preceding examples and embodiments of the invention have been described with reference to various examples. Modifications and alterations will occur to others upon reading and understanding the foregoing examples. Accordingly, the foregoing examples are not to be construed as limiting the disclosure.

What is claimed is:

1. A system for removing fluid from a urinary tract, comprising:
    at least one sensor configured to detect signal(s) representative of pulmonary artery pressure and communicate signal(s) representative of the pulmonary artery pressure; and
    a controller configured to:
        receive and process the signal(s) from the at least one sensor to determine if the pulmonary artery pressure is above, below, or at a predetermined value; and
        provide a control signal, determined at least in part from the pulmonary artery pressure signal(s) received from the at least one sensor, to a negative pressure source to apply negative pressure to a urinary catheter to remove the fluid from the urinary tract when the pulmonary artery pressure is above the predetermined value and to cease applying the negative pressure when the pulmonary artery pressure is at or below the predetermined value.

2. The system of claim 1, wherein the at least one sensor comprises an implantable pressure transducer.

3. The system of claim 2, wherein the implantable pressure transducer is configured to be deployed in a right pulmonary artery.

4. The system of claim 1, wherein the at least one sensor comprises a passive sensor comprising an inductor-capacitor circuit configured to generate an electromagnetic field in response to an external radio frequency signal.

5. The system of claim 4, wherein the controller comprises a radio frequency antenna configured to cause the inductor-capacitor circuit of the at least one sensor to generate the electromagnetic field, and wherein the signal(s) received by the controller from the at least one sensor are representative of the generated electromagnetic field.

6. The system of claim 1, wherein the at least one sensor comprises at least one anchor comprising elongated tines formed from a flexible biocompatible material for securing the at least one sensor at an implant location.

7. The system of claim 1, wherein the negative pressure source comprises a pump configured to apply the negative pressure to the urinary catheter, the pump comprising at least one fluid port in fluid communication with a drainage lumen of the urinary catheter for receiving the fluid from a kidney.

8. The system of claim 7, wherein at least a portion of the pump is configured to be positioned external to the urinary tract.

9. The system of claim 7, wherein at least a portion of the pump is configured to be implanted in the urinary tract.

10. The system of claim 7, wherein the pump comprises at least one of a rotary pump, a rotodynamic pump, or a positive displacement pump.

11. The system of claim 7, wherein the pump is configured to provide negative pressure ranging from 0 mmHg to about 150 mmHg to the drainage lumen of the urinary catheter, as measured at the at least one fluid port of the pump.

12. The system of claim 7, wherein the pump is configured to produce a negative pressure sufficient for establishing a pressure gradient across a glomerulus of the kidney to facilitate urine flow towards the drainage lumen of the urinary catheter.

13. The system of claim 7, wherein the controller is an external controller electrically coupled to the pump to provide the control signal and, optionally, power to the pump.

14. The system of claim 7, wherein the controller is a pump controller disposed on a printed circuit board within a housing of the pump.

15. The system of claim 1, further comprising a remote computer device in wired or wireless communication with the controller, the remote computer device being configured to provide instructions to the controller for operating the negative pressure source and to receive information from the controller about at least one of the negative pressure source and/or about the pulmonary artery pressure.

16. The system of claim 1, further comprising the urinary catheter.

17. The system of claim 16, wherein the urinary catheter comprises a ureteral catheter comprising a distal portion comprising a retention portion and a proximal portion comprising a drainage lumen.

18. The system of claim 17, wherein the retention portion of the ureteral catheter comprises an outer periphery or protective surface area which prevents mucosal tissue from a kidney, renal pelvis and/or uretero-renal pelvis junction from occluding one or more protected drainage holes, ports, or perforations of the ureteral catheter upon application of the negative pressure through the ureteral catheter.

19. The system of claim 18, wherein the retention portion comprises a coil, and wherein the one or more protected drainage holes, ports, or perforations extend through a radially inwardly facing portion of a sidewall of the coil.

20. The system of claim 16, wherein the urinary catheter comprises a percutaneous kidney catheter.

21. The system of claim 20, wherein the percutaneous kidney catheter comprises:
a proximal portion configured to pass through a percutaneous opening; and
a distal portion comprising a retention portion,
wherein the retention portion comprises an outer periphery or protective surface area that inhibits mucosal tissue from a kidney, renal pelvis and/or uretero-renal pelvis junction from occluding one or more protected drainage holes, ports, or perforations of the percutaneous kidney catheter upon application of the negative pressure through the percutaneous kidney catheter.

22. The system of claim 21, wherein the retention portion comprises a proximal end sized to be positioned in the kidney and a distal end sized to be positioned in the uretero-renal pelvis junction.

23. The system of claim 21, wherein the retention portion comprises a coiled retention portion comprising at least a first coil having a first diameter and at least a second coil having a second diameter, the first diameter being greater than the second diameter.

24. The system of claim 1, wherein the controller is further configured to:
as the negative pressure source is applying the negative pressure to the urinary catheter, periodically compare the pulmonary artery pressure to the predetermined value for pulmonary artery pressure; and
provide additional control signals to the negative pressure source to increase a magnitude of the negative pressure applied by the negative pressure source to the urinary catheter when the pulmonary artery pressure is greater than the predetermined value.

25. The system of claim 24, wherein the controller is configured to provide the additional control signals to the negative pressure source to cause the negative pressure source to continue providing the increased magnitude of the negative pressure to the urinary catheter until the pulmonary artery pressure decreases below the predetermined value.

26. The system of claim 24, wherein the periodic comparison between the pulmonary artery pressure and the predetermined value occurs at least one of every hour, every four hours, every eight hours, or every twenty four hours.

27. A system for providing mechanical assistance for blood circulation and for removing fluid from a urinary tract, the system comprising:
at least one sensor configured to detect signal(s) representative of pulmonary artery pressure and communicate the signal(s) representative of the pulmonary artery pressure; and
a controller in communication with the at least one sensor configured to:
receive and process the signal(s) from the at least one sensor to determine the pulmonary artery pressure;
provide a first control signal determined at least in part based on the determined pulmonary artery pressure to a negative pressure source to control applying negative pressure to a urinary catheter to remove the fluid from the urinary tract; and
provide a second control signal determined at least in part based on the determined pulmonary artery pressure to a blood pump to control output of the blood pump.

28. The system of claim 27, wherein the blood pump comprises a left ventricular assist device.

29. The system of claim 27, wherein the controller is configured to determine if the pulmonary artery pressure is within or outside of a target range for pulmonary artery pressure.

30. The system of claim 29, wherein the second control signal adjusts the output of the blood pump when the pulmonary artery pressure is outside of the target range.

31. The system of claim 29, wherein the first control signal causes the negative pressure source to apply the negative pressure to the urinary catheter to remove the fluid from the urinary tract when the pulmonary artery pressure is outside of the target range, and the first control signal causes the negative pressure source to cease applying the negative pressure to the urinary catheter when the pulmonary artery pressure is within the target range.

32. The system of claim 31, wherein the controller is further configured to:
as the negative pressure source is applying the negative pressure to the urinary catheter, periodically compare the pulmonary artery pressure to the target range for pulmonary artery pressure; and
provide a signal to the negative pressure source to increase a magnitude of the negative pressure applied by the negative pressure source to the urinary catheter when the pulmonary artery pressure is greater than the predetermined value.

33. The system of claim 32, wherein the controller is configured to cause the negative pressure source to continue providing the increased magnitude of negative pressure to the urinary catheter until the pulmonary artery pressure determined by the at least one sensor decreases below the predetermined value.

34. The system of claim 27, wherein the at least one sensor comprises an implantable pressure transducer.

35. The system of claim 34, wherein the implantable pressure transducer is configured to be deployed in a right pulmonary artery.

36. The system of claim 27, wherein the at least one sensor comprises a passive sensor comprising an inductor-capacitor circuit configured to generate an electromagnetic field in response to an external radio frequency signal.

37. The system of claim 36, wherein the controller comprises a radio frequency antenna configured to cause the inductor-capacitor circuit of the at least one sensor to generate the electromagnetic field, and wherein the signal(s) received by the controller from the at least one sensor are representative of the generated electromagnetic field.

38. The system of claim 27, wherein the at least one sensor comprises at least one anchor comprising elongated tines formed from a flexible biocompatible material for securing the at least one sensor at an implant location.

39. The system of claim 27, wherein the negative pressure source comprises a pump configured to apply the negative pressure to the urinary tract, the pump comprising at least one fluid port in fluid communication with a drainage lumen of the urinary catheter for receiving the fluid from a kidney.

40. The system of claim 27, wherein the controller is a pump controller disposed on a printed circuit board contained within a housing of the pump.

41. The system of claim 40, wherein the controller wirelessly transmits the second control signal to the blood pump.

42. The system of claim 27, wherein the controller is configured to receive negative pressure feedback regarding at least one of a flow rate of fluid passing through the urinary catheter, a total fluid volume of fluid passing through the urinary catheter, and/or an analyte concentration of fluid passing through the urinary catheter, and wherein the second control signal is determined based, at least in part, of the received negative pressure feedback.

43. The system of claim 42, wherein the second control signal comprises an instruction to increase an output of the blood pump when the negative pressure feedback indicates fluid overload and/or pulmonary edema, and an instruction to decrease or maintain the output of the blood pump when the negative pressure feedback indicates no fluid overload and/or pulmonary edema.

44. A method for removing fluid from a urinary tract, the method comprising:

monitoring a pulmonary artery pressure;

determining if the pulmonary artery pressure is above, below, or at a predetermined value; and applying negative pressure to a urinary catheter to remove the fluid from the urinary tract when the pulmonary artery pressure is above the predetermined value or ceasing application of the negative pressure when the pulmonary artery pressure is at or below the predetermined value.

45. The method of claim 44, wherein monitoring the pulmonary artery pressure comprises applying a radio frequency signal to a passive sensor comprising an inductor-capacitor circuit configured to be generate an electromagnetic field in response to the radio frequency signal, and detecting changes in the generated electromagnetic field to determine the pulmonary artery pressure.

46. The method of claim 45, wherein the radio frequency signal is applied to the passive sensor by an external control device comprising a radio frequency antenna that generates the radio frequency signal and detects a signal response from the inductor-capacitor circuit of the sensor.

47. The method of claim 45, wherein the passive sensor is implanted in a right pulmonary artery.

48. The method of claim 45, wherein the radio frequency signal is periodically applied to the passive sensor at least one of once every hour, once every two hours, once every four hours, or once every twenty-four hours.

49. The method of claim 44, wherein applying the negative pressure to the urinary catheter when the pulmonary artery pressure is above the predetermined value comprises applying the negative pressure for a predetermined duration.

50. The method of claim 49, wherein, following the predetermined duration, the method further comprises determining the pulmonary artery pressure and applying the negative pressure for another instance of the predetermined duration when the pulmonary artery pressure is above the predetermined value or ceasing to apply the negative pressure when the pulmonary artery pressure is at or below the predetermined value.

51. The method of claim 49, wherein the predetermined duration comprises at least twelve hours.

52. The method of claim 44, further comprising, as the negative pressure is being applied to the urinary catheter, continuing to monitor the pulmonary artery pressure, and increasing a magnitude of the negative pressure applied by the negative pressure source when the pulmonary artery pressure is above the predetermined value.

53. The method of claim 44, wherein the negative pressure source comprises a pump configured to apply the negative pressure to the urinary tract, the pump comprising at least one fluid port in fluid communication with a drainage lumen of the urinary catheter.

54. The method of claim 44, further comprising causing an implanted blood pump to provide blood flow at an output determined based, at least in part, on the pulmonary artery pressure.

55. The method of claim 44, wherein the blood pump comprises a left ventricular assist device.

* * * * *